(12) United States Patent
Gould et al.

(10) Patent No.: US 8,271,996 B1
(45) Date of Patent: Sep. 18, 2012

(54) EVENT QUEUES

(75) Inventors: Christopher M. Gould, Leominster, MA (US); Peter J. McCann, Mason, NH (US)

(73) Assignee: EMC Corporation, Hopkinton, MA (US)

( * ) Notice: Subject to any disclaimer, the term of this patent is extended or adjusted under 35 U.S.C. 154(b) by 1024 days.

(21) Appl. No.: 12/286,493

(22) Filed: Sep. 29, 2008

(51) Int. Cl.
*G06F 9/54* (2006.01)

(52) U.S. Cl. ........ 719/312; 719/313; 719/314; 719/315; 719/316; 719/317; 719/318; 719/330

(58) Field of Classification Search .................. None
See application file for complete search history.

(56) References Cited

U.S. PATENT DOCUMENTS

| | | | | |
|---|---|---|---|---|
| 4,914,653 A * | 4/1990 | Bishop et al. | ................ | 370/462 |
| 5,317,726 A * | 5/1994 | Horst | ............................ | 714/12 |
| 5,434,975 A * | 7/1995 | Allen | ............................ | 719/312 |
| 5,566,337 A * | 10/1996 | Szymanski et al. | ........... | 710/260 |
| 5,619,687 A * | 4/1997 | Langan et al. | ................ | 713/502 |
| 5,632,032 A * | 5/1997 | Ault et al. | .................... | 718/100 |
| 5,682,534 A * | 10/1997 | Kapoor et al. | ................ | 719/328 |
| 5,771,383 A * | 6/1998 | Magee et al. | ................... | 719/312 |
| 5,887,134 A * | 3/1999 | Ebrahim | ........................ | 709/200 |
| 6,029,205 A * | 2/2000 | Alferness et al. | ............ | 719/310 |
| 6,668,279 B1 * | 12/2003 | Curtis | ........................... | 709/218 |
| 6,847,991 B1 * | 1/2005 | Kurapati | ....................... | 709/213 |
| 7,231,638 B2 * | 6/2007 | Blackmore et al. | ........... | 718/108 |
| 7,331,049 B1 * | 2/2008 | Jin | ................................ | 719/314 |
| 2001/0049726 A1 * | 12/2001 | Comeau et al. | ............... | 709/218 |
| 2002/0026502 A1 * | 2/2002 | Phillips et al. | ................ | 709/219 |
| 2002/0062402 A1 * | 5/2002 | Regnier et al. | ............... | 709/313 |
| 2002/0091863 A1 * | 7/2002 | Schug | ............................ | 709/250 |
| 2002/0144006 A1 * | 10/2002 | Cranston et al. | ............. | 709/312 |
| 2003/0037178 A1 * | 2/2003 | Vessey et al. | ................. | 709/319 |
| 2003/0088854 A1 * | 5/2003 | Wygodny et al. | ............. | 717/130 |
| 2003/0200355 A1 * | 10/2003 | Warwick et al. | .............. | 709/321 |
| 2004/0078799 A1 * | 4/2004 | Koning et al. | ................ | 719/313 |
| 2004/0103221 A1 * | 5/2004 | Rosu et al. | ........................ | 710/1 |
| 2004/0216137 A1 * | 10/2004 | Warwick et al. | .............. | 719/318 |
| 2005/0097564 A1 * | 5/2005 | Laura | ............................ | 719/312 |
| 2005/0138235 A1 * | 6/2005 | Ali Khan et al. | ............... | 710/24 |
| 2005/0183093 A1 * | 8/2005 | Pope et al. | ..................... | 719/314 |
| 2005/0198410 A1 * | 9/2005 | Kagan et al. | .................... | 710/22 |
| 2005/0210479 A1 * | 9/2005 | Andjelic | ........................ | 719/321 |
| 2006/0080668 A1 * | 4/2006 | Blackmore et al. | ........... | 719/312 |
| 2006/0218532 A1 * | 9/2006 | Cordella et al. | ............... | 717/124 |
| 2006/0259488 A1 * | 11/2006 | Bernabeu-Auban et al. | ..... | 707/9 |
| 2007/0266392 A1 * | 11/2007 | Thoelke | ........................ | 719/313 |
| 2007/0300241 A1 * | 12/2007 | Prakash et al. | ................. | 719/321 |

OTHER PUBLICATIONS

U.S. Appl. No. 12/286,433, filed Sep. 29, 2008, Gould et al.
U.S. Appl. No. 12/079,759, filed Mar. 28, 2008, McCann et al.
U.S. Appl. No. 12/079,822, filed Mar. 28, 2008, McCann et al.
U.S. Appl. No. 12/079,648, filed Mar. 28, 2008, McCann et al.

* cited by examiner

*Primary Examiner* — Andy Ho
*Assistant Examiner* — Shih-Wei Kraft
(74) *Attorney, Agent, or Firm* — Muirhead and Saturnelli, LLC

(57) ABSTRACT

Described are techniques for communicating between one or more producers and one or more consumers. A first consumer of an event queue registers for notification regarding occurrences of one or more events. A producer of the event queue posts one or more notifications to one or more consumers of the event queue regarding one or more occurrences of one or more events. Each of the consumers receive notification regarding occurrences of events for which the consumer is registered. The first consumer retrieves posted event notifications regarding events for which the first consumer is registered. If the first consumer is executing in user space and an event notification list to which the event notifications for the first consumer are posted is located in shared memory, the first consumer retrieves the posted event notifications without proxying into kernel space.

19 Claims, 100 Drawing Sheets

---

1350 add_events(reference, num_events, events[], private_data, private_data_size, qfull_policy, &num_events_queued_rv)

USER SPACE:
1352 - create input params containing kernel reference, private data size, qfull policy, and number of events
1354 - package up the input params, event objects, and private data in the input message list
1356 - create output params that will contain the number of events that were actually queued and package into output message list
1358 -send RPC to kernel rpc_call FAST (kernel_id, state_id, eventq_rpc_object, input msg_list, output msg_list, &rpc_status_rv)
1360 -(in kernel) kernel space handler (e.g., eventq_rpc_callback):
    1360a -extracts the kernel reference address, private data size, number of events, and qfull policy from input data
    1360b -extracts the event objects and private data region from the input list
    1360c - calls add_events API
    1360d- sets number of events queued in output params and returns from the RPC to U space
1362 - return status and the number of events queued (from output params) to the caller

```
create (  name,              /* name of event queue created */
          private_data_size,  /* size of private data record */
          &handle_rv)         /* handle to event queue created */
       );

/*This API is used to create a named event queue that can be used to hold events
whose private data is less than or equal to private_data_size. */
```

```
destroy (handle)  /* handle to previously created event queue */
```

/* This API is used to destroy a previous created event queue.
A destroy call can either be made explicitly by a user code module running in user or kernel space,
or as a result of cleaning up after a dying container. */

```
open (   name,        /* name event queue */
         num_entries, /* number of entries for event notifications */
         is_shared,   /* create in shared memory or not */
         &reference_rv); /* reference to created notification list */
```

340

/*
This API is used to create a reference to an event queue for event notifications
An event queue reference is needed to both produce and consume events. When a reference is created,
a kernel-resident ring buffer and private data region are allocated to hold num_entries event notifications.
Consumers can choose whether to allocate the ring buffer from shared memory or from standard memory.
User space consumers receive a performance benefit from using shared memory because it allows
for retrieval of event notifications from the private ring buffer without entering or proxying
into the kernel as long as event notifications are available. Producers may create a reference with
0 entries and use the reference to send event notifications to registered consumers.
A consumer may use its reference to register for specific event types and then retrieve event notifications
as added to the private ring buffer. Multiple producers can use the same event queue reference
to produce events, but only one consumer may retrieve events from an event queue reference at a time
without providing additional synchronization in other code using the API. */

```
close (reference) /* reference value returned from a previous open API call */
```

350

/*
This API is used to close a previously opened reference to an event queue.
A close may be issued explicitly by a user code module running in user or kernel space.
The close API may also be invoked during cleanup processing on behalf of a dying or terminating
container. When an event queue reference is closed, all the resources associated with the reference,
including the ring buffer, private data, and associated metadata may be made available for other uses. */

380 register_event (reference, /* reference value returned from a previous open API call */
          event)      /* identifies event for which reference is being registered. */
/*
This API is used by a consumer to register for a specific event identified by the event parameter. Upon occurrence of an event matching the event parameter, a notification is added to the event notification list identified by the reference parameter. Consumers may register for any number of different events. When a producer adds an event to an event queue (via add events API call), every consumer that has registered for that event receives a copy of the event as notification by placing the notification on the notification list included in the consumer's reference along with any optional additional private data copied to the consumer's ring buffer.*/

390 unregister_event (reference, /* reference value returned from a previous open API call */
          event)      /* identifies event for which reference is being registered. */
/*
This API is used by a consumer to unregister for a specific event identified by the event parameter. Once an event has been unregistered, the consumer no longer receives copies of notifications for that event type in the consumer's ring buffer (as associated with the consumer's reference structure)
*/

FIGURE 5

```
add_events (reference,       /* reference returned from previous open API call */
            num_events,      /* number of events */
            events[],        /* one or more events being added */
            private_data,    /* ptr to private data area for all events */
            private_data_size, /* size of private data area */
            qfull_policy,    /* policy affecting producer/caller if consumer's event notification
                                list (ring buffer) is full */
            &num_events_queued_rv) /* number of events queued by producer */
/*
This API is used by a producer to add events to an event queue. The producer can specify one or more
events and (optionally) a pointer to a contiguous private data area containing the private data associated
with those events. Any consumer currently registered for one of the events matching
an event record included in the events parameter (array) receives a copy of that event in its ring buffer.
If a producer encounters a condition where it is trying to add an event and one of the receiving consumers
has a full notification list (ring buffer is full), the API handles the situation according to the qfull_policy
parameter specified by the producer. There are three different qfull policies supported by the add_events
API: PEND, OVERWRITE_OLDEST, and OVERWRITE_NEWEST. The PEND policy causes
the producer to block if the API encounters a qfull situation. The other two policies,
OVERWRITE_OLDEST and OVERWRITE_NEWEST, cause the producer to overwrite,
respectively, the oldest or newest entry in the queue.              */
```

FIGURE 6

```
get_events (reference, /* reference returned from previous open API call */
    max_events, /* max number of events to retrieve in this invocation */
    events[],     /* structure for holding event notifications retrieved */
    private_data, /* ptr to data area for any private data */
    private_data_size, /* max amount of private data copied for each event */
    timeout,      /* only wait this long for an event notification if notification list is empty */
    &num_events_rv) /* number of events actually retrieved/consumed from ring buffer */
/*

This API is used by a consumer to retrieve events and private data from the consumer's ring buffer.
Each consumer (per reference) has a ring buffer for event notification storage as previously allocated
during an open API call. Each ring buffer can be allocated from either shared memory or from standard
memory. If a ring buffer is allocated from standard memory, a U space consumer cannot access the ring
buffer from user space and may use an RPC to proxy into the kernel to collect the events in the kernel.
If the ring buffer is allocated from shared memory, a U space consumer can access the ring buffer
producer/consumer indices as well as the event objects and private data directly from user space without
proxying into the kernel. When using shared memory from a U space consumer, an RPC may be issued
to the kernel to signal a waiting producer (as a result of consuming an event from a full ring buffer),
or to wait for events (as a result of trying to consume an event from an empty ring buffer).
*/
```

```
Event entry:
event type    /* event type and event id are used in combination to uniquely identify
event id      /* an event. These two may be combined to determine value which is
              /* then hashed when accessing reg table entry */ user context /* can be used to send small amount of user specific data for event.
              Utilize private data area if more is needed */
```

FIGURE 12A create (name, private_data_size, &handle_rv)
/* This API is used to create a named event queue that can be used to hold events whose private data is less than or equal to private_data_size. */

USER SPACE
962 - allocate user space handle
964 - create input params containing private data size
966 - package up input params and name into input msg_list
968 - create output params that will contain the address of the kernel handle for the event queue
970 - package up output params into output msg_list
972 - send RPC to kernel rpc_call FAST (kernel_id, state_id, eventq_rpc_object, input msg_list, output msg_list, &rpc_status_rv)
974 - (in kernel) kernel space handler (e.g., eventq_rpc_callback):
    974a - deconstructs input and output params and passes them to kernel space create API
    974b - kernel space handler sets output_params kernel handle to the handle_rv returned from the K space create API and returns from the RPC to user space
976 - user space create API returns user space handle to caller

KERNEL SPACE
/* may be called from kernel space or from user space via RPC */
981- if the event queue already exists return STATUS_ALREADY_EXISTS
982- otherwise allocate kernel space handle
984- add this handle to the global list of event queues
986- initialize handle metadata (create gate, registration db, etc)
988- initialize the handle refcount to 1
990- return the handle to the caller

FIGURE 16 open (name, num_entries, is_shared, &reference_rv)
KERNEL SPACE:
/* may be called from kernel space or from user space via RPC */

1152 - lookup the handle by name and if not found return STATUS_NOT_FOUND
1154 - allocate kernel reference
1156 - initialize the reference
1158 - calculate the space needed for the ring buffer and the private data region and
       allocate them from either shared (if is_shared == 1) or standard memory
1160 - increment the event queue handle refcount
1162 - return the kernel reference to the caller

1100

FIGURE 19 close (reference)

USER SPACE:

1152 - if the ring buffer is shared memory unmap the memory from the container address space 1154 - create input params containing the kernel reference address 1156 - package up the input params into the input msg_list 1158 send RPC to kernel rpc_call FAST (kernel_id, state_id, eventq_rpc_object input msg_list, output msg_list, &rpc_status_rv)

1160 -(in kernel) kernel space handler (e.g., eventq_rpc_callback):

1160a  -kernel space handler extracts the kernel reference address from the input params and issues the kernel space close API 1160b  -kernel space handler returns from the RPC to user space 1162 - free the user space reference 1164 - return to the caller

FIGURE 20 close (reference)
KERNEL SPACE
/*may be called from kernel space, from user space via RPC, or during cleanup of a user space container */

1202 - wake up a consumer if one is waiting on this reference. Perform processing to ensure that the consumer doesn't try to wait again 1204 - Perform SEAL GATE processing and wakeup any producers pending in add_events. Sleep for a while and continue waking up producers until all waiting producers have left the gate. (gate is now closed)

1206 - walk all the registration tables in the registration db for the event queue handle and remove any registration entries associated with this reference 1208 - Perform UNSEAL GATE processing to re-open the gate to allow producers back in.

1210 - cleanup the reference metadata

1212 - decrement the handle refcount

1214 - if the reference count is 0 remove the handle from the global list of event queues and free up the handle 1216 - free up the memory associated with the ring buffer 1218 - free the kernel space reference 1220 - return to the caller

1200

FIGURE 21 add_events(reference, num_events, events[], private_data, private_data_size, qfull_policy, &num_events_queued_rv)

USER SPACE:

1352 - create input params containing kernel reference, private data size, qfull policy, and number of events 1354 - package up the input params, event objects, and private data in the input message list 1356 - create output params that will contain the number of events that were actually queued and package into output message list 1358 - send RPC to kernel rpc_call FAST (kernel_id, state_id, eventq_rpc_object, input msg_list,
output msg_list, &rpc_status_rv)

1360 - (in kernel) kernel space handler (e.g., eventq_rpc_callback):

1360a - extracts the kernel reference address, private data size, number of events, and qfull policy from input data 1360b - extracts the event objects and private data region from the input list 1360c - calls add_events API 1360d - sets number of events queued in output params and returns from the RPC to U space 1362 - return status and the number of events queued (from output params) to the caller

1400 ⤵ add_events(reference, num_events, events[], private_data, private_data_size, qfull_policy, &num_events_queued_rv)
KERNEL SPACE /* may be called from kernel space or from user space via RPC */
- for each event being added do the following steps:
1401)  - Perform ENTER GATE to enter gate if open. If the gate is closed sleep periodically until it is open again
1402)    - look up the registration table for the event in the handle's event registration db
1403)    - for each entry in the registration table do the following steps:/ *for each registered C */
1404)        - take the producer mutex (P mutex) for this C to serialize access to this C's reference with other Ps
1405)        - make two copies of the producer and consumer indexes (position info)
                (one to save original value and another to modify to reflect new values)
1406)        - use the indices to calculate the number of free slots in the ring buffer for the current C
1407)        - if there are no free slots and the qfull policy is overwrite oldest/newest discard
                    oldest or newest slot accordingly
1408)        - if there are no free slots and the qfull policy is pend perform the following steps:
1409)            - Perform CHECK GATE to make sure it hasn't closed while processing event
1410)            - if the gate was closed release the P mutex and start again at step 1401
1411)            - wait on the P wait semaphore for the C to free up a slot
1412)            - if the wait was interrupted drop the P mutex and proceed to step 1420 and return
                        from API with STATUS_INTERRUPTED /* IF U process dies */
1413)            - return to step 1405
1414)        } 1424
1414a)      - if there are free slots then:
1415)            -copy the event to the first free slot in the ring buffer and the private
                    data to the first free slot in the private data region
1416)            - update producer index in local copy of position info
1417)            - use CAS to try to update position info for current consumer
1418)            - if CAS failed restart operation for current consumer
                 - if we just added an event to a queue that was previously empty then signal
                    C semaphore (check unchanged copy of position info to determine free slots)
                } 1426
1419)    - unlock the producer mutex (P mutex) for this consumer
1420)  - Perform EXIT GATE processing.
1421) - return the number of events processed to the caller

FIGURE 25

1450 get_events(reference, max_events, events[], private_data, private_data_size, timeout, &num_events_rv)
USER SPACE
1460 - if the event notification Q is NOT allocated from standard memory perform the following steps: /*UNOPTIMIZED*/
1462     - create input data containing the kernel reference, private_data_size, and max_events
1464     - package up the input data into the input msg_list
1466     - package up the event objects (events[]) and the private data into the output msg_list
1468     - send RPC to kernel rpc_call FAST (kernel_id, state_id, eventq_rpc_object, input msg_list, output msg_list, &rpc_status_rv)
1470     -(in kernel) kernel space handler (e.g., eventq_rpc_callback):
1470a       - kernel space handler extracts parameters from input msg_list and private data and events[] from output message list and calls get_events API
1470b       - kernel space handler sets output msg_list entry for events[] to actual size of events[] based on the number of events that were received
1470c       -kernel space handler sets output msg_list entry for private_data to actual size of private data based on the number of events that were received
1470d     - return from RPC to user space
1480 - if the event notification Q is allocated from shared memory perform the following steps: /*OPTIMIZED*/
1482     - make two copies of the producer and consumer indexes (position info)
      /**(one to save original value and another to modify to reflect new values) */
1486     - calculate the number of used slots in the ring buffer
1488     - if there are no events then use the kernel RPC to proxy to the kernel and wait on the C semaphore
1490     - for each event found (up to max events) copy the event information and private data from the ring buffer into events[] and private_data
1492     - update the local copy of the Cindex to reflect the number of events consumed
1494     - use CAS to update the position_info ring buffer indices using local copy and original position info
1496     - if the indices changed while we were consuming the events then restart (step 1480)
1498     - if the queue was full before we consumed the entries then use the RPC to proxy to the kernel and wake up the P semaphore
1499     - set the number of events (num_events_rv) that were consumed and return to the caller 1463a = steps 1460–1470d
1463b = steps 1480–1499

FIGURE 26 get_events(reference, max_events, events[], private_data, private_data_size, timeout, &num_events_rv)
KERNEL SPACE

1502- make two copies of the producer and consumer indexes (position info)
/** (one to save original value and another to modify to reflect new values)
1504- calculate the number of used slots in the ring buffer
1506- if there are no events then wait on the consumer semaphore
1508- for each event found (up to max events) copy the event information and private data from the ring buffer into events[] and private_data
1510- update the local copy of the consumer index to reflect the number of events consumed
1512- use CAS to update the position_info ring buffer indexes based on the local copy and the original position info
1514- if the indexes changed while we were consuming the events then restart /goto step 1502
1516- if the queue was full before we consumed the entries then signal the producer semaphore to wake up the waiting producer
1518- set the number of events (num_events_rv) that were consumed and return to the caller

FIGURE 27

Gate lock structure 1552 waiter count
gate closed /*boolean */
lock /* spin lock */
mutex

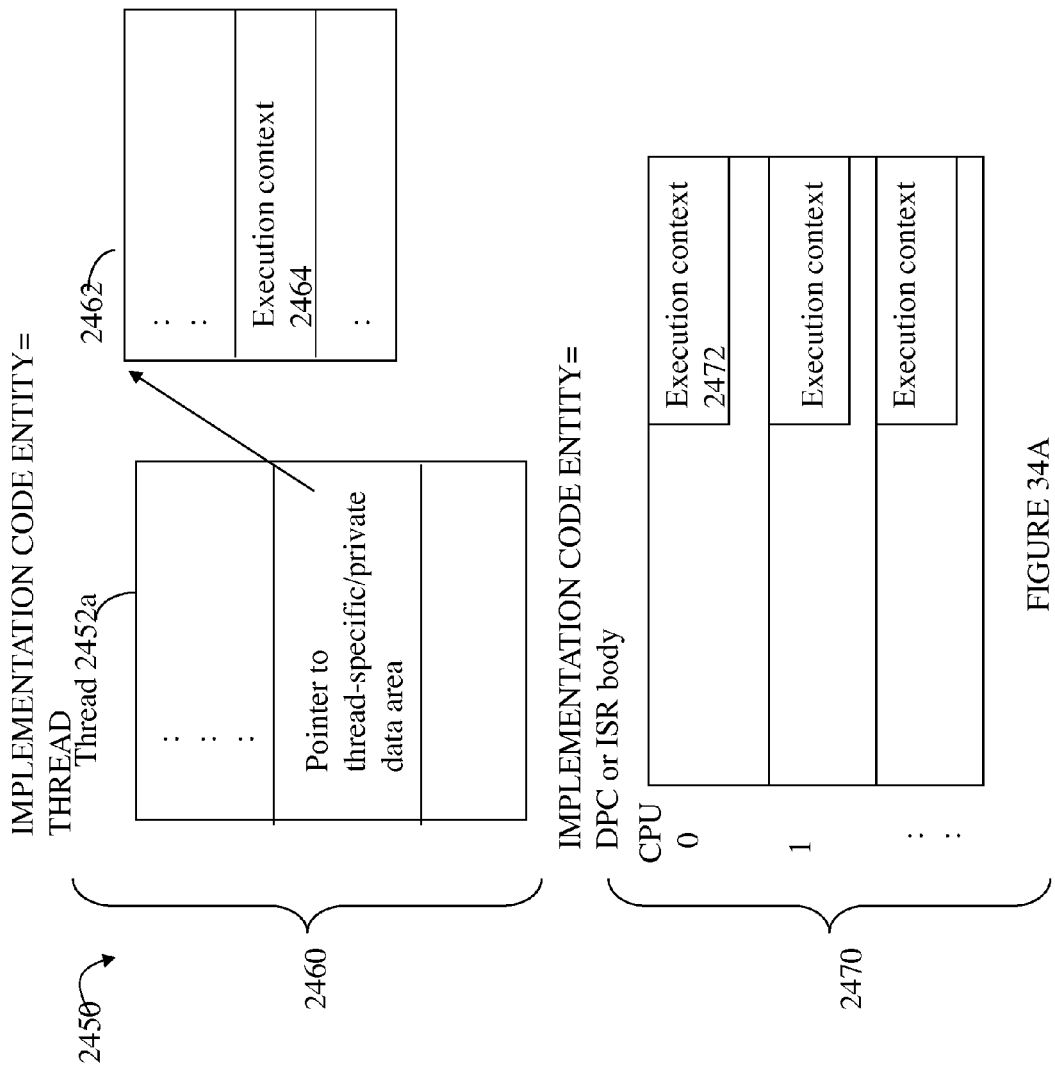

```
rpc_register(&rpc_object, /* object to track information about this RPC */
             rpc_function); /* function to register. This parameter identifies the name of function which
                               is included in the list of registered RPCs for a particular container. */
```
4310

```
rpc_unregister(&rpc_object);  /* RPC object previously registered using rpc_register */
```
4320

4360 — rpc_call SLOW(ic_id, /* container identifier of remote container */
NAME, /* string of RPC name in server being called */
input_args, /* RPC input arguments */
output_args, /* RPC output arguments */
&rpc_status_rv /* status of RPC call */
)

4370 — rpc_lookup( ic_id, /* container identifier of remote container */
rpc_name, /* name of RPC function                                    */
&rpc_remote_addr_rv, /* address of RPC object in remote container */
&state_id_rv    /* current global RPC state id of remote container */
)

4380 — rpc_call FAST(ic_id, /* container identifier of remote container */
state_id, /* global state id of remote container */
remote_rpc_addr, /* address of RPC object in remote container */
input_args, /* RPC input arguments */
output_args, /* RPC output arguments */
&rpc_status_rv /* status of RPC call */
)

FIGURE 56

```
rpc_lookup( ic_id,     /* container identifier of remote container */
            rpc_name, /* name of RPC function                       */
            &rpc_remote_addr_rv,/* address of RPC object in remote container */
            &state_id_rv   /* current global RPC state id of remote container */
          )                                                                       } 4760

/* execute API inputs include lookup command code, rpc_name; */
/* execute API output params include rpc_remote_addr_rv and state_id_rv */
/*send lookup request to server denoted by ic_id using execute API. */
status = execute(ic_id, RPC_CMD, input_buffer = (LOOKUP_CMD, rpc_name);  ───▶ 4752
                 output_buffer= (&rpc_remote_addr_rv, &state_id_rv));

if (status indicates server is not present) then  /* examine return status from lookup request */
    return PROTOCOL_ERROR ──────▶ 4754
else if (status indicates rpc not found) then
    return RPC_NOT_FOUND ─────▶ 4756
else return SUCCESS ──────▶ 4758
```

FIGURE 64

```
rpc_call SLOW(ic_id,  /* container identifier of remote container */
              NAME,    /* string of RPC name in server being called */
              input_args, /* RPC input arguments */
              output_args, /* RPC output arguments */
              &rpc_status_rv /* status of RPC call */
             )                                                           } 4860
{
/* send RPC call request to server denoted by ic_id using execute API. */
/* execute API inputs include call SLOW command code, NAME, input_args; */
/*execute API output params include output_args and rpcs_status_rv */
4852 ───── status = execute(ic_id, RPC_CMD,
                          input_buffer= (SLOW_CMD, NAME, input_args),
                          output_buffer =(output_args, rpc_status_rv));
4854 ──▶ return status;
}
```

EVENT QUEUES

BACKGROUND

1. Technical Field

This application generally relates to code execution, and more particularly to techniques used for communicating between different code modules.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Code modules that execute on a data storage system, as well as other systems, may use a variety of different techniques for inter-module communications. An environment in which the code executes may provide a facility for such inter-module communication. It may be desirable to utilize a flexible and efficient communication model and facility allowing communications to be exchanged between executing code modules.

SUMMARY OF THE INVENTION

In accordance with one aspect of the invention is a method for communicating between one or more producers and one or more consumers comprising: registering, by a first consumer of an event queue, for notification regarding occurrences of one or more events; posting, by a producer of the event queue, notification to one or more consumers of the event queue regarding one or more occurrences of one or more events, each of said one or more consumers receiving notification regarding occurrences of events for which said each consumer is registered, said one or more consumers including said first consumer; and retrieving, by said first consumer, posted event notifications regarding events for which said first consumer is registered, wherein, if said first consumer is executing in user space and an event notification list to which said event notifications for said first consumer are posted is located in shared memory, said first consumer retrieves said posted event notifications without proxying into kernel space, and wherein if said event notification list of said first consumer is not located in shared memory, said first consumer proxies into kernel space to retrieve said posted event notifications from said event notification list. The event notification list may be implemented using a ring buffer. The event queue may be used by different containers for communicating therebetween, each of said different containers executing in a context of its own address space that is different from address spaces of other containers. Posting a notification regarding an occurrence of an event may include posting an event notification to an entry in said ring buffer and posting additional data to a private data area, said private data area being located in shared memory if said event notification list is included in shared memory. The producer may use a first application programming interface to create a first reference structure to said event queue, and said first consumer may use the first application programming interface to create a second reference structure to said event queue. The first consumer may use a second application programming interface to perform said registering. Each invocation of said second application programming interface by said first consumer may identify said second reference structure. The first consumer may use a third programming interface to perform said retrieving, each invocation of said third programming interface by said first consumer identifying said second reference structure. The producer may use a second application programming interface to perform said posting. Each invocation of said second application programming interface by said producer may identify the first reference structure. The producer may also be a consumer of one or more events for which said producer has registered using said second application programming interface. Each invocation of said second application programming interface by said producer may identify the first reference structure. An application programming interface may be invoked by code of a container other than said producer and said one or more consumers to create said event queue. The steps of registering, posting and retrieving may be performed using defined interfaces. The defined interfaces may be used when said producer executes in user space and said first consumer executes in user space, when said producer executes in user space and said first consumer executes in kernel space, and when said producer executes in kernel space and said first consumer executes in user space. The event queue may be associated with a registration database of registered events for which consumers are registered. Processing performed to modify said registration database may include performing processing to close a logical gate, awakening all waiting producers of said event queue waiting for a free entry in any notification list of any consumer of said event queue, modifying said registration database, and opening said logical gate. Processing performed by said producer in connection with said posting of an event notification for a first event to said event notification list of said first consumer may include: reading information from said registration database when said producer determines that said logical gate is opened, said information indicating that said first consumer is registered to receive notifications regarding said first event; acquiring a mutex to synchronize access to said first consumer's event notification list with other producers; and if there are no free entries in said first consumer's event notification list and said producer is trying to post an event notification to a free entry in said first consumer's event notification list, said producer determines whether the gate is closed, and if the gate is closed, the producer releases said mutex and resumes processing when said gate is opened, and if the gate is open, said producer blocks waiting for a free entry in said first consumer's event notification list. An application programming interface may include a first defined interface for use by a consumer to perform said registering, a second defined interface for use by a consumer to unregister for a specified event, and a third defined interface used by producers and consumers of said event queue to indicate that an invoking container is ending use of said event queue for communications with other containers which have opened said event queue for communications using a fourth defined interface. Code of routines for said first defined interface, said second defined interface and said third defined interface may modify said registration database. The application programming interface may include a fifth defined interface used by a producer to perform said posting. The fifth defined interface may include a parameter indicating a policy utilized in connection with posting an event notification to a consumer's event notification list when the consumer's event notification list is full. The parameter may indicate one of a plurality of policies, said plurality of policies including pending, overwrite oldest, and overwrite newest, wherein said pending causes processing of a posting producer to wait until an entry in the consumer's event notification list is free, said overwrite oldest causes a posting producer to overwrite an oldest entry in the consumer's event notification list when full, and said overwrite newest causes a posting producer to overwrite a newest entry in the consumer's event notification list when full. A defined interface may be used by said first consumer to perform said retrieving. The defined interface may include a parameter indicating a timeout value, wherein, if said event notification list of said first consumer is empty, said timeout value specifies an amount of time said first consumer waits for an event notification to be posted to said event notification list prior to said first consumer continuing processing.

In accordance with another aspect of the invention is a computer readable medium comprising executable code thereon for facilitating communications between one or more producers and one or more consumers, the computer readable medium comprising executable code for: a first interface for opening communications between an invoking container and other containers using said event queue, said first defined interface being invoked by producers and consumers of said event queue prior to using said event queue for communicating with other containers, said first interface returning a reference to said event queue; a second interface used by a consumer of said event queue to register for notification regarding occurrences of one or more events, said second interface including a parameter indicating said reference used by said consumer; a third interface used by a producer of said event queue to post one or more notifications regarding one or more occurrences of one or more events to one or more consumers, each consumer receiving a notification on an event notification list used by said consumer regarding events for which said each consumer has registered using said second interface; and a fourth interface used by a consumer to retrieve event notifications from an event notification list regarding events for which the consumer is registered, wherein if the consumer is executing in user space and the event notification list of the consumer is located in shared memory, said consumer retrieves the event notifications therefrom without proxying into kernel space, and wherein if said event notification list of the consumer is not located in shared memory, said consumer proxies into kernel space to retrieve the event notifications therefrom. The third interface may include a parameter indicating a policy utilized in connection with posting an event notification to a consumer's event notification list when the consumer's event notification list is full, said parameter of said third interface indicating one of a plurality of policies. The plurality of policies may include pending, overwrite oldest, and overwrite newest, wherein said pending causes processing of a posting producer to wait until an entry in the consumer's event notification list is free, said overwrite oldest causes a posting producer to overwrite an oldest entry in the consumer's event notification list when full, and said overwrite newest causes a posting producer to overwrite a newest entry in the consumer's event notification list when full. The fourth interface may include a parameter indicating a timeout value, wherein, if said event notification list of said consumer is empty, the timeout value may specify an amount of time said consumer waits for an event notification to be posted to said event notification list prior to said consumer continuing processing. The first interface may include a parameter indicating whether an event notification list of said invoking container is located in shared memory, and wherein a producer invoking said first interface may indicate that said event notification list is created to hold no entries. The event queue may be used for communicating between different containers. Each of the different containers may execute in a context of an address space that is different from address spaces of other containers. The computer readable medium may include code for implementing said interfaces between a producer executing in user space and a consumer executing in user space, between a producer executing in user space and a consumer executing in kernel space, and between a producer executing in kernel space and a consumer executing in user space.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3, 4, 5, 6, and 7 are examples illustrating defined interfaces that may be included in an event queue API in connection with an embodiment in accordance with techniques herein;

FIGS. 9, 10, 11, 12, 12A, and 13 are examples of data structures that may be used in connection with an embodiment in accordance with techniques herein;

FIGS. 15, 16, 17, 18, 19, 20, 21, 22, 23, 24, 25, 26, and 27 are examples illustrating logical processing that may be performed in connection with the event queue API in an embodiment in accordance with techniques herein;

FIG. 28 is an example illustrating fields that may be included in a gate structure in an embodiment in accordance with techniques herein;

FIG. 34A is an example illustrating data structures that may be used in connection with storing execution contexts in an embodiment;

FIG. 55 is an example illustrating a server-side API for use in connection with the techniques herein;

FIG. 56 is an example illustrating a client-side API for use in connection with the techniques herein;

FIGS. 59, 61, 62, 63 and 64 are examples illustrating processing that may be performed by a server container in an embodiment in accordance with techniques herein;

FIGS. 65 and 66 are examples illustrating processing that may be performed by a client container in an embodiment in accordance with techniques herein;

DETAILED DESCRIPTION OF EMBODIMENT(S)

Figure 1:
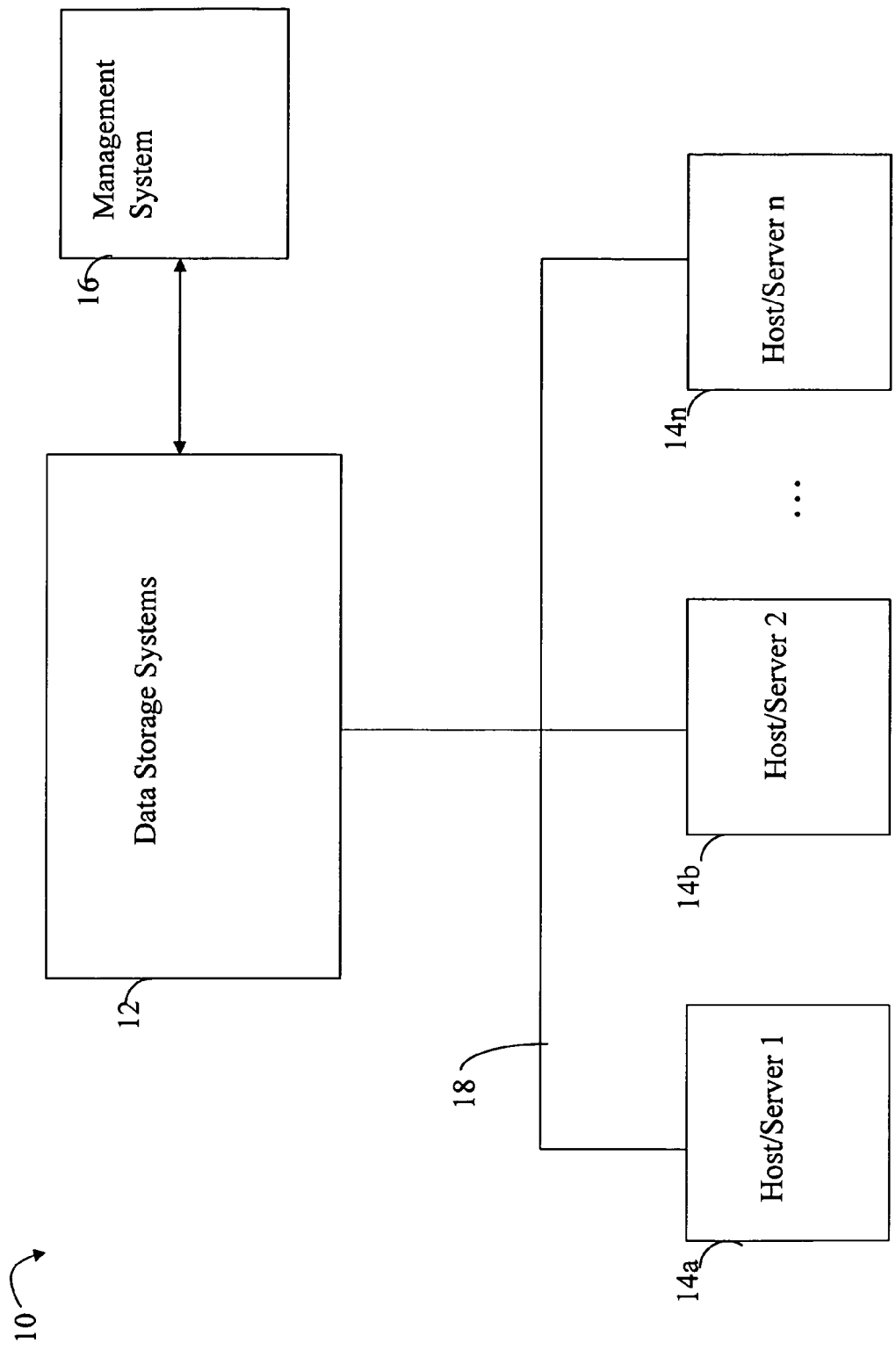
FIG. 1 is an example of an embodiment of a system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment (CSE) based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment (CSE).

In another embodiment, the data storage systems 12 may include one or more data storage systems such as one or more of the data storage systems, such as a data storage array, offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interfaces) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Figure 2:
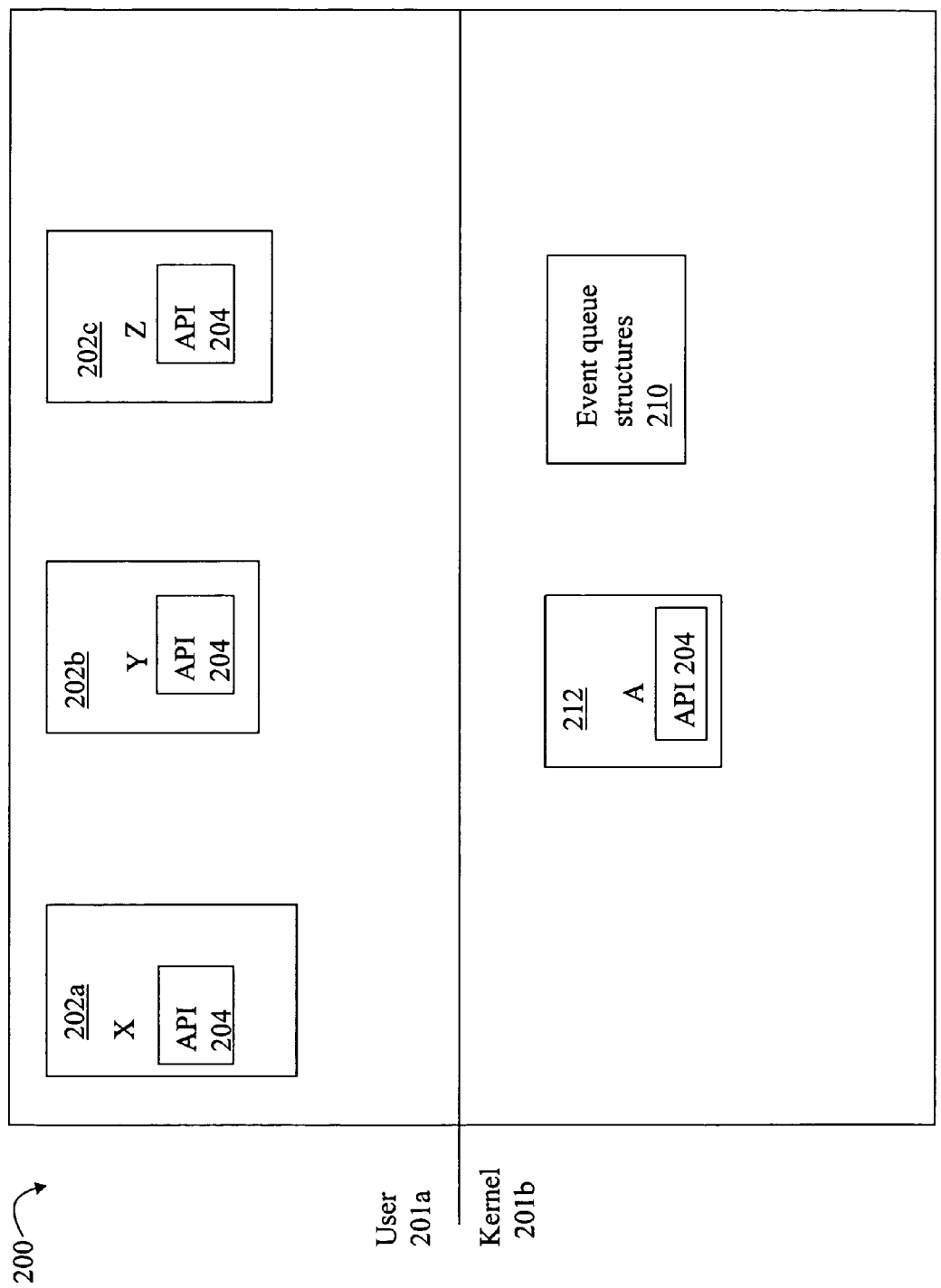
FIG. 2 is an example illustrating use of an API (application programming interface) in connection with a same code module that may be executed in user space and kernel space.

Referring to FIG. 2, shown is an example of components that may be executing on a processor node of a data storage system. If a data storage system has multiple processors, FIG. 2 illustrates components that may be executed by each such processor and includes user mode processes 202a, 202b and 202c and module 212 executing in kernel mode.

In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, elements 202a, 202b, and 202c may be user space processes or containers each having their own process address space. Thus, each user space process may be characterized as a single container or fault domain for fault containment purposes. In other words, each user process has its own state and can have an execution fault independent of, or isolated from, the other user processes. Thus, when one of the user processes experiences a fault, the other user processes may continue to execute without being affected by the fault. When a first of the executing processes is notified of the failing process, the first process may also notify other executing user and/or kernel space modules. The first process, or other currently executing user space process, may perform processing on behalf of the failing process and may perform cleanup associated with the failing process. In one embodiment, each user process can save information about its own state in an area of memory external to the process so that another instance of the same user process can perform cleanup, resume processing of the failed process, and the like. Additionally, a currently executing user space process may take steps in response to the failing process in accordance with any outstanding requests or processing being performed by the failing process on behalf of the currently executing process. For example, a first process may reissue its request previously made to a failing user process to another user process instance performing the same services or functionality as the failing process. In contrast, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each instance of 202a, 202b, and 202c executing in user mode 201a. Typically, code such as device drivers execute in kernel mode. As will be described in following paragraphs using the common software environment herein, a code module using APIs which implement user and kernel mode variations of necessary operations can execute in both user and kernel mode without modification to the original source code. In other words, for a given API call, any coding difference in implementing the API call when executing in user or kernel mode, different operating system, or other data storage system environment particular, may be embedded in the code of the API.

Described in following paragraphs is an API that may be used in connection with an inter-container (e.g. inter address space) event queue facility where the producers and consumers of the events may execute in user space or kernel space. That is, each producer may execute in user mode or kernel mode and each consumer may execute in user mode or kernel mode. In one embodiment described herein, the structures 210 for implementing the event queue may be kernel resident and calls between user space and kernel space (including calls made by code of the event queue facility and API described herein) may be facilitated using another facility, remote procedure call (RPC) facility, where a first code module in a first container makes a remote procedure call to a second container. An RPC API may be utilized as described in U.S. patent application Ser. No. 12/286,433, filed on Sep. 29, 2008, REMOTE PROCEDURE CALLS, ("RPC patent application"), which is incorporated by reference herein. The RPC mechanism and facility described in the RPC patent application includes an API with a client interface and a server interface for performing inter-container calls. In accordance with the techniques herein, the RPC mechanism and facility described in the RPC patent application may be utilized in an embodiment in connection with U-K communications, for example, where a container, such as a consumer container or producer container of events, executes in user mode in order to access the event queue structures as needed for different event queue processing operations. This is described in more detail in following paragraphs.

In the example 200, each of the user mode processes 202a, 202b and 202c may use the same API 204. Code executing in the kernel space, such as software component or module 212, may also utilize the same API 204. The underlying details of implementing the functionality of the API call are embedded in the API code and not the code associated with 202a-202c and 212. Using the API, an embodiment may make a same set of functionality available to code that executes in both user and kernel space and leave the implementation details of the API calls to be included in the API code. The same event queue API may be used when the consumer executes in user mode or kernel mode, and when the producer executes in user mode or kernel mode. Similarly, an embodiment may implement the event queue API described herein using the RPC API described in the RPC patent application where the RPC API may be used for U-U RPCs, U-K RPCs, and K-U RPCs.

Figure 2A:
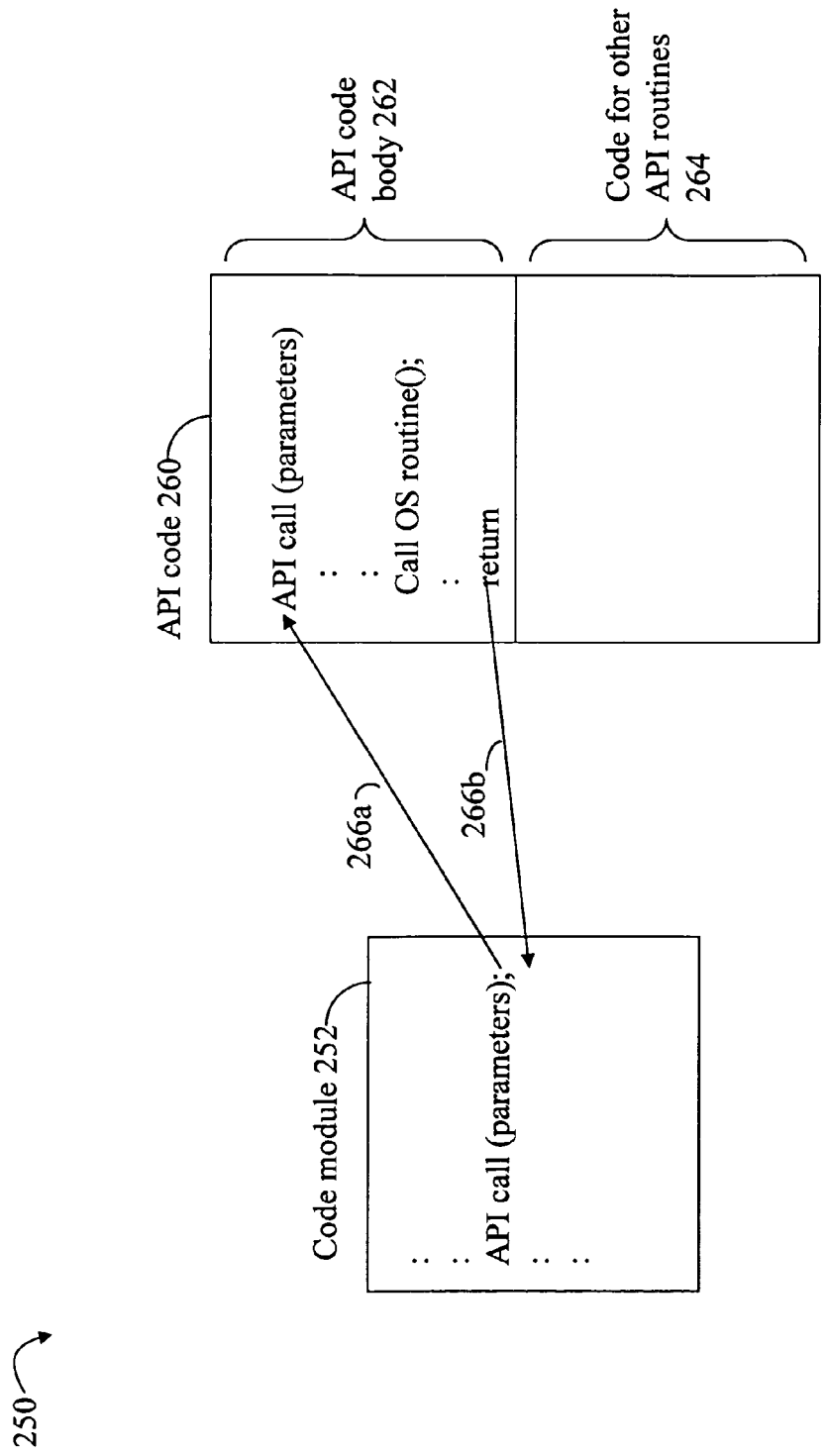
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation in connection with the API is not directly available in a native operating system, the functionality may be emulated or synthesized using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system. The API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

In one embodiment of the event queue API, the RPC facility may be build on top of, and utilize, a lower level inter-module communication mechanism (for inter-container communication) and technique to facilitate inter-module communication between two code modules executing in user mode (U-U communication between containers), or between a first code module that executes in user mode and a second code module that executes in kernel mode (U-K and K-U communication).

The inter-module communication techniques described in U.S. patent application Ser. No. 12/079,759 (the '759 application), filed Mar. 28, 2008, TECHNIQUES FOR INTER-USER-SPACE COMMUNICATION, and U.S. patent application Ser. No. 12/079,822 (the '822 application), filed Mar. 28, 2008, TECHNIQUES FOR USER SPACE AND KERNEL SPACE COMMUNICATION, both of which are incorporated by reference herein, may be used in connection with inter-module communication between containers as needed to implement the RPCs for inter-container communications. As described in the '759 and '822 applications, the API may also include interfaces defined and used to facilitate inter-module communication between two code modules in different containers executing in user mode (U-U communication), or between a first code module that executes in user mode and a second code module that executes in kernel mode (U-K and K-U communication). A first code module initiates a transaction or a command request and invokes a second code module. The first code module may also be referred to as a client and the second code module may be referred to as the server. In accordance with the techniques described in the foregoing two patent applications, U-U communications may be utilized when both client and server are user mode processes, U-K communications may be utilized when the client executes in user mode and the server executes in kernel mode, and K-U communications may be utilized when the client executes in kernel mode and the server executes in user mode. In connection with the techniques herein, the client may issue requests to a server to perform a remote procedure call and the appropriate inter-module communications may be used depending on the particular mode (e.g., user U or kernel K) of each of the client and server.

In accordance with the techniques described herein, a code module may be executed using a communications model (such as the inter-module and inter-container communications described above in the '759 and '822 applications), RPC mechanism and facility (as described in the RPC patent application), and event queue facility (as described herein) where interfaces and associated code for all of the foregoing may be embodied in the API in both user space and kernel space meaning that the same set of operations are available in user space and kernel space.

In one embodiment, the API may include the event queue API described herein, the RPC facility and API of the RPC patent application, and the inter-module communications model and API for inter-container communications as described in the '822 and '759 applications. Code may be written using this API including a defined interface that provides code portability across user and kernel mode in all supported environments.

As will be described in following paragraphs in accordance with techniques herein, an event queue facility and interface is defined that may be used by producer containers and consumer containers of events using kernel resident structures. The producer containers may be in user mode or kernel mode, and the consumer containers may be in user mode or kernel mode.

In an embodiment in accordance with techniques described herein, an event queue may be used to facilitate the exchange of information between containers. Furthermore, the techniques herein may also be used in connection with facilitating communications between a producer and a consumer included in the same container as well as different containers. Additionally, the techniques herein may be used to facilitate communications between a producer and consumer in a same container, alone or in combination with, other producers and consumers included in different containers. Similarly, the techniques herein may be used to facilitate communications between a producer and consumer in different containers, alone or in combination with, other producers and consumers included in the same and/or different containers. A consumer may register to receive notification regarding each occurrence of one or more events. A producer may post a notification to the event queue regarding the occurrence of an event and each registered consumer may receive notification of the event occurrence. A consumer may register for specific events with a particular event queue and a consumer may post notification regarding event occurrences with the particular event queue. A container may be both a producer and a consumer with respect to one or more of the same event queues and one or more of the same events. For example, a thread in a container may be a producer of events and the same thread and/or a different thread in the container may be a consumer of the same and/or different events and thus, the foregoing container may be characterized as both a producer and consumer. As an example with reference back to FIG. 2, containers X, Y and A may register to receive notification of one or more particular events regarding container Z, such as, for example, when container Z is created, terminates, and the like. Code of the API may provide for event registration and notification and management of event queue data structures. In an embodiment described herein, code of the API may provide functionality for event queue operations and may include code that executes in user and kernel mode for managing the event queue data structures. The particular API code executed in connection with an API invocation varies in accordance with whether the call is made from user or kernel mode.

Described in connection with FIGS. 3, 4, 5, 6, and 7 are APIs that may be included in an event queue API in an embodiment in accordance with techniques described herein. Included with each API below is a description of processing that may be performed in an embodiment. Additional detail regarding the processing and associated data structures is also described in more detail below in connection with figures other than FIGS. 3, 4, 5, 6, and 7.

Referring to FIG. 3, shown is an example of create and destroy APIs that may be used included in an embodiment of an event queue API. Element 310 describes the create API and element 320 describes the destroy API. As illustrated in 310, the create API may include the following parameters:

name—input parameter specifying the name of the event queue created;

private_data_size—input parameter specifying the size of private data record; and &handle_rv—output parameter specifying the handle to the event queue created with this invocation.

The create API may be used to create a named event queue as indicated by the first parameter, name. Optionally, the event queue may be created with an additional private data area used for communicating information between producers and consumers where each event posted may include additional private data having a size up to the size indicated by the second parameter, private_data_size. Code of the API may create the event queue and return a handle to the event queue created as indicated by the third parameter, &handle_rv.

As illustrated in 320, the destroy API may include a single input parameter, handle, specifying the handle of a previously created event queue which is destroyed as a result of the destroy API invocation. The input parameter handle may be the value of the parameter of a previous create API invocation. A destroy API call can either be made explicitly by a user code module running in user or kernel space, or as a result of performing clean up processing, for example, in connection with a container that has terminated.

Any container may execute the create and/or destroy APIs of FIG. 3. For example, the container executing the create and/or destroy APIs may subsequently be a producer and/or a consumer. Furthermore, an event queue may be created and/or destroyed by a container which is subsequently neither a producer or consumer.

Referring to FIG. 4, shown is an example of open and close APIs that may be used included in an embodiment of an event queue API. Element 340 describes the open API and element 350 describes the close API. As illustrated in 340, the open API may include the following parameters:

name—input parameter specifying the name of the event queue to open for use by the invoking container;

num_entries—input parameter specifying the number of entries for event notifications;

is_shared—input parameter specifying whether to create data areas used for the event notification in shared memory or not; and &reference_rv—output parameter specifying the reference to the event notification list created as a result of this invocation.

The open API may be invoked to create a reference structure (indicated by the fourth parameter) to an event queue (named by the first parameter) for event notifications. In an embodiment described herein, an event queue reference is needed to both produce and consume events. Thus the open API may be invoked by both producers and consumers of events. As will be described in following paragraphs in one embodiment when a reference is created using the open API call, a kernel-resident ring buffer and private data region are allocated to hold num_entries event notifications. In one embodiment described herein, the ring buffer may be the particular structure used to hold event notifications and may also be referenced herein as the event notification list. The foregoing ring buffer and private data region are associated with the created reference structure. On the open API invocation, the is_shared parameter may be used to identify whether to allocate the ring buffer from shared memory or from standard memory. As will be appreciated by those skilled in the art in light of further description set forth in following paragraphs, user space consumers may receive a performance benefit from using shared memory because it allows for retrieval of event notifications from the private ring buffer without entering or proxying into the kernel as long as event notifications are available. Producers may create a reference with 0 ring buffer entries and use the reference to send event notifications to registered consumers. A consumer may use its reference to register for specific event types and then retrieve event notifications as added to the private ring buffer. Multiple producers can use the same event queue reference to produce events, but only one consumer may retrieve events from an event queue reference at a time without providing additional synchronization in other code using the API.

As illustrated in 350, the close API may include a single input parameter, reference, specifying the reference to be closed as a result of the API invocation. The input parameter reference may be the returned value of the parameter, &reference_rv, of a previous open API invocation. A close may be issued explicitly by a user code module running in user or kernel space. The close API may also be invoked during cleanup processing on behalf of a terminating container. When an event queue reference is closed, all the resources associated with the reference, including the ring buffer, private data, and associated metadata may be made available for other uses.

Both event producer containers and event consumer containers may execute the open and close APIs of FIG. 4 in order to perform subsequent respective operations in connection with events for the named event queue.

Referring to FIG. 5, shown is an example of register_event and unregister_event APIs that may be used included in an embodiment of an event queue API. Element 380 describes the register_event API and element 390 describes the unregister_event API. As illustrated in 380, the register_event API may include the following parameters:

reference—input parameter specifying a reference value returned from a previous open API call; and event—input parameter identifying the event for which the reference, as may be used by a consumer container, is being registered.

The register API may be used by a consumer to register for a specific event identified by the event parameter. The event parameter may identify the event for which the consumer container is to be notified. The event parameter may be a value, structure, and the like, identifying the particular event. Upon occurrence of an event matching the event parameter, a notification is added to the event notification list identified by the reference parameter. Consumers may register for any number of different events. When a producer adds an event to an event queue (via add_events API call described below), every consumer that has registered for that event receives a copy of the event as notification by placing the notification on the notification list included in the consumer's reference along with any optional additional private data copied to the consumer's ring buffer.

As illustrated in 390, the unregister_event API may be used by a consumer to unregister for a specific event identified by the event parameter. Once an event has been unregistered, the consumer no longer receives copies of notifications for that event type in the consumer's ring buffer (as associated with the consumer's reference structure).

A container which is a consumer of events may execute the APIs of FIG. 5 in order to register and unregister regarding particular events for an event queue.

Referring to FIG. 6, shown is an example of an add_events API that may be used included in an embodiment of an event queue API. As illustrated in 400, the add_events API may include the following parameters:

reference—input parameter reference returned from previous open API call;

num_events—input parameter indicating the number of events to be added;

events[ ]—input parameter describing each of the one or more events being added;

private_data—input parameter that is a pointer to a private data area for the events added;

private_data_size—input parameter specifying the size of entire private data area;

qfull_policy—input parameter specifying a policy affecting producer/caller if consumer's event notification list (ring buffer);

&num_events_queued_rv—output parameter indicating the number of events queued by producer as a result of this invocation.

The add_events API may be used by a producer to add one or more events to an event queue. The producer may specify one or more events (as specified using the num_events and events[ ] parameters) and may include a pointer to a contiguous private data area (private_data parameter) containing the private data associated with those events. Any consumer currently registered for one of the events matching an event record included in the events parameter (array) receives a copy of that event in its ring buffer. If a producer encounters a condition where it is trying to add an event and one of the receiving consumers has a full notification list (ring buffer is full), the API handles the situation according to the qfull policy parameter specified by the producer in this API invocation. One embodiment may provide for 3 different qfull policies: PEND, OVERWRITE_OLDEST, and OVERWRITE_NEWEST. The PEND (pending) policy causes the producer to block if the API encounters a full event notification list. With the PEND policy, the producer is blocked until needed free slots in the list needed are available. The other two policies, OVERWRITE_OLDEST and OVERWRITE_NEWEST, cause the producer to overwrite, respectively, the oldest or newest entry in the queue.

Referring to FIG. 7, shown is an example of an get_events API that may be used included in an embodiment of an event queue API. As illustrated in 420, the get_events API may include the following parameters:

reference—input parameter identifying the reference output parameter returned from previous open API call;

max_events—input parameter indicating the maximum number of events to retrieve in this invocation;

events[ ]—structure or pointer to data area for holding event notifications retrieved;

private_data—pointer to data area for any private data also retrieved with the event notifications;

private_data_size—input parameter specifying the maximum amount of private data copied for each event retrieved;

timeout—input parameter indicating an amount of time for which the invoking container will wait (sleep) for an event notification if notification list is empty; and &num_events_rv)—output parameter indicating a number of events actually retrieved/consumed from ring buffer.

The get_events API may be used by a consumer to retrieve events and private data from the consumer's ring buffer associated with the reference parameter. Each consumer (per reference) has a ring buffer for event notification storage as previously allocated during an open API call. Each ring buffer can be allocated from either shared memory or from standard memory. If a ring buffer is allocated from standard memory, a U space consumer cannot access the ring buffer from user space and may use an RPC to proxy into the kernel to collect the events in the kernel. If the ring buffer is allocated from shared memory, a U space consumer can access the ring buffer producer/consumer indices as well as the event objects and private data directly from user space without proxying into the kernel. When using shared memory from a U space consumer, an RPC may be issued to the kernel to signal a waiting producer (as a result of consuming an event from a full ring buffer), or to wait for events (as a result of trying to consume an event from an empty ring buffer).

Figure 8:
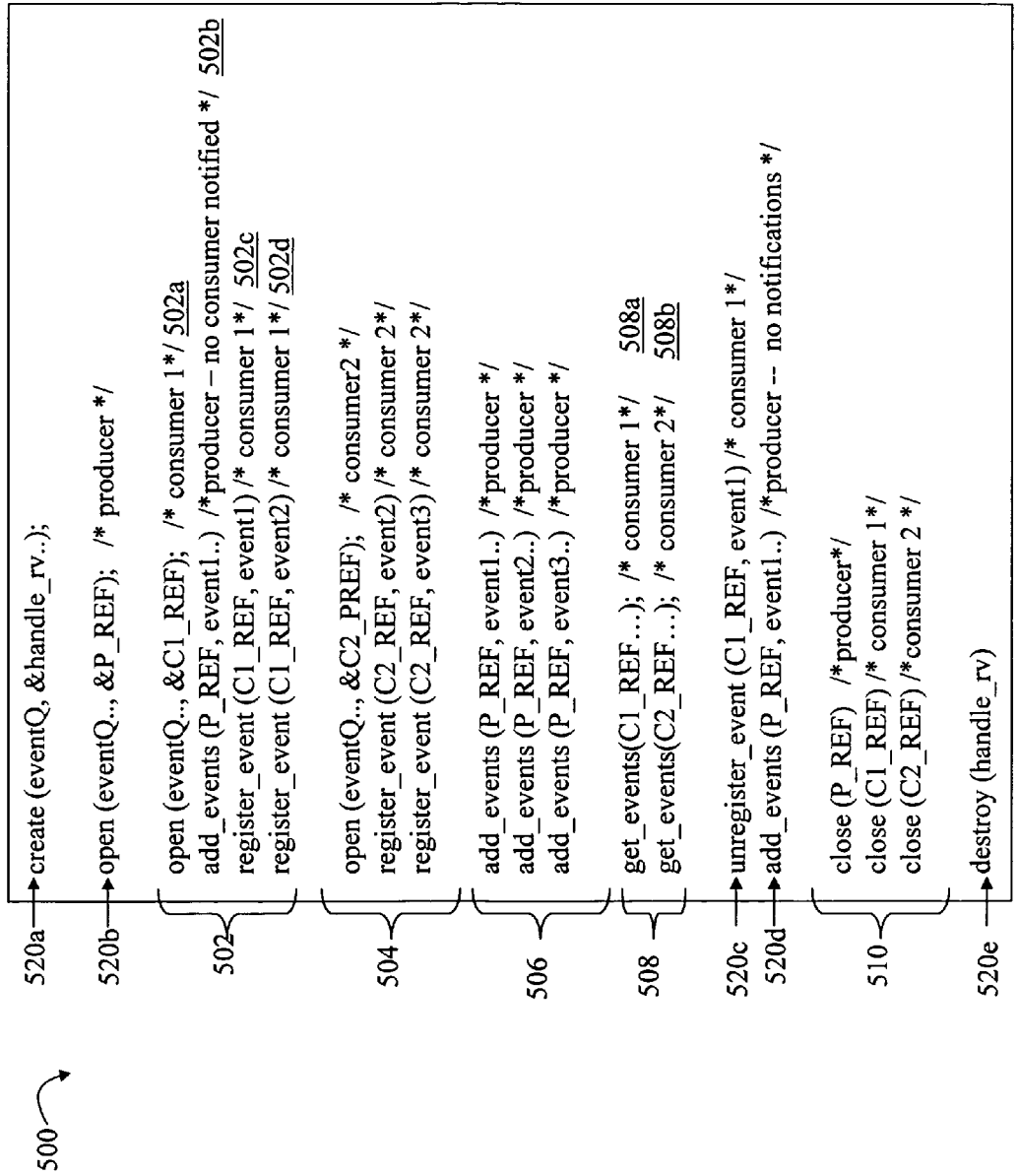
FIG. 8 is an example illustrating an invocation of the APIs by a producer and consumers in connection with an embodiment in accordance with techniques described herein.

Referring to FIG. 8, shown is an example illustrating a possible API invocation ordering by a producer and 2 consumers in accordance with techniques described herein. The example 500 includes a create API call 520a to create the named event queue, eventQ. It should be noted the API call of 520a may also be performed by any existing container. After the eventQ has been created, producers and/or consumers may execute open calls to obtain a reference to the named eventQ. Element 520b is an open API call made by a producer. Element 502 specifies a sequence of API calls that may be performed by a first consumer (consumer 1) and the producer (that executed the call 520b). Element 502a is a call by consumer 1 to open eventQ. Element 502b is a call by the producer to produce an event, event1. In connection with 502b, no consumers are notified regarding event1 since, although consumer 1 has executed an open API call, no consumers have registered for any events on eventQ. Consumer 1 registers to receive notifications regarding event1 and event2, respectively, using API calls 502c and 502d. Element 502 includes API calls made by consumer2 to open the eventQ and register to receive notification regarding occurrences of event2 and event3. Element 506 includes 3 API calls made by the producer regarding occurrences of event1, event2 and event3. It should be noted that the producer may alternatively perform a single API call to add_events and include event1, event2, and event3 in an array of events as described in connection with the add_events API call. As a result of 506a, a single event notification is posted on consumer1's ring buffer or event notification list. As a result of 506b, a single event notification is posted to the event notification lists for each of consumer 1 and consumer 2. As a result of 506c, a single event notification is posted to the event notification list for consumer 2. Element 508a is an API call made by consumer1 container to retrieve any event notifications posted to the eventQ for consumer1's handle indicated by C1_REF. Element 508b is an API call made by consumer2 container to retrieve any event notifications posted to the eventQ for consumer2's handle indicated by C2_REF.

Element 520c unregisters consumer1 with respect to receiving subsequent notifications for event1 occurrences. Element 520d is executed by the producer and posts event notification regarding the event1 occurrence to any registered consumers. In this example, execution of the API call of 520d does not result in any event notifications to any consumers since none are currently registered. Element 510 illustrates API calls performed, respectively, by the producer, consumer1 and consumer 2 to close each invoking container's reference to eventQ. Element 520e illustrates an API call that may be performed by the producer, consumer1, consumer 2, or some other container to destroy the event queue instance (denoted as eventQ in this example).

What will now be described are various data structures that may be utilized in an embodiment in connection with implementation of event queues using the foregoing event queue API.

Figure 9:
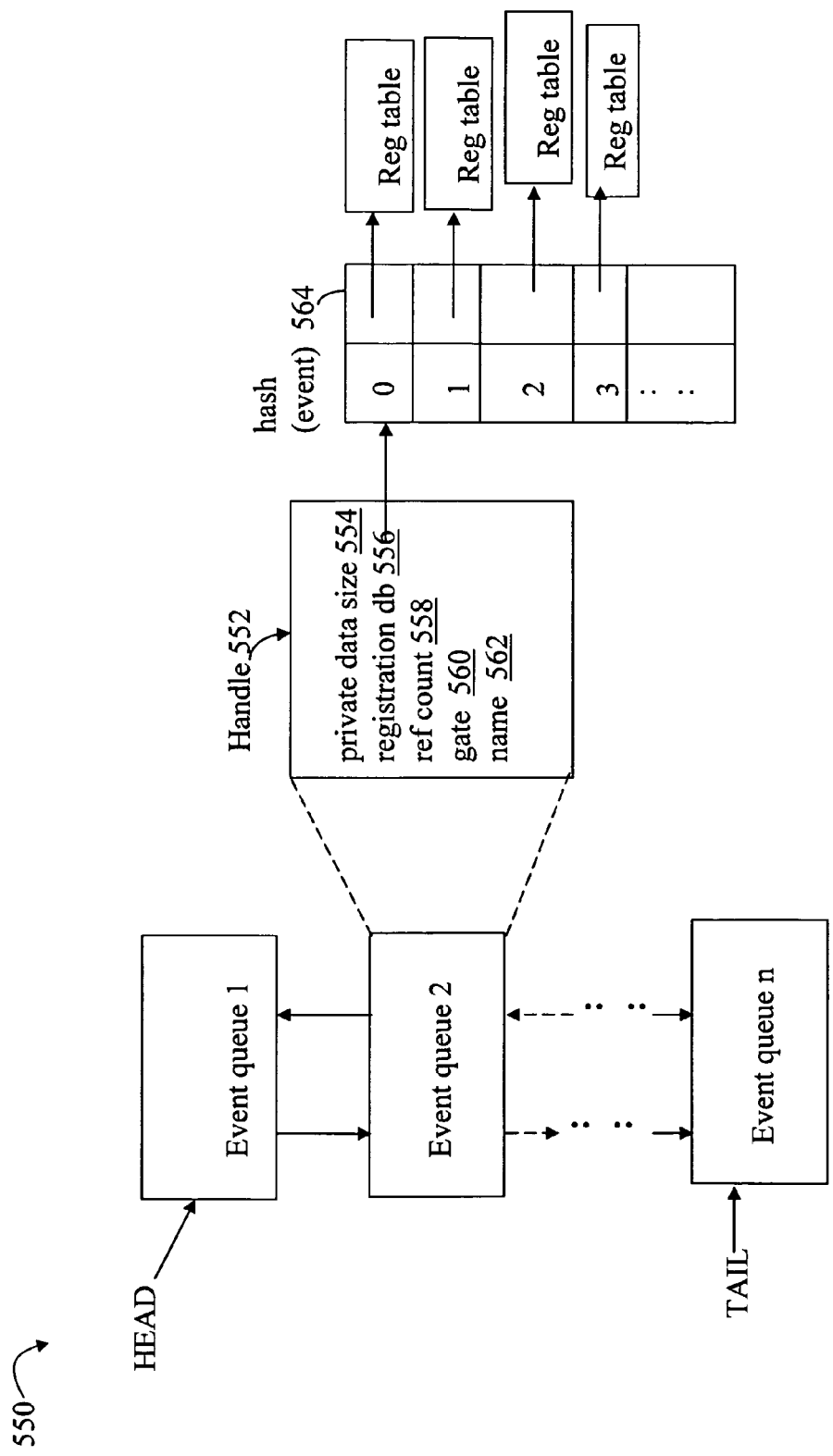

Referring to FIG. 9, shown is an example of a list of event queue structures that may be created and maintained in kernel space for use in connection with the techniques described herein. The example 550 includes a list of event queue structures having a first entry denoted by HEAD pointer and a last entry denoted by the TAIL pointer. Each entry on the list may correspond to a single event queue created as a result of executing the create event queue API described in FIG. 3. Each entry on the list of event queue structures may be referred to as a handle structure created and specified as the handle_rv parameter of the create API call. Element 552 illustrates in more detail different fields that may be included in the handle structure for each event queue created. Element 552 may include a private data size 554, registration database (db) 556, ref count 558, gate 560 and name 562. The private data size 554 may be an integer quantity indicating the maximum size of the private data for each event notification posted for a consumer. The value of 554 may be as specified in the create API call. The registration database (db) 556 may be a pointer to a registration database of registered events and denote which consumer containers (e.g., references used by particular containers having previously executed the register API call for events) are notified upon the occurrence of particular events as posted by a producer (e.g., using the add events API call). In one embodiment, the registration database may be implemented using a hash table 564 which maps a hash value for a particular event to a registration table (regtable) for that event. Regtables are described in more detail in following paragraphs and figures and identify a list of references registered for a particular event. It should be noted that multiple events may result in a same hash value so that there may be multiple regtables for each hash entry although the example illustrates only a single regtable with each hash entry. Ref count 558 may be an integer value indicating a number of current users of the event queue. Ref count 558 may be used in an embodiment in connection with event queue maintenance, for example, to detect when event queue handle structures and resources may be made available for other uses. Gate 560 represents a locking mechanism structure that may be used to synchronize use of the registration db for registration and unregistration of events. In one embodiment, the gate 560 may represent a structure including a mutex and a spinlock used for synchronizing access to the registration db and other fields of the gate structure itself. The gate 560 and its use is described in more detail in following paragraphs. The name 562 may be string specifying the name of the event queue. The value of 562 may be as specified in the create API call.

An instance of 552 may be created as a result of invocation of the create API. In one embodiment, execution of the create API may also create the hash table 564 which is not mapped to any regtable instance since there are currently no events registered for the event queue when the create API is performed. A pointer to an instance of 552 may be returned as the &handle_rv parameter of the create API.

It should be noted that the structures of 550 may be kernel resident structures maintained by API code executing in kernel space. Thus, a producer and consumer executing in user space may proxy into the kernel to perform operations using the event queue structures as needed. API code executing in user space may also create and manage additional data structures to track handles and other information of kernel space data structures. Such information may be used when making calls into kernel space. This is described in more detail in following paragraphs.

Particular structures described herein are included for purposes of illustrated exemplary structures that may be utilized in an embodiment and should not be construed as limited to those herein as will be appreciated by those skilled in the art.

Figure 10:
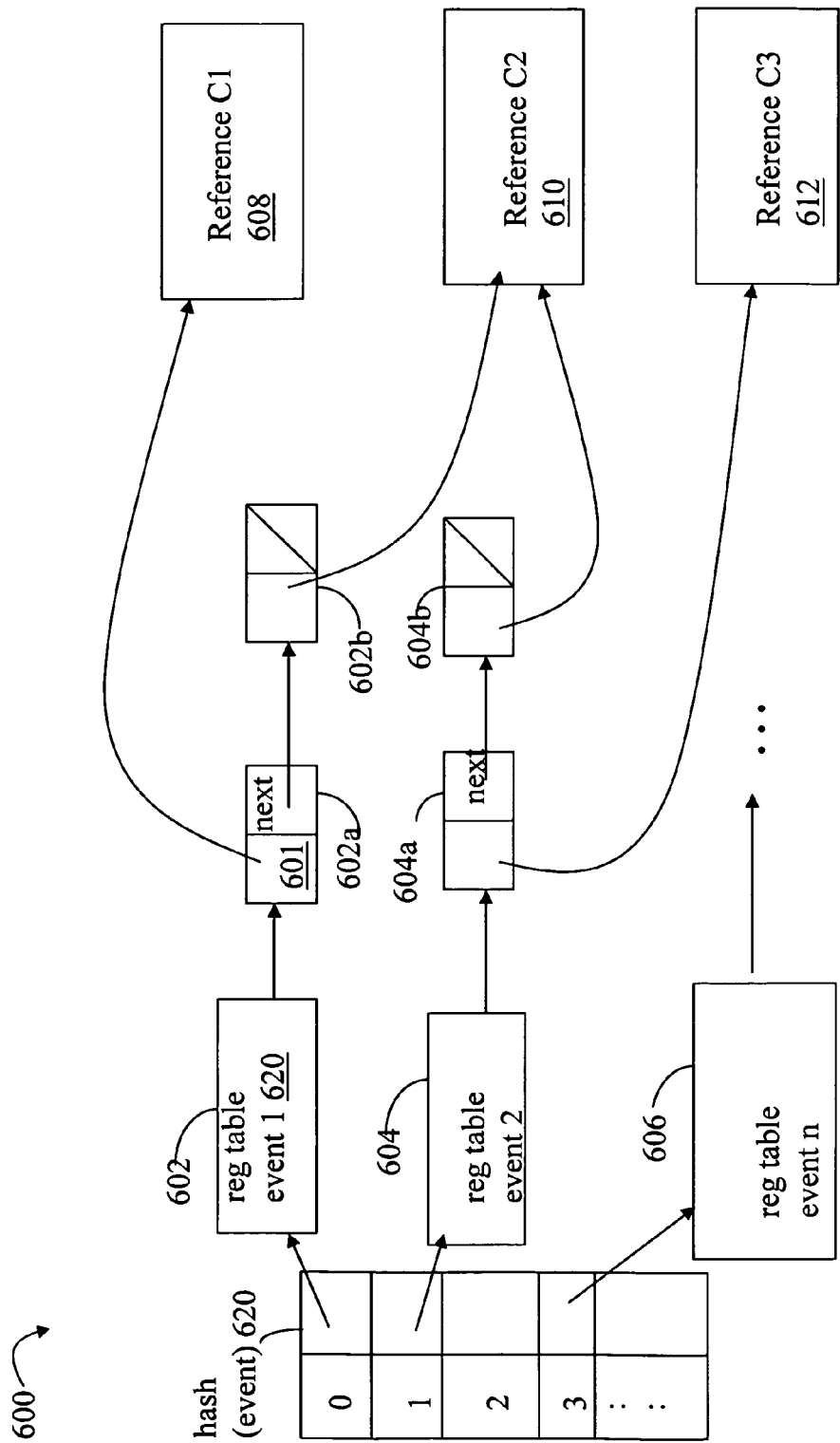

Referring to FIG. 10, shown is an example illustrating how a registration database (registration db) may be implemented in an embodiment in accordance with techniques described herein. The example 600 provides additional detail regarding the structure 564 and associated registration tables (reg tables) of FIG. 9. Hash table 620 indicates that one or more consumers have registered for event 1, event 2 and event n. In particular with respect to event1 and event2, the example 600 indicates that consumer C1 is registered for event1, consumer C2 is registered for event1 and event2, and consumer C3 is registered for event2. In this example, hash table entry 0 is mapped to event 1 as indicated by the reg table 602 associated with hash table entry 0. Hash table entry 1 is mapped to event 2 as indicated by the reg table 604 associated with hash table entry 1. Hash table entry 3 is mapped to event n as indicated by the reg table 606 associated with hash table entry 3. The reg table may include a list of entries where there is an entry on the list for each consumer that has registered to receive the event associated with the reg table. The reg table 602 may include a first field 620 which identifies the associated event, event 1, and a second field identifying the list of entries for registered consumers of event 1. Element 602a represents an entry on the reg table list of registered users and may include a first field 601 which points to a reference structure for the registered consumer C1 608 and a next pointer to the next entry 602b. Element 602b similarly includes a first field pointing to the reference C2 610 for consumer C2 and the next field is null since there is no next entry in the list of 602. The reg table 604 has a list of 2 registered consumers as indicated by entries 604a (consumer C3) and 604b (consumer C2).

Elements 608, 610 and 612 are created, respectively, as a result of consumers C1, C2, and C3 each executing the open API. Elements 602a, 602b, 604a and 604b are created respectively as a result of consumers C1, C2, C3 and C2 executing the register_event API. It should be noted that the first consumer to register for an event may also result in the creation of 602, link between 620 and 602, and other data items that may be used in maintaining the list of registered event consumers. An example of a reference structure that may be used in an embodiment is described in more detail below.

Figure 11:
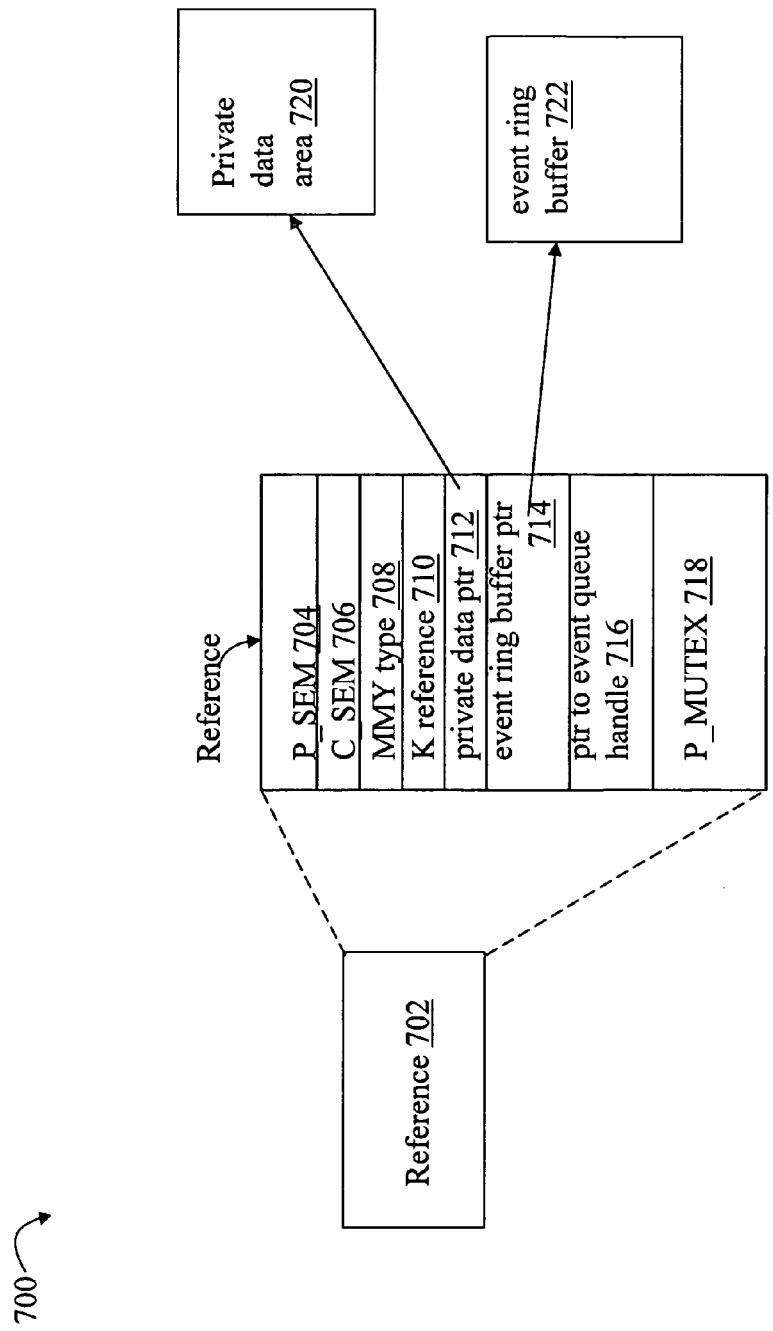

Referring to FIG. 11, shown is an example 700 illustrating in more detail fields that may be included in an embodiment of the reference structure created as a result of executing the open API described herein. Each reference structure 702 may include the following fields:
P_SEM 704, C_SEM 706, MMY type 708, K reference 710, private data ptr 712, event ring buffer (pointer) ptr 714, ptr to event queue handle 716, and P_MUTEX 718. P_SEM 704 may be a semaphore used to block an executing producer waiting for an empty entry in the ring buffer (event notification list associated with 714 and 722) when full. C_SEM 706 may be semaphore used to block an executing consumer waiting for an event notification to be posted to the ring buffer (event notification list) when empty. It should be noted an embodiment may utilize other API calls in connection with the semaphores, such as P_SEM and C_SEM, and other synchronization primitives and associated operations as described, for example, in U.S. patent application Ser. No. 12/079,648 (the '648 application), filed Mar. 28, 2008, COMMON SCHEDULING AND SYNCHRONIZATION PRIMITIVES, which is incorporated by reference herein. Alternatively, an embodiment may choose to utilize other techniques in connection with implementing the foregoing semaphores and other synchronization primitives and related operations.

MMY type 708 may denote the type of memory from which storage for the private data area 720 and event ring buffer 722 is allocated. Element 708 may denote a type of memory in accordance with the is_shared parameter of the open API. K reference 710 may be used in user space only to identify the address of a reference in kernel space. Thus, an embodiment of user space API code may create a user-space instance of the reference 702 and also include in that user space structure an address to the corresponding kernel space structure. Private data ptr 712 is an address or pointer to a portion of storage used as the private data area 720. As described herein, the private data area 720 may be used to communicate additional private data for each event between producers and consumers (from producer to a consumer). Event ring buffer (pointer) ptr 714 may be a pointer to a ring buffer 722 used as an event notification list. The event notification list may include an entry for each posted event notification for the consumer using the reference 702. As described in more detail below, the ring buffer 722 may be managed as a lockless ring buffer of entries. Ptr to event queue handle 716 may be a pointer to the handle for the event queue associated with this reference. Element 716 may point to an instance of a handle structure 552 as illustrated in FIG. 9. X 718 (also referred to as a producer mutex herein) may be a mutex used within the add_events API code to synchronize or serialize access to the reference structure of a consumer with other producers. In particular, the P_MUTEX may be used in connection with synchronizing or providing serialized access to a consumer's event notification list by producers. An embodiment may utilize the API described in the '648 application as well as other techniques in connection with the mutex P_MUTEX.

It should be noted that the size of the private data area 720 may be determined in accordance with the private_data size parameter of the create API and the num_entries parameter of the open API (e.g., size of 720 may be equal to the product of private_data_size and num_entries).

Figure 12:
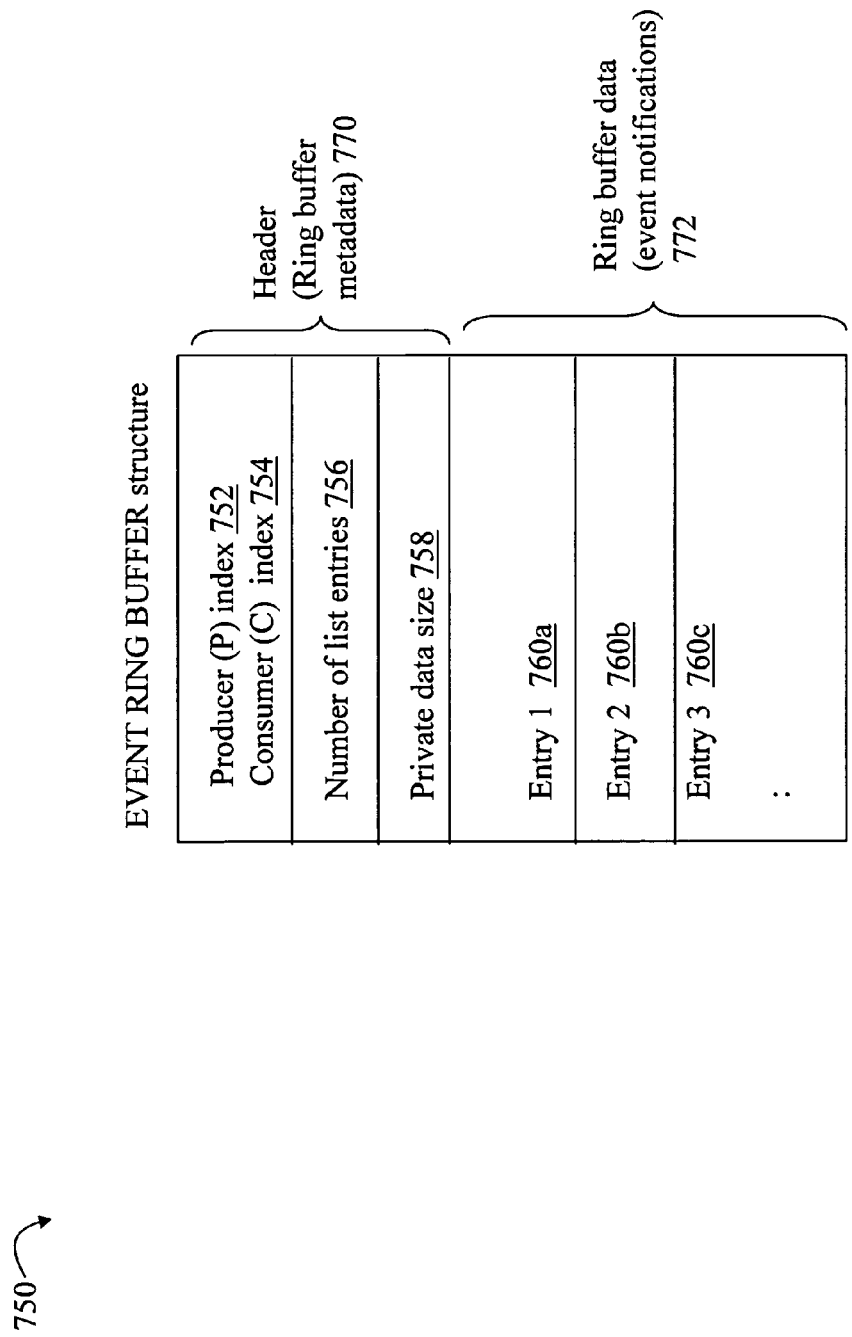

Referring to FIG. 12, shown is an example illustrating in more detail an event ring buffer structure that may be used in an embodiment in accordance with techniques herein. The example 750 illustrates element 722 in more detail. The example 750 may include a header portion 770 with ring buffer metadata and a data portion or data area 772 including the ring buffer data (e.g., event notifications). The header 770 may include a producer (P) index 752, a consumer (C) index 754, number of list entries 756 and private data size 758. Element 752 may indicate the ring buffer index of the next event notification entry for use by the producer. If the event notification list (e.g., ring buffer) is not full (e.g., has available or free entries), element 752 may indicate the next free entry; otherwise element 752 may indicate the next entry to be used by a producer (in accordance with the qfull policy described elsewhere herein) where the next entry currently contains an unconsumed notification. Element 754 may indicate the ring buffer index of the next event notification in the list for a consumer to consume if the event notification list is not empty. If the event notification list is empty, element 754 may indicate an empty entry or an event notification that has already been consumed. Element 756 may indicate a maximum number of entries in the ring buffer (e.g., maximum number denoting the ring buffer notification capacity). Element 758 may indicate an amount of private data used for storing private data for a single event notification. Each event notification may be included in a portion of storage of 772 as illustrated.

Referring to FIG. 12A, shown is an example of an event entry that may be used in an embodiment in connection with techniques herein. The example 780 identifies information that may be included in an event entry structure used in connection with the event parameter of the register_event, unregister_event, add_events and get_events API calls. An instance of the event entry structure of 780 may be included as an entry in the ring buffer or event notification list as described above. For example with reference to FIG. 12, an instance of an event notification may correspond to 760a so that 760a may include the information of the example 780. An instance of the event entry structure of 780 may be specified for each event occurrence to be posted for the add_events API call. The event entry of 780 may include an event type, event id and user context information. The event type and event id may be used in combination to uniquely represent each event. The event type and event id may vary with each embodiment in accordance with the particular events to be represented. User context may represent a relatively small data area used to communicate user specified data for an event occurrence. The size of user context may vary with embodiment. It should be noted that the private data area may be used in an embodiment if the size of user context is insufficient to facilitate communicating data from a producer to event consumers.

Figure 13:
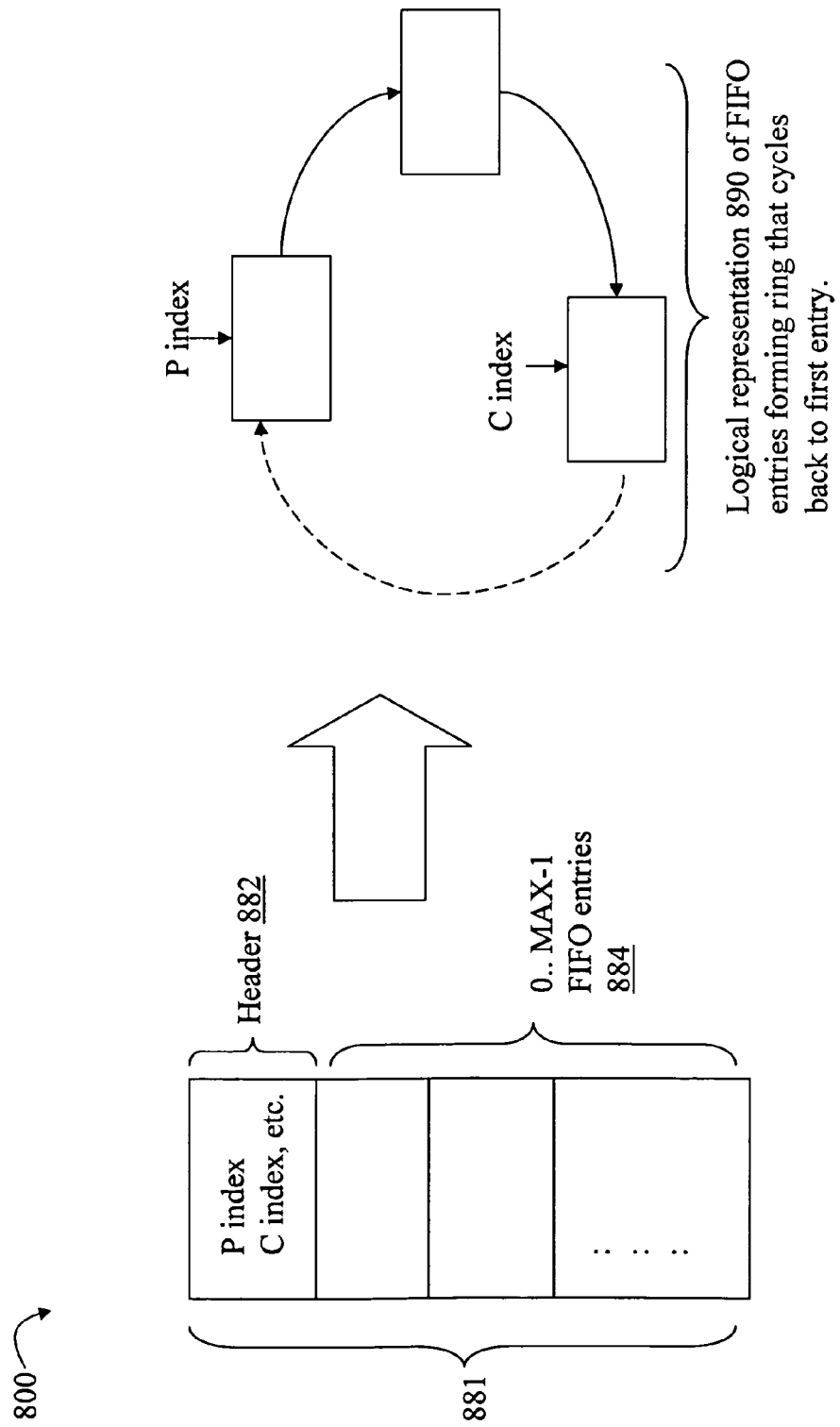

Referring to FIG. 13, shown is an example illustrating in more detail how each of the ring buffers used for event notification lists may be implemented in an embodiment. The example 800 includes a first representation of the ring buffer 881 that includes a header 882 followed by a number of entries 884. Element 881 corresponds to the structure 750 of FIG. 12 described above. Element 890 illustrates a logical representation of the ring buffer entries 884 which may be characterized as a FIFO (first in first out) data structure where the entries form a ring or circular buffer. When the last FIFO entry (entry MAX−1) of 884 is reached in processing, processing then cycles back to the first entry (FIFO entry 0). As will be appreciated by those skilled in the art, there are a variety of different ways in which the ring buffer described herein may be implemented in a lockless fashion (that is without using native operating system locks to synchronize access to the ring buffer).

Described in following paragraphs are logical steps of a consumer (reader of entries) and a producer (write of the entries) that may be performed in one embodiment to utilize the ring buffer in connection with the event queue APIs herein. As will also be described in processing of following paragraphs, an embodiment may use a hardware primitive or instruction that may available to perform an atomic compare and swap operation or CAS. The CAS operation may described using three operands—a memory location (V), the expected old value (A), and a new value (B). The processor will atomically update the location V to the new value if the current value stored in V matches the expected old value, otherwise it will do nothing. In either case, the value that was stored in the location V prior to the CAS instruction may be returned. The CAS may be used to execute a read-modify-write sequence without fear of another thread modifying the location V in the meantime, because if another thread did modify V, the CAS would detect it (and fail) and the algorithm could retry the operation. The way in which the CAS operation is implemented may vary with embodiment. It should be noted that the CAS instruction may be used in an embodiment in connection with updating P index and C index values at the same time as described below in more detail. An embodiment may also use other techniques in connection with ensuring that the foregoing values are updated simultaneously.

In an embodiment in which the event queue API is implemented using the RPC facility, and the RPC facility is built on top of, and utilizes, the lower level inter-module or inter-container communication mechanism and techniques to facilitate communication between two code modules in different containers as described in the '759 and '822 patent applications, communications from a U-mode container to a K-mode container may form a command path including a request path originating from the event queue API invocation (starting point) to the event queue API code executing in K mode (ending point), and a return path from ending point back to the starting point. The command path may be characterized as a runtime path or call chain between starting point and the ending point. The call chain may include multiple invocation layers of routines including user code, and one or more API routines of the inter-module or inter-container API, RPC API and event queue API as described herein. It should be noted that one or more layers may be included in the command path and associated call chain above the event queue API layer (e.g., where another user code module makes calls to API code using the event queue API described herein).

Figure 14:
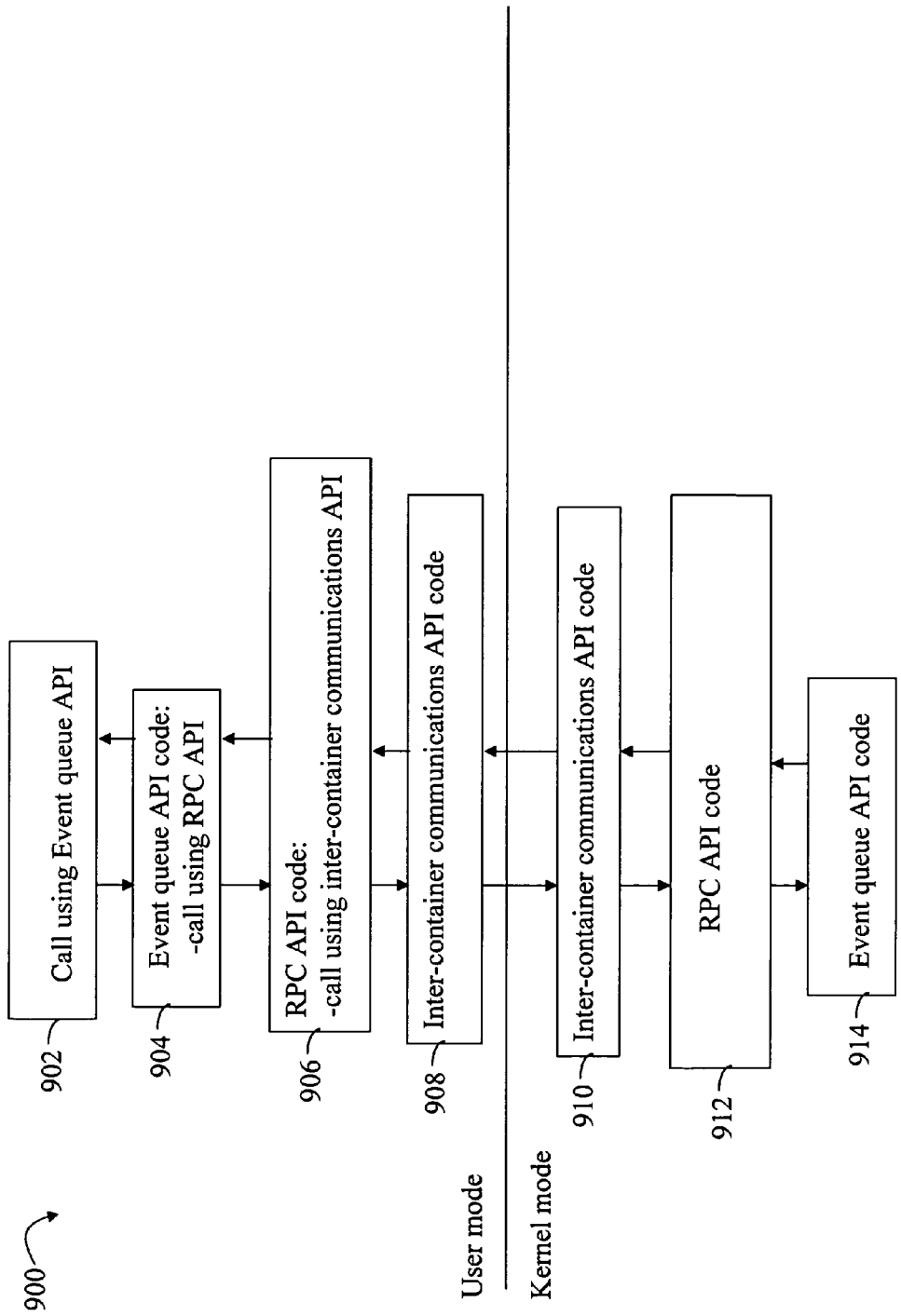
FIG. 14 is an example illustrating a call chain in an embodiment in accordance with techniques herein.

Referring to FIG. 14, shown is an example illustrating multiple invocation layers as may be included in a command path in accordance with techniques herein. The example 900 illustrates a runtime call chain as may result when an event producer or consumer is a U mode container and includes a call using the event queue API 902. The runtime call chain illustrated in the example 900 may include a first call 902 into event queue API code of 904. The API code for the event queue of 904 may include an RPC API call, such as to perform an operation in connection with the event queue structures which are kernel resident. The RPC API call of 904 may result in a transfer of control to the appropriate RPC API code portion 906. An embodiment may use the RPC API as described in the RPC patent application. The code of 906 may then issue further API calls using inter-container communications API as described in the '759 and '822 applications resulting in a transfer of control to other API code of 908. In one embodiment, the layer 908 may be characterized as a lower layer in the call chain on the U mode side and a command may then be issued to proxy into kernel space resulting in a transfer of control to code of 910. For example, an exec-handler executing in kernel space may be included in 910 which receives a command request from an execute code module executing in user space as may be included in 908. From the layer 910, control may be transferred to a kernel mode portion of the RPC API code 912 and then subsequently to the event queue API code 914 executing in kernel mode. It is the code of 914 that may perform the requested operation for implementing the event queue API call of 902 by accessing the appropriate kernel resident event queue structures described herein. Any data that is to be returned to the starting point 902 may be propagated back up the call chain on the return path also illustrated.

As set forth in more detail in following paragraphs and figures with the event queue API described herein, an API may be invoked in user space or kernel space having a same name and same defined interface. In user space, API code may package up the input parameters and other parameter information (e.g., necessary metadata for command and parameters), communicate this information to kernel mode code (such as the exec-handler) which then invokes a K space RPC level kernel handler for the event queue (e.g. event queue handler). This latter K space handler may then invoke the same named API on the kernel side for processing. The foregoing may be performed as a general technique as appropriate for user space API code as described below. Thus, the foregoing general paradigm for a user space event queue API packages parameter information and transmits the parameter information to the kernel using the RPC API to invoke a K space event queue handler. The K space event queue handler then invokes the K space event queue API corresponding to the U space event queue API initially invoked. As described in more detail in following paragraphs and figures, an embodiment of the user space API code may include an optimization which varies from the general paradigm just described when the ring buffer (or other event notification list structure) and private data area (if any) are implemented using shared memory accessible to both user space and kernel space.

It should be noted that the parameter information for the input and output parameters for the event queue API described herein may utilize the techniques described in the RPC patent application for propagating parameter information from the event queue API code at layer 904 to the kernel side. As described in the RPC patent application, a message transport technique may be used where each layer in the call chain on the client side may pass its parameter information in the form of an embedded list. For example, a calling routine may construct a structure including its parameter information and parameter information received from a calling routine. The parameter information from the calling routine may be linked or chained into the called routine's structure via a pointer to the parameter information passed from the calling routine. At the bottom most level in user mode as represented by 908, the collective or aggregate parameter information may be encoded and transmitted to code in the kernel for processing. Similarly, an embodiment may also use the techniques described in the RPC patent application for unmarshalling or decoding the parameter information when control is returned to the user mode. Using this technique to pass parameter information between user and kernel space may be used in an embodiment to avoid excessive data copying at different levels in the call chain.

The code of 914 may operate on the kernel resident data structures such as illustrated and described above such as, for example, in connection with FIGS. 9, 10, 11, and 12. As also noted above, the ring buffer used for event notification may be in shared memory so that it is directly accessible to both user space code and kernel space code. As described in more detail elsewhere herein, use of shared memory may provide an advantage to a user space consumer in that the user space consumer may access the event notification list from user space without proxying into the kernel. When user mode API code requires access to the kernel resident event queue structures, the user space code may proxy into the kernel to perform the operations using the kernel resident event queue structures. Such code may be included in kernel code of the API described herein in an embodiment.

What will now be described is logical processing that may be performed by code of the API in connection with implementing the event queue API described herein.

Figure 15:
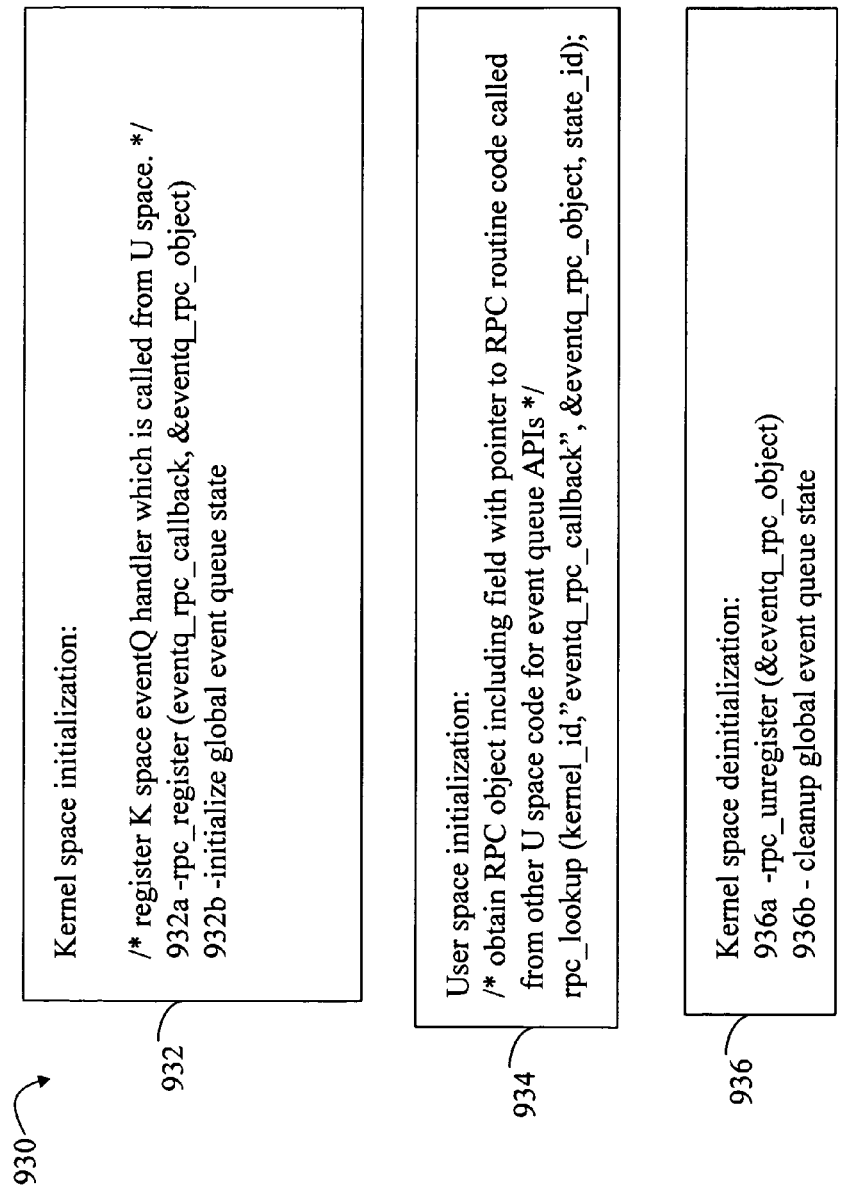

Referring to FIG. 15, shown is an example of logical processing that may be performed as part of initialization and de-initialization processing. Elements 932 and 934 may be performed as part of initializing, respectively, the kernel container and each user container with the event queue API described herein. Similarly, the element 936 describes processing that may be performed as part of deinitializing the kernel container for use with the event queue API described herein.

Element 932 includes steps 932a and 932b. At step 932a, the RPC API is used to register kernel space code, the eventq_rpc_callback, which is invoked from user space code implementing the event queue API. The foregoing callback may refer to kernel space code included in a layer (e.g., such as denoted by element 914 of FIG. 14) in the call chain on the kernel side. At step 932b, initialization of the event queue data structures for the event queue state may be performed. Step 932b may include, for example, creating and initializing related to the structures described herein such as FIG. 9. For example, step 932b may include creating the head pointer and tail pointers and initializing the foregoing to null since no event queues have been created at this point. With reference to element 934 in an embodiment using the RPC API, 934 may include invoking the rpc_lookup API to obtain the eventq_rpc_object and state_id when using the rpc_call FAST API (as described in the RPC patent application) in later processing. With reference to element 936, included are steps 936a and 936b. At step 936a in an embodiment using the RPC API, the rpc_unregister API call may be invoked to unregister the kernel code previously registered in step 932a. At step 936b, processing may be performed to cleanup any event queue state information such as, for example, related to the structures described above.

Referring to FIG. 16, shown is an example of logical processing that may be performed in connection with implementing the create event queue API described herein. The example 950 includes a first portion 960 describing steps performed in connection with implementing the user space version of the create API. The example 950 also includes a second portion 980 describing steps performed by kernel space code implementing the create API.

Element 960 includes step 962 where a user space handle for the event queue is allocated an initialized. In one embodiment, a user space instance of the handle structure of FIG. 9 may be allocated and initialized. Additionally, an embodiment may also maintain information for a list of these handles for all event queues in user space as also illustrated in FIG. 9 in order to facilitate calls to kernel space to utilize the kernel resident structures. Steps 964, 966, 968 and 970 relate to processing to prepare parameter information for a call to proxy into the kernel where code of the kernel performs processing to create the kernel resident handle in accordance with the parameters of the user space create API invocation. Step 972 uses the RPC API routine rpc_call FAST to proxy into the kernel to perform the necessary processing for the create event queue API. It should be noted that the rpc_call FAST includes second and third input parameters using values obtained from the previous rpc_lookup RPC API call of FIG. 15. Step 974 indicates that control is transferred to kernel space code, the kernel space handler eventq_rpc_callback in this example, which performs processing of steps 974a and 974b. It should be noted that processing described in steps 974a and 974b may be performed by part of a larger body of kernel space code of the eventq_rpc_callback although 974a and 974b are illustrated inline in this example. For example, the eventq_rpc_callback may include code which implements steps 974a and 974b as well as other code for other logical processing steps described herein. The eventq_rpc_may include a large switch or case statement with a different case for each of the user space event queue API cases. The particular case corresponding to the processing to be performed may be identified in the input parameters of input msg_list. For example, a tag field of a message list as described in the RPC patent application may denote a value of a command code used in selecting a particular case and associated processing in the event_q_rpc_callback code of the API.

At step 974a, the input and output parameters are deconstructed or extracted from the parameter information received on the kernel side and the kernel space create API code of 980 is invoked. At step 974b, the kernel space handler performs processing to pass the output parameters from the RPC to user space (processing continues in user space to the point subsequent to the rpc_call FAST invocation from step 972). At step 976, the user space code for the create API returns to the caller that invoked the create event queue API. The handle returned may be the user space handler. Although not specifically pointed out, element 960 may also include initializing fields of the user space handle structure to include information returned from the rpc_call FAST. For example, the user space handle structure may include a field (e.g., a pointer) which identifies the kernel handle structure. When subsequent API calls are made in user space, the user space API code may obtain the kernel space handle when provided with the corresponding user space handle.

Element 980 describes logical processing for the kernel space API code of the create API. As described above, processing of 980 may be performed as a result of invoking the create API in connection with the RPC call of step 972 (where the kernel space create API is invoked by the kernel space handler at step 974*a*), or as a result of other kernel code that includes a create API call. At step 981, a determination is made as to whether the named event queue already exists. If so, step 981 indicates that an appropriate status may be returned. Otherwise, processing continues with step 982 where the kernel space handle structure is allocated, added to the global list of event queues (at step 984), and initialized (in steps 986 and 988). At step 990, the K space handler is returned to the caller.

Figure 17:
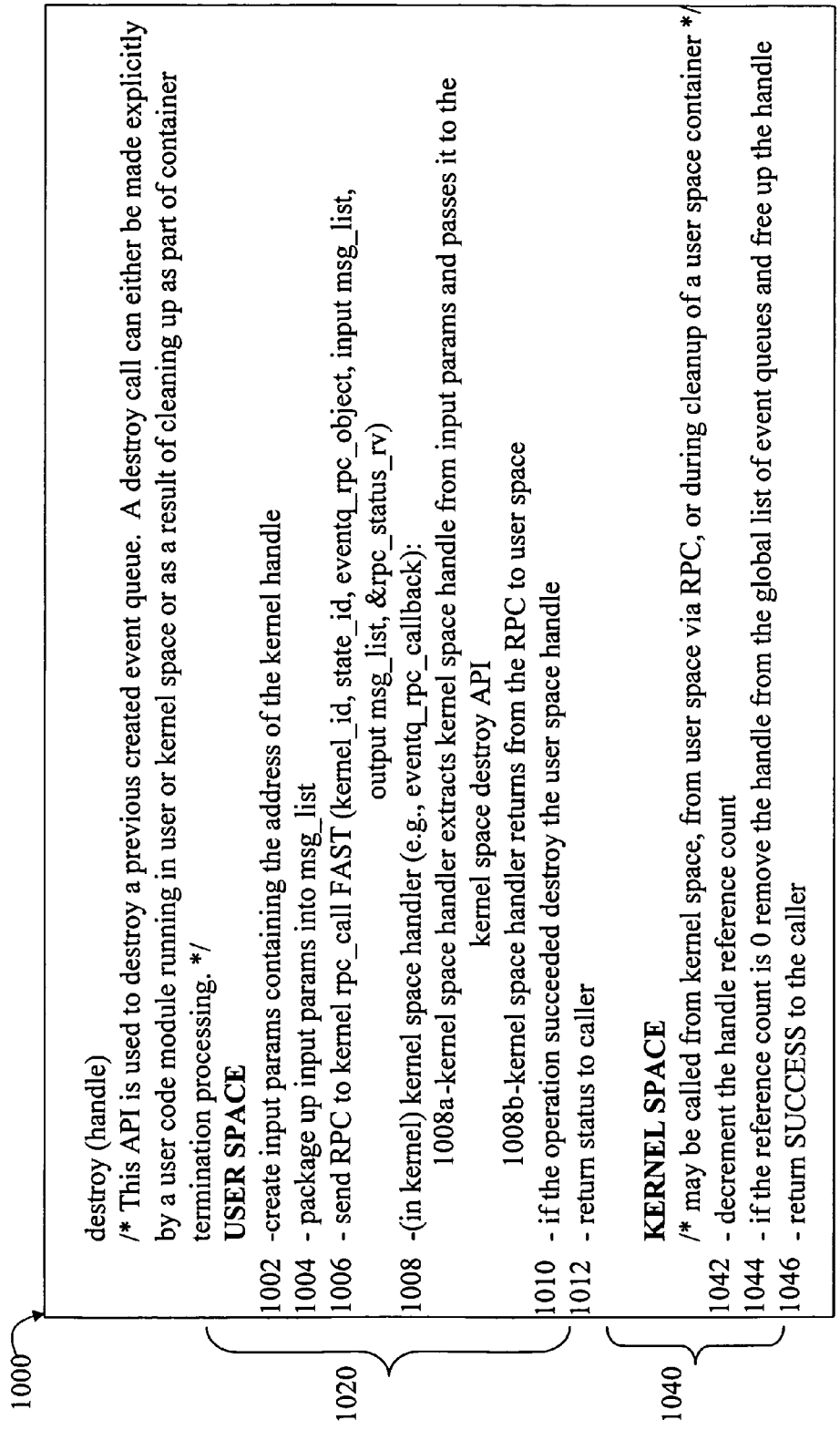

Referring to FIG. 17, shown is an example of logical processing that may be performed in connection with implementing the destroy event queue API described herein. The example 1000 includes a first portion 1020 describing steps performed in connection with implementing the user space version of the destroy API. The example 1000 also includes a second portion 1040 describing steps performed by kernel space code implementing the destroy API.

Element 1020 includes steps 1002 and 1004 which describe processing to prepare parameter information for a call which proxies into the kernel. Code of the kernel performs processing to destroy the kernel resident handle in accordance with the parameters of the user space destroy API invocation. Similar to step 972 of FIG. 16, step 1006 uses the RPC API routine rpc_call FAST to proxy into the kernel to perform the necessary processing for the destroy event queue API. Step 1008 indicates that control is transferred to kernel space code, the kernel space handler eventq_rpc_calback in this example, which performs processing of steps 1008*a* and 1008*b*. It should be noted that, as described in connection with steps 974*a* and 974*b* of FIG. 16, processing described in steps 1008*a* and 1008*b* may be performed by part of the larger body of kernel space code of the eventq_rpc_callback although illustrated inline in this example. At step 1008*a*, the input and output parameters are deconstructed or extracted from the parameter information received on the kernel side and the handler invokes the kernel space create API code of 1040 which then returns. At step 1008*b*, the kernel space handler returns from the RPC to user space. At step 1010 in the user space destroy API code, a determination is made as to whether the operation was successful, and if so, the user space handle as maintained in user space is destroyed (e.g., the associated storage may be deallocated or otherwise made available for other use). In step 1012, a status regarding the destroy API processing is returned to the caller.

Element 1040 describes logical processing for the kernel space API code of the destroy API. As described above, processing of 1040 may be as a result of invoking the destroy API in connection with the RPC call of step 1006 (where the kernel space destroy API is invoked by the kernel space handler at step 1008*a*), or performed as a result of other kernel code that includes a destroy API call. At step 1042, the handle reference count (of the kernel resident structure) is decremented. At step 1044, a determination is made as to whether the reference count is 0. If so, step 1044 includes removing the handle from the global list (e.g., list of FIG. 9) so that the storage associated with the handle structure may be made available for other uses. At step 1046, a success status is returned to the caller.

Figure 18:
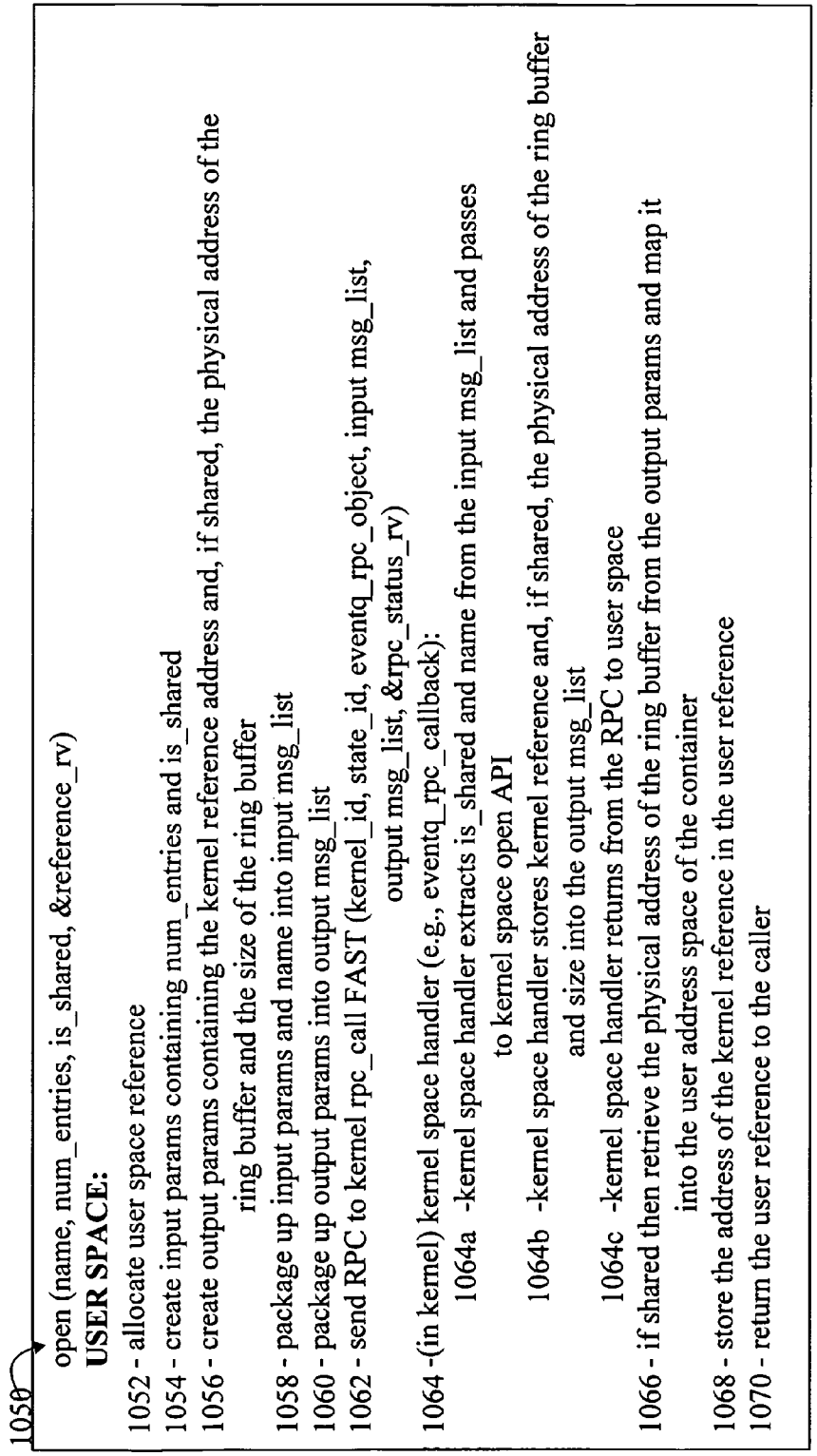

Referring to FIG. 18, shown is an example of logical processing that may be performed in connection with implementing the open event queue API issued from user space.

At step 1052, an instance of a user space reference structure is allocated and may be included in a list of other user space references or other suitable user space structures that may be maintained in an embodiment. Steps 1054, 1056, 1058 and 1060 describe processing to prepare parameter information for a call which proxies into the kernel where code of the kernel performs processing to create a reference in accordance with the parameters of the user space open API invocation. Similar to that as described above in connection with other figures, step 1062 uses the RPC API routine rpc_call FAST to proxy into the kernel to perform the necessary processing for the open event queue API. Step 1064 indicates that control is transferred to kernel space code, the kernel space handler eventq_rpc_calback in this example, which performs processing of steps 1064*a*, 1064*b* and 1064*c*. As also described in connection with other figures, steps 1064*a-c* may be performed by part of the larger body of kernel space code of the eventq_rpc_callback although illustrated inline in this example. At step 1064*a*, the parameter information received on the kernel side by the handler is extracted and passed to the kernel space open API. Once control returns to the kernel space handler at step 1064*b*, the kernel space handler performs processing to pass the output parameters from the RPC to user space (processing continues in user space to the point subsequent to the rpc_call FAST invocation from 1062). At step 1064*b*, the kernel handler stores the kernel reference, and if the event notification list is implemented using shared memory, the physical address of the ring buffer and its size, as output parameters. At step 1064*c*, the kernel space handler returns from the RPC to user space. At step 1066, a determination is made as to whether the ring buffer is implemented with shared memory. If so, processing is performed to map the shared memory portion for the ring buffer and private data areas into the user space address of the U container that invoked the open API. At step 1068, the address of the kernel space reference structure may be stored as a field in the user space reference structure allocated in step 1052. At step 1070, control is returned to the caller.

Referring to FIG. 19, shown is an example of logical processing that may be performed in connection with implementing the kernel version of the open event queue API. As described above, the code of 1100 may be invoked from user space via a RPC in connection with a user space open API call, or from kernel space directly from other code including the open API call. At step 1152, the named event queue is looked upon the global list of event queues. Step 1152 may include determining whether there is an entry already in the global event queue list (such as illustrated in FIG. 9 for a kernel resident structure) by comparing the name parameter to the name field of each handle structure. If no matching entry in the event queue list is found, step 1152 includes returning a corresponding status. Otherwise, control proceeds to step 1154 where a kernel reference structure is allocated and initialized in step 1156. At step 1158, a calculation may be performed to determine the amount of space needed for the ring buffer and the private data regions. Step 1158 includes allocated the storage for the foregoing from either shared or standard memory in accordance with the is_shared input parameter. At step 1160, the refcount field of the event queue handle structure is increment. At step 1162, the kernel reference is returned to the caller.

Referring to FIG. 20, shown is an example of logical processing that may be performed in connection with implementing the close event queue API issued from user space. At step 1152, a determination is made as to whether the ring buffer and private data areas are implemented using shared memory. If so, the shared memory region is unmapped from the user space container's address space. Steps 1154 and 1156 describe processing to prepare parameter information for a call which proxies into the kernel where code of the kernel performs processing in accordance with the parameters of the user space close API invocation. Similar to that as described above in connection with other figures, step 1160 uses the RPC API routine rpc_call FAST to proxy into the kernel to perform the necessary processing for the close event queue API. Step 1160 indicates that control is transferred to kernel space code, the kernel space handler eventq_rpc_calback in this example, which performs processing of steps 1160a and 1160b. As also described in connection with other figures, steps 1160a-b may be performed by part of the larger body of kernel space code of the eventq_rpc_callback although illustrated inline in this example. At step 1160a, the parameter information received on the kernel side by the handler is extracted and passed to the kernel space close API. Once control returns to the kernel space handler at step 1160b, the kernel space handler returns from the RPC to user space. At step 1162, the user space reference structure may be deallocated and made available for other uses. At step 1164, control returns to the caller.

Referring to FIG. 21, shown is an example of logical processing that may be performed in connection with implementing the kernel version of the close event queue API. As described above, the code of 1200 may be invoked from user space via an RPC in connection with a user space close API call, or directly from other code executing in kernel space. At step 1202, a next waiting consumer, if any, may be awakened if waiting on the C_SEM of the reference structure. Additionally, step 1202 may include processing to ensure that the consumer does not attempt to wait on the semaphore again. For example, an embodiment may set a flag or other state information to communicate with a consumer not to wait on the semaphore. At step 1204, seal gate processing is performed. Seal gate processing, and its complementary operation of unseal gate processing, are described in more detail in following paragraphs. Seal gate processing wakes up any waiting producers which are waiting on the P_SEM of the reference structure due to the pending policy in the add_event API when there are no available entries in the ring buffer to post event notifications. Seal gate processing is performed to wake up any such waiting producers to place them outside the logical gate formed using the gate structure. At step 1206, the registration tables in the registration database for this event queue handle are traversed and any registration entries associated with this reference are removed. At step 1208, unseal gate processing is performed to effectively re-open the gate and allow other producers back in to utilize the registration database structure as needed. At step 1210, cleanup processing for the reference metadata is performed. Step 1210 may include, for example, destroying or deallocating semaphores, a mutex, and the like, of the reference structure. At step 1212, ref count field of the handle (of the event queue associated with this reference structure) is decremented. At step 1214, a determination is made as to whether the ref count is 0. If so there are no current users of the event queue as indicated with the event queue handle structure's ref count=0, the handle may be removed from the global list of event queues. Storage associated with the remove handle structure may be made available for other uses. At steps 1216 and 1218, processing may be performed to also make available other storage, for example, associated with the ring buffer and kernel space reference structure. At step 1220, control is returned to the caller.

As will be described in more detail below, the operations of seal gate and unseal gate may be performed by those modifying the registration database and registration tables associated with an event queue handle. The operations of seal and unseal gate are used to synchronize access to the registration database and registration tables in connection with the close, register and unregister APIs described herein. As will also be described below, operations of enter gate, exit gate and check gate may be performed in connection with the add_events API to synchronize access between producers updating the event notification lists (reading the registration database and registration tables) and other processing which writes or updates the registration database and tables for the register, unregister and close APIs. The combination of seal/unseal/enter/exit/check gate operations are used to provide a logical gate synchronizing access to the registration database and registration tables between readers and writers of these structures. Additionally, the foregoing gate operations may include other processing to synchronize access to fields of the gate structure which may also be updated and/or read by producers and consumers.

As will be described below, the gate structure may be implemented using a combination of a mutex (to serialize access to the gate lock field) and spinlock (to protect waiter_count and indicate that the lock is held). The gate keeps producers from sending events while events are being registered/unregistered. Also, processing performed in connection with the gate operations described herein provides for waking up any pending producers on any event queue and ensures that a producer doesn't end up blocking a consumer from unregistering an event (at cleanup time or otherwise).

Figure 22:
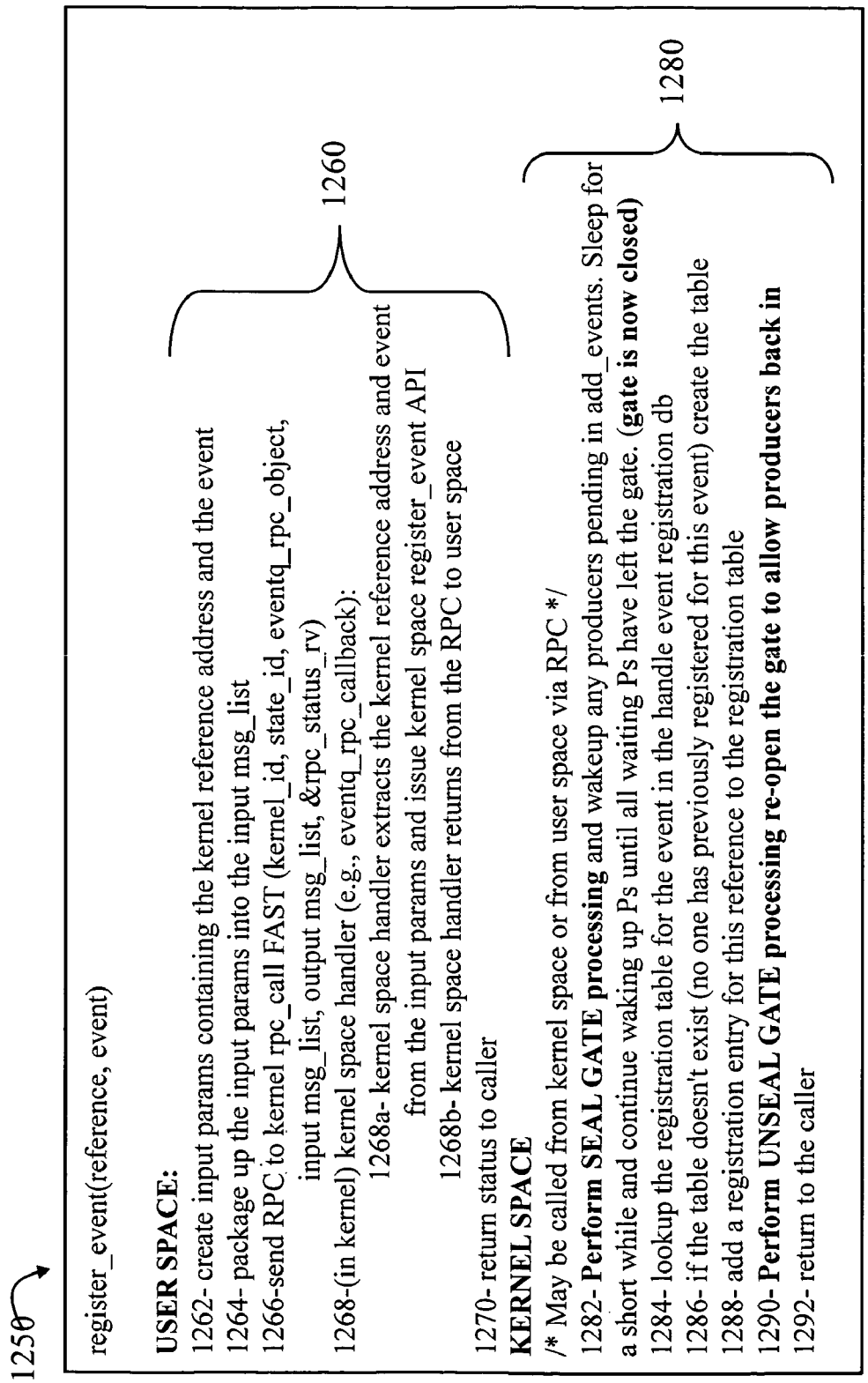

Referring to FIG. 22, shown is an example of logical processing that may be performed in connection with implementing the register_event API. Element 1260 indicates processing performed in connection with the user space version and element 1280 indicates processing performed in connection with the kernel space version. In connection with element 1260, steps 1262 and 1264 describe processing to prepare parameter information for a call which proxies into the kernel where code of the kernel performs processing in accordance with the parameters of the user space close API invocation. Similar to that as described above in connection with other figures, step 1266 uses the RPC API routine rpc_call FAST to proxy into the kernel to perform the necessary processing for the register_event queue API. Step 1268 indicates that control is transferred to kernel space code, the kernel space handler eventq_rpc_callback in this example, which performs processing of steps 1268a and 1268b. As also described in connection with other figures, steps 1268a-b may be performed by part of the larger body of kernel space code of the eventq_rpc_callback although illustrated inline in this example. At step 1268a, the parameter information received on the kernel side by the handler is extracted and passed to the kernel space register_event API. Once control returns to the kernel space handler at step 1268b, the kernel space handler returns from the RPC to user space. At step 1270, control returns to the caller.

In connection with element 1280, seal gate processing is performed at step 1282 which wakes up any producers pending in the add_events kernel API code. Seal gate processing includes then sleeping for a while and then continuing to awaken other producers until all waiting or blocked producers (waiting on P_SEM for the different consumer reference structures associated with this event queue handle structure).

At this point, the gate is closed. At step 1284, the registration table for the event in the registration database (associated with the event queue's handle structure) is located if one exists. With reference back to FIG. 10, step 1284 may include determining whether an instance such as 602 exists for the event parameter. At step 1286, if no registration table matching the event parameter is located (no container has previously registered for this event), then the registration table for this event is created. At step 1288, a registration entry is added for this reference to the registration table (e.g., new entry like 602*a* of FIG. 10). At step 1290, unseal gate processing is performed to reopen the gate and allow producers back in (e.g, to access the structures). At step 1292, control is returned to the caller.

Figure 23:
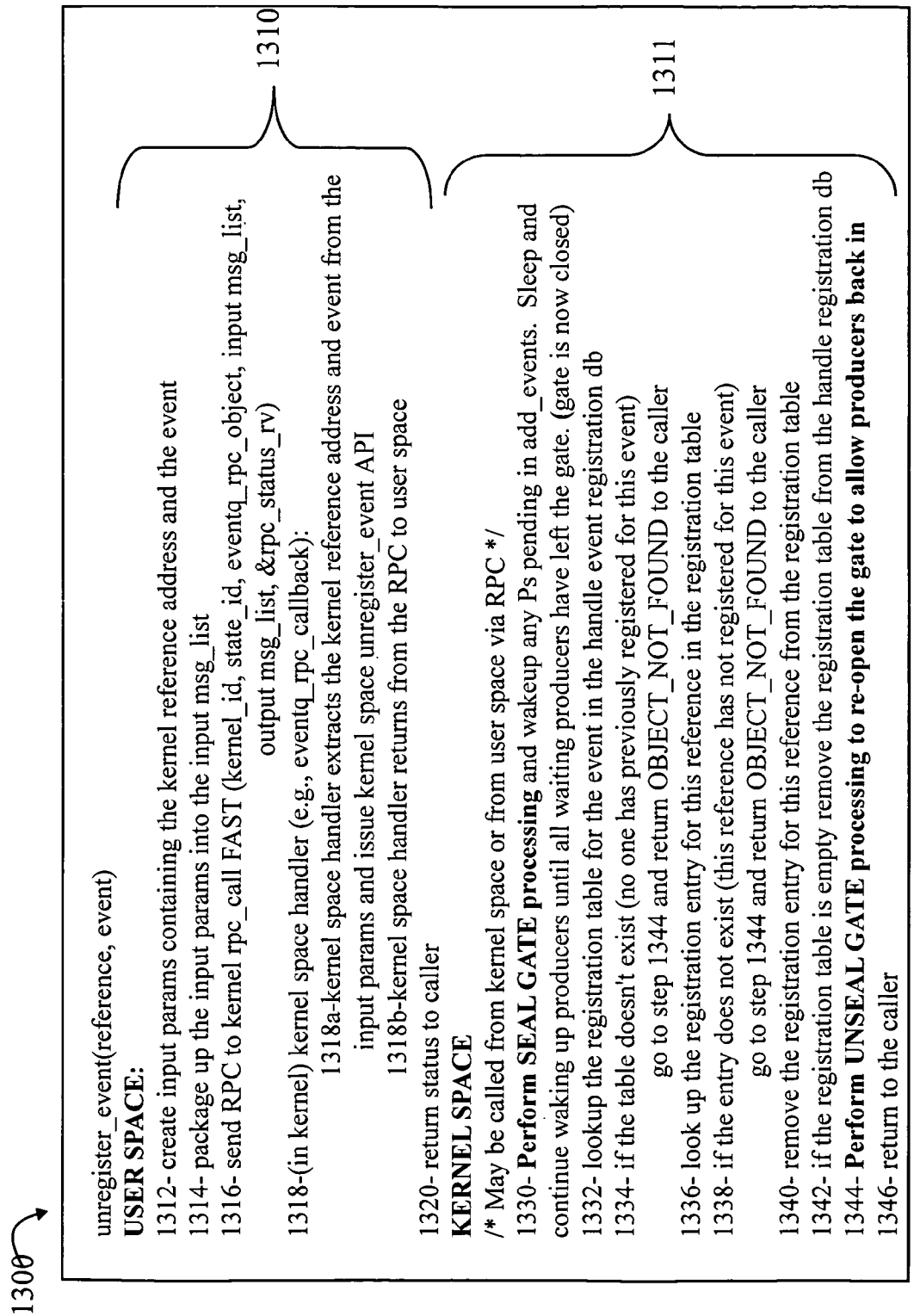

Referring to FIG. 23, shown is an example of logical processing that may be performed in connection with implementing the unregister_event API. Element 1310 indicates processing performed in connection with the user space version and element 1311 indicates processing performed in connection with the kernel space version. In connection with element 1310, steps 1312 and 1314 describe processing to prepare parameter information for a call which proxies into the kernel where code of the kernel performs processing in accordance with the parameters of the user space API invocation. Similar to that as described above in connection with other figures, step 1316 uses the RPC API routine rpc_call FAST to proxy into the kernel to perform the necessary processing for the unregister_event API. Step 1318 indicates that control is transferred to kernel space code, the kernel space handler eventq_rpc_calback in this example, which performs processing of steps 1318*a* and 1318*b*. As also described in connection with other figures, steps 1318*a*-*b* may be performed by part of the larger body of kernel space code of the eventq_rpc_callback although illustrated inline in this example. At step 1318*a*, the parameter information received on the kernel side by the handler is extracted and passed to the kernel space unregister_event API. Once control returns to the kernel space handler at step 1318*b*, the kernel space handler returns from the RPC to user space. At step 1320, control returns to the caller.

In connection with element 1330, seal gate processing is performed at step 1330 which wakes up any producers pending in the add_events kernel API code. Seal gate processing includes then sleeping for a while and then continuing to awaken other producers until all waiting or blocked producers (waiting on P_SEM for the different consumer reference structures associated with this event queue handle structure). At this point, the gate is closed. At step 1332, the registration table for the event in the registration database (associated with the event queue's handle structure) is located if one exists. With reference back to FIG. 10, step 1284 may include determining whether an instance such as 602 exists for the event parameter. At step 1334, if no registration table matching the event parameter is located (no container has previously registered for this event), then an appropriate status is returned to the caller. At step 1340, a corresponding registration entry is removed for this reference from the registration table (e.g., remove appropriate instance of entry like 602*a* of FIG. 10). At step 1342, if the registration table for this event is empty, the registration table may be removed from the handle registration database. At step 1344, unseal gate processing is performed to reopen the gate and allow producers back in (e.g, to access the structures). At step 1346, control is returned to the caller.

Referring to FIG. 24, shown is an example of logical processing that may be performed in connection with implementing the user space add_events API. Steps 1352, 1354, and 1356 describe processing to prepare parameter information for a call which proxies into the kernel where code of the kernel performs processing in accordance with the parameters of the user space API invocation. Similar to that as described above in connection with other figures, step 1358 uses the RPC API routine rpc_call FAST to proxy into the kernel to perform the necessary processing for the add_events API. Step 1360 indicates that control is transferred to kernel space code, the kernel space handler eventq_rpc_calback in this example, which performs processing of steps 1360*a*-*d*. As also described in connection with other figures, steps 1360*a*-*d* may be performed by part of the larger body of kernel space code of the eventq_rpc_callback although illustrated inline in this example. At steps 1360*a*-*b*, the parameter information received on the kernel side by the handler is extracted and passed in step 1360*c* to the kernel space add_events API. Once control returns to the kernel space handler at step 1360*d*, the kernel space handler sets the number of events queued output parameter and returns from the RPC to user space. At step 1362, status and the number of events queued (output parameter or return value) is returned to the caller.

Referring to FIG. 25, shown is an example of logical processing that may be performed in connection with implementing the kernel space add_events API. The steps 1401-1420 are performed for each event being added. In connection with element 1401, enter gate processing is performed which allows the producer to enter the gate if open. Processing for the enter gate, exit gate and check gate processing is described in more detail in subsequent figures and description. At step 1402, the registration table for the event is looked up on the event registration database. Step 1402 may include performing error processing if there are problems encountered with accessing or otherwise locating the appropriate registration table. At step 1403, processing is performed for each entry in the registration table. With reference to 1400, steps 1404-1419 are performed for each entry in the registration table. At step 1404, the P_MUTEX of the reference structure input parameter is taken. This provides for serializing access to the consumer's list of event notifications with respect to other producers. As described elsewhere herein, operations performed in connection with the mutex, P_MUTEX, of the reference structure as well as the semaphores P_SEM and C_SEM may utilize the API as described in the '648 patent application. Steps 1405 and 1406 relate to processing to determine the number of free slots in the ring buffer (event notification list). At step 1407, if there are not free slots and the qfull policy indicates to overwrite either the oldest or newest entry in the ring buffer, then discard the oldest or newest entry accordingly. At step 1408, if there are no free slots and the qfull policy is pending, the steps of 1424 are performed. Element 1424 includes:

step 1409: performing check gate processing to see if the gate has been closed while processing the event.

step 1410: if the gate has been closed, the P_MUTEX (producer mutex of the reference structure) acquired in step 1404 is released and control proceeds to step 1404.

step 1411: wait on the P_SEM of the reference for the consumer container to consume an event notification and make available an entry in the ring buffer.

step 1412: if the wait was interrupted, the P_MUTEX is dropped and control proceeds to step 1420 and 1421 to return with an appropriate status. The wait may be interrupted in step 1412 if the U space process for which this kernel proxy is being performed terminates.

step 1413: return to step 1405.

At step 1414, a determination is made as to whether there are free slots, and if so, processing of 1426 is performed. Element 1426 includes:

- step 1414*a*: copy the event to the first free slot in the ring buffer, and copy the private data (if any) to the first free location in the private data region.
- step 1415: update the P index in the local copy of position information
- step 1416: use the CAS to try and update the position information for the current consumer (e.g., position information of the ring buffer structure pointed to by the reference structure parameter)
- step 1417: if the CAS failed, restart (go to step 1401)
- step 1418: if an event was just added to a previously empty queue, then signal any consumer container waiting on the C_SEM (e.g. wake up reference->C_SEM)

At step 1419, the P_MUTEX for the current reference of the consumer is unlocked or dropped. Once all entries in the registration table for the current event have been processed, control proceeds to step 1420 where exit gate processing is performed. Once all events have been processed, control proceeds to step 1421 to return the number of events processed to the caller.

In connection with a qfull_policy of pending, if there are multiple consumers of an event because one of consumers has a full event notification queue (ring buffer is full), the producer is blocked and waits on the current consumer's (reference structure's) P_SEM semaphore. This stops the other subsequent consumers from receiving notification from the producer. In other words, the producer is blocked or waits on the current consumer until the current consumer makes space available in its ring buffer used for event notification. When an entry in the ring buffer becomes available, processing described herein awakens and unblocks the producer waiting on P_SEM so that the producer resumes with notification posting to the current and remaining registered consumers.

Referring to FIG. 26, shown is an example of logical processing that may be performed in connection with implementing the user space get_events API. At step 1460, a determination is made as to whether the event notification queue (ring buffer and private data area) is allocated from standard or non-shared memory. If so, processing of 1463*a* is performed indicating processing for an unoptimized case. If the event notification queue is allocated from shared memory, processing of 1463*b* is performed. Element 1463*a* includes steps 1462-1470*d* as will be described. Steps 1462, 1464, and 1466 describe processing to prepare parameter information for a call which proxies into the kernel where code of the kernel performs processing in accordance with the parameters of the user space API invocation. Similar to that as described above in connection with other figures, step 1468 uses the RPC API routine rpc_call FAST to proxy into the kernel to perform the necessary processing for the get_events API. Step 1470 indicates that control is transferred to kernel space code, the kernel space handler eventq_rpc_calback in this example, which performs processing of steps 1470*a-d*. As also described in connection with other figures, steps 1470*a-d* may be performed by part of the larger body of kernel space code of the eventq_rpc_callback although illustrated inline in this example. At step 1470*a*, the parameter information received on the kernel side by the handler is extracted and passed in step to the kernel space get_events API. Once control returns to the kernel space handler, steps 1470*b-c*, the kernel space handler sets the output parameters and returns from the RPC to user space.

Element 1463*b* includes steps 1482-1499 as will be described. At step 1482, two copies of the position information for the current ring buffer are made. The two copies are used with the CAS instruction in subsequent steps where one copy is updated and the second copy is preserved as an original. In step 1486, the number of used slots in the ring buffer is determined. At step 1488, a determination is made as to whether there are any event notifications in the ring buffer. If not, step 1488 uses the RPC API (e.g., rpc_call FAST) to proxy into the kernel and wait on the C_SEM for the reference structure. Step 1488 may include performing an RPC to proxy into the kernel to the eventq_rpc_callback as described elsewhere herein. The input parameters in connection with the rpc_call FAST to the eventq_rpc_callback may include a tag in a message list indicating the appropriate command code for the operation to wait on the semaphore. The input parameters may also identify the C_SEM semaphore as the semaphore for which the wait operation is performed.

At step 1490, for each event, processing is performed to post the event in the ring buffer and associated private data area. At step 1492, the local copy of Cindex (consumer index of the position information) is updated to reflect the number of events consumed. At step 1494, the CAS operation may be used to update the position information included in the ring buffer structure indices using the local copy and the original position information. At step 1496, a determination is made as to whether the indices (consumer and producer indices of the position information) have changed while the events were being consumed. If so, step 1496 indicates that processing proceeds to step 1480. At step 1498, a determination is made as to whether the queue was full prior to consuming event notifications. If so, step 1498 performs processing to proxy into the kernel using the RPC API (e.g., call to rpc_call FAST) to awaken a waiting producer (if any) on the P_SEM of the reference structure. Step 1498 may include performing an RPC to proxy into the kernel to the eventq_rpc_callback as described elsewhere herein. The input parameters in connection with the rpc_call FAST to the eventq_rpc_callback may include a tag in a message list indicating the appropriate command code for the operation to awaken a producer that may be waiting on the semaphore. The input parameters may also identify the P_SEM semaphore as the semaphore for which the operation is performed. At step 1499, the number of events (num_events_rv) is set in accordance with the number of events consumed and control returns to the caller.

In connection with the user space version of the get_events API, implementing the ring buffer and any private data using shared memory may be characterized as an optimized version of this routine in contrast to not using shared memory for the foregoing. In the code of 1463*b*, the consumer container does not have to proxy into the kernel to retrieve the posted event notifications and any associated private data. Rather, since these are stored in shared memory, the consumer container is able to directly access this information as in connection with step 1490. As a result in connection with step 1463*b*, the consumer only needs to proxy into the kernel at step 1488 and 1498 if needed. In contrast in connection with 1463*a* for the unoptimized case, the consumer container performs processing to proxy into the kernel to retrieve any event notifications and associated private data.

It should be noted that step 1496 checks to see if additional event notifications were posted while retrieving event notifications. If so, processing proceeds to step 1480 to restart processing which retrieves posted notifications including any newly posted event notifications (which have been posted since previous execution of step 1480).

Referring to FIG. 27, shown is an example of logical processing that may be performed in connection with implementing the kernel space get_events API. At step 1502, two copies of the position information for the current ring buffer are made. The two copies are used with the CAS instruction in subsequent steps where one copy is updated and the second copy is preserved as an original. In step 1504, the number of used slots in the ring buffer is determined. At step 1506, a determination is made as to whether there are any event notifications in the ring buffer. If not, step 1506 waits on the C_SEM for the reference structure. Step 1506 may include using the appropriate API as described in the '648 patent application for semaphore operations. At step 1508, for each event, processing is performed to post the event in the ring buffer and associated private data area. At step 1510, the local copy of Cindex (consumer index of the position information) is updated to reflect the number of events consumed. At step 1512, the CAS operation may be used to update the position information included in the ring buffer structure indices using the local copy and the original position information. At step 1514, a determination is made as to whether the indices (consumer and producer indices of the position information) have changed while the events were being consumed. If so, step 1514 indicates that processing proceeds to step 1502. At step 1516, a determination is made as to whether the queue was full prior to consuming event notifications. If so, step 1516 performs processing to awaken a waiting producer (if any) on the P_SEM semaphore of the reference structure. Step 1516, as well as other operations on semaphores herein, may be performed using the appropriate API as described in the '648 patent application. At step 1518, the number of events (num_events_rv) is set in accordance with the number of events consumed and control returns to the caller.

It should be noted that step 1514 checks to see if additional event notifications were posted while retrieving event notifications. If so, processing proceeds to step 1502 to restart processing which retrieves posted notifications including any newly posted event notifications (which have been posted since previous execution of step 1480).

In connection with techniques herein, multiple producers can use the same event queue reference structure for event notification or posting to consumers of an event queue. For example, two threads in a same producer container can use the same reference structure created with a single open API invocation. It should be noted that two consumer threads in a same container may not use the same reference structure without additional synchronization between the threads. In other words, an embodiment in accordance with the techniques herein may include code in which two consumer threads of a same container use the same reference structure if additional synchronization is provided to synchronize processing of the two consumer threads with respect to the reference structure used by both threads. Otherwise, the API as described herein assumes that each thread in a container which consumes events will utilize its own reference structure. In contrast, a same reference structure may be used, for example, by multiple producers in a same container, or by a producer and a consumer in a same container with the API herein without additional synchronization.

In connection with the get_events API, a time out value may be specified indicating a maximum amount of time a consumer will wait for event notification should the consumer's reference be associated with an empty ring buffer at the time the consumer container issues the get_events API call.

What will now be described is the gate lock structure and associated operations (seal/unseal/enter/exit/check) as mentioned above.

Referring to FIG. 28, shown is an example 1550 illustrating a gate lock structure and fields therein. The gate lock structure 1552 may be included in each instance of the event queue handle structure. In particular with reference to FIG. 9, the example 1550 illustrated in more detail an instance of the gate 560. The gate lock structure may include a waiter count, gate closed boolean, lock, and mutex. Usage of the fields of 1552 is described in following paragraphs and figures. The waiter count field may be an integer quantity indicating a number of producers inside the logical gate. Each of the producers may or may not be waiting (e.g., a producer inside the gate may be, for example, posting event notifications, waiting for a free entry in the ring buffer (event notification list) and the like). The gate closed boolean, lock, and mutex data items may be used to control synchronization as described in subsequent operations. In one embodiment, the lock field may be implemented using a native spin lock primitive and using the appropriate APIs as described in the '648 patent application. The mutex may be implemented using the appropriate APIs as described in the 648 patent application.

Figure 29:
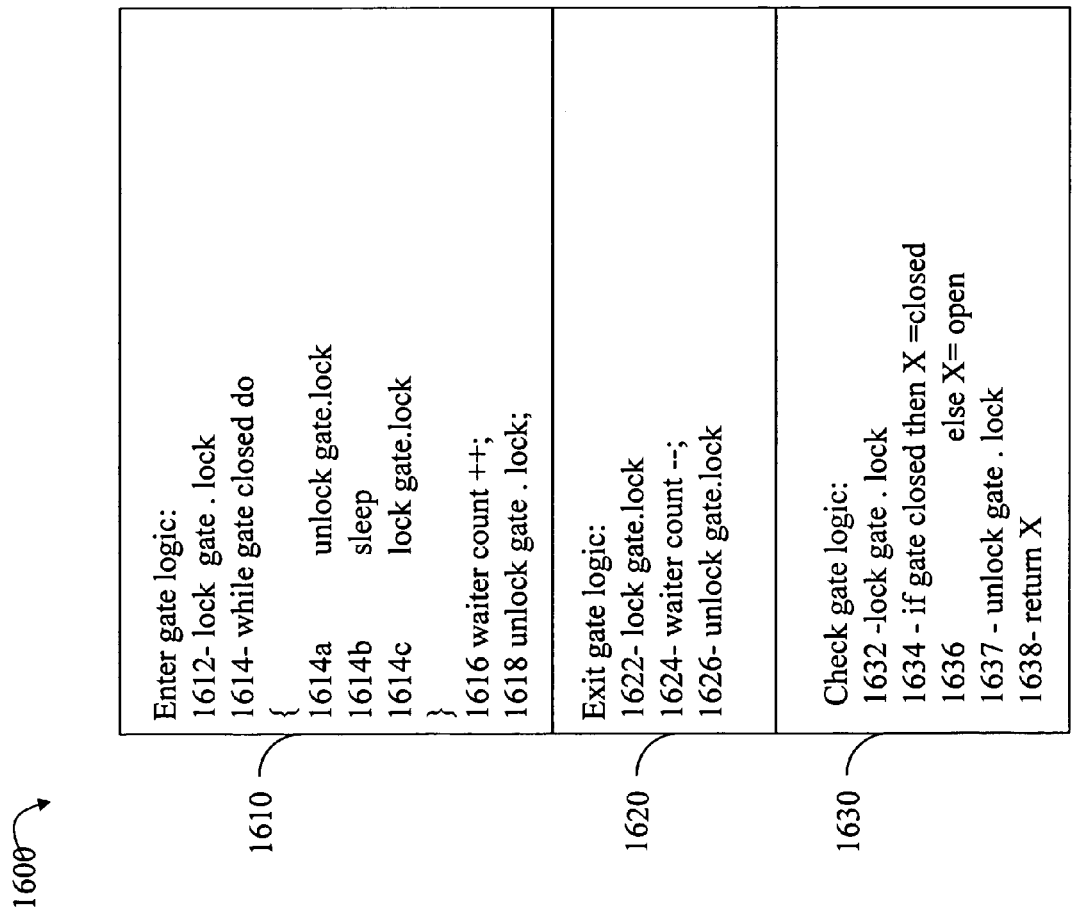
FIGS. 29 and 30 described processing of different gate operations that may be performed in an embodiment in accordance with techniques herein.

Referring to FIG. 29, shown is an example of processing that may be performed for the enter gate, exit gate and check gate operations. Element 1610 indicates processing for the enter gate processing. Element 1610 includes step 1612 where gate.lock is locked. At step 1614, a while loop is performed while the gate closed field of the gate structure is true. Step 1614 includes the following:

step 1614*a*: unlock gate.lock
step 1614*b*: sleep
step 1614*c*: lock gate.lock where the executing container loops until the boolean gate closed is false indicating that the gate is open. At step 1616, the waiter count is incremented. In step 1618, gate.lock is unlocked. The lock field of the gate structure is used to control access to the waiter count and gate closed fields of the gate structure.

Element 1620 indicates processing for the exit gate processing. At step 1622, gate.lock is locked and the waiter count is decremented in step 1624. At step 1626, gate.lock is unlocked. Element 1630 indicates processing for the check gate processing. At step 1632, gate.lock is locked. At step 1634, a determination is made as to whether gate.gate closed is true. If so (indicating that the gate is closed), X is set to closed which will be returned in step 1638. Otherwise, if the gate is open, X is set to open. In step 1637, gate.lock is unlocked and the appropriate value as indicated by the variable X is returned in step 1638.

As described above, the operations of FIG. 29 may be performed with the add_events API.

Figure 30:
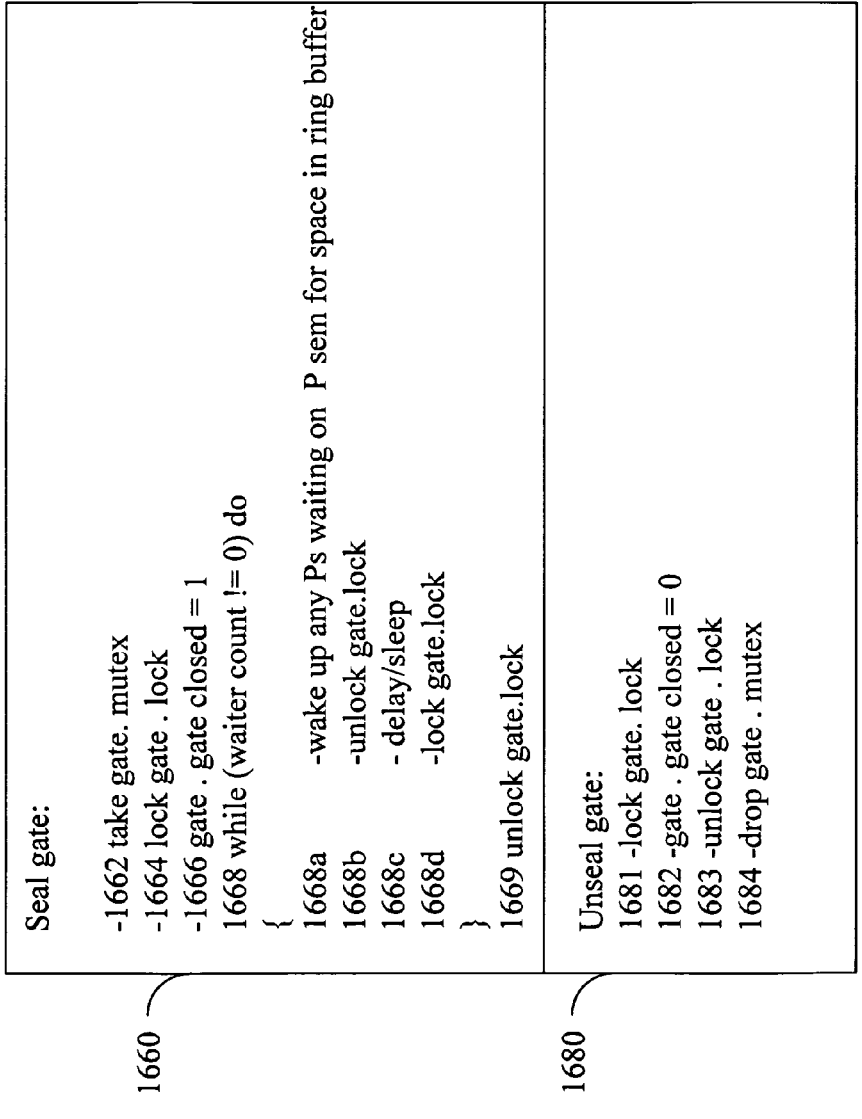

Referring to FIG. 30, shown is an example of processing that may be performed for the seal and unseal gate operations. Element 1660 indicates processing for the seal gate processing and element 1680 indicates processing for the unseal gate processing. In connection with element 1660, step 1662 takes the gate.mutex. At step 1664, gate.lock is locked. At step 1666, gate.closed=1 indicating that the gate is closed. Step 1668 performs processing to wake up any waiting producers waiting on (e.g., blocked on) P_SEM of a consumer's reference structure. Step 1668 includes steps 1668*a-d* as illustrated. At step 1669, gate.lock is unlocked.

In connection with element 1680, step 1681 locks gate.lock. Step 1682 sets get.gate closed=0. Step 1683 unlocks gate.lock. Step 1684, drops or releases the gate.mutex.

As described above, the operations of FIG. 30 may be performed with the register_events, unregister events, and close APIs.

The gate structure used herein is down or closed (as indicated by the gate closed boolean of the gate structure of FIG. 28) when event registration information (such as of the event registration database and associated tables) is being modified.

When any producer is inside the gate (e.g. per enter gate logic 1610 of FIG. 27), processing is performed to ensure that there is no reconfiguration for event registration/unregistration (e.g., no reconfiguration of event registration information for the event queue). In other words, when a producer is inside the gate (e.g., step 1401 of FIG. 25), no container can register or unregister for an event. Also, processing for the close API is not allowed to modify the structures indicating event registration. The waiter count of the gate structure indicates the number of producers currently inside the gate. The register, unregister and close APIs close the gate (e.g., gate closed= true). When the gate is closed, processing as described herein will not let any additional producers inside the gate, allows existing currently executing producers which are not blocked to continue posting event notifications, and wakes up any producers inside the gate waiting for a free entry on a consumer's ring buffer. Waking up such producers effectively forces the producers outside the gate so that they cannot reenter to continue waiting until the gate is reopened (e.g., gate closed=false). In connection with register, unregister and close APIs which use the seal and unseal operations to synchronize access to the structures herein, processing may be represented as follows:

gate down or closed/*seal operation */
    awaken any waiting producers currently inside the gate
    perform reconfiguration with respect to register/unregister
        modifications to the registration database and associate
        registration tables
    gate up or open/* unseal operation */

Any container trying to reenter the gate or gain access (e.g., via enter gate logic) will sleep and periodically check whether the gate has been reopened using the unseal operation. It should be noted that a container may also wait in connection seal operation processing when trying to obtain gate mutex (step 1662 of FIG. 30). When the gate is closed via the seal operation, no reconfiguration of the registration information may be performed by an entity other than the entity that performed the seal operation. Additionally, when the gate is closed, no additional threads are allowed inside the gate (to read or write event registration configuration information). As described herein, reconfiguration of registration information may be performed by the register, unregister and close event queue APIs described herein which modify information indicating what consumers are registered for what events. Referring back to FIGS. 9 and 10, when the gate is closed via the seal gate operation, only the entity performing the seal gate operation is allowed to modify the registration database including the registration tables and associated entries (identifying which consumers are registered for events). Additionally, threads which need to read the registration database and associated registration tables and which are outside the logical gate when closed are also not allowed to access (for reading) the event registration configuration information. It should be noted that the foregoing exclusive access to configuration information for event registration is provided per event queue (e.g., per entry on the global list of FIG. 9).

The event queue API described herein may be used in a variety of different ways of producer-consumer inter-container communication and notification regarding events. A single event queue may be associated with a selected group of one or more producers and one or more consumers. For example, producer and consumer containers may utilize a first event queue for first set of defined events. The same, or different containers may utilize a second different event queue for a second set of defined events. For example, a first event queue may be used to communicate event notifications regarding container creation and termination. A second event queue may be used to communicate event notifications regarding certain files such as when one or more files are opened, closed, and the like.

The techniques described herein provide for cleanup processing as described above. For example, when the reference count (ref count 558 of FIG. 9) of the handle structure associated with an event queue reaches 0 indicating there are no users of the event queue, resources associated with the event queue may be made available for other uses (e.g., the handle structure may be deallocated). As described herein, processing may be performed to manage the reference count by incrementing the reference count with each open and create API call and accordingly decrementing the reference count on each close and destroy API call for the event queue handle structure.

Figure 31:
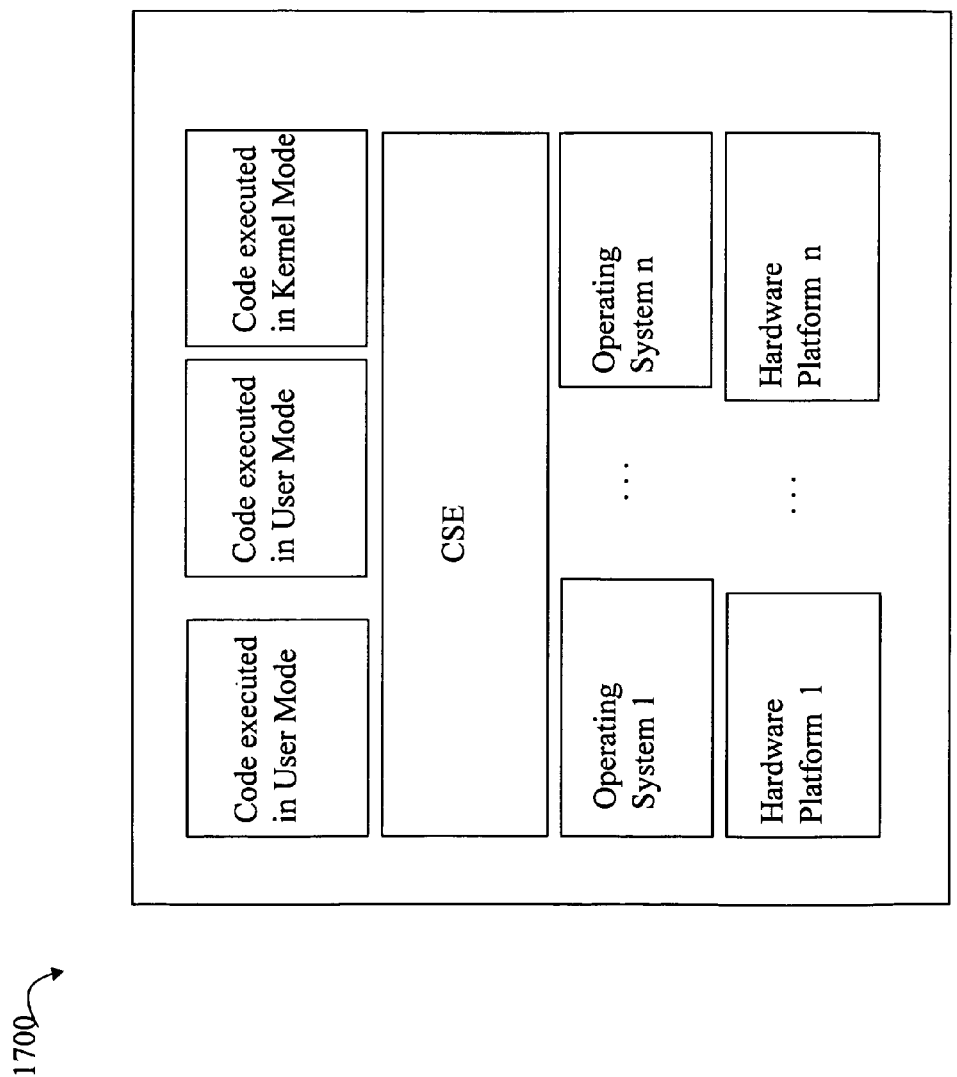
FIG. 31 is an illustration of the different operating systems and hardware platforms that may be included on a data storage system for use with the techniques herein.

Referring now to FIG. 31, shown is a representation illustrating the relationship of the common software environment (CSE) components to other components of the data storage system. In the example 1700, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code written using the API of the CSE may be executed in either user or kernel mode as illustrated herein.

As will be appreciated by those skilled in the art, the techniques herein may be used for existing code as well as newly developed code. For existing code, the platform specific calls may be determined and replaced with appropriate API calls. The API code may be modified to provided the necessary support for any additional platform. Similarly, new code may be developed using the API calls which may utilize the platform specific primitives while isolating the code from these platform dependencies.

It should be noted that a code module making calls into the API in accordance with techniques herein may use a first version of the API code when executing in user mode and a second version of the API code when executing in kernel mode by linking to the appropriate version. In other words, the code module makes the same API call (e.g., same defined interface) when executing in user mode and kernel mode so that the same code module can be executed in user mode and kernel mode without modification. However, the body of code included in the API which is executed as a result of the API call may vary in accordance with whether executing in user mode or kernel mode.

Although the techniques herein are illustrated in an exemplary embodiment of a data storage system, the techniques herein may be used in connection with code executing on any computer processor on any system.

It should be noted that other operations such as in connection with semaphores (e.g., P_SEM and C_SEM of FIG. 11) and mutexes (e.g., P_MUTEX of FIG. 11) may be implemented using APIs providing code portability and used from either user space or kernel space. One exemplary API that may be used in an embodiment in accordance with techniques herein is described in the '648 patent application.

It should also be noted that the ring buffer as described herein may be used in an embodiment as the event notification list. The techniques described herein for accessing the ring buffer and performing operations thereon in connection with posting (e.g., adding) and retrieving event notifications therefrom may be characterized as an adaption of the techniques described in the '759 and '822 applications for the FIFO structure described herein.

As described herein, an event registration configuration change or event registration reconfiguration may refer to modification of event registration information such as of the registration database and registration tables identifying which consumers are registered for which events. In accordance with an embodiment of the event queue API described herein, event registration reconfiguration may occur in connection with processing performed by API code for the register, unregister and close APIs.

In accordance with the techniques described herein, a container may include more than one producer thread or other code execution entity. For example, two producer threads may be included in a same container. Each of the producer threads may produce notifications in connection with the same events and/or different events. The foregoing two producer threads in the same container may use the same reference structure for posting event notifications. Thus, a reference structure with respect to producers may be used by one or more producers (different code execution entities producing events) in the same container.

Also in accordance with the techniques described herein, a container may include more than one consumer thread. For example, a container may include two consumer threads where each of the foregoing two threads uses a different reference structure. Alternatively, an embodiment using the API herein may provide for the two consumer threads using the same reference structure with additional synchronization (in addition to the event queue API) between the two consumer threads providing serialized or exclusive access to the reference structure used by both consumer threads.

Yet further in accordance with techniques herein, a container may include one or more threads which are consumers and one or more threads which are producers. A single thread in a container may be both a consumer and a producer and the single thread may use one or more reference structures.

It should be noted that examples described herein may have been provided with respect to a single event queue and that producers and consumers may use more than one event queue for communicating between producers and consumers thereof. Additionally, techniques herein may be used for communicating between one or more producers and one or more consumers in different containers as well as within the same container. For example, the techniques herein may be used to facilitate communications between a producer thread in a first container and a consumer thread in a second different container. Additionally, the techniques herein may also be used to facilitate communications between a producer thread in a first container and a consumer thread also in the same first container. Thus, techniques herein may be used for communications between one or more producers and one or more consumers included in the same and/or different containers.

With reference back to FIG. 2A, as described in more detail elsewhere herein in one embodiment, the code module 252 may include code of a thread body, a deferred procedure call (DPC), or an interrupt service routine (ISR). It will be appreciated by those skilled in the art that a routine in the API 260 may also be invoked by other bodies of code including, for example, another API routine, operating system code, and the like. In any case, the API routine may return to the calling routine once the called API routine has completed.

In accordance with the techniques described herein, a same code module may be executed using scheduling and synchronization primitives of the API in both user space and kernel space meaning that the same set of operations are available in user space and kernel space. The scheduling and synchronization primitives may be implemented using code of the API to behave in a similar manner when executing code in user space and kernel space. In other words, the scheduling and synchronization primitives of the API may be implemented to exhibit runtime behavior in accordance with a same set of criteria in both user space and kernel space as well as on the different supported platforms and environments. The scheduling and synchronization primitives of the API may exhibit the same runtime behavior on different platforms as well as user and kernel space although the primitives may be implemented differently by the API depending on the functionality included in a native environment. As such, the API herein may implement and enforce a set of criteria for code including API calls corresponding to the scheduling and synchronization primitives to ensure portability of the code across user space, kernel space, and supported environments. The set of criteria in an embodiment may also be characterized as a set of rules reflecting the most restrictive supported environment to ensure portability across all supported environments, such as when executing the code in an environment including any one of the supported operating systems. Using the API herein for performing operations of the scheduling and synchronization primitives, features and operations which are typically only available when executing code in kernel mode are also available to code executing in user mode. Similarly, features and operations which are typically only available when executing code in user mode are also available to code executing in kernel mode. In one embodiment described in following paragraphs, the API may implement a set of scheduling and synchronization primitives in user mode to provide kernel mode functionality and semantics specified using the criteria.

The criteria may define the allowable runtime behavior in connection with interactions between different scheduling and synchronization primitives. Additionally, the criteria may define the runtime behavior with respect to what scheduling and synchronization primitives can be performed in accordance with a current execution context associated with code executing at runtime. As an example, currently executing code may not be allowed to perform a first scheduling and synchronization primitive under certain conditions as indicated by the one or more criteria.

The API may include code to perform operations on classes of objects. In one embodiment, the API may include code to perform a set of operations, or methods, on each object. The API may include code and a defined interface to perform each of the operations in both user and kernel space and across the different supported environments.

What will now be described are scheduling objects for which different operations may be provided using the API. The objects and operations in connection with scheduling and synchronization primitives may be determined in accordance with the supported environments. The set of objects and operations may be determined as a union of all objects and operations that may be performed on all supported environments. For example, if the supported operating systems included one or more Windows-based operating systems, and LINUX, the list of objects and operations provided by the API may be based on the union of operations and objects for the foregoing supported operating systems. As a further example, if there is a scheduling object and associated operations provided in only the Windows-based operation system but not in LINUX, the API may provide support for performing the operations on the scheduling object across all supported environments for code portability across all supported environments in both user space and kernel space.

One embodiment may include support for performing operations on the following scheduling objects: mutual exclusion lock, spin lock, condition variable, thread, semaphore, manual reset event (MRE), automatic reset event (ARE), deferred procedure call (DPC), timer, and deferred work item (DWI). The operations performed on the objects may also be referred to as scheduling and synchronization primitives. Other embodiments may include support for different objects and operations than as described herein depending on the particular operating systems and functionality therein supported across different environments. The foregoing different scheduling objects will now be described in more detail. It should be noted that the API may include a common set of operations, such as create and terminate, that may be performed with respect to all the objects. The API may also include other operations that may vary with the particular object and scheduling or synchronization operations performed.

The mutual exclusion lock, or mutex lock, object may be used to enforce mutual exclusion to a critical region of code or a resource since only one thread at a time can hold the lock. Acquisition of the mutex lock is required prior to entering a critical region of code and the mutex lock is released upon exiting the critical region of code. An embodiment of the API may include, for example, operations to instantiate a mutex lock, acquire the mutex lock and release the mutex lock. If the mutex lock cannot be acquired by a thread, the thread is blocked and may enter a wait or sleep state until the mutex lock becomes available. A blocked thread waiting on a mutex lock is awakened or signaled when the lock becomes available upon release by another thread currently holding the mutex lock.

A spin lock object is a lock that may be used in a manner similar to the mutex lock (e.g., to enforce mutual exclusion of a resource or critical region of code) so that acquisition of the spin lock is required prior to accessing the resource or critical region of code. A thread trying to acquire the spinlock will enter a busy-wait (e.g., loop or spin) until the spin lock is unlocked or becomes available. With the mutex lock, a blocked thread will enter a wait state and may relinquish control of the processor to another thread for execution. In contrast, with a spin lock, the blocked thread continues execution with a busy wait or looping. An embodiment may include two different types of spin locks—interrupt disabling and non-interrupt disabling. With an interrupt disabling spin lock, when the spin lock is acquired, an interrupt cannot preempt the currently executing code which has acquired the spin lock. With a non-interrupt disabling spin lock, an interrupt can preempt executing code which has acquired the spin lock. It should be noted that an embodiment may also implement a single one of the foregoing types of spin locks.

A condition variable object is associated with a predicate or logical expression that evaluates to true or false based on shared data. The condition variable allows a thread to block on it and provides facilities to wake up one or more threads when the predicate changes. The condition variable provides for synchronization along with a signaling mechanism so that signaling can occur when the predicate state changes.

A thread object may be associated with a body of code that is executed. An API may include support for starting and terminating a thread as well as one or more other operations used for synchronization. For example, one or more other threads may be synchronizing or waiting for a particular thread to complete, reach a particular execution point, and the like. Operations may be provided by invoking code in the API using a defined interface so that, for example, upon the termination of the particular thread, the one or more other threads which are currently blocked and awaiting termination of the particular thread may be signaled and continue execution.

A semaphore object may be an integer valued variable that can be decremented (e.g. P operation) or incremented (V operation). If when decremented the semaphore has a value less than zero, the semaphore blocks (e.g., causes a requesting thread performing the decrementing operation to enter a wait or sleep execution state). Semaphores may occur in different variants such as a counting semaphore, where the associated integer value is greater than 1, and a binary semaphore (e.g., also referred to as the mutual exclusion lock described above) where the associated integer value=1. A counting semaphore may be used as a counter for a set of available resources. A semaphore may have an associated queue of threads. If a thread performs a P operation on a semaphore which has the value zero, the thread is added to the semaphore's queue. When another thread increments the semaphore by performing a V operation, and there are threads on the queue, one of the waiting or blocked threads is removed from the queue and resumes execution.

An embodiment may include an API providing operations on event objects, such as a manual reset event (MRE) object and an automatic reset event (ARE) object, used to signal a thread indicating that a particular event has occurred. The API may include support for performing operations in connection with MRE and ARE objects, for example, if the embodiment supports a Windows-based operating system. An MRE object is associated with an event that is manually set by a programmer or executing code. An MRE is an event object whose state remains signaled until it is explicitly reset to nonsignaled by executing code. While it is signaled, any number of waiting threads, or threads that subsequently specify the same event object, can be released. An ARE has a state that is set to signaled upon the occurrence of an event and the state is automatically reset to non-signaled when the first waiting thread successfully returns from the wait (i.e., "consumes" the event). In other words, if there are multiple threads waiting on occurrence of the event, only the first waiting thread consumes the event and is removed from the wait queue.

A deferred procedure call (DPC) object is an object associated with a body of code that is queued and then executed at a later point in time. Typically, the DPC is available only in kernel mode and may be characterized as a scheduled kernel mode callback which is performed at a later time. The DPC may be performed at a higher priority than other scheduled entities and is executed after any higher priority tasks. In the embodiment described herein, the DPC functionality may be made available to code executing on both user mode and kernel mode using the API. As known in the art, the DPC body of code is scheduled and performed as soon as possible. The DPC code body is not associated with a thread but is preferred work executed as soon as possible. A DPC may be queued, for example, when servicing an interrupt in order to perform remaining work for handling the interrupt. It should be noted that code associated with a queued DPC cannot block (e.g., code cannot perform an operation that may cause the code to enter a wait state such as if a mutex lock cannot be acquired). Therefore, code of a queued DPC may use a spin lock rather than a mutex lock.

A timer object may be associated with a body of code scheduled to be executed at a future point in time. The body of code may be associated with a queued DPC to be executed at a specified time or if a specified amount of time has elapsed. A timer object may be used, for example, in connection with an issued I/O operation. Code associated with a timer may be queued for execution at a point in time by which the I/O is expected to have completed so that if the I/O has not completed within a certain time, the timer will cause the I/O request to be aborted. If the I/O completes within the specified time, the timer may be canceled. It should be noted that code associated with a timer object may be subject to the same constraints, semantics and runtime behavior set forth regarding a DPC.

A deferred work item (DWI) object defers work done by a thread and executes at a thread priority level. A deferred work item is similar to a DPC in that the associated code is queued for execution at a later point. However, the code associated with a deferred work item runs at a thread priority level rather than an elevated DPC priority level. It should be noted that in an embodiment, code associated with servicing an interrupt may execute at a priority level higher than code associated with a DPC. Code associated with a thread may execute at a priority level lower than that associated with a DPC. A DWI may be used rather than a DPC since code associated with a DWI can block (e.g., perform operations using scheduling objects that may cause the code to enter a wait state such as when a mutex lock cannot be acquired), whereas code of a DPC cannot block (e.g., perform an operation that may cause the code to enter a wait state). It should be noted that code associated with a DWI object may be subject to the same constraints, semantics and runtime behavior set forth regarding a thread.

The foregoing objects and associated operations provided using the API may define a set of scheduling and synchronization primitives supported representing a union of all objects and operations across all supported environments and associated user and kernel execution modes. A same set of criteria is used to define the behavior that is acceptable when executing in any supported environment (e.g., such as any supported operating system) and when executing in user and kernel mode. The criteria may be defined in accordance with the most restrictive case so that the same code can be executed using any combination of supported hardware, software, user mode or kernel mode supported for the different environments. The set of supported scheduling and synchronization primitives may be a union of all possible operations across supported environments in both user and kernel mode. It should be noted that an embodiment may also define a set of scheduling and synchronization primitives which are supported across supported environments in both user and kernel mode. For example, the primitives associated with event objects, such as the MRE and ARE objects above, may be functionality typically including in a native Windows-based operating system but may not be implemented in a native LINUX operating system. In connection with the techniques herein, the API may include a defined interface for performing operations on MRE and ARE objects. If a code module performs a call into the API to perform an operation on an MRE, on a Windows-based operating system, the API may use native operating system functionality of the Windows-based operating system. If the same code module is executed on a LINUX operating system, the API may synthesize functionality, for example, using condition variables since support for the event objects and associated operations are not provided in the native LINUX operating system.

Figure 32B:
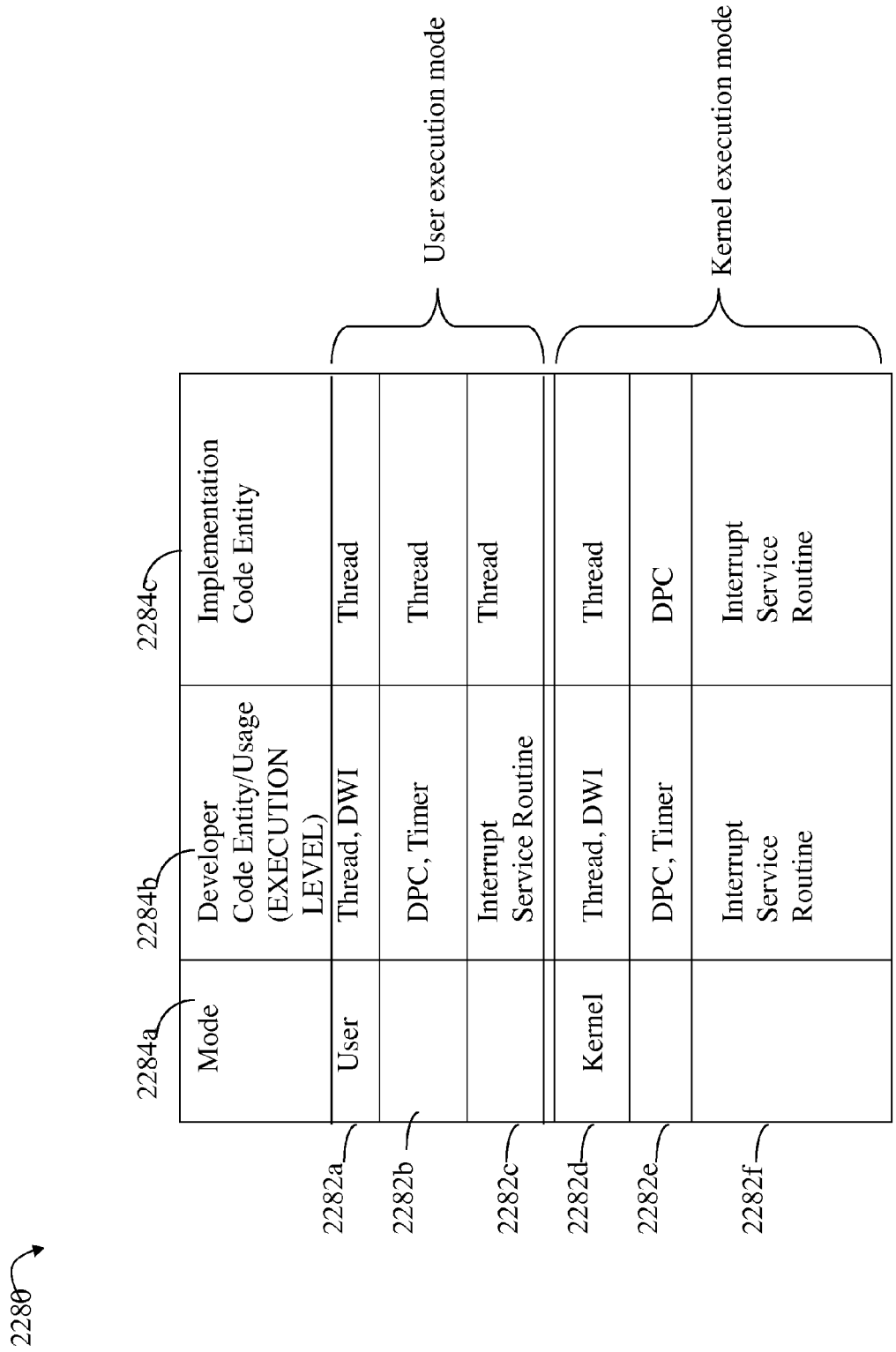
FIG. 32B is a table illustrating how different developer code entities may be implemented in an embodiment using the techniques herein in user mode and kernel mode.

Referring to FIG. 32B, shown is a table illustrating how an embodiment of the API may implement the different developer code entities for code executing in user and kernel mode. Table 2280 includes a first column 2284*a* listing one of user mode or kernel mode. Column 2284*b* indicates the different developer code entities or usage code entities as defined and used in a code module. The developer code entities of 2284*b* may be implemented by the API using the implementation code entities as indicated in 2284*c* in order to provide a same set of functionality in both user and kernel mode. As known in the art, different developer code entities of 2284*b* in user mode, such as the DPC and ISR, are typically entities only available to code that executes in kernel mode. In accordance with the techniques herein, a code module that calls the API in connection with operations for DPCs and ISRs may execute in user mode or kernel mode. In order to provide the foregoing functionality in user mode, one embodiment may include an API that simulates the objects and operations for DPCs and ISRs using threads when code executes in user mode. Rows 2282*a-c* indicate how different developer code entities may be implemented in one embodiment of the API when code executes in user mode. Rows 2282*d-f* indicate how different developer code entities may be implemented in one embodiment of the API when code executes in kernel mode. The way in which an embodiment implements the developer code entities 2284*b* as indicated by 2284*c* may vary depending in the underlying functionality available in the operating system and environment. It should be noted that element 2284*b* indicates an execution level that may be associated with the body of code. The execution level indicates the developer code entity or usage.

Figure 32C:
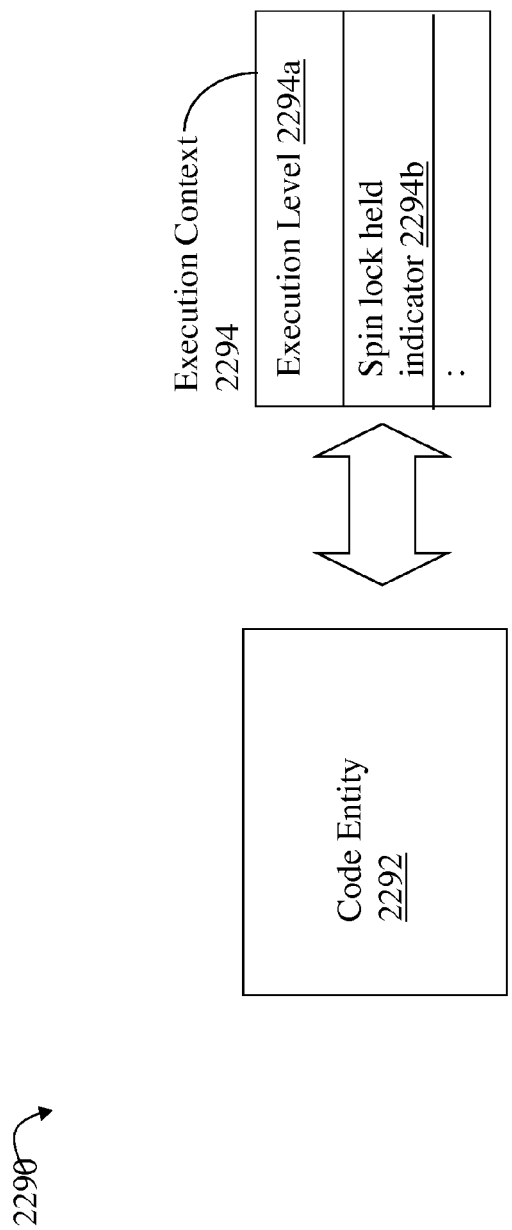
FIG. 32C is an example illustrating association of an execution context with a code entity.

Referring to FIG. 32C, shown is a representation of a runtime or an execution context 2294 associated with a current execution state of a body of code (code entity 2292) that may be used in an embodiment with the techniques herein. The execution context 2294 may characterize aspects regarding the execution state of the code entity 2292 at a point in time. As the code of 2292 continues to execute, the execution context 2294 may also accordingly change. The code entity 2292 may have attributes associated with one of the rows of table 2280. In one embodiment, the API may use the execution context 2294 in connection with defining a set of criteria indicating allowable conditions or conditions as to when different scheduling and synchronization primitives are allowed to be performed. The execution context 2294 may include an execution level 2294*a* and a spin lock held indicator 2294*b*. The execution level 2294*a* may indicate a runtime execution context level associated with the code at a current execution point and correspond to the developer code entity as indicated in 2284*b* of FIG. 32B. The spin lock held indicator 2294*b* may provide a runtime indication as to whether a spin lock is currently acquired at the current execution point. When a spin lock is successfully acquired during code execution and for the duration that the spin lock is held, the spin lock held indicator evaluates to true. If no spin lock is currently being held at an execution point, the spin lock held indicator evaluates to false. It should be noted that the spin lock held indicator may be implemented in an embodiment in a variety of different ways. In one embodiment, the indicator 2294*b* may be implemented as a boolean or logical variable. An embodiment may also implement the indicator 2294*b* using a counter which is incremented each time a spin lock is acquired.

It should be noted that although the execution context described herein includes an execution level and a spin lock held indicator, other information may be stored in an embodiment in connection with the execution context.

In one embodiment, the execution level 2294*a* may be set to indicate one of the following in accordance with the usage of the code entity in the developer code module: a thread level, a deferred procedure call level or an interrupt level. The thread level indicates that the current execution point occurs in thread or a deferred work item developer code entity. The deferred procedure call level indicates that the current execution point occurs in a deferred procedure call or a timer developer code entity. The interrupt level indicates that the current execution point occurs in an interrupt service routine developer code entity. The execution level and the spin lock held indicator are appropriately updated and maintained by the API during execution of code that invokes the API. The execution level and the spin lock held indicator may be examined prior to performing scheduling and synchronization primitives corresponding to operations on objects as described herein and included in the API to determine whether to allow a requested operation.

The execution context 2294 may be provided by the API for code that executes in user mode and kernel mode. The execution level 2294*a* and spin lock held indicator 2294*b* may be used in an embodiment described herein to define a set of criteria enforced for user space and kernel space to provide the same semantics for similar run time behavior when executing code in user and kernel space. It should be noted that code executing in user space does not typically have and apply the kernel-mode concepts of execution level and spin lock indictor as described herein. It should also be noted that the execution levels may vary with operating system. In accordance with the techniques herein, a common set of execution levels may be defined which can be supported across all environments to characterize the current execution level of code executing in any supported environment, in user mode and kernel mode.

An embodiment may utilize the defined execution levels of thread, DPC and interrupt as described above. The execution level associated with executing code may be set to thread level if the executing code is associated with a developer code entity that is a thread. When in the thread execution level, operations can be performed that block (e.g., cause the code to wait for a lock in a wait state) if no spin locks are held. Also, when in the thread execution level, the code is allowed to perform operations that wake up or signal other threads.

The execution level associated with executing code may be set to DPC level if the executing is associated with a developer code entity that is a DPC or a timer. When in the DPC execution level, operations cannot be performed that block (e.g., cause the code to wait for a lock in a wait state), and the code is allowed to perform operations that wake up or signal other threads.

The execution level associated with executing code may be set to interrupt level if the executing code is associated with a developer code entity that is an interrupt service routine. When in the interrupt execution level, code cannot perform operations that block (e.g., cause the code to wait for a lock in a wait state), and the code is not allowed to perform operations that wake up or signal other threads. However, the code may acquire a spin lock and can fire or queue a DPC for execution. It should be noted that a spin lock may be acquired by executing code having any of the defined execution levels herein. Also, executing code may queue a DPC when the executing code has any one of the defined execution levels herein.

As described herein, the spin lock held indicator may be used in combination with the execution level of executing code to determine what scheduling and synchronization primitives may be performed by calling code in the API. Prior to performing a requested operation corresponding to the scheduling and synchronization primitive, the API may include code which uses the execution context associated with the currently executing code to determine whether the requested operation is currently allowable. Criteria may be defined specifying conditions as to when requested operations may/may not be performed. The conditions may be expressed in terms of the execution context using the execution level and spin lock held indicator. For example, code having an associated thread execution level cannot enter a wait state (e.g. cannot perform an operation which may cause the code to block for failure to acquire a requested lock). As such, the code having a thread execution level and spin lock held indicator=true cannot perform a requested operation if the requested operation can cause the code to block for failure to acquire a lock.

It should be noted that as used herein, to say that code cannot perform an operation that blocks or "cannot block" means that the code is not allowed to perform an operation or scheduling and synchronization primitive that may cause the code to be placed in a blocking or wait state. It should noted that the foregoing is distinct from a busy wait state that may occur in connection with processing performed while waiting to acquire a spin lock. Code having an execution context in which the spin lock held indicator evaluates to true means that the code has acquired a spinlock and if another body of code tries to acquire the same spin lock, the other code will spin in a busy wait loop waiting for the spin lock (e.g., until it can acquire the spin lock).

The foregoing three possible execution levels may be utilized in an embodiment to indicate runtime behavior and associated semantics for code having a particular execution level. Each execution level may denote an execution priority level as follows from lowest execution priority level to highest: thread, DPC, and interrupt. Code having an associated execution level with an execution priority level may be preempted by another body of code having a higher execution level and associated execution priority level. Once the higher priority level code has completed, the originally preempted code can resume execution. In the embodiment described herein, the foregoing follows along with code that executes in both user mode and kernel mode. Thus, the execution level may also be used in connection with defining similar runtime behavior that is enforced when code executes in both user mode and kernel mode.

It should be noted that an embodiment implementing the different execution levels or developer code entities in user mode may optimize performance by assigning relative priority levels to user threads to simulate the different execution priorities for threads, DPCs and ISRs.

Figure 33:
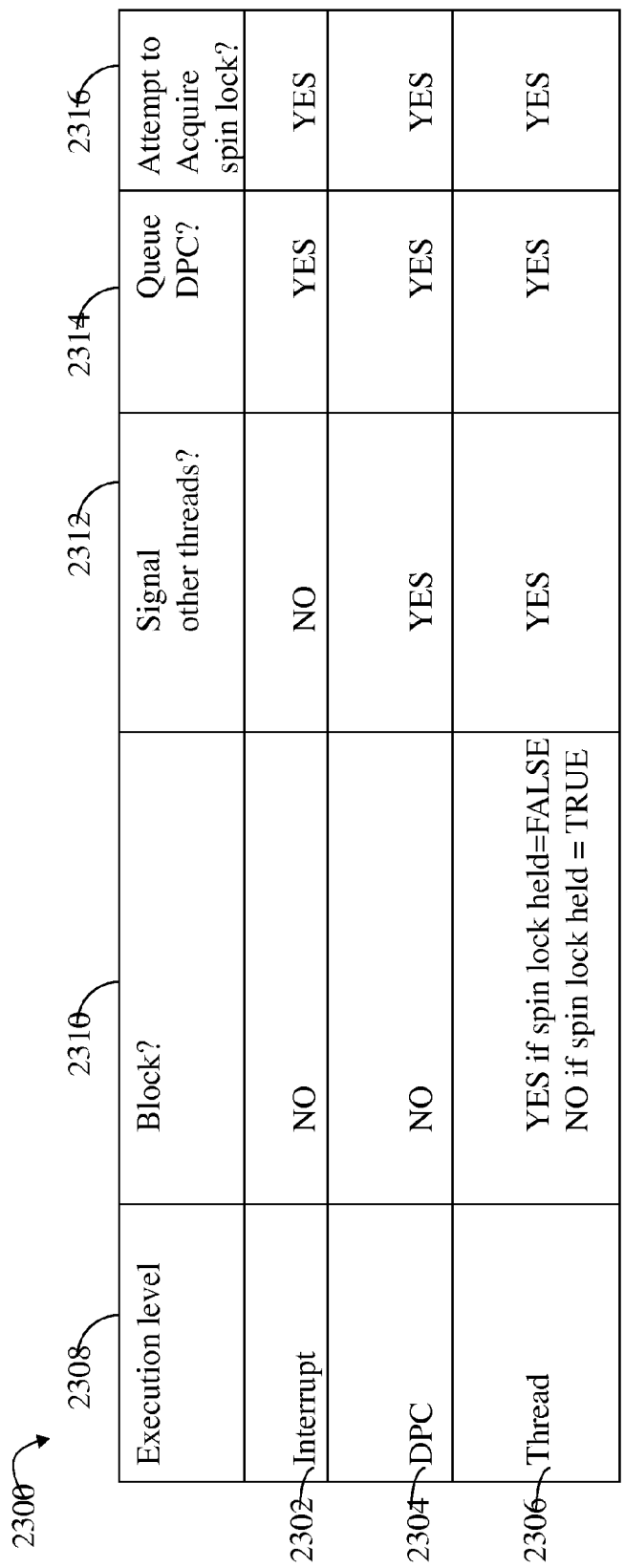
FIG. 33 is a table summarizing criteria that may be enforced by an API using the techniques herein for code executing in user mode or kernel mode on any supported platform.

Referring to FIG. 33, shown is an example summarizing when particular scheduling and synchronization primitives may be performed in an embodiment using the techniques herein. The example 2300 summarizes whether a requested operation is allowable based on actions or possible resulting consequences of performing the requested operation. The example 2300 indicates criteria that may be used to determine whether to perform a requested scheduling and synchronization primitive made by making a call to code in the API described herein. The API may include code which checks to determine whether the requested scheduling and synchronization primitive is allowable in accordance with the current execution context of executing code making the API call corresponding to the requested scheduling and synchronization primitive. Row 2302 indicates the criteria for when to allow operations for an interrupt execution level. Row 2304 indicates the criteria for when to allow operations for a DPC execution level. Row 2306 indicates the criteria for when to allow operations for a thread execution level. It should be noted that the spin lock held indicator only affects the determination as to whether a thread can perform a requested operation that can result in blocking the code as may occur if a requested mutex lock is not available.

Based on the criteria set forth in rows 2302, 2304 and 2306, code having an interrupt execution level, a DPC execution level, or a thread execution level with spin lock held indicator=YES or TRUE is not allowed to perform, for example: acquire_mutex_lock ( )—which attempts to acquire a mutex lock and otherwise causes the requesting code to block and enter a wait state; and semaphore_decrement ( )—which decrements a semaphore and causes the requesting code to block if the semaphore has an ending value less than zero. Code having an interrupt execution level is also not allowed to perform an operation which signals another code entity as may occur in connection with operations on condition variable objects and event objects. Code having a DPC execution level or a thread execution level, however, is allowed to perform the foregoing operation which may signal another code entity.

Columns 2314 and 2316 indicate that an operation can be performed which queues a DPC or attempts to acquire a spin lock when the executing code has any of the defined execution contexts.

It should be noted that an embodiment may allow variations of the foregoing illustrated in FIG. 33 to provide a further level of granularity in defining when operations described herein are allowable. For example, an embodiment may have two types of a spin lock—a non-interrupt disabling spin lock and an interrupt disabling spin lock. The embodiment may also have two spin lock held indicators, one for each of the foregoing spin lock types. A thread may be allowed to signal or wakeup another thread, such as in connection with semaphores, if holding a non-interrupt disabling spin lock but not if holding an interrupt-disabling spin lock.

Figure 34:
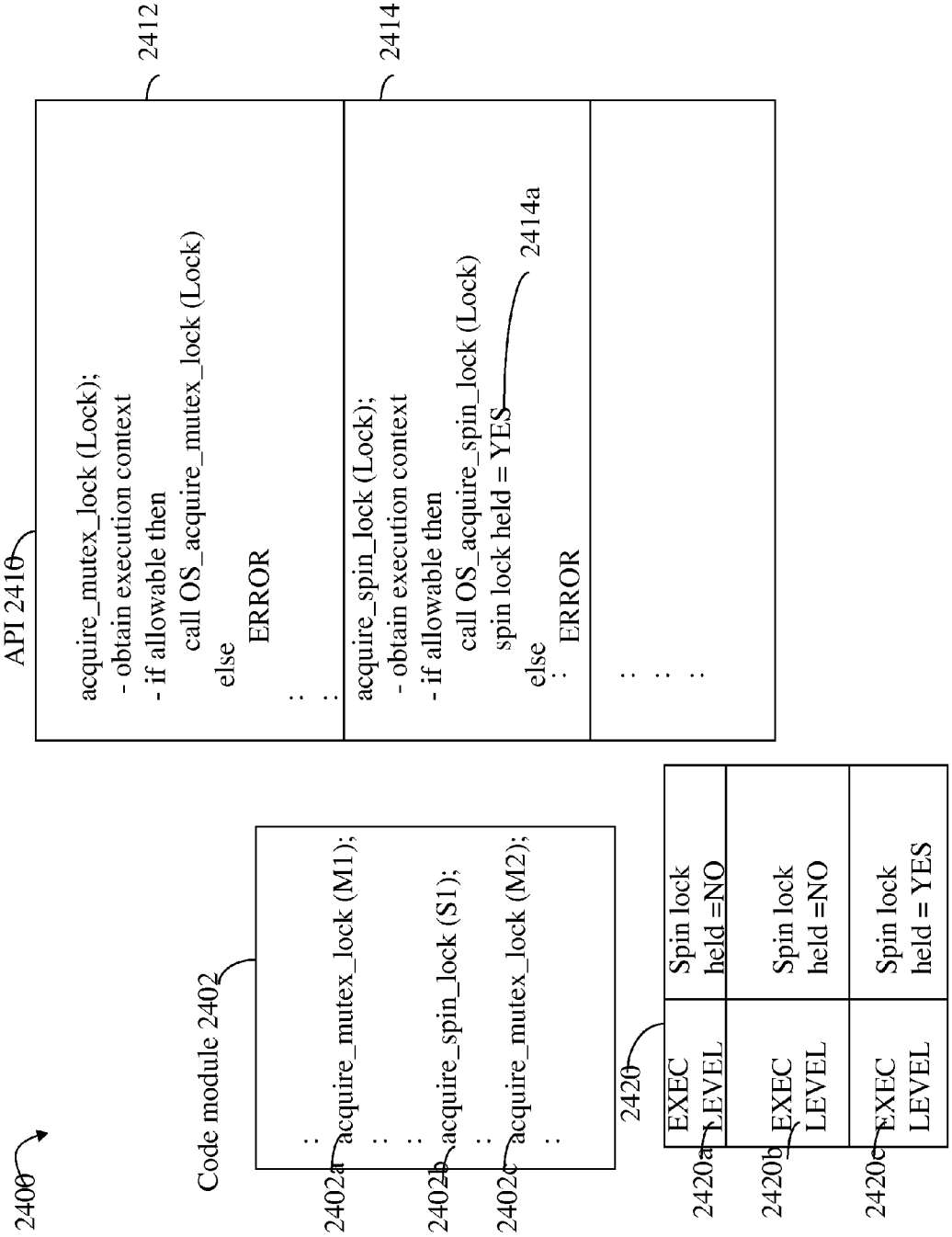
FIG. 34 is an example illustrating use of the techniques herein during code execution to implement the criteria of FIG. 33 in an embodiment.

Referring to FIG. 34, shown is an example illustrating how the criteria of FIG. 33 may be used in an embodiment of the API implementing the scheduling and synchronization primitives herein using the execution context. In the example 2400, the code module 2402 may include various calls into the API 2410. Table 2420 indicates the execution context as defined herein using the execution level and spin lock held indicator at different execution points in the module 2402 as will be described in following paragraphs. Each of 2420a-2420c indicates a set of values as may be recorded in the execution context for the code module 2402 at different points in time during execution thereof.

The code module 2402 may include a first call at point 2402a into the API 2410 to the routine acquire_mutex_lock to attempt to acquire the mutex lock, M1. Execution of the call at 2402a results in a transfer to code included in the API at the entry point indicated by 2412. Element 2412 indicates the processing that may be performed by the API code associated with attempting to acquire the mutex lock. The code of 2412 obtains the current execution context from 2420a. It should be noted that the first column of the table 2420 indicates an execution level (EXEC LEVEL) and a corresponding spin lock held indicator (Spin lock=<value>). EXEC LEVEL generically indicates that in this example, the execution level may be any one of the 3 possible values described herein depending on the developer code entity including the code module 2402. The code of the API 2412 may obtain the current execution context as indicated in 2420a for code module 2402 and determine whether the requested scheduling and synchronization primitive is allowable in accordance with the current execution context. As described in connection with FIG. 33, the requested operation implemented by the API code of 2412 may be performed only if the requested execution level is the thread execution level. If the requested operation is indicated as allowable, the code of 2412 may perform a call to an underlying operating system primitive, OS_acquire_mutex_lock. Upon return from the operating system primitive, the code of 412 may update the execution context as needed. In this example, there is no change to the execution level and the spin lock held indicator does not need updating.

The code module 2402 may include a second call at point 2402b into the API 2410 to the routine acquire_spin_lock to attempt to acquire the spin lock, S1. Execution of the call at 2402b results in a transfer to code included in the API at the entry point indicated by 2414. Element 2414 indicates the processing that may be performed by the API code associated with attempting to acquire the requested spin lock. The code of 2414 obtains the current execution context from 2420b and then determines whether the requested scheduling and synchronization primitive is allowable in accordance with the current execution context. As described in connection with FIG. 33, the requested operation of 2414 may be performed and the code of 2414 performs a call to an underlying operating system primitive, OS_acquire_spin_lock. Upon return from the operating system primitive, the code of 2414 may update the execution context as needed. In this example, the spin lock held indicator is updated in step 2414a since the requested spin lock is acquired. Control may return to the code module 2402. Element 2420c may indicate the execution context for the code module 2402 after execution of the API call 2402b and also prior to execution of the API call at point 2402c.

The code module 2402 may include a third call at point 2402c into the API 2410 to the routine acquire_mutex_lock to attempt to acquire the mutex lock, M2. Execution of the call at 2402c results in a transfer to code included in the API at the entry point indicated by 2412. The code of 2412 obtains the current execution context from 2420c and determines whether the requested scheduling and synchronization primitive is allowable in accordance with the current execution context. As described in connection with FIG. 33, the requested operation of 2412 may be performed only if the requested execution level is the thread execution level and the spin lock held indicator is NO or FALSE. In this example, the requested operation is indicated as not allowable and the code of 2412 may result in an error indicating that the requested operation cannot be performed.

Referring to FIG. 34A, shown is an example illustrating storage of the execution context in an embodiment using the techniques herein. The example 2450 illustrates that the execution context may be stored and accessed per thread 2460 or per CPU 2470. The particular times and conditions as to when the execution context is stored and retrieved on a per thread basis as in 2460 or per CPU-basis as in 2470 is described in following paragraphs. When the execution context including the execution level and spin lock held indicator is stored and retrieved on a per thread basis as illustrated in 2460, the execution context may be stored in a thread-specific data area 2462. In one embodiment, a thread-specific data 2462 area may be associated with each thread object 2452a. The thread-specific data area 2462 may also be characterized as a thread's own local or private data area for use by the thread. In this example when the implementation code entity is a thread, the execution context 2464 may be stored in the thread-specific data area 2462. As the code of the thread executes, the execution context 2464 may be accordingly updated. The thread-specific data area 2462 may be accessible using a pointer included in the thread object 2452a.

When the execution context including the execution level and spin lock held indicator is stored and retrieved on a per CPU basis as illustrated in 2470, the execution context may be stored in a data area containing relevant information for each CPU. As an example, the current execution context for CPU 0 may be stored and retrieved using the kernel data structure of 2470 by accessing the information in execution context

2472. Element 2472 represents a portion of the CPU-specific data for CPU 0 containing the current execution context for code executing on CPU 0.

As described herein and known in the art, code may be executed on a system having multiple CPUs. As an example in an embodiment having multiple CPUs, a thread implementation code entity may be executed on a first CPU, may be pre-empted, and then resume execution on the same or a different CPU. There are instance where the code may not, even if pre-empted, execute on a different CPU. In one embodiment described herein, if the implementation code entity is a DPC, ISR or a thread that has acquired a spin lock, the code entity may not be executed on different CPUs. In such cases where the code entity will not switch between CPUs (e.g., be executed on different CPUs), the structure of 2470 may be used to set and retrieve the execution context.

In one embodiment, the execution context may be stored in thread-specific data as illustrated in 2460 when the implementation code entity is a thread (as indicated in accordance with column 2284c of FIG. 32B). The foregoing occurs when the code is included in a thread developer code entity executed in kernel mode and when the code is included in a developer entity that is a thread, DPC, or ISR executed in user mode. As described elsewhere herein, a developer's code module may include code for a DPC or ISR code body that is executed in user mode. In such a case, the API may use threads in user space to implement the foregoing (e.g., API may use user space threads to emulate DPC and ISR functionality).

In one embodiment, the execution context may be stored and accessed using a kernel data structure as illustrated in 2470 providing information on a per-CPU basis when the implementation code entity is a DPC or ISR code body. The foregoing occurs when the code is included in a developer code entity that is a DPC or ISR executing in kernel mode. It should be noted that the execution context may be stored and retrieved using the structure of 2470 when the currently executing code will not switch CPUs once execution has commenced. In contrast, when the currently executing code can switch CPUs, the execution context for the currently executing code is stored on a per-thread basis in the thread-specific data area as in 2460.

It should be noted that in one embodiment, a thread developer code entity that has acquired a spin lock may not hold a spin lock across blocking operations (e.g., cannot perform an operation which may block the thread's execution). The embodiment may also not preempt the foregoing thread that holds a spin lock so as to allow any waiting thread on another processor to acquire the spin lock as soon as possible. In such a case where there is an execution level=thread for code running in kernel mode and a spin lock is held, the execution context information may be stored and retrieved from the data structure of 2470 since the currently executed code will also execute on the same CPU. Alternatively, if no spin lock is held, the currently executing code running in kernel mode with execution level=thread may execute on different CPUs and the current execution context may be stored and retrieved using the thread-specific data of 2460. It should also be noted that accessing the execution context using the structure of 2470 may be more efficient than accessing the execution context using thread-specific data areas. As such, an embodiment may choose to utilize the structure of 2470 over the thread-specific data area to obtain the current execution context when possible. In such an embodiment, the API code invoked to acquire a spin lock may update the data structure 2470 when code that has execution level=thread acquires the spin lock. The current execution context may be retrieved from the thread's private data area by other code using the thread object as in 2460 or using 2470.

It should also be noted that although 2470 illustrates execution contexts as being included in an entry for each CPU, a pointer may be maintained in the per-CPU entry which identifies or points to the thread's private data area, a location in the private data area containing the execution context, or a location of an execution context stored at a location other than in the foregoing private data area.

Figure 35A:
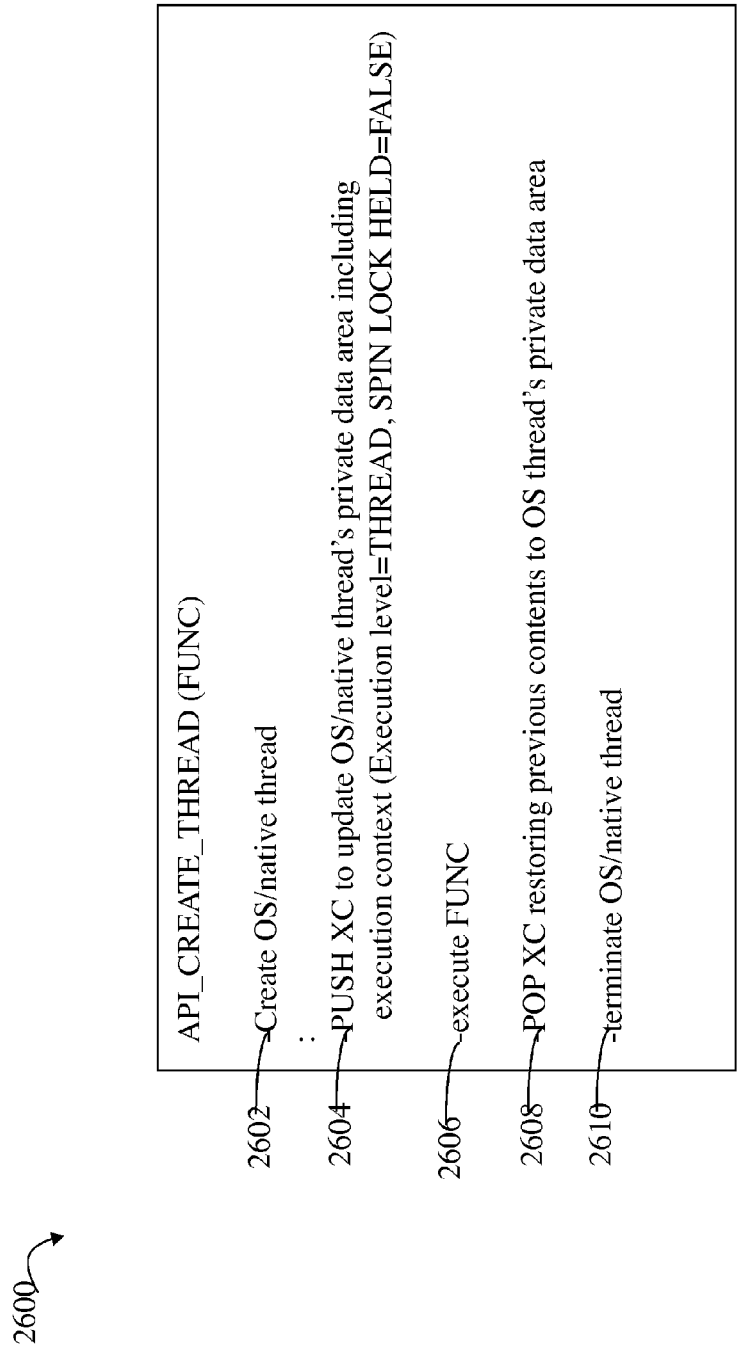
FIG. 35A is an example of logical steps that may be performed by code of the API in connection with thread creation and execution of a code entity having a thread execution level in user mode and kernel mode.

Referring to FIG. 35A, shown is an example illustrating steps that may be performed using an API routine to create a thread (e.g., API_CREATE_THREAD_WRAPPER) as may be called from developer code utilizing the techniques herein. The API of FIG. 35A may be invoked in connection with the thread developer code entity. The API includes code which implements the API thread on top of a native operating system (OS) thread by creating an OS thread in step 2602. The thread object created identifies the code for FUNC (e.g., as included in the calling module and also indicated by parameter FUNC in this example) as the thread body of code. In step 2604, the execution context for the thread is placed in the OS thread's private data area. In one embodiment, step 2604 may include using any one of variety of different techniques which saves or preserves the existing contents of the OS thread's private data area prior to updating with the current execution context. The execution context of the OS thread as included in the private data area is updated to indicate a thread execution level and initialize the spin lock held indicator to false. At step 2606, control is transferred to begin executing the thread body of code, FUNC. Once the thread code has completed, control returns and processing proceeds with step 2608. In step 2608, the previous contents of the OS thread's private data area may be restored. In step 2610, the OS thread may be terminated. It should be noted that the thread's private data area may be preserved and restored to its previous state as just described in case another routine, previously in the current call chain, has stored information to the thread's private data area which step 2604 may have overwritten. When the code of FUNC is executed as part of performing step 2606, the spin lock held indicator may be updated when a spin lock is acquired and released. It should be noted that in one embodiment, the underlying OS function invoked in step 2602 may be a user thread object if the code is executed in user mode, and may be a kernel thread object if the code is executed in kernel mode. The foregoing may be the case, for example, in connection with Unix operating systems and Windows NT operating systems. The example 2600 represents the logical steps that may be implemented by the API for both user and kernel mode.

Figure 35B:
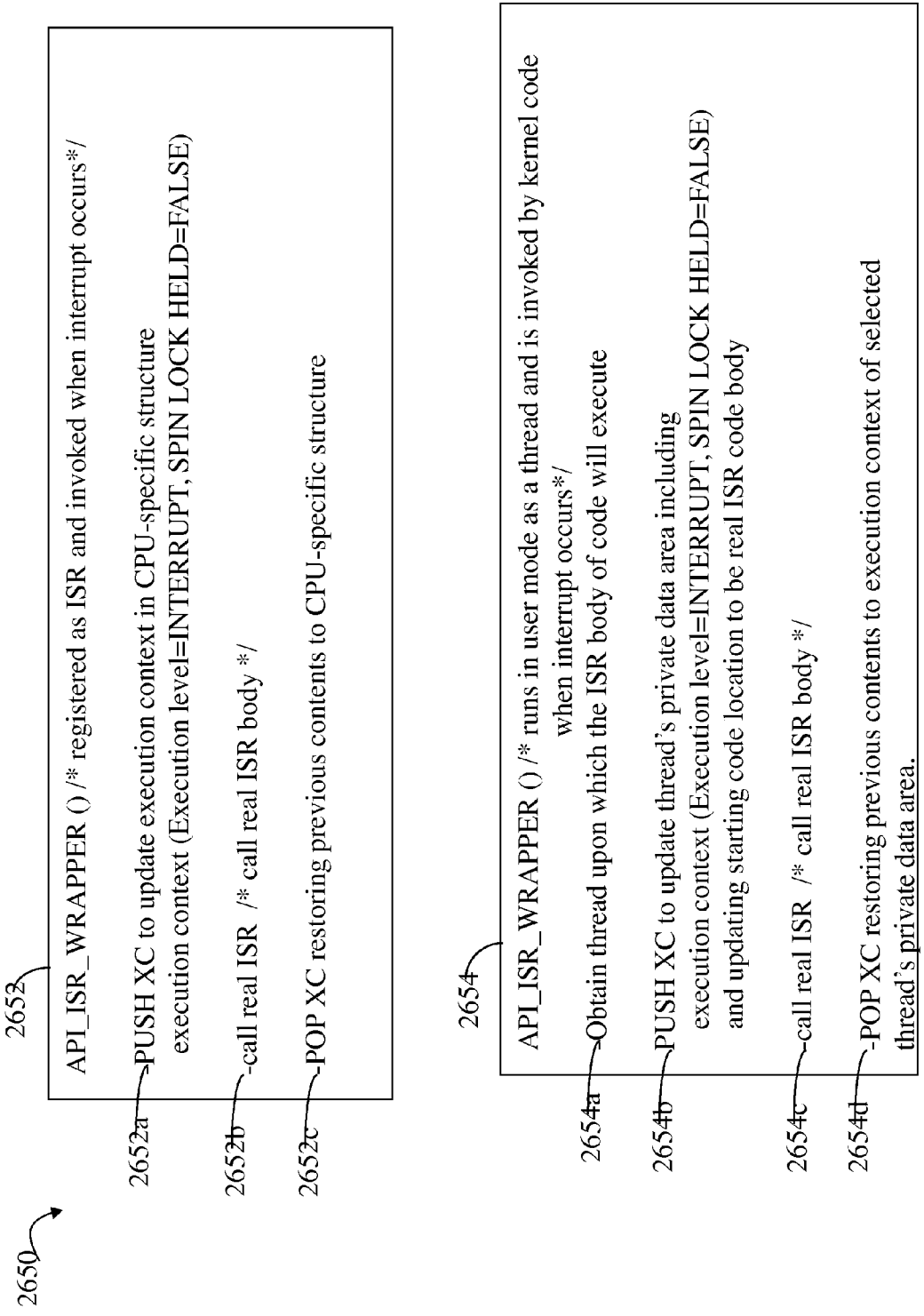
FIG. 35B is an example of logical steps that may be performed by code of the API in connection with execution of a code entity having an interrupt execution level in user mode and kernel mode.

Referring to FIG. 35B, shown is an example illustrating steps that may be performed using an API routine that may be invoked upon the occurrence of an interrupt. Element 2652 may be used in connection with a user-defined ISR body of code when executed in kernel mode. In other words, 2652 represents the logical steps that may be performed in an embodiment in connection with implementing an ISR developer code entity executed in kernel mode. Element 2654 may be used in connection with a user-defined ISR body of code when executed in user mode (e.g., user mode interrupt service routines). In other words, 2654 represents the logical steps that may be performed in an embodiment in connection with implementing an ISR developer code entity executed in user mode. In the example 2650, the user-defined ISR code body comprising the interrupt handler or service routine is denoted as "real ISR". The API API_ISR_WRAPPER performs steps before and after invoking the real ISR.

Element 2652 includes a first version of API code for API_ISR_WRAPPER which may be invoked upon the occurrence of an interrupt for the registered device. As known in the art, an interrupt service routine (ISR) may be registered for handling or servicing interrupts for particular devices. In connection with this example, the routine API_ISR_WRAPPER has been previously registered and is subsequently invoked upon the occurrence of an interrupt for the registered device. Upon invocation when an interrupt occurs, API_ISR_WRAPPER may be provided with sufficient information to transfer control to the location of the real ISR code body. In step 2652a, the execution context of the CPU-specific structure 2470 of FIG. 34A may be updated to identify an execution context with an interrupt execution level and a spin lock held indicator set to false. In step 2652b, the real ISR may be invoked. Upon completion of the real ISR, control returns to 2 652 and processing continues with step 2652c. In step 2652c, the previous contents of the CPU-specific structure overwritten in step 2652a may be restored.

Element 2654 includes a second version of API code for API_ISR_WRAPPER which may be invoked upon the occurrence of an interrupt for the registered device. In connection with the techniques herein, the code of 2654 may execute as a thread in user mode and be invoked by other code executing in kernel mode upon the occurrence of an interrupt. The other code executing in kernel mode which is initially notified upon the occurrence of the interrupt may be registered as with the operating system as the interrupt service routine. In step 2654a, a thread is obtained that will be used to carry or execute the real ISR body of code. An embodiment may select a thread in step 2654a using any one of a variety of different techniques. For example, step 2654a may select an existing thread that is a dedicated worker thread, a worker thread selected from a pool of previously created worker threads, or may notify a waiting user space thread. In step 2654b, information associated with the thread object selected from step 2654a is modified so that the execution context of the thread's private data area indicates an interrupt execution level with a spin lock held indicator of false. In other words, the storage location of the selected thread's execution context is utilized or "borrowed" in step 2654b.

Prior to modifying the thread's information in step 2654b, the current thread information may be saved and then later restored in a fashion similar to that as described above in connection steps 2604 and 2608 of FIG. 35A In step 2654c, the real ISR is called. Control then returns to API code 654 where step 2654d is performed to restore the thread information previously overwritten in step 2654b. Step 2654d may include restoring the execution context in the thread's private data area, and any other information modified as a result of step 2654b. It should be noted that other information associated with the selected thread from step 2654a may be modified than as described herein as needed to call the real ISR code in step 2654c. In connection with step 2654a, an embodiment may also select a thread, for example, previously created using the API of FIG. 35A and which may have subsequently made another second API call requesting a resource. After acquiring the resource, code of the API for 2654 may select the previously created step in 2654a, modify the thread's information as described in 2654b, execute the real ISR in 2654c, restore the thread's information in 2654d prior to returning to returning from the second API call. An example illustrating this in connection with an API call implementing the DPC developer code entity in user mode is described in following paragraphs.

Figure 36:
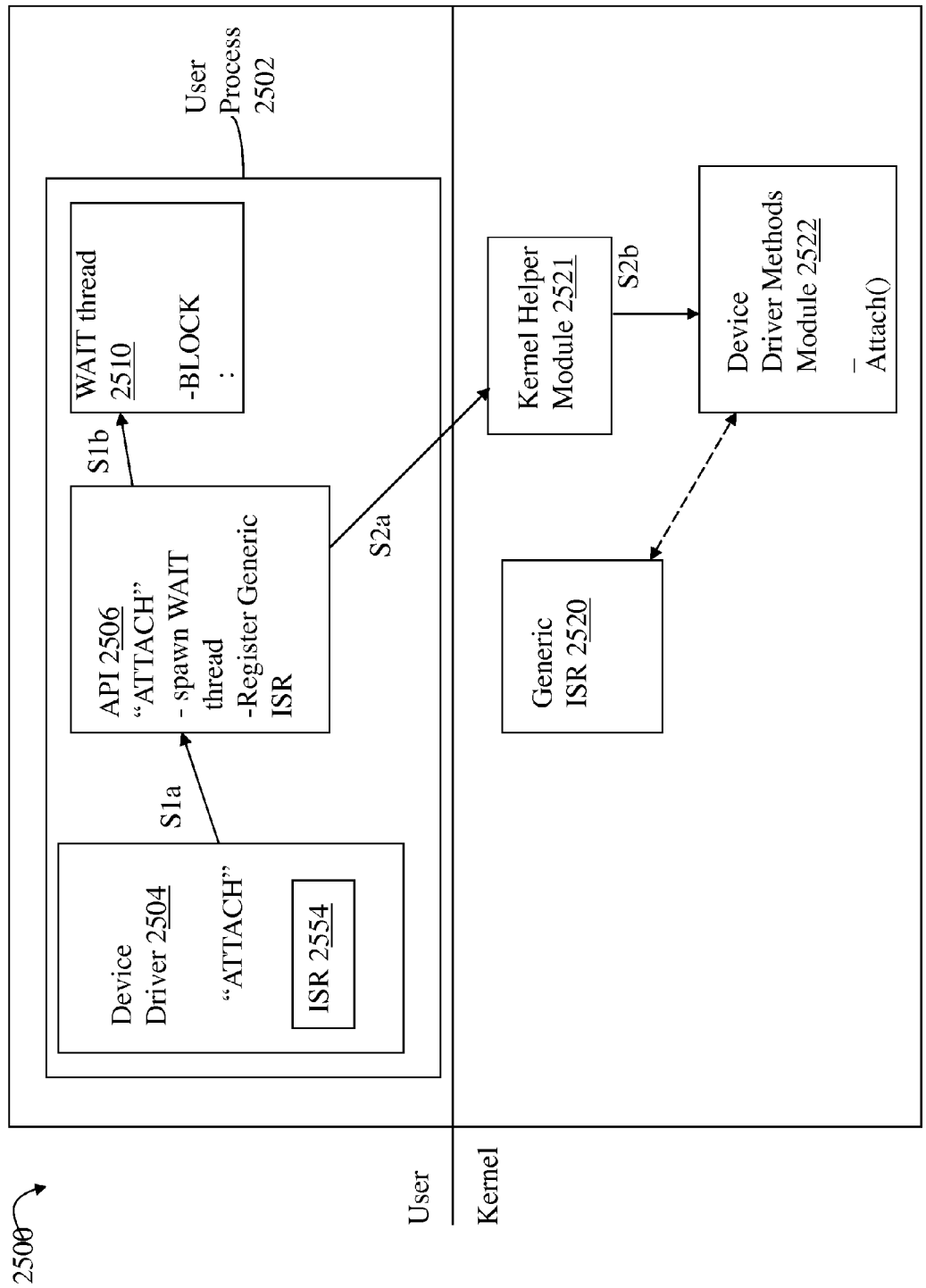
FIGS. 36-37 are an example illustrating execution of code having an interrupt execution level in user mode.

Referring now to FIG. 36, shown is an example of the techniques herein used in connection with implementing interrupts in user mode. FIG. 36 shows a first step in an exemplary use of an interrupt with device drivers. The example 2500 illustrates using an attach operation to register the device driver in user mode. The example 2500 illustrates a user mode device driver 2504 executing an attach API call resulting in invoking API code 2506 as illustrated by S1a. In this instance, the API code determines that the requested attach operation is performed as illustrated by S3b by first spawning wait thread 2510 illustrated by S1b. The wait thread 2510 includes code which executes an API call to block or stop execution of the thread 2510 until signaled to resume execution by other code described in more detail in following paragraphs. The block operation may be an API call used for synchronizing execution between thread 2510 and other code. In this instance, the execution of 2510 will be resumed upon the occurrence of an interrupt for the device now being attached to. The block API call may result in a call to the kernel to place the wait thread 2510 in a blocked execution state using scheduling and synchronization primitives in the underlying operating system. The API may utilize a kernel helper module 2521 when issuing the kernel mode call to place the wait thread 2510 in a blocked state. The module 2521 may be used to facilitate making a call from user mode into kernel mode. After spawning the wait thread 2510, the API 2506 communicates with the kernel helper module 2521 as illustrated by S2a to register with the operating system a generic ISR 2520 in kernel mode as the ISR to be invoked upon the occurrence of an interrupt for the device. The module 2521 then issues the attach request to the module 2522 which results in registering the kernel mode generic ISR 2520 to service any subsequent requests for the device. The generic ISR 2520 may perform minimal work in connection with servicing the interrupt. The ISR 2554 in the user mode device driver 2504 will be invoked to perform processing to service the interrupt as described in FIG. 37.

Figure 37:
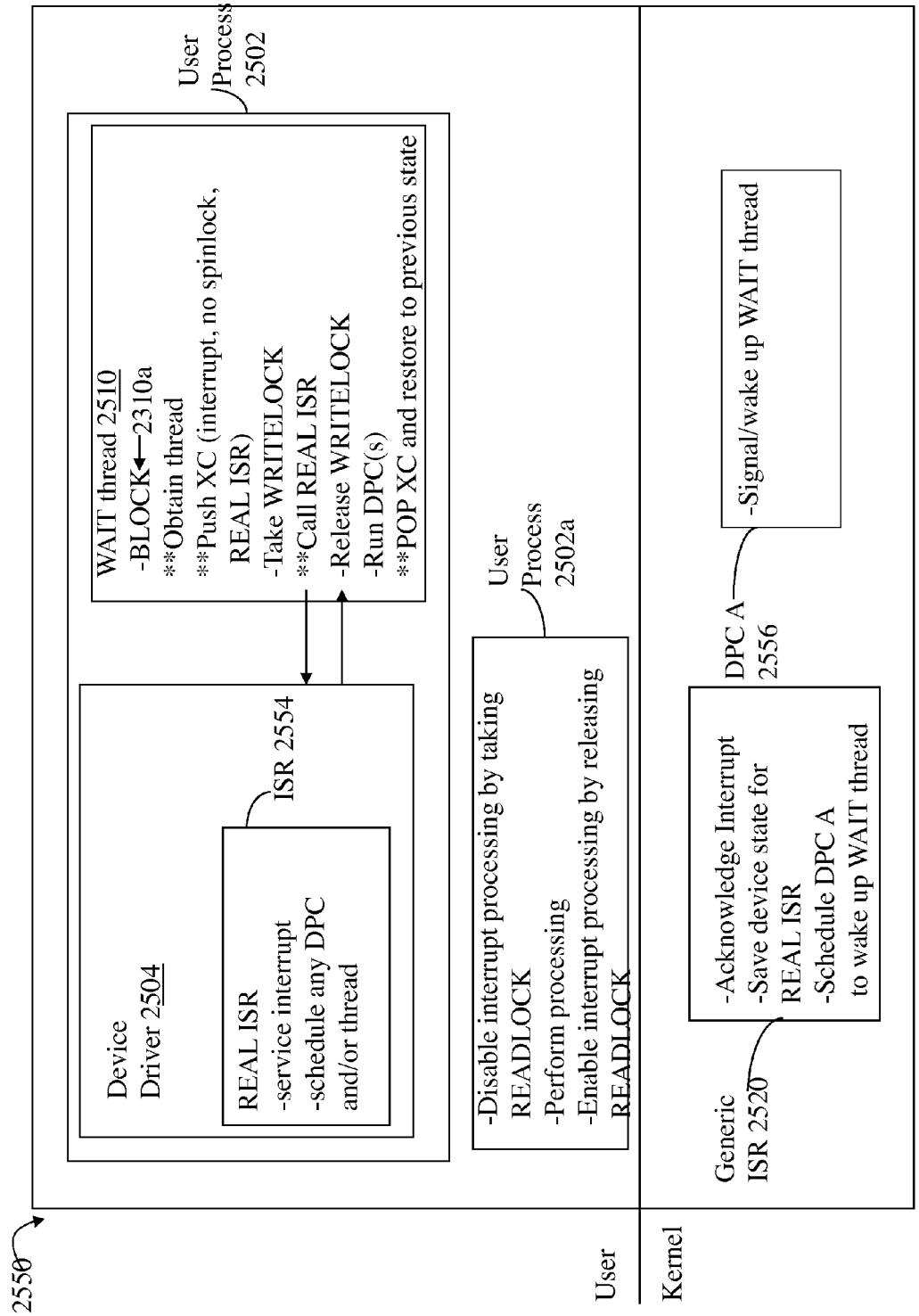

Referring to FIG. 37, shown is an example illustrating processing upon the occurrence of an interrupt for the user mode device driver attached in FIG. 36. As a first step, the generic ISR 2520 is invoked. The generic ISR 2520 performs minimal processing needed so that the real ISR, ISR 2554, is able to service the request. The generic ISR performs processing to acknowledge the interrupt. This may include setting particular registers on the device. The generic ISR may also save the device state information regarding the interrupt to be processed later by the real ISR, ISR 2554. As will be appreciated by those skilled in the art, such device state information may be needed by the ISR 2554 in servicing the interrupt. The device state information may include, for example, data in the device's hardware registers indicating a reason for the interrupt such as an error, successful completion of a previous request, device time out, and the like. The generic ISR 2520 then schedules or queues a DPC, denoted as DPC A 2556, to wake up the WAIT thread 2510. The generic ISR 2520 may also be written using API calls such as a DPC API call. At some point, the DPC A 2556 executes and signals or wakes up thread 2510. The signaling results in the wait thread 2510 being awakened and scheduled for execution by the processor. When the wait thread 2510 resumes execution, it resumes execution following 2310a, the point at which the wait thread's state was previously blocked. The wait thread 2510 performs processing to invoke the real ISR, ISR 2554, which services the interrupt. The steps performed by the wait thread 2510 which are also described in connection with element 2654 of FIG. 35 are denoted with a "". The wait thread 2510 obtains a thread object having associated information that is modified to carry out execution of the REAL ISR 2554. The thread's execution context is modified to indicate an interrupt execution level with no spin locks held (=false). The thread information identifying the location of code to be executed is modified to identify the REAL ISR 2554. The wait thread 2510 uses a WRITELOCK synchronization operation. The WRITELOCK operation may be an API call which results in invoking the appropriate operating system primitives to implement a reader/writer lock. A reader/writer lock may have processes accessing the lock for read access or write access. Only a single process is allowed to access the lock for write providing exclusive access to the lock by the writer and not allowing any readers or other writers to access the lock. One or more processes may access the lock for read access when the lock is not already accessed for writing. A process cannot access the lock for write while there are any readers accessing the lock. A reader/writer lock may be a lock used to emulate enabling and disabling interrupts. When there are no readers accessing the lock, interrupts are enabled. When an interrupt occurs, other interrupts are disabled. When there are one or more readers accessing the lock, interrupts are disabled and the ISR 2554 is not allowed to execute. Thus, the wait thread 2510 does not invoke the ISR 2554 until the WRITELOCK is available. Once the WRITELOCK is obtained, the real ISR code included in ISR 2554 is invoked. The real ISR is the code that actually services the interrupt and then queues DPCs to complete the interrupt service processing, and/or otherwise has the DPC schedule threads to complete the processing. The ISR 2554** may invoke an API call to perform the DPC operation.

The reader/writer lock may be logically implemented using a reader counter and a writer counter. A reader is able to access the lock if the writer counter is 0. A writer is able to access the lock if the reader counter and writer counter are both 0. Each operation to "take" a READLOCK increases the reader counter by 1 if there are no writers and otherwise waits until there are no writers. Each operation to "release" a READLOCK decreases the reader counter by 1. Each operation to "take" a WRITELOCK increases the writer counter by 1 if there are no readers and otherwise waits until there are no readers. Each operation to "release" a WRITELOCK decreases the writer counter by 1. The wait thread 2510 may make API calls for the operations to take a WRITELOCK and release a WRITELOCK. Other threads of the user process 2502 may make API calls for the operations to "disable interrupt processing" and "enable interrupt processing". In implementing the "disable interrupt processing" for code executing in user mode, the API may take a READLOCK by using a reader/writer lock or other operating system primitive. In implementing the "enable interrupt processing" for code executing in user mode, the API may release a READLOCK by releasing the native reader/writer lock or other operating system primitive. The API may perform the processing needed to utilize the underlying operating system primitives. In one embodiment, the API may include calls to "disable interrupt processing" and "enable interrupt processing". Each of these may be published APIs for use by code modules. Within the API, there may be unpublished routines which implement the READLOCK and WRITELOCK operations. As such, a code module may include a first published API call to "disable interrupt processing" or "enable interrupt processing". The published API call may result in other unpublished API calls for taking or releasing a READLOCK as appropriate. Each of these unpublished API calls may utilize the underlying operating system primitives, such as a reader/writer lock or other primitive, that may vary with the underlying operating system. The wait thread 2510 in this example may utilize other unpublished APIs for taking and releasing a WRITELOCK. Each of these unpublished API calls may also utilize the underlying operating system primitives, such as a reader/writer lock or other primitive, that may vary with the underlying operating system. The foregoing describes the behavior with respect to the API for user mode code. If code module 2502, for example, is executed in kernel mode, the code module may include the same published API calls to "enable interrupt processing" and "disable interrupt processing". However the forgoing published API calls when made from code executing in the kernel mode may directly invoke the operating system or hardware primitives to directly manage enabling/disabling the interrupt state.

In one embodiment herein, the ISR 2554 in user mode runs at a real-time priority level so that it is not pre-empted and is scheduled to execute prior to other user space code so that the ISR 2554 executes with a priority substantially the same as the ISR which runs in kernel mode and the generic ISR 2520. For the user space code in FIG. 37, the ISR 2554 may have a higher priority than the emulated DPC call for user mode, and the emulated DPC may have a higher priority than other user processes and threads executing in user mode. In user mode, the API may implement the DPC functionality by scheduling a user mode thread for execution having a priority substantially the same as a DPC included in an operating system for kernel mode execution.

Once the real ISR code of ISR 2554 completes, control is returned to the wait thread 2510 which then issues an API call to run queued DPCs. The API call to run the DPCs in user mode causes execution of those DPCs associated with the same processor on which the wait thread 2510 is currently executing. The step of the wait thread 2510 to run the DPCs causes the processor to execute the DPCs of the processor on which the wait thread is executing prior to other DPCs or other code having the same priority. The foregoing step of the wait thread 2510 to run the DPCs may be optionally performed in an embodiment. As a last step, the wait thread 2510 restores the execution context (denoted as POP XC).

It should be noted that for the user space emulated DPC operation, whenever user space code performs a DPC call, this results in the API scheduling a DPC user-mode thread for execution on the same CPU as the requesting thread or code module. In other words, the emulated DPC operation queues a DPC thread for execution on the same CPU as the thread making the DPC call. The foregoing is made with reference to an embodiment in which there are multiple storage system processors so that the emulated DPC operation in user mode may result in scheduling a DPC user-mode thread with a relative priority as indicated above on any one of the data storage system processors. However, in one embodiment, the DPC thread is scheduled for execution on the same processor as that of the requestor or thread performing the DPC call.

It should be noted that the reader/writer lock is used to ensure that the ISR 2554 and other code that may share the same data structures as the ISR 2554 do not execute at the same time. In other words, the ISR 2554 needs exclusive access to data structures used in connection with performing I/O operations for the device. For example, one of the data structures may be a buffer used to store data in connection with performing the I/O request for the device. Other threads may also be executing which utilize the same data structures. One or more of these other threads may be able to simultaneously access the data structures. The reader/writer lock may be used to implement the state of interrupt disable/enable in accordance with kernel semantics. To further illustrate, user process 2502a may include code which accesses the same data structures as ISR 2554. Prior to performing processing using these data structures, the process 2502a may take a READLOCK to disable interrupt processing. If the wait thread 2510 tries to take the WRITELOCK while 2502a has a READLOCK, wait thread 2510 will have to wait until 2502a issues a release READLOCK indicating that there are no more readers.

It should be noted in the foregoing that each code portion in user mode and kernel mode may utilize APIs to implement the functionality described. The API may perform the necessary processing to implement the requested operation by invoking the helper modules as necessary and utilizing underlying primitives of the operating system.

Figure 38:
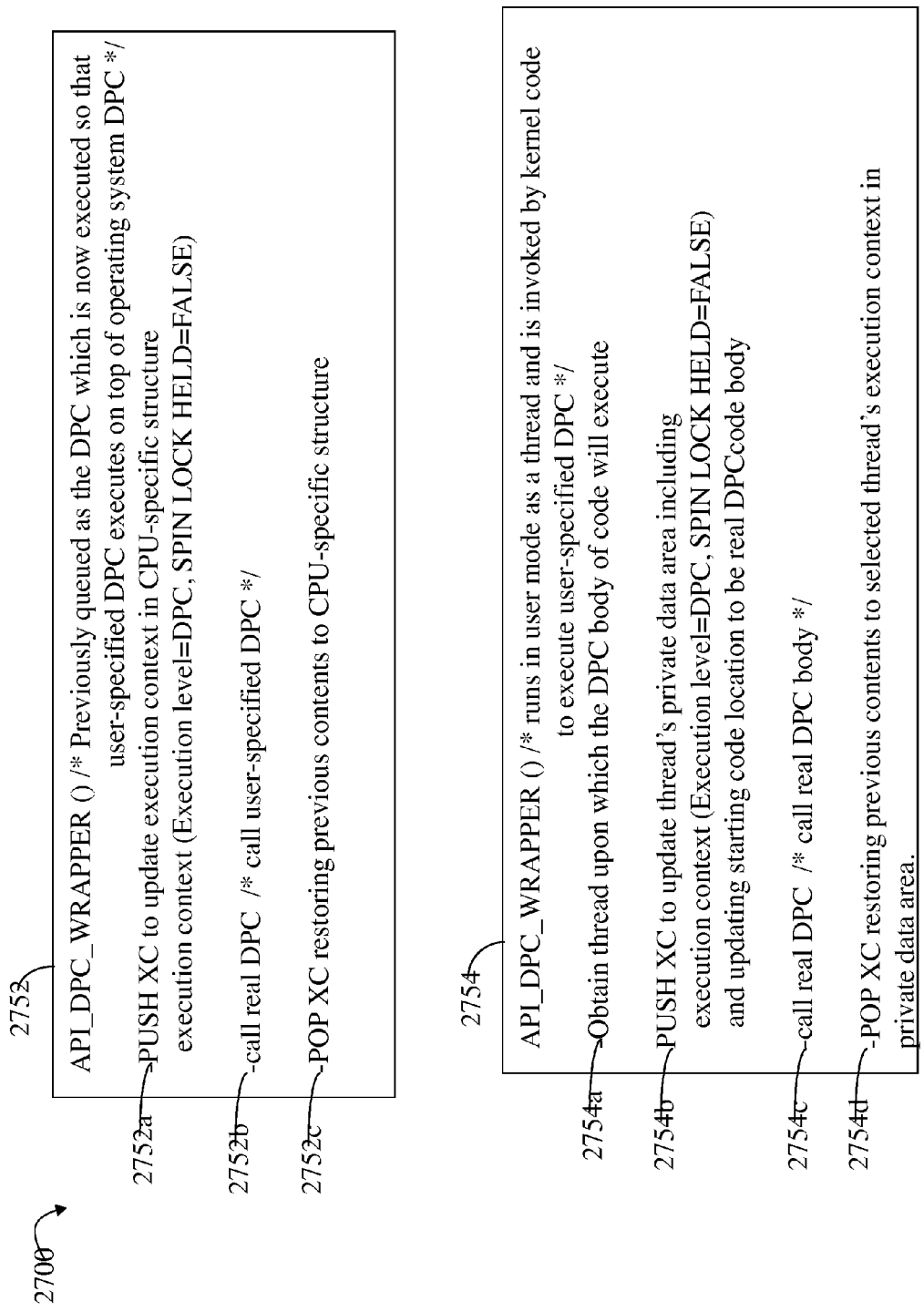
FIG. 38 is an example of logical steps that may be performed by code of the API in connection with execution of a code entity having a DPC execution level in user mode and kernel mode.

Referring to FIG. 38, shown is an example illustrating steps that may be performed using an API routine to execute a user-specified DPC code body. Element 2752 may be used in connection with a user-defined DPC body of code when executed in kernel mode. In other words, 2752 represents the logical steps that may be performed in an embodiment in connection with implementing a DPC developer code entity executed in kernel mode. Element 2754 may be used in connection with a user-defined DPC body of code when executed in user mode. In other words, 2754 represents the logical steps that may be performed in an embodiment in connection with implementing a DPC developer code entity executed in user mode. In the example 2750, the user-defined DPC code body is denoted as "real DPC". The API API_DPC_WRAPPER performs steps before and after invoking the real DPC.

Element 2752 includes a first version of API code for API_DPC_WRAPPER which may have been previously queued as the DPC which is now being invoked so that the user-specified DPC code body can run. In step 2752a, the execution context of the CPU-specific structure 2470 of FIG. 34A may be updated to identify an execution context with an DPC execution level and a spin lock held indicator set to false. In step 2752b, the real DPC may be invoked. Upon completion of the real DPC, control returns to 2752 and processing continues with step 2752c. In step 2752c, the previous contents of the CPU-specific structure overwritten in step 2752a may be restored.

Element 2754 includes a second version of API code for API_DPC_WRAPPER which may be invoked to execute the user-specified DPC code body. In connection with the techniques herein, the code of 2754 may execute as a thread in user mode and be invoked by other code executing in user mode. The other code executing in user mode may be scheduled as a DPC and executed at a later point. During execution, the other code may signal the user mode thread 2754 causing the real DPC to be executed. In step 2754a, a thread is obtained that will be used to carry or execute the real DPC body of code. An embodiment may select a thread in step 2754a using any one of a variety of different techniques as described elsewhere herein in connection with step 2654a of FIG. 35B. In step 2754b, information associated with the thread object selected from step 2754a is modified so that the execution context of the thread's private data area indicates a DPC execution level with a spin lock held indicator of false. Prior to modifying the thread's information in step 2754b, the current thread information may be saved and then later restored in a fashion similar to that as described above in connection steps 2604 and 2608 of FIG. 35A In step 2754c, the real DPC is called. Control then returns to API code 2754 where step 2754d is performed to restore the thread information previously overwritten in step 2754b. Step 2754d may include restoring the execution context in the thread's private data area, and any other information modified as a result of step 2754b. It should be noted that other information associated with the selected thread from step 2754a may be modified than as described herein as needed to call the real DPC code in step 2754c.

In connection with both 2752 and 2754, as well as in other API code described herein, an embodiment may perform other processing to examine the execution context at appropriate points in time and determine whether the execution context has a proper or expected state. For example, after performing 2752c and 2754d, an embodiment may perform a sanity check regarding the state of the previously restored execution context. An embodiment may, for example, check to see whether the spin lock held indicator is zero.

Figure 39:
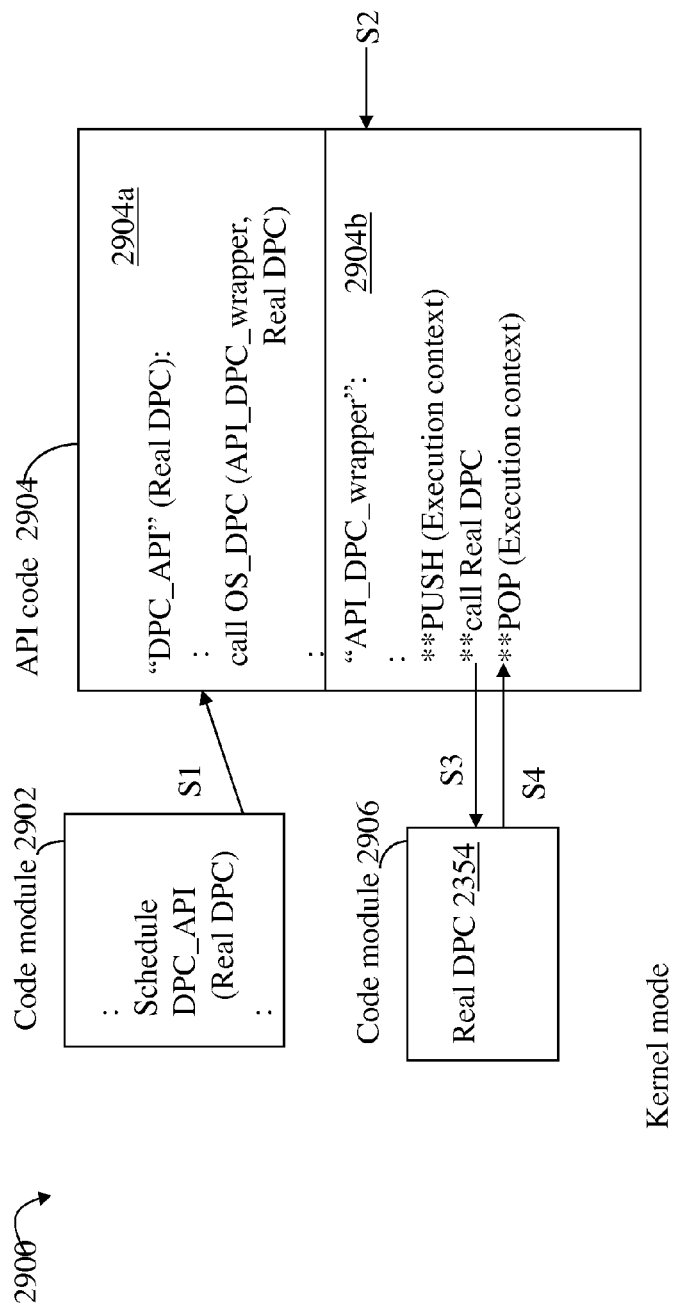
FIG. 39 is an example illustrating execution of code having a DPC execution level in kernel mode.

Referring to FIG. 39, shown is an example illustrating implementation of a DPC developer code entity executed in kernel mode. The example 2900 includes code modules 2902 and 2906 and API code 2904. The first code module 2902 performs an API call, DPC_API, to schedule a DPC, "Real DPC" 2354, having code included in module 2906. The call DPC_API from 2902 into the API portion 2904a is illustrated by S1. API code 2904a performs an operating system call to queue API_DPC_wrapper as a native or operating system DPC for execution. Element 2904b is the code portion for API_DPC_wrapper and includes the logic of 2752 (denoted by **) from FIG. 38. At some later point in time, API_DPC_wrapper executes, saves the current CPU execution context and replaces with the execution context for the DPC execution level (denoted as PUSH operation), calls the REAL DPC (S3) and then returns (S4) where the execution context is restored (denoted as POP operation).

Figure 40:
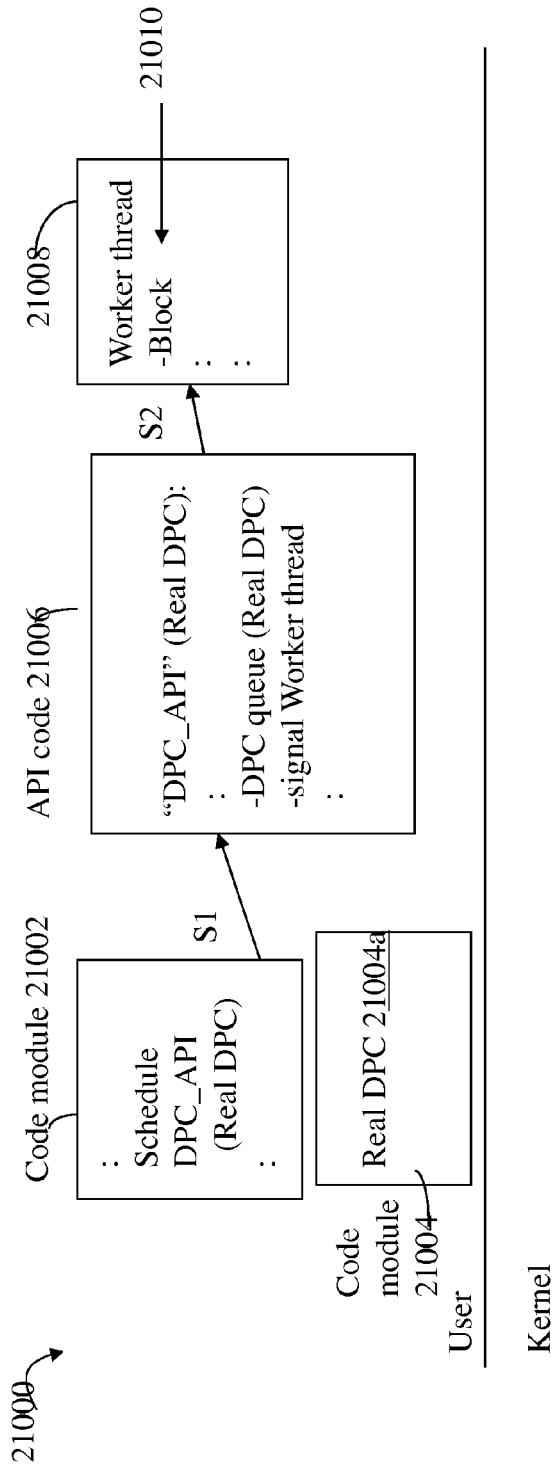
FIGS. 40-41 are an example illustrating execution of code having a DPC execution level in user mode.
Figure 41:
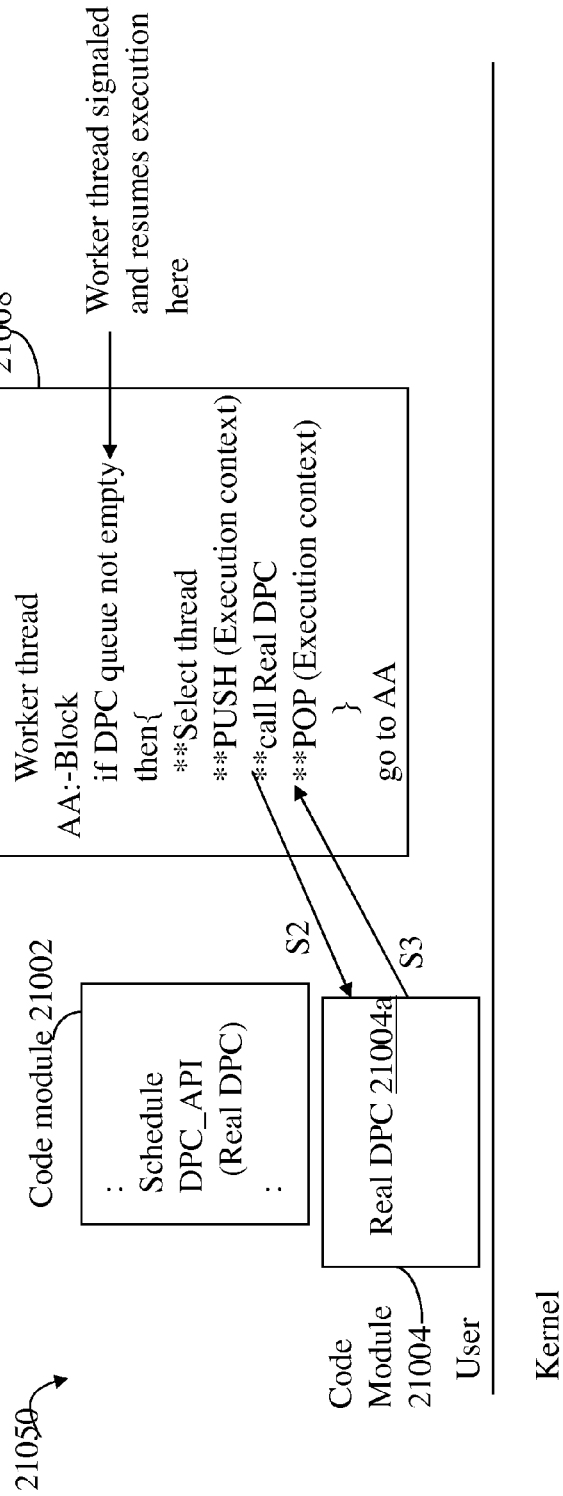

Referring to FIGS. 40 and 41, shown is an example illustrating implementation of a DPC developer code entity executed in user mode. The example 21000 includes code modules 21002 and 21006, API code 21004 and worker thread 21008. The first code module 21002 performs an API call, DPC_API, to schedule a DPC, "Real DPC" 1004a, having code included in module 21004. The call DPC_API from 21002 into the API is illustrated by S1. API code 21006 queues the Real DPC on a queue. The queue may be implemented as a user mode data structure including entries for the different scheduled user mode developer DPC code entities to be executed. Each entry may include information identifying the location of the Real DPC code in the module 21004. The code of 21006 may then signal (S2) a worker thread 21008 for execution. The worker thread 21008 may include code which remains in the blocked state 21010 until signaled by the API code 21006 for the DPC_API.

FIG. 41 illustrates execution flow once the worker thread 21008 is signaled and resumes execution. If DPC queue is not empty, then the worker thread 21008 selects a thread for use in connection with executing the Real DPC as described above. The selected thread may be the worker thread itself or another thread whose execution context storage location is borrowed in connection with storing the execution context for the Real DPC. In an embodiment where the selected thread is the worker thread 21008 itself, the worker thread 21008 performs processing inline to save the selected thread's execution context and replaces it with the execution context for the DPC (denoted PUSH). The worker thread calls the Real DPC (S2) which executes using the DPC execution context and then returns to the worker thread which restores the selected thread's previous execution context (denoted POP). The worker thread then goes to sleep or blocks until signaled again to process any queued DPCs. It should be noted that the worker thread 21008 may process one or more queued DPCs. The logical steps performed by the worker thread 21008 as previously described in connection with 2754 of FIG. 38 are denoted by "**". The worker thread 21008 and the code of the Real DPC 21004a may be executed with a relative priority level higher that of code having a thread execution level but less than the execution priority of code having an interrupt execution level.

In an embodiment in which the selected thread (denoted select thread) is not the worker thread 21008 itself but is rather another thread, the selected thread may perform the steps denoted in FIG. 41 as: Select thread, PUSH (Execution context), call Real DPC, and POP (Execution context).

Figure 42:
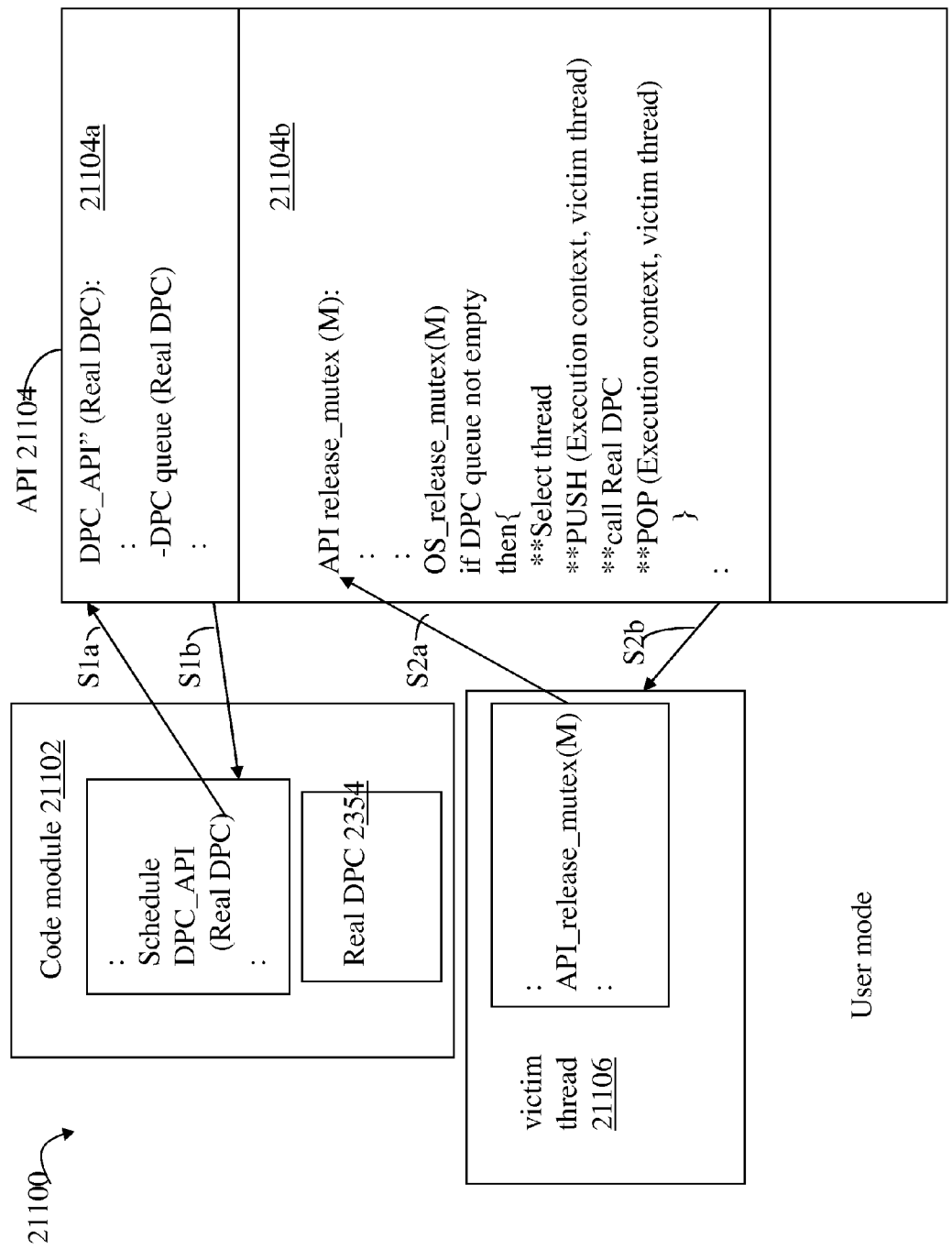
FIG. 42 is an example illustrating a technique that may be used in connection with selection of a thread and execution of code having a DPC execution level in user mode.

Referring to FIG. 42, shown is an example illustrating another technique that may be used in connection with implementation of user mode DPCs. The example 21100 illustrates another technique used to select a thread used to carry out the execution of the Real DPC. As described herein, in order to execute the Real DPC, the storage area of the selected thread's is borrowed by replacing the selected thread's execution context with the execution context for the Real DPC (e.g., execution level=DPC, spin lock held=NO). The example 21100 includes code module 21102, API 21104, and victim thread 21106. S1*a* illustrates the call from module 21102 to the API code 21104*a* to schedule the Real DPC. The code 21104*a* queues the Real DPC to the user mode DPC queue structure as described previously in connection with FIG. 40, and then returns to the user code. At some later point in time, another code module, such as victim thread 21106, may perform another API call for any one of a variety of different operations. This example illustrates 21106 as performing an API call, API_release_mutex, to release the mutex lock M. However, an embodiment may utilize the techniques herein with any one or more other API calls. The foregoing API call by 21106 transfers control to code 21104*b* of the API which executes a native operating system call, OS_release_mutex, to release the mutex lock M. After the mutex lock is released, the code of 21104*b* determines whether the DPC queue is empty. If not, processing is performed to call the Real DPC as described previously in connection with 2754 of FIG. 38, (denoted **). In this example, the thread selected is the victim thread itself and the victim thread's own execution context may be modified as described above to facilitate execution of the Real DPC prior to returning (S2*b*) to the victim thread 21106.

As will be described in following paragraphs, the API may be used to facilitate inter-module communication between two code modules executing in user mode (U-U communication), or between a first code module that executes in user mode and a second code module that executes in kernel mode (U-K and K-U communication). In following paragraphs, a first code module initiates a transaction or a command request and invokes a second code module. The first code module may also be referred to as a client and the second code module may be referred to as the server. In accordance with the techniques herein, U-U communications may be utilized when both client and server are user mode processes, U-K communications may be utilized when the client executes in user mode and the server executes in kernel mode, and K-U communications may be utilized when the client executes in kernel mode and the server executes in user mode.

It should be noted that in connection with K-K communications, both client and server execute in kernel mode and communications between such code modules may utilize local procedure calls available for communication within the same kernel container or same kernel address space and are not described herein.

In accordance with the techniques described herein, a same code module may be executed using a communications model and facility embodied in the API in both user space and kernel space meaning that the same set of operations are available in user space and kernel space. The inter-module communication may be performed by making calls into the API using a defined interface providing code portability across user and kernel mode in all supported environments.

Figure 43:
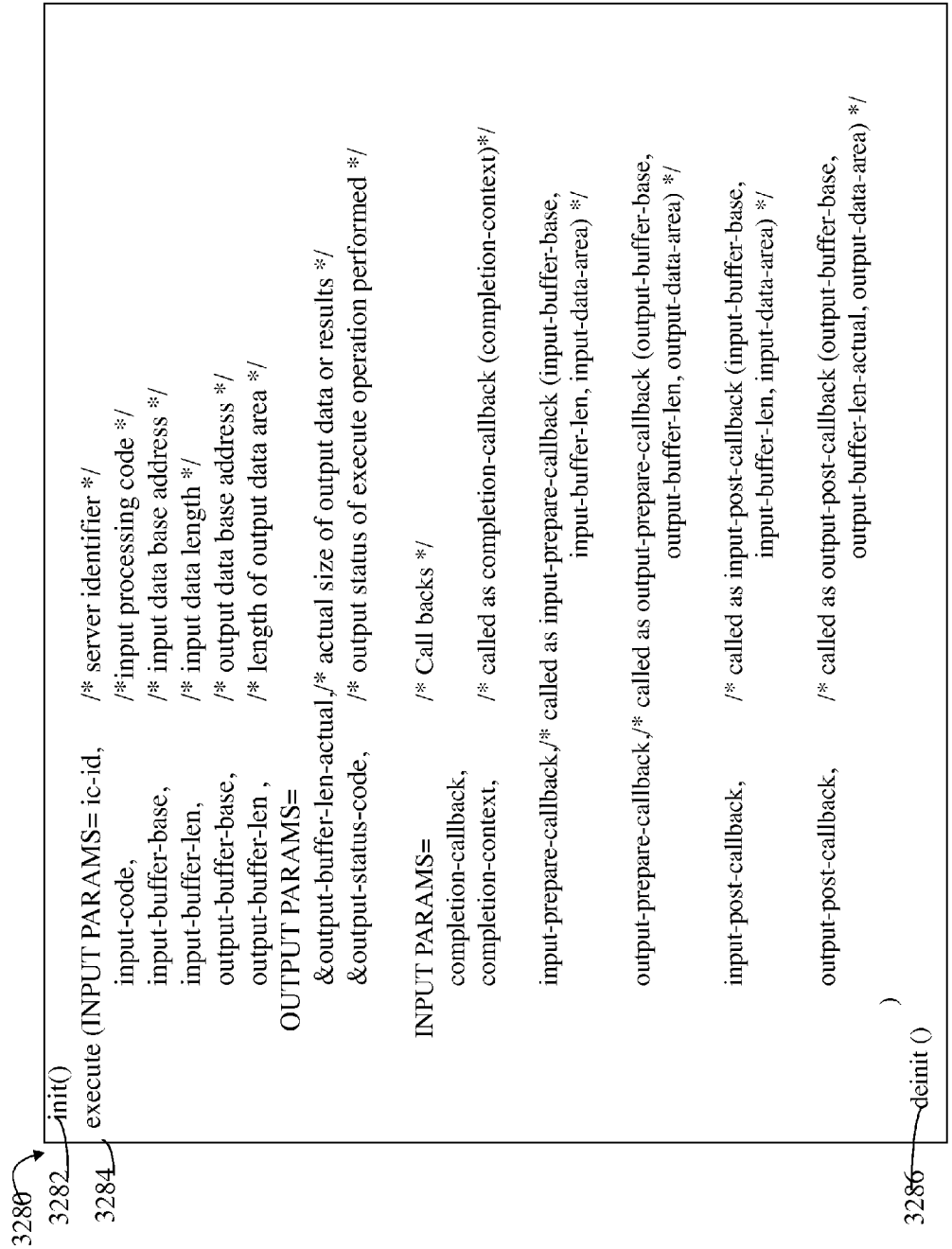
FIG. 43 is an example illustrating a client-side API for use in connection with the techniques herein.

Referring to FIG. 43, shown is an example of a client-side API that may be used in connection with communication between modules when the client is code that executes in user space or kernel space. The API of 3280 may be used by a client in connection with issuing a command request to a server. The server may perform processing associated with the command request and transmit results back to the client. A server-side API is described in following paragraphs.

Element 3282 represents the init API which may perform initialization processing. Element 3284 represents the execute API which may be invoked to issue a command request for a transaction to a server. Parameters for the execute API 3284 may include:

ic_id—identifies the server instance to communicate with to perform the requested command;

input-code—specifies an input processing code and may be used to indicate a particular operation or command where the server may perform many different operations;

input-buffer-base—base or starting address of the input data area;

input-buffer-len—length of the input data area;

output-buffer-base—base or starting address of the output data area; and output-buffer-len—length of output data area.

Output parameters for the execute API 284 may include:

&output-buffer-len-actual—actual size of output data area including result of processing performed by server; and &output-status-code—output status of processing performed by server.

The output parameters as indicated in 3284 have values that may be determined by the server or by code on the client-side API if there are processing errors in connection with obtaining results from the server.

Additionally, one or more callbacks described in following paragraphs may be optionally specified as input parameters to the execute API. Each of the callbacks may represent an address in the client code to which control is transferred by other code of the API at various processing points. If a callback is not specified in the execute invocation, the API code may perform a default operation as will be described herein. With reference to element 3284, input-prepare-callback and output-prepare-callback are callbacks invoked by the API code prior to sending the command request to the server to perform an operation. Input-post-callback and output-post-callback are callbacks invoked by the API code when the client-side API code has received notification regarding completion of the command request from the server. The input-post-callback and output-post-callback may be invoked after output or results have been obtained from the server that performed the requested operation indicated by input-code. The completion callback is invoked by the API code after input-post-callback and output-post-callback have been invoked. The callbacks and their usage is described in more detail herein.

Callbacks as used herein may be characterized as developer or user-supplied routines which are invoked at particular points in time by other code, such as code of the API. The callbacks may provide the developer with an opportunity to perform optional processing in connection with the techniques herein for intermodule communication or communication between different code execution containers as also described herein.

The completion callback is designated as having an address of the completion-callback parameter. The parameter, completion-context, specifies a completion context. During runtime, the API code may invoke the completion callback as completion-callback (completion-context) passing the completion context as a parameter when performing the completion callback. As described in more detail below, specifying the completion callback causes the execute API call to be performed asynchronously so that the completion callback is invoked after the API code has finished processing the execute API call. If the completion callback is omitted, the execute call is performed synchronously and the invoking code waits inline until the execute API call completes and returns control to the point of the execute invocation.

The input-prepare-callback routine has an address indicated by the input-prepare-callback parameter. During runtime, the API code may invoke the input-prepare callback as input-prepare-callback (input-buffer-base, input-buffer-len, input-data-area). In one embodiment described in following paragraphs, the input-data area may indicate the address in shared memory where the input data is stored for this command instance.

The output-prepare-callback routine has an address indicated by the output-prepare-callback parameter. During runtime, the API code may invoke the output-prepare callback as output-prepare-callback (output-buffer-base, output-buffer-len, output-data-area). In one embodiment described in following paragraphs, the output-data area may indicate the address in shared memory where the output data is stored for this command instance.

The input-post-callback routine has an address indicated by the input-post-callback parameter. During runtime, the API code may invoke the input-post callback as input-post-callback (input-buffer-base, input-buffer-len, input-data-area). The parameters input-buffer-base and input-buffer-len are as specified on the execute invocation. The parameter input-data area is the address of the input data area that includes the input data sent to the server.

The output-post-callback has an address indicated by the output-post-callback parameter. During runtime, the API code may invoke the output-post callback output-post-callback (output-buffer-base, output-buffer-len-actual, output-data-area). The parameter output-buffer-base is as specified on the execute invocation. The output-buffer-len actual specifies the actual length of the output data as set by the server. The parameter output-data area is the address of the output data area that includes the output data returned by the server.

Element 3286 may represent the deinit API invoked at the end of processing on the client-side and may perform processing such as, for example, releasing resources used to maintain information in tracking commands and other cleanup processing.

Figure 44:
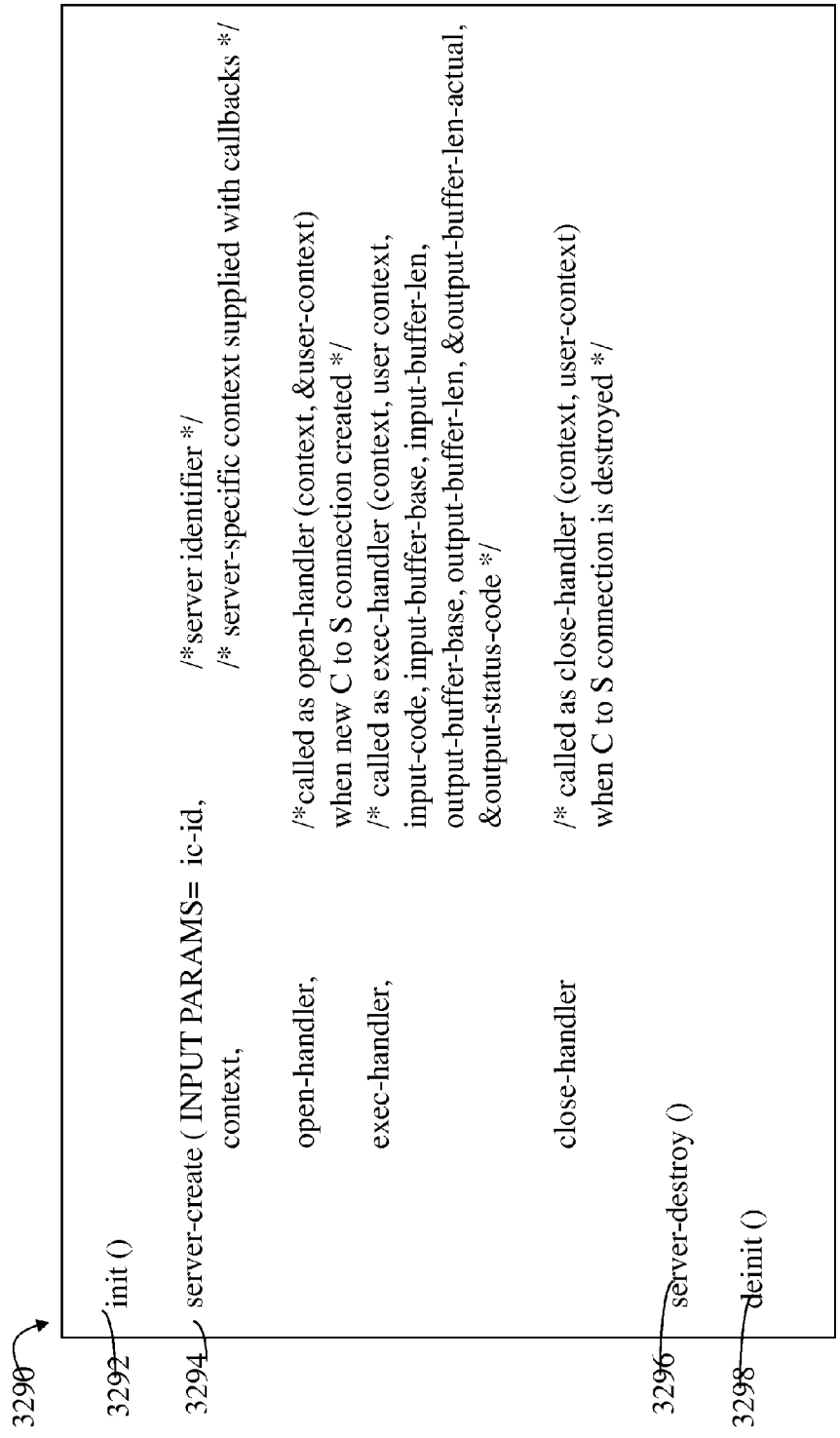
FIG. 44 is an example illustrating a server-side API for use in connection with the techniques herein.

Referring to FIG. 44, shown is an example of a server-side API that may be used in connection with communication between modules when the server is code that executes in user space or kernel space. The server-side API 3290 may include the following: init 3292 which performs initialization processing, server-create 3294 invoked to establish a communication end point to which clients can connect and to define callbacks invoked during processing, server-destroy 3296 invoked to destroy and close the connection created between any clients and the server, and deinit 3298 to perform any de-initialization processing.

Input parameters of the server-create API may include:
ic-id—identifier of server to advertise or expose to clients; and
context—indicating the client-server connection identifier. Unique for each server instance.

The open-handler, exec-handler and close-handler callbacks may be optionally specified as input parameters with a server-create invocation as indicated by 3294. The open-handler callback may be invoked as open-handler (context, &user-context) when a new client to server connection is created for communication using the techniques herein. The user context may be a user-supplied value for use by the callbacks or other developer code. The user context may indicate context or information about the client-server relationship and is unique for each client-server connection or each particular client-server pair. The user context may be filled in, for example, by the open handler API and used, for example, by the exec handler and close handler to identify user data specific to each client-server pair. As will be appreciated by those skilled in the art, there may be multiple command requests in progress (e.g., as a result of multiple client-side execute requests), at a point in time. The user context, as well as in conjunction with the context parameter, may be used to identify commands associated with a particular client-server communication connection and to determine what commands have not completed in the event of a client failure.

The exec-handler callback may be invoked in response to a single command request received from the client directed to the server having the associated "ic-id". The exec-handler may be invoked as exec-handler (context, user context, input-code, input-buffer-base, input-buffer-len, output-buffer-base, output-buffer-len, &output-buffer-len-actual, &output-status-code. The exec-handler may include code to perform processing in accordance with a command request originating from a client's API execute invocation. The exec-handler may be invoked after the client-side input-prepare and output prepare callbacks. The exec-handler may read input from the location specified by input-buffer-base having a length of input-buffer-len and may store results in the location specified by output-buffer-base. The exec-handler may determine value for output-buffer-len-actual in accordance with the results so that output-buffer-len-actual indicates the actual length of the output as stored at output-buffer-base by the exec-handler. Additionally, the exec-handler may specify an output-status code indicating the results of its processing. As an example, the output-status code may indicate any one of a variety of values such as success, warning, invalid command request operation specified by input-code, and the like.

The close-handler may be invoked when the communication connection between the client and server as indicated by context is terminated or destroyed. This API may be invoked as close-handler (context, user-context).

Figure 45A:
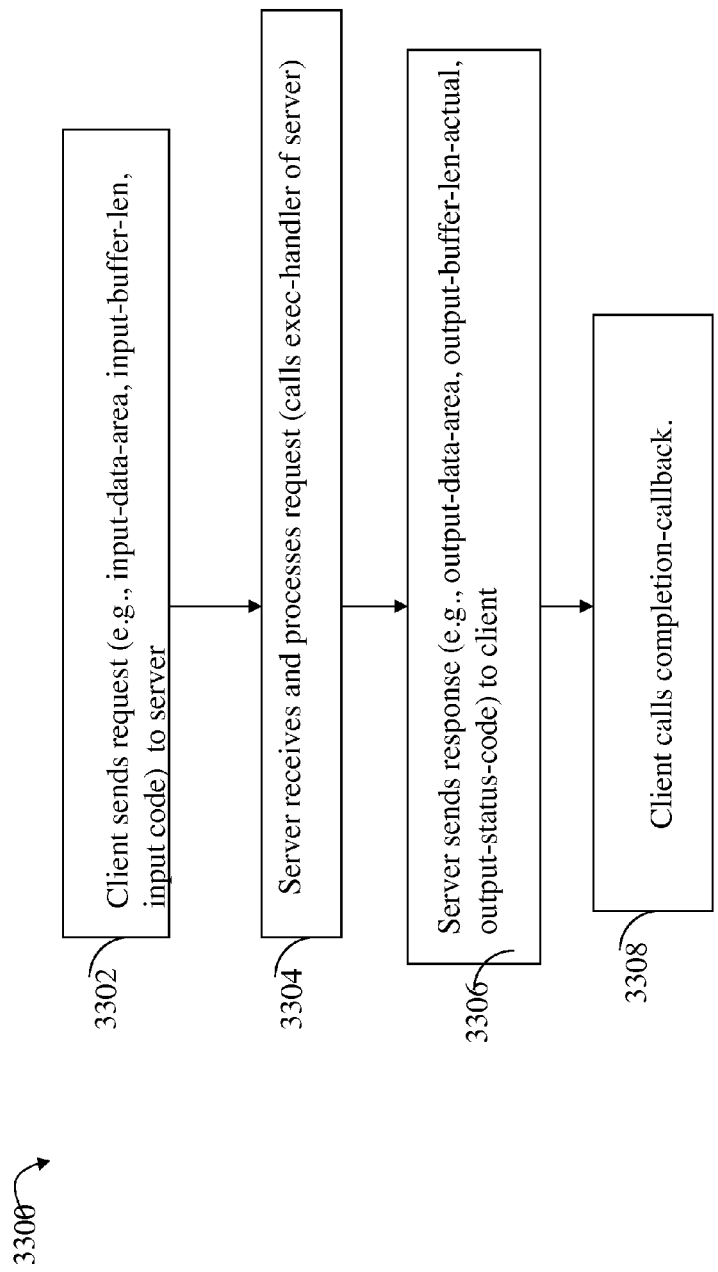
FIG. 45A is a flowchart illustrating a general message flow between client and server in connection with the techniques herein in an embodiment.

Referring to FIG. 45A, shown is a flowchart of processing that may be performed in an embodiment in connection with the techniques herein. The flowchart 3300 illustrates the general processing and message flow between the client and server in connection with the U-U, U-K and K-U communication cases. At step 3302, a client sends a request to the server. The request is in the form of a command as will be described herein and includes information in the input data area as well as values for the input-buffer-len and input code. The foregoing may be included in the command sent from the client to the server. At step 3304, the server receives and processes the request. To process the request, the server invokes the exec-handler of the server-create API. At step 3306, the server sends a response to the client. The response may include the processing results. The processing results may include information in the output data area as well as values for the output-buffer-len-actual and output-status-code. At step 3308, the client calls the completion-callback.

Figure 45B:
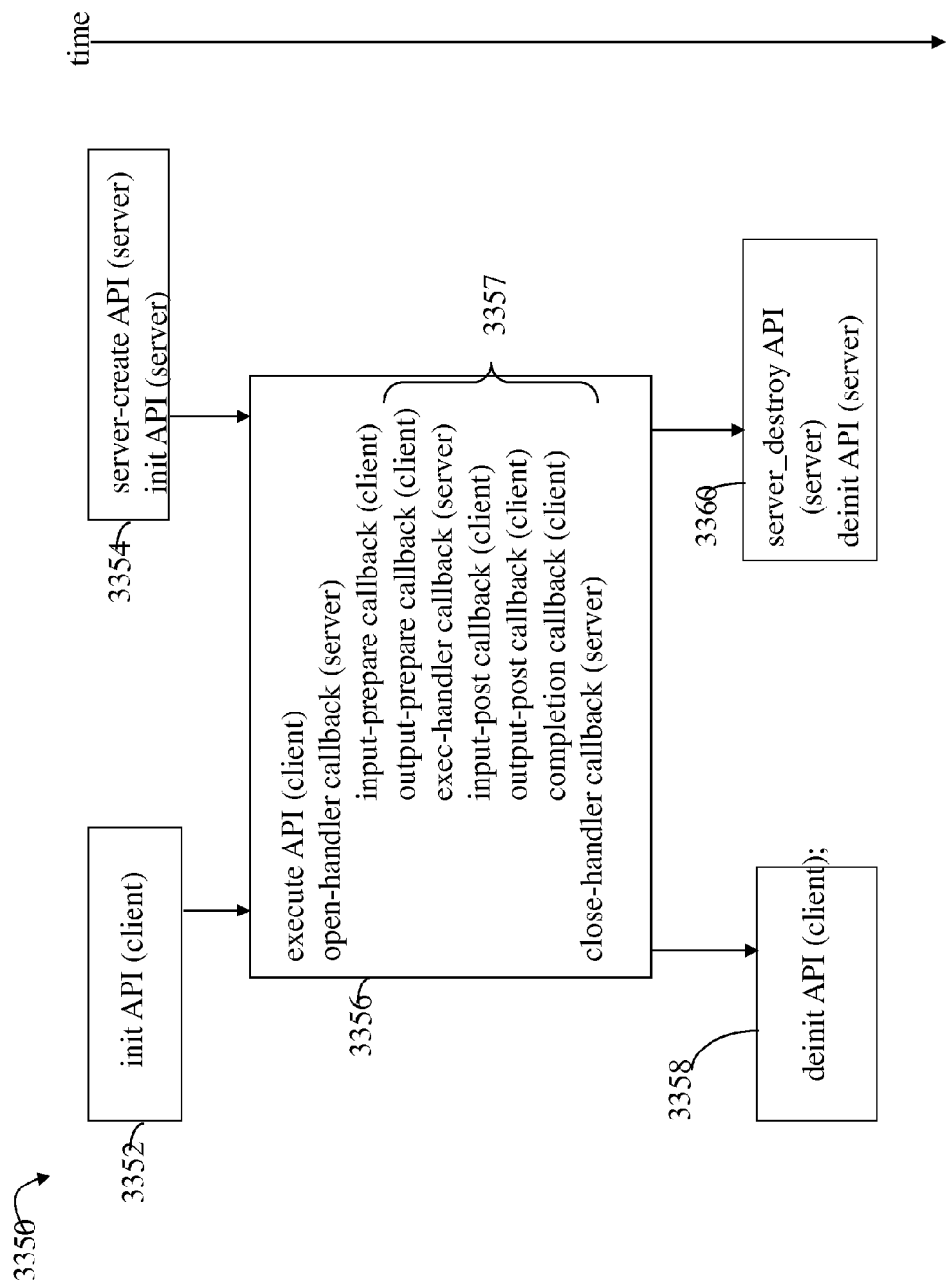
FIG. 45B is an example illustrating execution order dependencies in an embodiment using the techniques herein.

Referring to FIG. 45B, shown is a flow diagram illustrating in more detail the general flow between the client and server denoting order execution or runtime dependencies. In the example 3350, the steps of 3356 occur in the order indicated after processing of 3352 and 3354 have completed. Processing of 3358 and 3360 occur in order after processing of 356. Elements 3352 and 3354, respectively, indicate that the client init API, server init API, and server-create API (client) may be invoked prior to processing of element 3356. Element 3356 indicates the following order of invocation: open-handler callback (server), input-prepare callback (client), output-prepare callback (client), exec-handler callback (server), input-post callback (client), output-post callback (client), completion callback (client), followed by the close-handler callback (server). Element 3358 indicates that the deinit client API is invoked after processing of 3356. Element 3360 indicates that the server-destroy and deinit APIs of the server are invoked after processing of 3356.

It should be noted that element 3356 indicates processing that may be performed for a single execute API invocation made from the client. As will be appreciated by those skilled in the art, the client may perform more than one execute API call invocation so that each second and subsequent execute API invocation results in additional invocations of 3357.

In accordance with the techniques herein using the foregoing callbacks that may be specified with the client-side API, the user or developer code invoking the execute API may choose not to supply any valid data at the location input-buffer-base on invocation of the execute API. The input-prepare-callback may perform processing to obtain the actual input data and/or prepare and place the input data in a format to be processed by the server at the location specified by input-data-area. As another use of the techniques herein, the user or developer code invoking the API may supply data in one format at the address input-buffer-base on invocation of the execute API. Later on, the input-prepare-callback may be invoked to perform processing to obtain additional data and/or place the input data in a format to be processed by the server at the location specified by input-data-area. In either instance, the use of the input-prepare-callback provides the user or developer code with the opportunity to not have to specify the input data which will be processed by the server at the point of the execute API invocation. Similarly, the output-prepare-callback may perform processing prior to issuing the server command request to perform processing. The output-prepare-callback may, for example, perform processing to format or initialize the output-data-area (the location at which the server will place the command results) prior to sending the command request to the server for processing (e.g., prior to invoking the execute-handler server-side callback of the server-create API). The input-post-callback and output-post-callback provide the client-side user or developer code with the opportunity to process the results of the requested command. The results may be included in the output data area with corresponding values for output-buffer-len-actual and output-status-code in accordance with the processing results. The completion callback may be invoked after the input-post and output-post callbacks. The completion callback may also be invoked subsequent to incomplete or erroneous processing on the server-side (e.g., server side termination for U-U or K-U case).

In one embodiment, if the input-prepare client-side callback is omitted from the execute API invocation, API code may perform processing to copy an amount of data indicated by input-buffer-len from the location indicated by input-buffer-base to the location indicated by input-data-area. If the output-post client-side callback is omitted from the execute API invocation, API code may perform processing to copy an amount of data indicated by output-len-actual from the location indicated by output-data-area to the location indicated by output-buffer-base. If a completion callback is specified, the execute API invocation is performed asynchronously with respect to the developer or user code including the execute API invocation. In other words, if the completion callback is specified, the user code module thread including the execute API call continues executing while processing of the execute API proceeds. With asynchronous processing, at some point after the execute API invocation, the completion callback is invoked. If no completion callback is specified, a synchronous version of the execute API is indicated so that the user or developer code module calling the execute API waits inline for control to return from the execute API prior to proceeding.

Figure 46A:
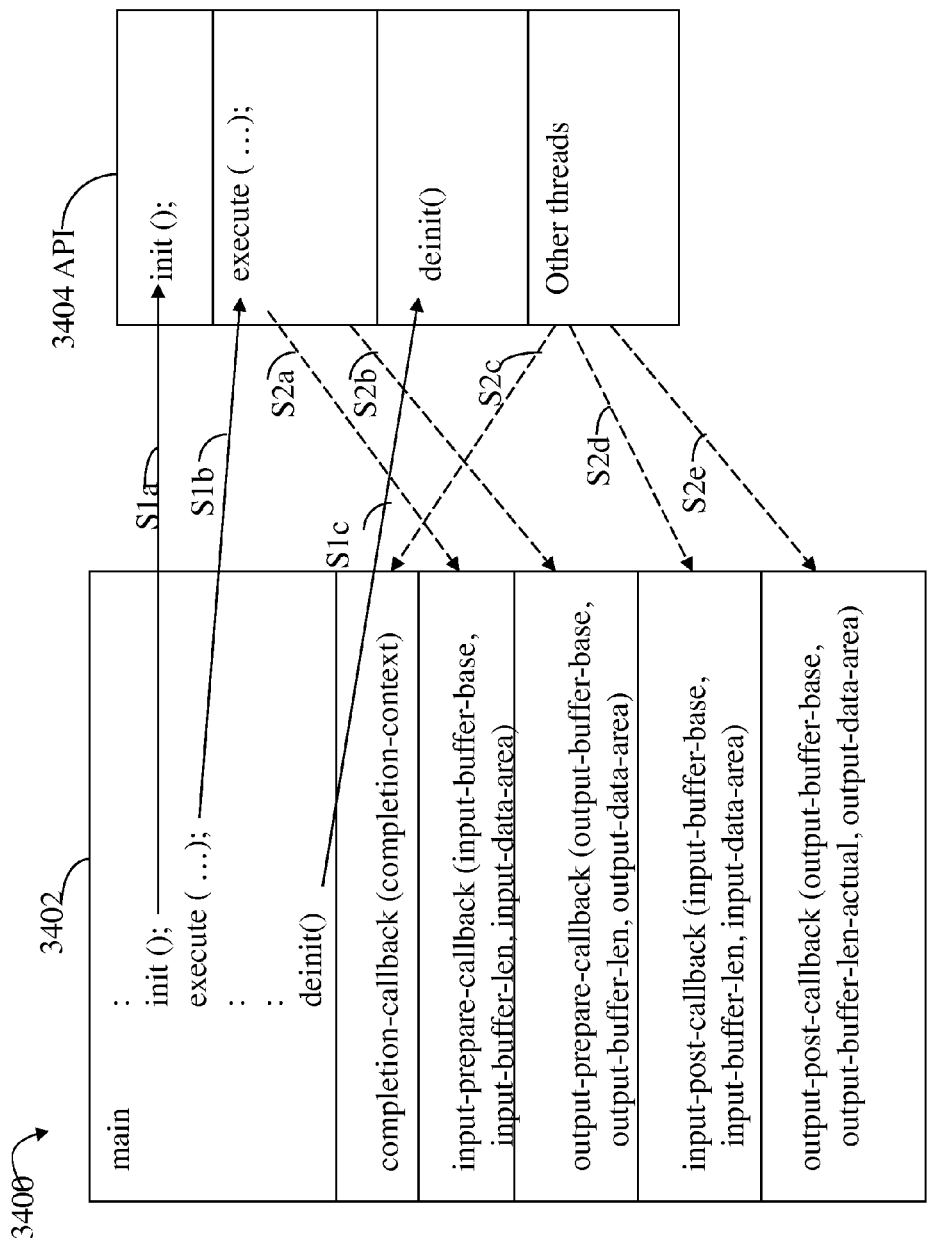
FIGS. 46A and 46B are examples illustrating interaction between developer code and code for an API (application programming interface) in an embodiment using the techniques herein.

Referring to FIG. 46A, shown is an example illustrating interactions between code of the API and a client module invoking the API in one embodiment using the techniques herein. The example 3400 includes a code module 3402 which makes calls into the API code 3404. Arrows S1a, S1b and S1c indicate points in the module 402 at which API calls are made and control is transferred to the API 3404. Dashed arrows S2a, S2b, S2c, S2d, and S2e are examples of points at which the API may transfer control to the code module 402 in connection with specified callbacks. It should be noted that, as indicated by S2c, S2d and S2e, the callbacks input-post, output-post and completion may be invoked from other threads as will be described in more detail in following paragraphs.

Figure 46B:
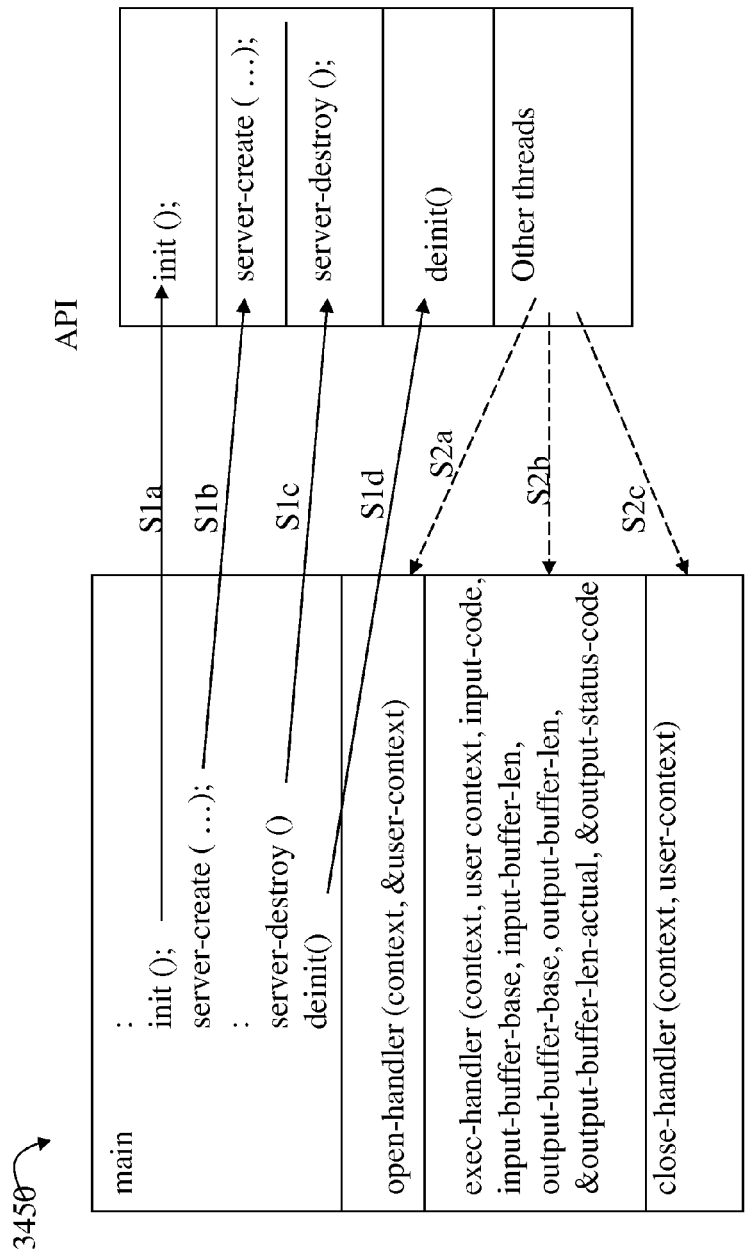

Referring to FIG. 46B, shown is an example illustrating interactions between code of the API and a server module invoking the API in one embodiment using the techniques herein. The example 3450 includes a code module 3452 which makes calls into the API code 3454. Arrows S1a, S1b, S1c and S1d indicate points in the module 3452 at which API calls are made and control is transferred to the API 3454. Dashed arrows S2a, S2b, and S2c are examples of points at which the API may transfer control to the code module 3452 in connection with specified callbacks. It should be noted that, as indicated by S2a, S2b and S2c, the callbacks may be invoked from other threads as will be described in more detail in following paragraphs.

What will now be described in more detail are the mechanisms that may be used in an embodiment in connection with performing U-U communications, U-K communications, and K-U communications. The U-U case will first be described.

In the U-U communication case, the API may implement the U-U module communication using shared memory (SHM), shared memory FIFOs (SHM FIFOs), and a pipe.

Figure 46C:
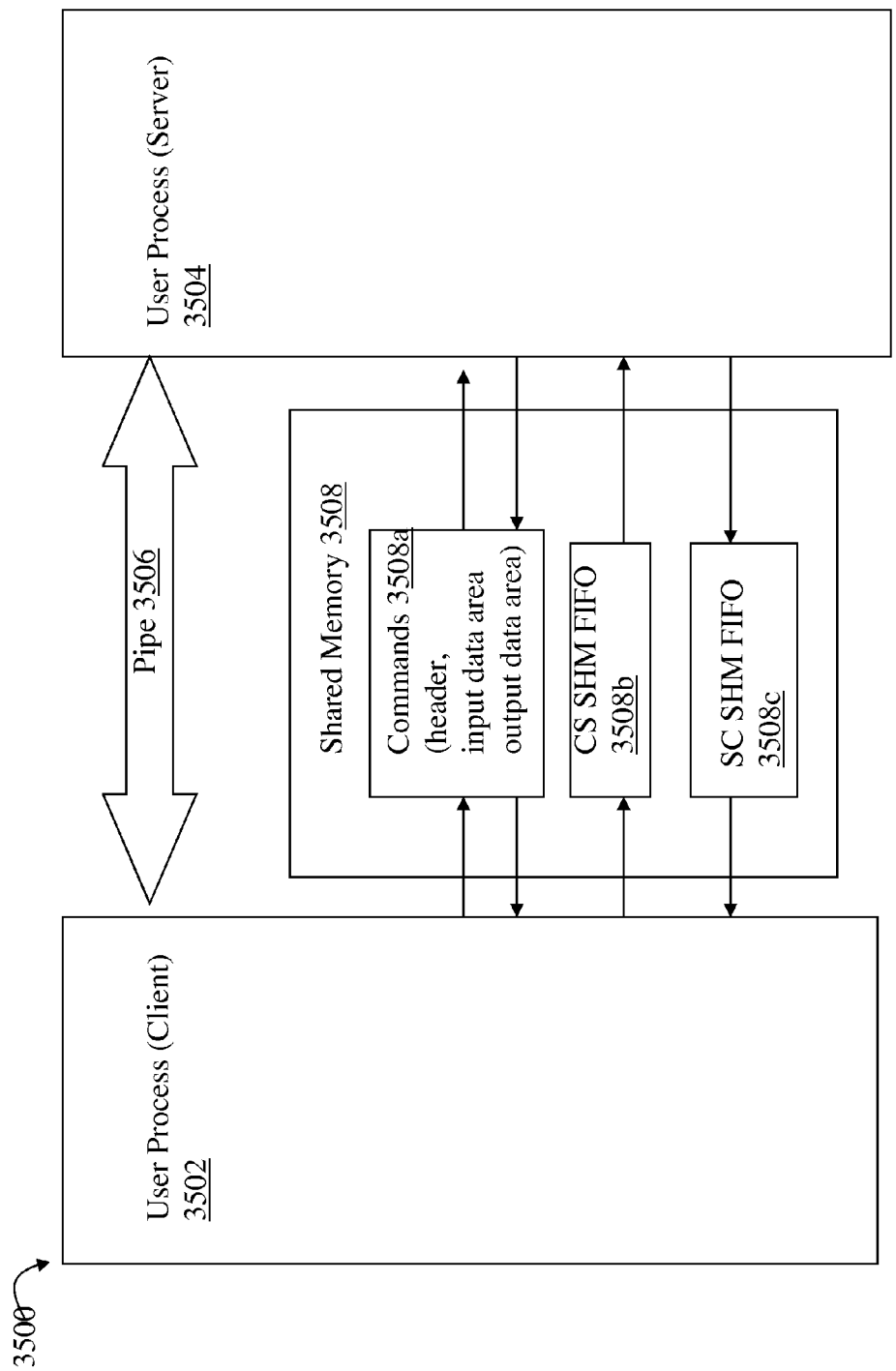
FIG. 46C is an example illustrating resources that may be used in connection with U-U (user space to user space) communications in an embodiment using the techniques herein.

Referring to FIG. 46C, shown is an example illustrating U-U communications in an embodiment using the techniques herein. The example 3500 includes a client user space process (user process) 3502, a server user-space process (user process) 3504, a pipe 3506, and shared memory 3508. The pipe 3506 may be implemented using operating system calls and functionality that may vary with embodiment. A pipe may generally be characterized as a logical connection between two endpoints that may be used for bidirectional communication. In one embodiment, a pipe may be created using a system call which returns a read and write file descriptor that may be used, respectively, to read from and write to the pipe. How a pipe is implemented may vary with the underlying operating system.

The shared memory 3508 may represent a portion of memory that is accessible to both 3502 and 3504. The shared memory 3508 may include a chunk or portion 3508a of one or more command slots holding one or more commands, and two shared memory FIFOs—CS SHM FIFO 3508b (used for sending information from the client to the server) and SC SHM FIFO 508*c* (used for sending information from the server to the client). Element 3508*a* may represent a portion of the shared memory including one or more command slots, each slot or entry may hold one command data block. Each command data block may include information for a single client request or command. As will be described below, each command may include a header, input data area, and output data area.

Each of SHM FIFOs 3508*b* and 3508*c* may be shared memory FIFOs which use shared memory to implement a first-in-first-out (FIFO) data structure. In connection with a first normal processing mode, the client 3502 may allocate a slot from 3508*a* and store the data for a command in the slot. The client 3502 may then communicate the offset or location in 3508*a* at which the command slot is located over 3508*b* to the server 3504. The server 3504 may receive the offset using 3508*b* and then retrieve the data from the location in 3508*a*. The server 3504 may perform processing in accordance with the command by retrieving data from the input data area and header, processing data from the input data area, and storing the results in the output data area and values in the header related to the processing results. The server 3504 may communicate the offset or location in 3508*a* at which the command slot is located over 3508*c* to the client 3502. The client 3502 may receive the offset sent over 3508*c* and then retrieve data from the location in 3508*a*. The data retrieved may include data from the output data area and other output parameter values stored in the header portion of the command slot. The shared memory 3508*a* may be used to reduce the amount of data copying when communicating between 3502 and 3504. With each of the FIFO structures 3508*b* and 3508*c*, a sender places one or more messages in the FIFO structure and the one or more messages are retrieved by the receiver in the same order in which they were placed in the structure by the sender. Using the input-prepare callback, an embodiment may have the client process gather and collect the input data and put it into the input data area of the command slot in 3508*a*. The API code of 3502 may also place information, such as input parameters, into the header portion of the command slot. The location of the command slot may be communicated from 3502 to 3504 using 3508*b*. Subsequently, the server 3504 may place the results in the output data area and communicate the location of the command slot including the output data area to the client 3502. The API code of the server 3504 may also update output parameter values that may be included in the header portion of the command. In one embodiment, the location of the command slot in 3508*a* may be indicated by a 4-byte message sent from a sender to a receiver.

For U-U communications in connection with techniques herein, the pipe 3506 may be used for termination detection occurring when the client or server terminates. If one of the client or server terminates, the other may receive notification by specifying a registered handler. Upon termination of the client or server user process, an error condition is generated and the registered handler of the other is invoked. The registered handler may then perform any desired processing, such as cleanup processing, as will be described in more detail.

As a variation to the foregoing, the pipe 3506 may be used in connection with a backup mode for processing commands between the client and server. The pipe 3506 may be used as an alternative to the shared memory 3508 (e.g., alternative to using 3508*a*, 3508*b*, and 3508*c*) for sending command data from 3502 to 3504 and from 3504 to 3502. The alternative backup mode may be used if there are problems in connection with utilizing shared memory. Such problems may include, for example, failure to allocate a command slot from 3508*a* because there are no available slots as may occur when there are too many commands in progress (e.g. outstanding commands being serviced by the server). In one embodiment, when the pipe is used as the backup command path, all data associated with the command (e.g., information from the header, input data area and output data area) may be sent from the client to the server, and also from the server to the client. An embodiment may also select to send only portions of the command data from the client to the server and server to the client. For example, an embodiment may select to send the contents of the output data area and header to the client from the server omitting the contents of the input data area.

What will now be described in more detail are processing steps that may be performed by the client-side in connection with the U-U communications.

Figure 47:
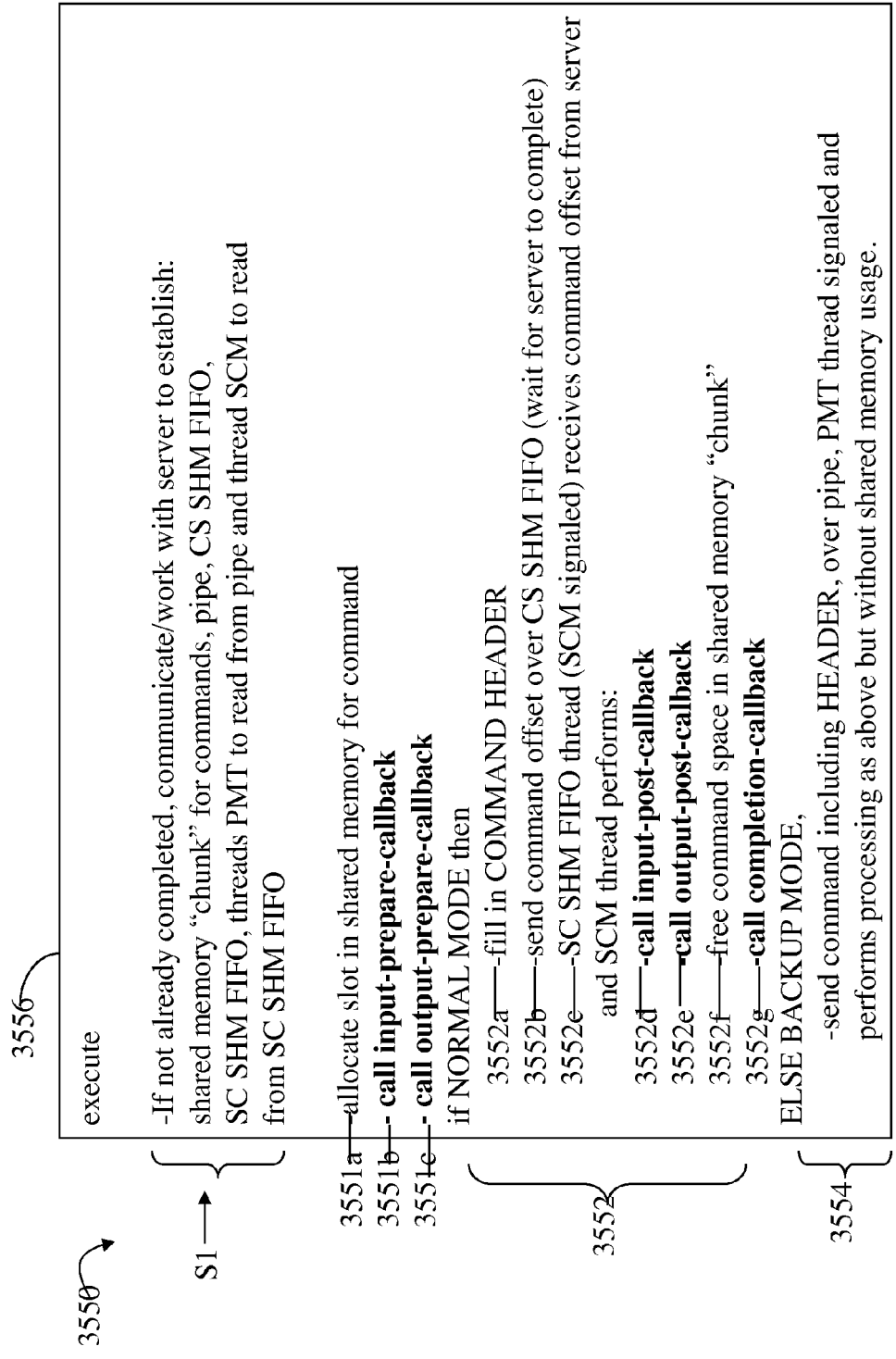
FIGS. 47, 48A, 48B, 49A, 49B, and 49C are examples illustrating in more detail processing that may be performed for the U-U case in an embodiment using the techniques herein.

Referring to FIG. 47, shown is an example of logical processing steps that may be performed by code of the execute API (client) in an embodiment using the techniques herein. Element 3556 includes a portion S1 which indicates processing that may be performed by the client to establish the necessary mechanisms or resources for communications between the client and server in the U-U case. Step S1 processing may be performed the first time the execute API is invoked with respect to a particular communication connection between a client and server Step S1 processing may occur, for example, as part of processing for a first execute command that is one of multiple execute commands performed for a particular client-server connection or pair. Step S1 is described in more detail below and includes: allocating a shared memory "chunk" or partition to hold data for one or more commands (e.g., one or more command data slots), establishing the SC SHM FIFO and CS SHM FIFO, creating thread PMT to read from the pipe and thread SCM to read from the SC SHM FIFO. In connection with techniques herein, the PMT thread may be registered and invoked to read data sent to the client over the pipe. The SCM thread may be registered and invoked to read from the SC SHM FIFO.

Once S1 processing has completed, a slot may be allocated from the shared memory chunk in step 3551*a* for use with the current invocation instance of execute. In step 3551*b*, the input-prepare callback is invoked. In step 3551*c*, the output-prepare callback is invoked. If the callbacks are not specified, the API code 3556 may perform other default processing as described herein. Different processing may be performed by 3556 in accordance with whether normal processing mode or the backup processing mode is in effect. As described herein with reference to FIG. 46C, the normal processing mode may use 3508*a*, 3508*b* and 3508*c* to communicate command data between 3502 and 3504 (bi directional). The pipe 3506 may be used for termination detection. In the backup mode, 3508 is not used and the pipe 3506 is used for termination detection and also to communicate data between 3502 and 3504 (bi directional). If the normal processing mode is in effect, steps of 3552 are performed, and otherwise steps of 3554 are performed for backup processing mode using a backup data path to communicate command data between the client and server.

In connection with 3552*a*, the command header of the allocated command slot is filled in with the parameters to be sent to the server. Step 3552*a* may include, for example, storing the following in the command header as may be specified using the client-side API: input code, input-buffer-len, location in SHM in the command slot of input data area, location in SHM in the command slot of output data area, output-buffer-len. Other information that may be stored in the command header may include, for example, flags or other indicators as described elsewhere herein.

In connection with 3552*b*, the offset of the command in the shared memory chunk 508*a* is communicated to the server over the CS SHM FIFO and the client waits for the server to complete processing the command. When the server has completed processing the command, the server sends a command offset to the client using the SC SHM FIFO. The SCM thread of the client is signaled to read the received command offset from the server in the SC SHM FIFO. The body of code of the SCM thread, as described in following paragraphs, may perform steps 3552*d-g* to: call input-post and output-post callbacks, free the command slot in the shared memory chunk, and call the completion call back.

If the command is being processed in the backup mode as indicated by 3554, the command data, including the header with the input parameters for the server, is sent over the pipe to the server. The code of 3554 waits for a response from the server indicating that the server has processed the command. When the server has completed processing of the received command, the server sends a message to the client over the pipe. The message includes command data and is a response message received from the server causing the PMT thread to be signaled. The PMT thread, as described in following paragraphs, reads the received message including command data and performs processing as indicated above in steps 3552*d-g*.

Figure 48A:
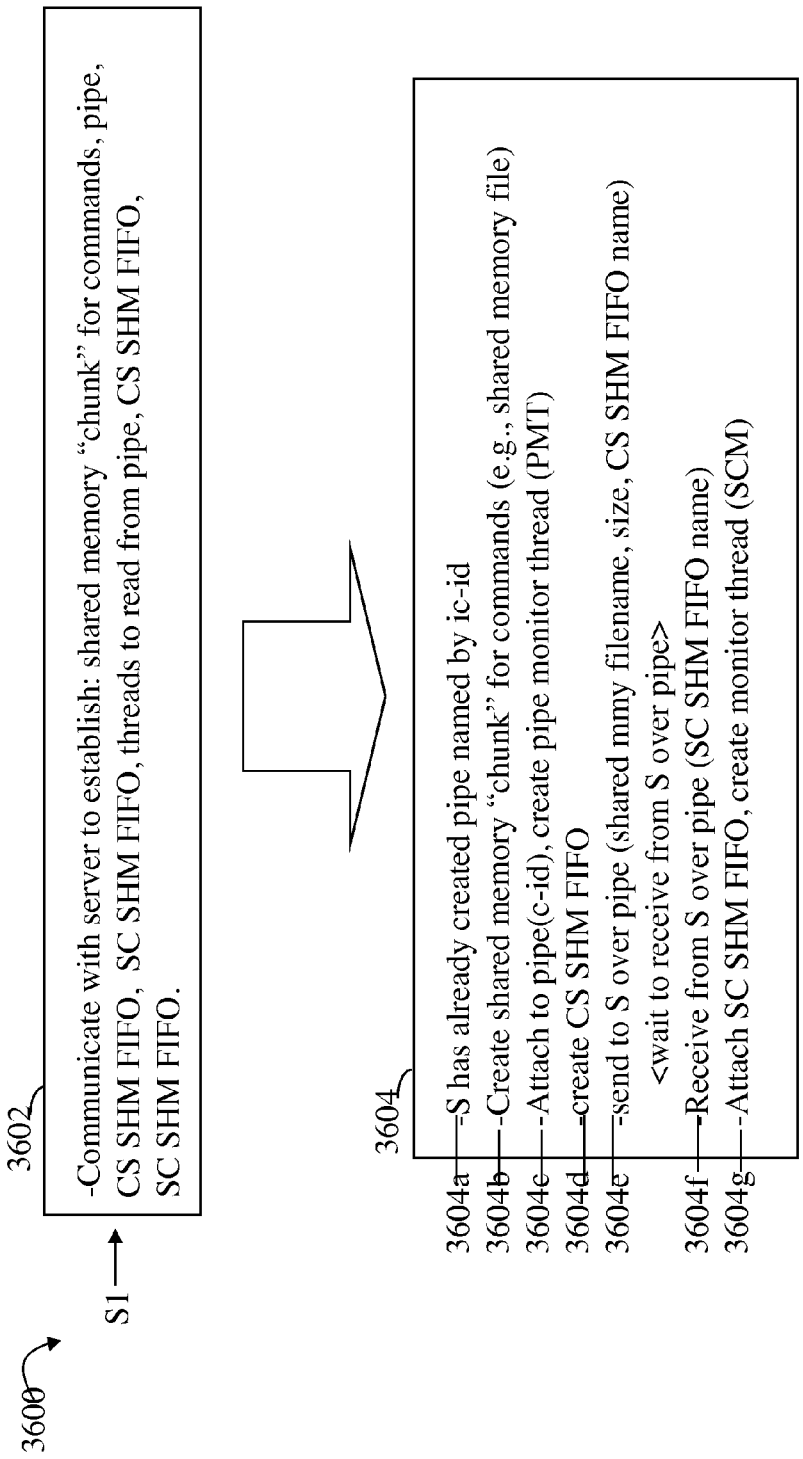

Referring to FIG. 48A, shown is an example illustrating additional details of step S1 of the client-side API that may be performed in an embodiment. Element 3602 indicates the processing performed by S1 from FIG. 47. More detailed steps of S1 3602 are illustrated in element 3604. In step 3604*a*, the client assumes that the server has already created a pipe identified by "ic-id", the input parameter for the client identifier for communication between the server 3504 and client 3502. In step 3604*b*, the shared memory chunk is created and allocated for use with commands between the client and server. In one embodiment, the shared memory chunk may be implemented as a named shared memory file so that the same shared memory location may be mapped to the virtual address space of both the client 3502 and server 3504. In the embodiment using a shared memory file (may also be referred to as a memory mapped file), reads and writes with respect to the shared memory may be performed using semantics similar to that as for files yet the location which is referenced for the reads and writes is the shared memory. The way in which shared memory is accessed by the client and server may vary with embodiment. In step 3604*c*, the client attaches to the pipe (c-id) (e.g., as referenced in step 3604*a*). The client creates the CS SHM FIFO in step 3604*d*. In step 3604*e*, the client sends to the server information identifying: the shared memory chunk implemented as a shared memory file in this example, and the CS SHM FIFO created by the client in step 3604*d*. The client waits inline to receive additional information from the server over the pipe in step 3604*f*. The information communicated in step 3604*f* from the server to the client enables the client to attach to the SC SHM FIFO (which is created by the server as described below). Also, as part of step 3604*f*, the client creates the monitoring thread SCM (described below).

Figure 48B:
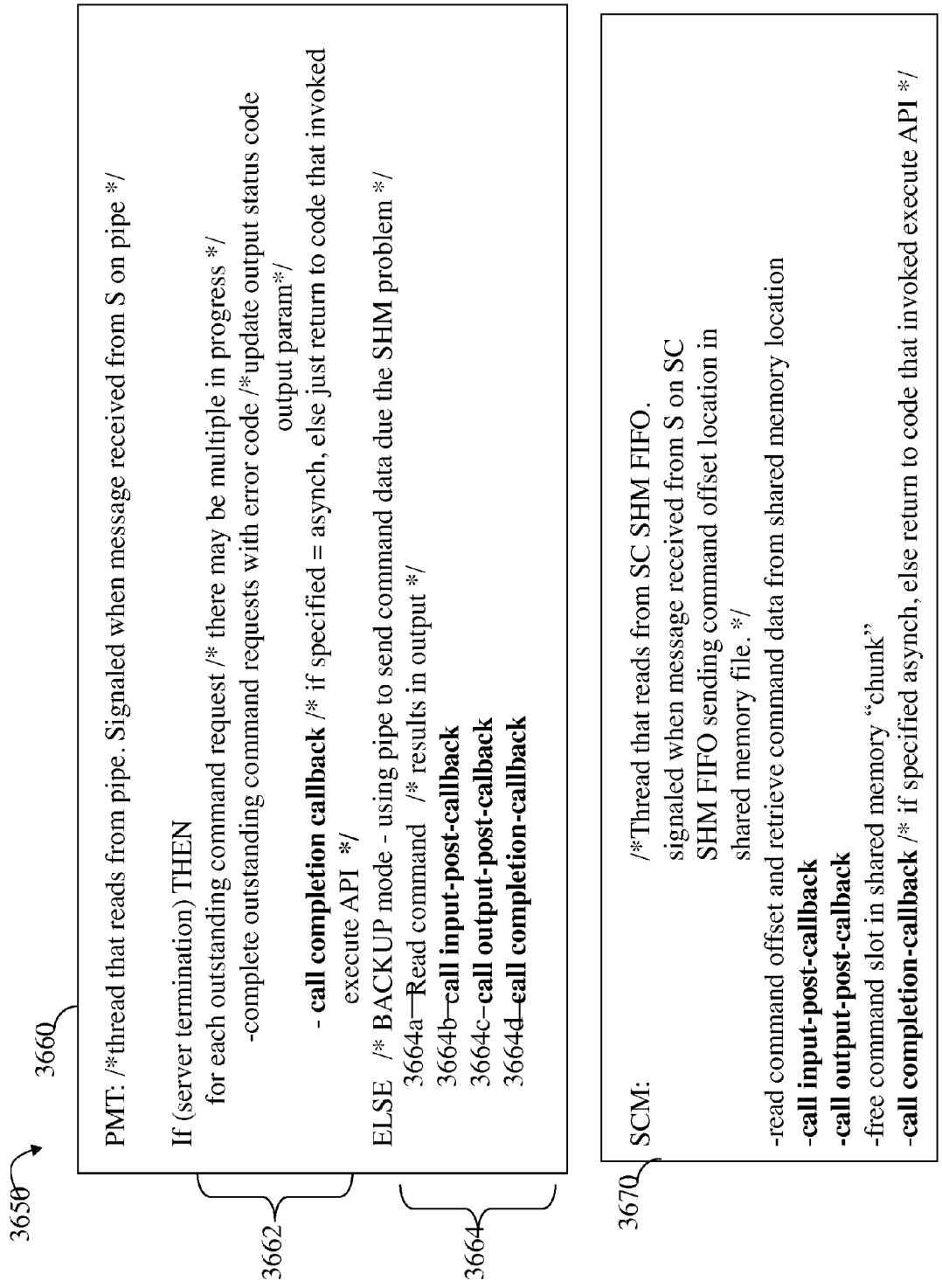

Referring to FIG. 48B, shown are additional details of threads that may be included on the client side in an embodiment. The PMT thread that reads from the pipe on the client side may perform processing as described in 3660. The PMT thread may be signaled when a message is received from the server over the pipe as well as when there is a read error in connection with the pipe as may occur upon server termination. Element 3662 describes processing steps that may be performed upon termination of the server where each outstanding command request is completed with an error code such as by setting the output status code return parameter accordingly. Subsequently the completion callback is invoked if specified. The client may keep track of the command requests in progress, for example, by having code of the execute API record information about each command requested prior to sending to the server. The client may, for example, keep track of the locations in shared memory at which commands are stored which are in progress or outstanding. In such an embodiment, as the command results are received from the server, the client API code may update such information to indicate that the command is no longer outstanding. Generally, the client may keep track of what command requests are sent to each server. As such, the client may perform processing, such as, tracking a list of outstanding or in progress commands when a command request is sent to a server instance and then removal of the command request from the list when notified by the server regarding completion of the command request. An embodiment may use any one or more data structures known in the art to perform the foregoing.

In connection with 3664, processing may be performed using the pipe to transmit the command data when operating in backup mode such as, for example, when there is a problem with shared memory. In step 3664*a*, the command is read from the pipe. In step 3664*b*, the input-post callback is invoked. In step 3664*c*, the output-post callback is invoked. In step 3664*d*, the completion callback is invoked.

Element 3670 indicates processing steps that may be performed by the SCM thread described above that reads messages (e.g., the command offsets) from the SC SHM FIFO received from the server. The SCM thread may read the command offset and retrieve the command data from the shared memory location command slot, call input-post callback, call output-post callback, free the command slot for use in connection with other commands, and the invoke the completion callback. The data retrieved from the command slot includes the information needed to populate the different parameters of the callbacks invoked by the SCM thread and may include, for example, the output-buffer-len-actual, and output status code. The foregoing may be stored in the command header portion.

What will now be described in more detail are processing steps that may be performed by the server-side in connection with the U-U communications.

Figure 49A:
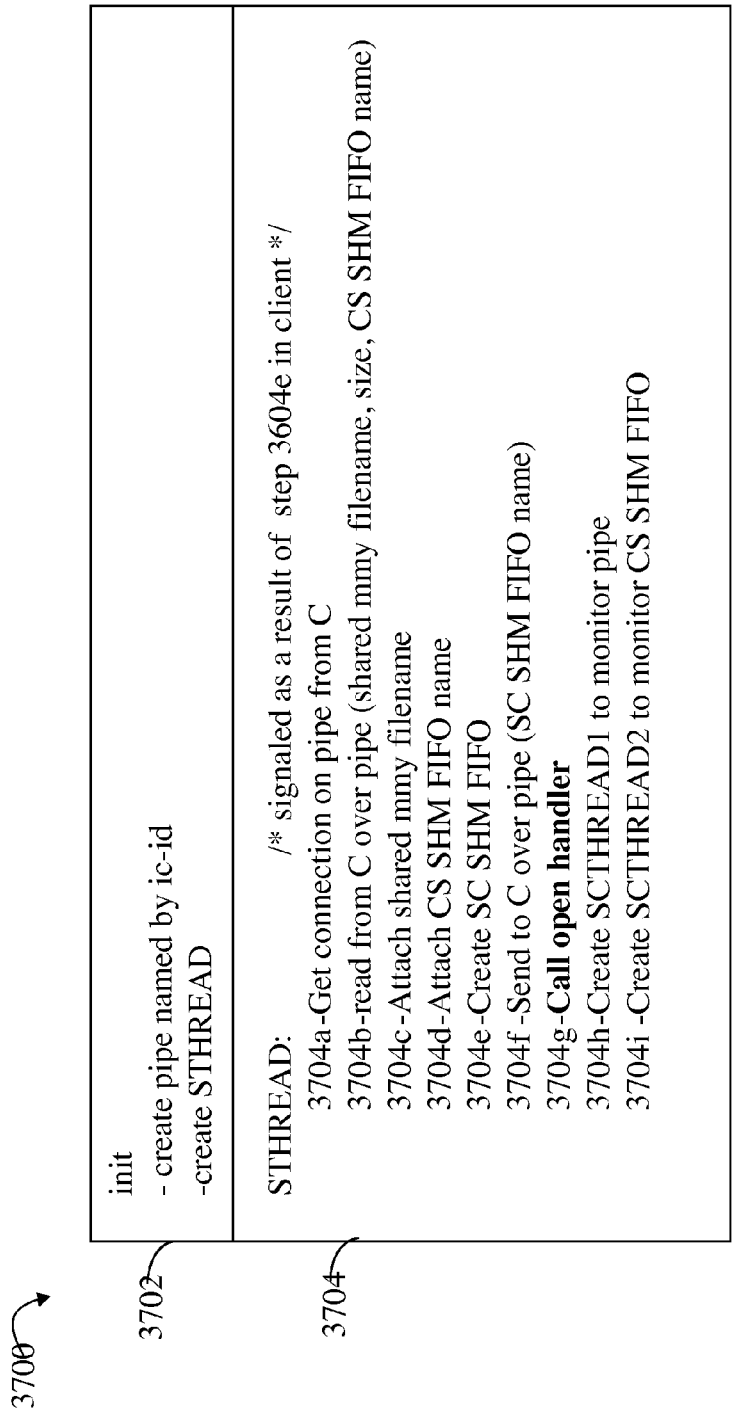

Referring to FIG. 49A, shown is an example of processing that may be performed by API code of the server for U-U communications. Element 3702 represents the processing that may be performed by the server side init API to create the pipe named by "ic-id" identifying this server. Also thread STHREAD having a code body that performs the steps of 704 may be created as part of init API processing. The STHREAD may be invoked or signaled as result of performing step 3604*e* of FIG. 48A. In step 3704*a*, the connection to the client over the pipe is established as a result of the client performing step 3604*c* of FIG. 48A. In step 3704*b*, the server reads data sent from the client over the pipe identifying the shared memory chunk allocated for the command slots, and also the name of the CS SHM FIFO. In one embodiment as described herein, the information received in step 3704*b* may related to the shared memory file to allow the server to attach to the shared memory file in step 3704*c*. In step 3704*d*, the server may attach to the CS SHM FIFO as created by the client using the CS SHM FIFO information communicated over the pipe and retrieved in step 3704*b*. In step 3704*e*, the server creates the SHM FIFO and sends information regarding the SC SHM FIFO to the client over the pipe in step 3704*f*. The information communicated to the client in step 3704*f* enables the client to attach to the SC SHM FIFO. Sending of information step 3704f causes the client to resume execution in step 3604f of FIG. 48A. In step 3704g, the open handler is invoked. In step 3704h, the thread SCTHREAD1 is created to monitor the pipe on the server side. In step 3704i, the thread SCTHREAD2 is created to monitor CS SHM FIFO on the server side. Processing that may be performed by SCTHREAD1 and SCTHREAD2 is described below.

Figure 49B:
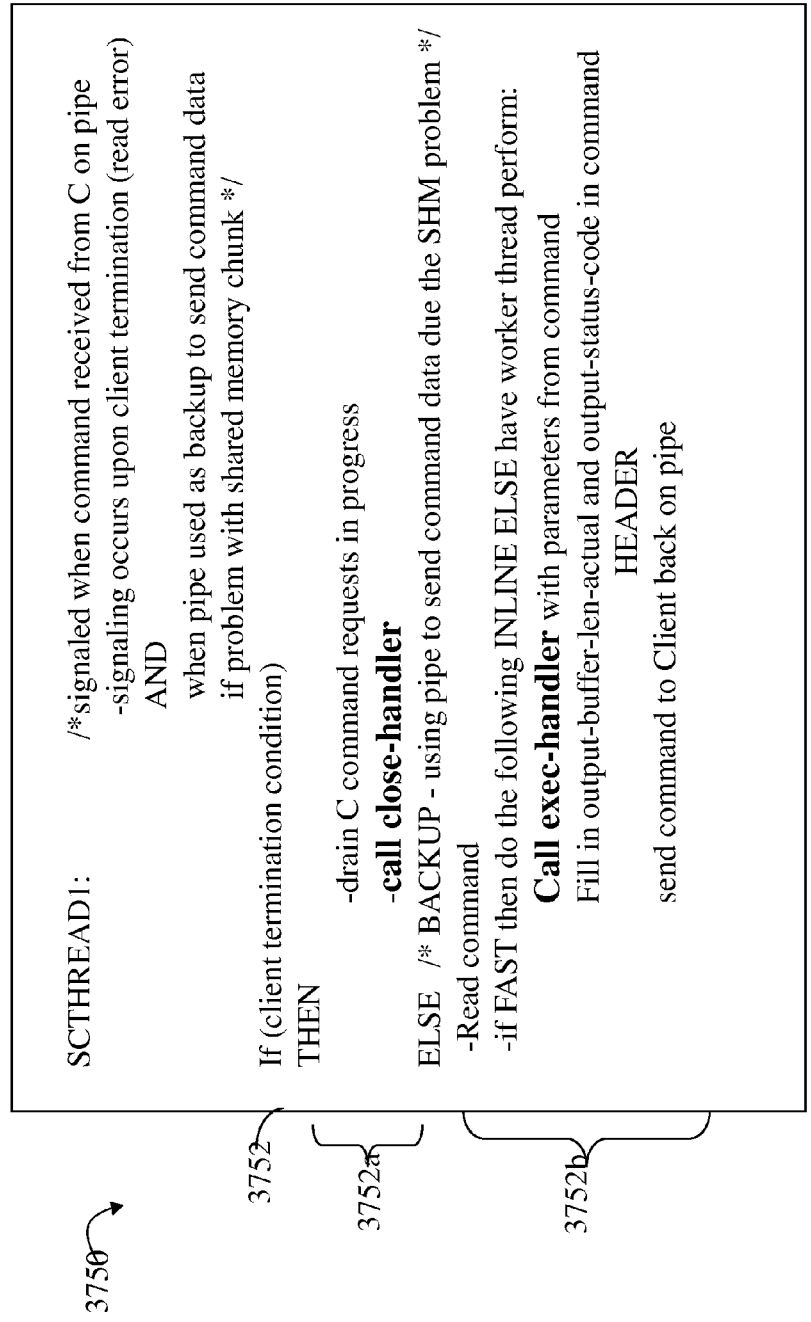

Referring to FIG. 49B, shown are processing steps that may be performed by the thread SCTHREAD1 in the server in an embodiment. SCTHREAD1 may be signaled to read messages from the pipe such as to process commands sent over the pipe when operating in backup mode. Also, SCTHREAD1 may be invoked upon termination of the client which causes a read error to occur with respect to the pipe. Element 3752a indicates processing performed upon the occurrence of a termination condition where the server may perform processing to drain any command requests in progress and then invoke the close-handler. The server may track information regarding commands which are in progress for this client associated with the "context" (e.g., client-server connection identifier). For example, the server may track information regarding which commands are in progress using server-local data structures by recording information prior to invoking the exec-handler (e.g., see SCTHREAD2 processing). The information used to track commands in progress may include the offset of the command (e.g., offset of the command slot) in the shared memory. Generally, the server may track what command requests are received from each particular client instance. The code of the API may include a table or list of clients being serviced by the server. For each such client, the server may track which command requests are in progress and then remove the command requests from the list after sending a response to the particular client. The server may perform the tracking by associating a unique client identifier with each client instance issuing command requests. User or developer supplied code (e.g., the callbacks) may utilize the user-supplied user context input parameter described elsewhere herein to track requests associated with a particular client-server pairing.

Element 3752b indicates processing performed when command data is sent over the pipe in connection with operating in backup mode. Element 3752b processing includes reading the command data sent over the pipe, invoking the exec-handler with parameters populated from the command data, filling in values for the output-buffer-len actual and output-status-code in the command header, and send the command data back to the client on the pipe. In one embodiment, when the pipe is used, the command data sent from the client to the server may include the information in the header and the input data area. Element 3752b indicates that the SCTHREAD1 may retrieve the command data and perform the processing inline, or select a worker thread to perform the processing of the command received. In one embodiment a pool of worker threads may be created, for example, as part of user process creation. A worker thread from the pool of previously created threads may be selected to process the received command. An indication as to whether the command should be performed in a FAST or INLINE mode to process a command or whether to utilize a worker thread may be indicated in the command header. For example, the command header may include a flag indicating whether to perform the command INLINE or otherwise utilize a worker thread.

Figure 49C:
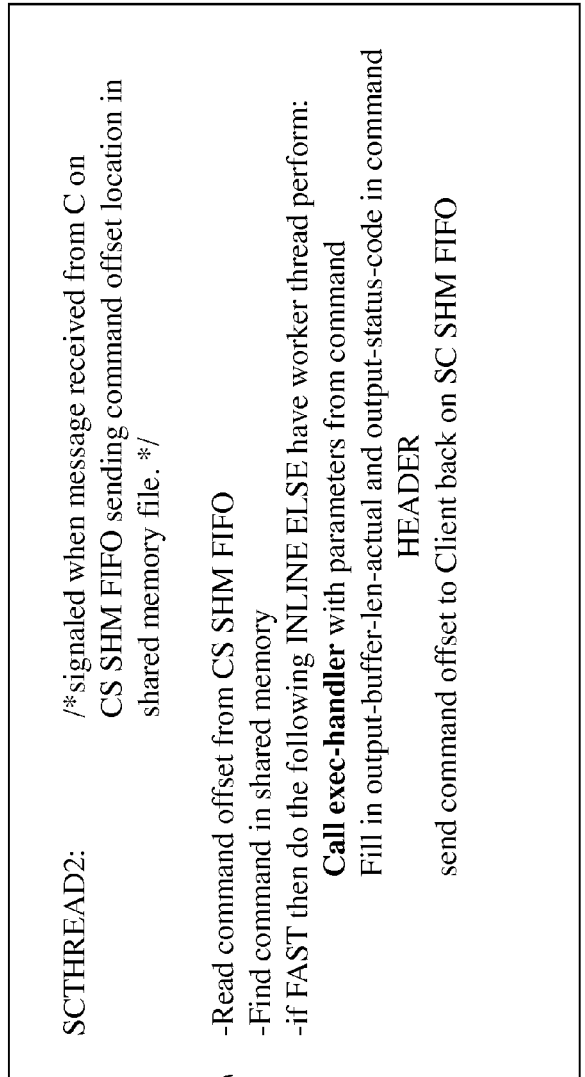

Referring to FIG. 49C, shown are processing steps that may be performed by the thread SCTHREAD2 in the server in an embodiment. SCTHREAD2 is signaled when a message is received by the server from the client on the CS SHM FIFO. The message indicates an offset location in the shared memory for the slot containing the command data. Element 3802 indicates that the code body of SCTHREAD2 reads the command offset from the CS SHM FIFO, retrieves the command from the indicated shared memory location (e.g., command slot) as sent over the CS SHM FIFO, and then either processes the command inline or has a worker thread perform processing of the command. The worker thread may be selected from a pool as described elsewhere herein. The command processing may include invoking the exec-handler with the command parameters, filling in the output parameter values of output-buffer-len-actual and output-status-code in the command header, and sending the command offset back to the client over the SC SHM FIFO.

Referring back to FIG. 46C, what will now be described in more detail are the shared memory portions 3508a-c.

Figure 50A:
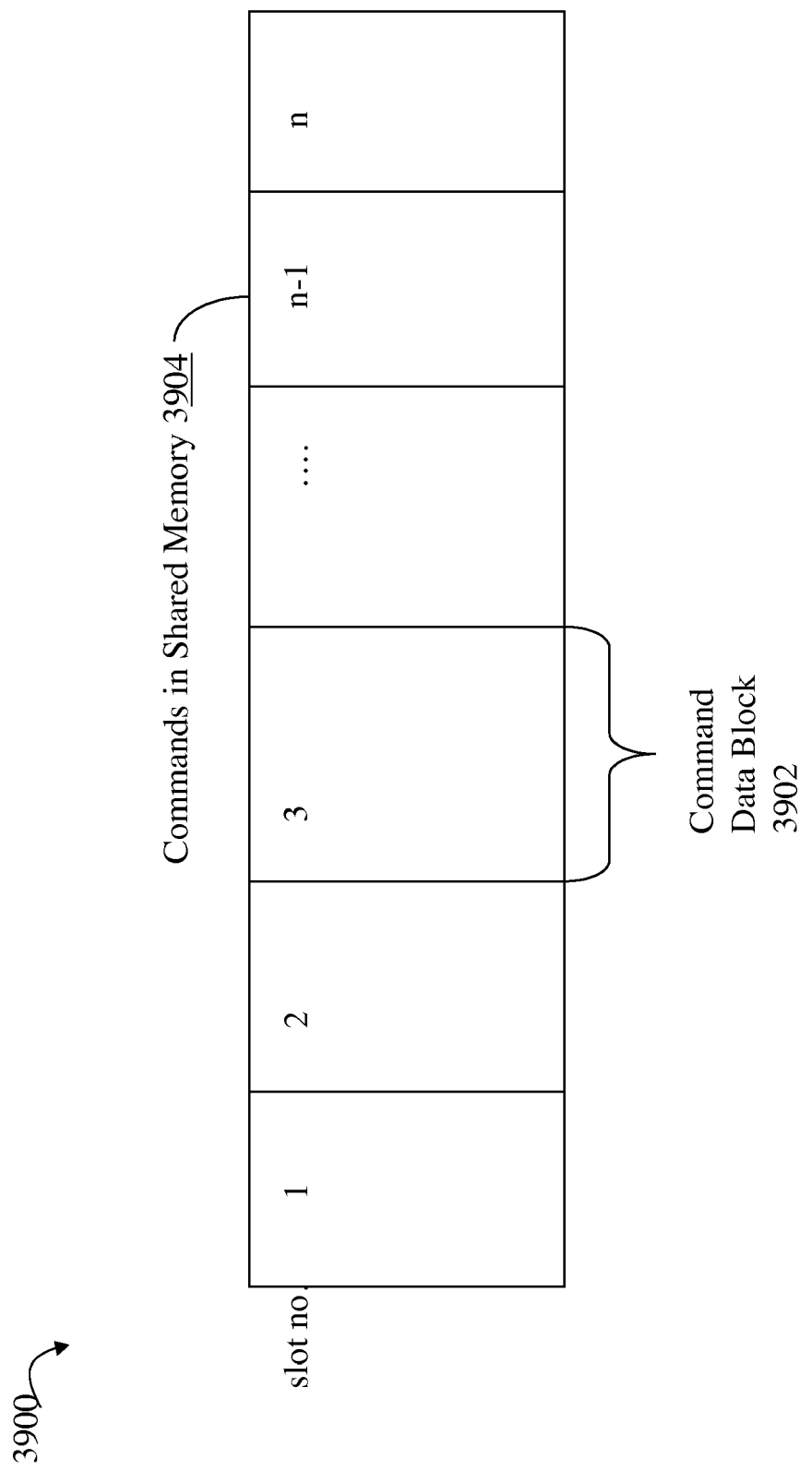
FIGS. 50A, 50B, 50C, 50D and 50E are examples illustrating data structures that may be used in an embodiment in connection with the techniques herein.

Referring to FIG. 50A, shown is an example illustrating the shared memory chunk or partition 3508a created for storing the command data for one or more commands in an embodiment. Element 3904 indicates the chunk or partition created by the client, such as for a shared memory file, including slots for command data. Each slot may include storage for one command data block to hold the data for a single command 3902. It should be noted that the shared memory chunk 3904 may be initially obtained for use in connection with the techniques herein and then portions of the chunk 3904 may be further allocated for use with individual commands as needed. The command data blocks may vary in size or may be of a fixed size. It should also be noted that although the command blocks are denoted by slot numbers 1 . . . n in FIG. 50A, the slot numbers do not denote an ordering of the commands in progress since the particular commands in progress at any point in time may vary. The slot numbers denote only that the chunk 3904 may be large enough to contain data for "n" commands. In an embodiment in which the size of each command data block varies, the number of slots will also vary.

Figure 50B:
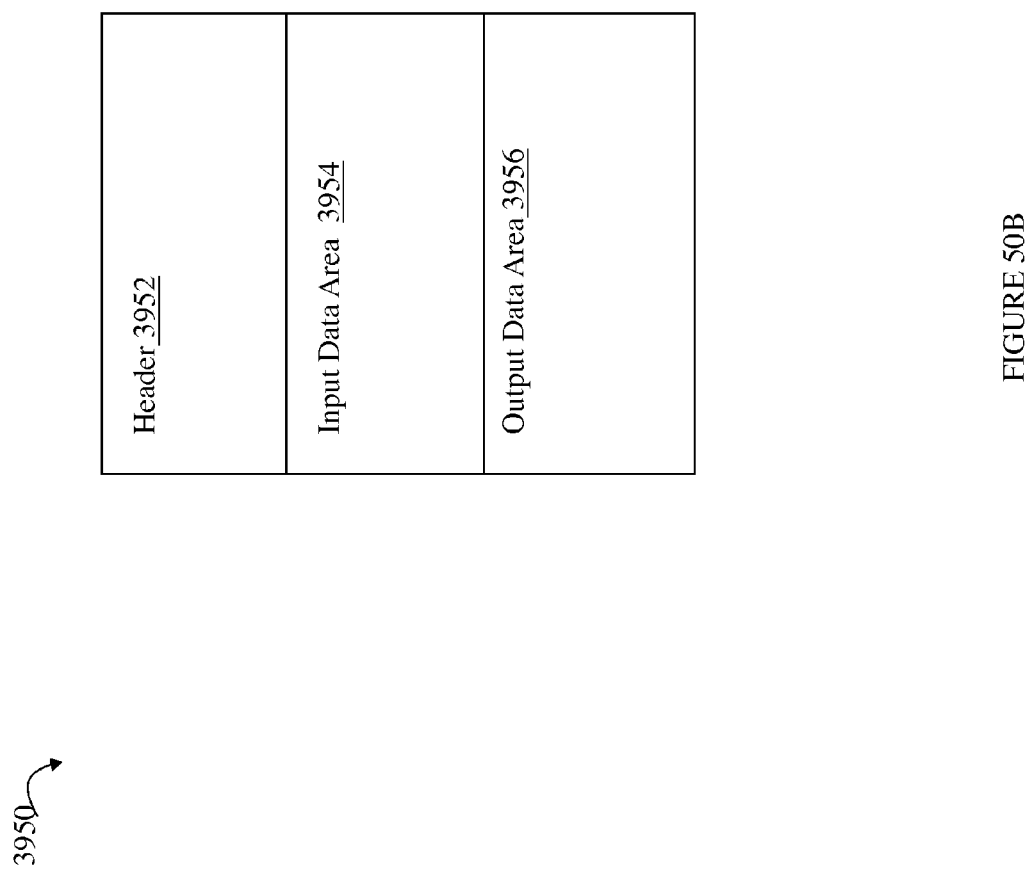

Referring to FIG. 50B, shown is an example illustrating fields that may be included in a command data block 3902 of FIG. 50A in an embodiment. The example 3950 illustrates the different fields that may be included in each slot for a single command. The example 3950 includes a header portion 3952, an input data area 3954 and an output data area 3956. The header portion 3952 may include parameters sent to the server from the client (e.g., values for the input code, input-buffer-len), and parameters sent or returned to the client from the server (e.g., values for the output-buffer-len-actual and output-status-code. The header may also include other metadata about the command. For example, the header may include a flag indicating whether the command is to be performed inline or by a worker thread as described elsewhere herein. The foregoing flag may be set in a variety of different ways, for example, based on information of a global setting, and/or user-specified information provided per execute call instance. In this case, the execute call described herein may include another input parameter for this flag. The input data area and the output data area may have a data layout and structure as understood by the client and server and used by the callback routines that may invoked. The foregoing provides for flexibility in connection with processing that may vary with each embodiment.

The header portion 3952 may include command metadata. The input data area 3954 may include the input data as well as metadata describing the input data. Such input metadata included in the input data area 3954 may indicate how the input data is structured in the input area as well as attributes about the input data included therein. Similarly, the output data area 3956 may include the output data as well as metadata describing the output data. Such output metadata included in the output data area 3956 may indicate how the output data is structured in 3956 as well as attributes about the output data included therein.

Figure 50C:
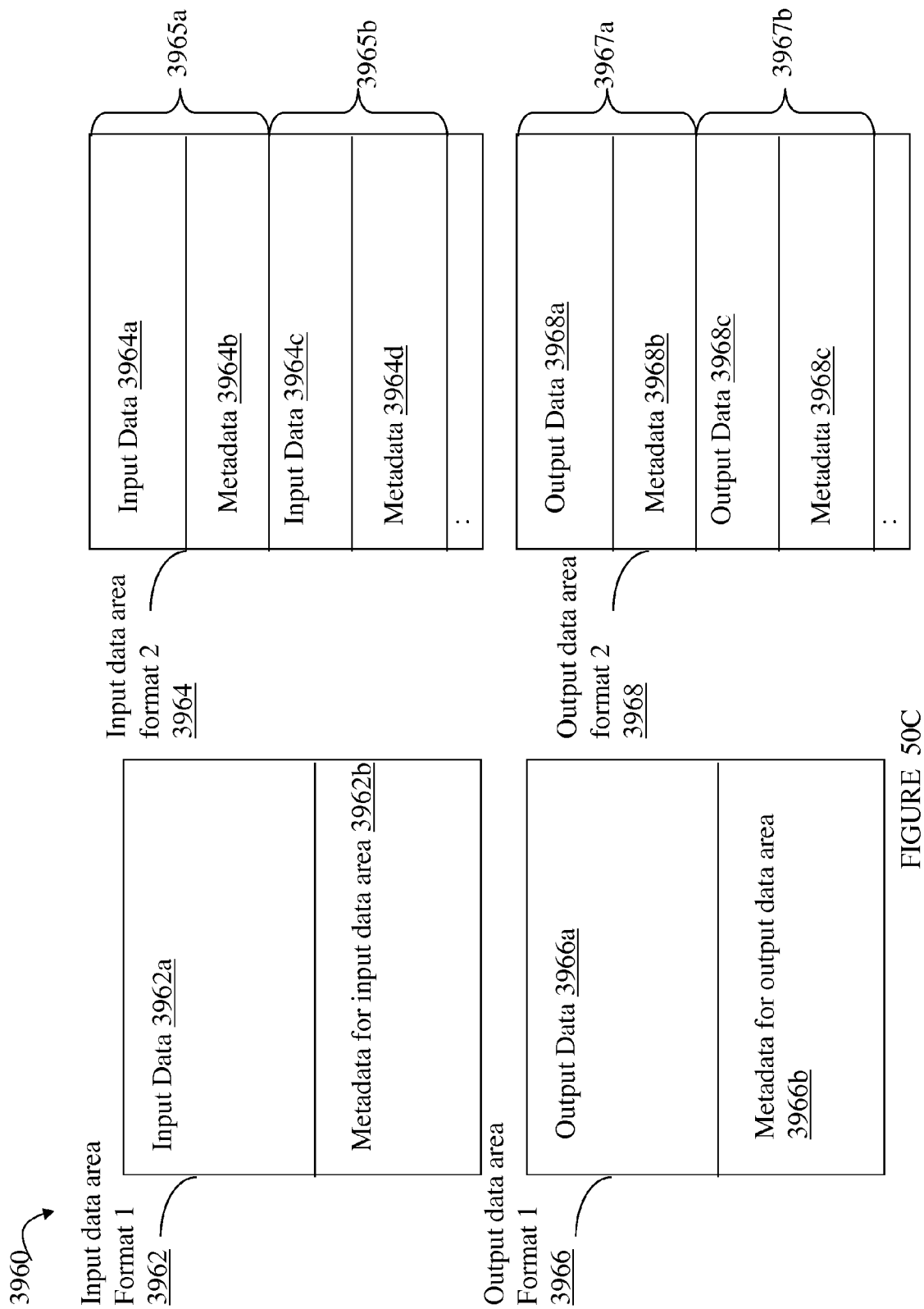

Referring to FIG. 50C, shown are examples of information that may be included in the input and output data areas and how the foregoing may be structured in an embodiment using the techniques herein. Elements 3962 and 3966 indicate how the input data area and the output data area may be structured in one embodiment. Element 3962 indicates a first format or layout of the input data area as may be included in a command data block of a command slot. Element 3962 includes a first segment 3962*a* of the input data followed by input metadata in 3962*b*. In this example 3962, all the input data of the command may be stored as a single contiguous segment. Similarly, all the input metadata may also be stored as a single contiguous segment in 3962*b*. The order of 3962*a* and 3962*b* may be reversed so that the input metadata 3962*b* occurs prior to the input data 3962*a*. Element 3966 indicates a first format or layout of the output data area as may be included in a command data block of a command slot. Element 3966 includes a first segment 3966*a* of the output data followed by output metadata in 3966*b*. In this example 3966, all the output data of the command may be stored as a single contiguous segment. Similarly, all the output metadata may also be stored as a single contiguous segment in 3966*b*. The order of 3966*a* and 3966*b* may be reversed so that the output metadata 3966*b* occurs prior to the output data 3966*a*.

Elements 3964 and 3968 collectively indicate another way in which the input and output data areas may be structured in another embodiment. In 3964 and 3968, the metadata segments are partitioned throughout the corresponding data areas as opposed to being stored contiguously as in 3962 and 3966. In the input data area format 3964, each set of input data may stored with its corresponding metadata portion. Sets of input data and associated metadata are indicated by 3965*a* and 3965*b*. In the output data area format 3968, each set of output data may stored with its corresponding metadata portion. Sets of output data and associated metadata are indicated by 3967*a* and 3967*b*.

The layouts or formats of the input and output data areas of a command illustrated in FIG. 50C are merely a couple of examples of different layouts and formats that may be used in an embodiment in connection with the techniques herein. The input and output data areas of the command can be structured in accordance with the developer code calling the API. The metadata that may be included in both the input and output data areas describing the respective data area layout or format may be used by callbacks to interpret the structure. For example, the output-prepare and/or output-post callback may first look at a location in the output data area expected to include output metadata to determine the structure and layout of the output data area indicating where the actual output data is stored.

Figure 50D:
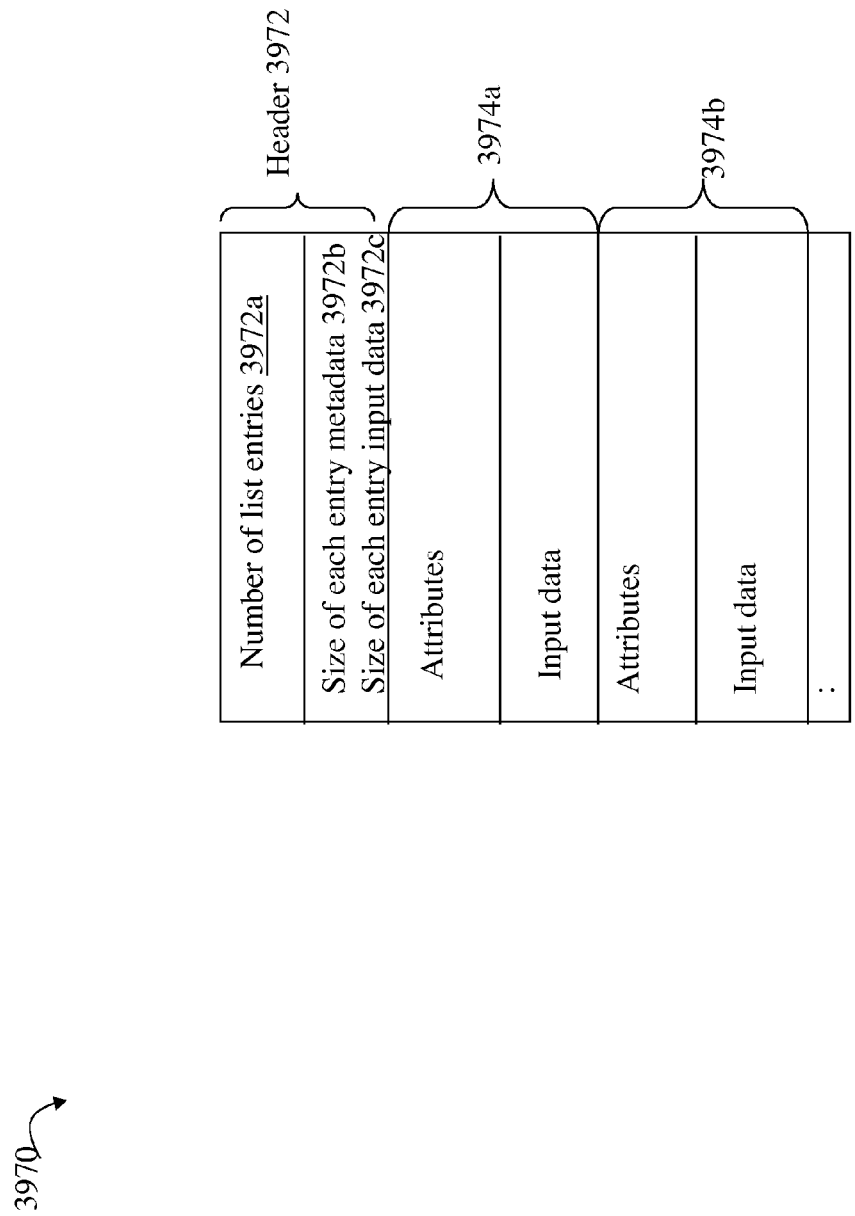

As another example, FIG. 50D includes an exemplary layout of an input data area of a command. The example 3970 includes a first metadata portion corresponding to a list header element 3972 with a first integer value indicating the number of entries in the list stored in the input data area 3972*a*, a second integer value indicating a fixed size of each entry's metadata 3972*b*, and a third integer indicated a fixed size of each list entry's corresponding input data 3972*c*. In the example 3970, the metadata of 3972 may be read to determine and interpret the layout of the input data area in which each list entry has input data and corresponding metadata portions stored together at consecutive logical memory locations. Following the list header 3972 are the list entries 3974*a*, 3974*b*, and the like. A list entry 3974*a* includes the metadata for an entry, such as indicated by the attributes, followed by the entry's input data. In an embodiment with a command having an input data area 3970, the output data area may also have a format like that of 3970 or a different format as may vary with embodiment.

The callback routines input-prepare, output-prepare, input-post and output-post may perform processing in accordance with the particular format and layout of the input and output data areas. In one embodiment, one or more of the callbacks may further invoke one or more other routines to obtain the needed input data, place it in the required format for the server, and the like.

As an exemplary use of the callbacks, input-prepare callback may be invoked and the input data may be in a first format used on the client side. The server side may expect data to be in a second different format and input-prepare may perform processing to convert the data from the first format to the second format for use by the server. Similarly, results of the command processing performed by the server are expressed in accordance with the second format so that the output data area has the second format. Thus, when command results are sent from the server to the client, the output-post callback may transform the results of the output data area from the second format to the first format for use by the client. As a furtherance of the foregoing example, the input data in the first format may be stored at the location indicated by the input parameter input-buffer-base. The input-prepare callback may transform the input data stored at input-buffer-base from a first format to a second format and store the data in the appropriate shared memory location of the command prior to sending the command to the server. Alternatively, the input-prepare callback may call one or more other routines to obtain the input data in the first format. The one or more other routines may place the data in the shared memory location in the first format and then, upon return to the input-prepare callback, input-prepare may transform the input data in the shared memory location from the first format to the second format prior to sending the command to the server.

After the input data is sent to the server in the second format as described above, the server may place results in the output data area in the second format. Upon return to the client, the input-post callback may be called to transform the input data in the shared memory from the second format back to the first format as may be expected and subsequently used by other client-side code. The callback output-post may transform the result of the output data area from the second format to the first format for use on the client side.

As another example of the use of the callbacks, the callback output-prepare may be called to format or initialize the output data area as expected by the server. For example, output-prepare may initialize header of a list or place metadata in the output data area indicating how the server should store the results in the output data area. The layout of input and output data areas may be defined by the client and may be indicated using metadata in the input and output data areas. If the input-prepare and/or output-prepare callbacks are specified in a client-side execute invocation, the input parameters input-buffer-base and output-buffer-base, respectively, may initially refer to metadata used by the callbacks in populating the corresponding locations (e.g., such as in shared memory) including the command data passed to the server.

It will be appreciated by those skilled in the art that the foregoing are just a few examples illustrating the flexibility of the techniques herein as may be utilized in an embodiment.

Figure 50E:
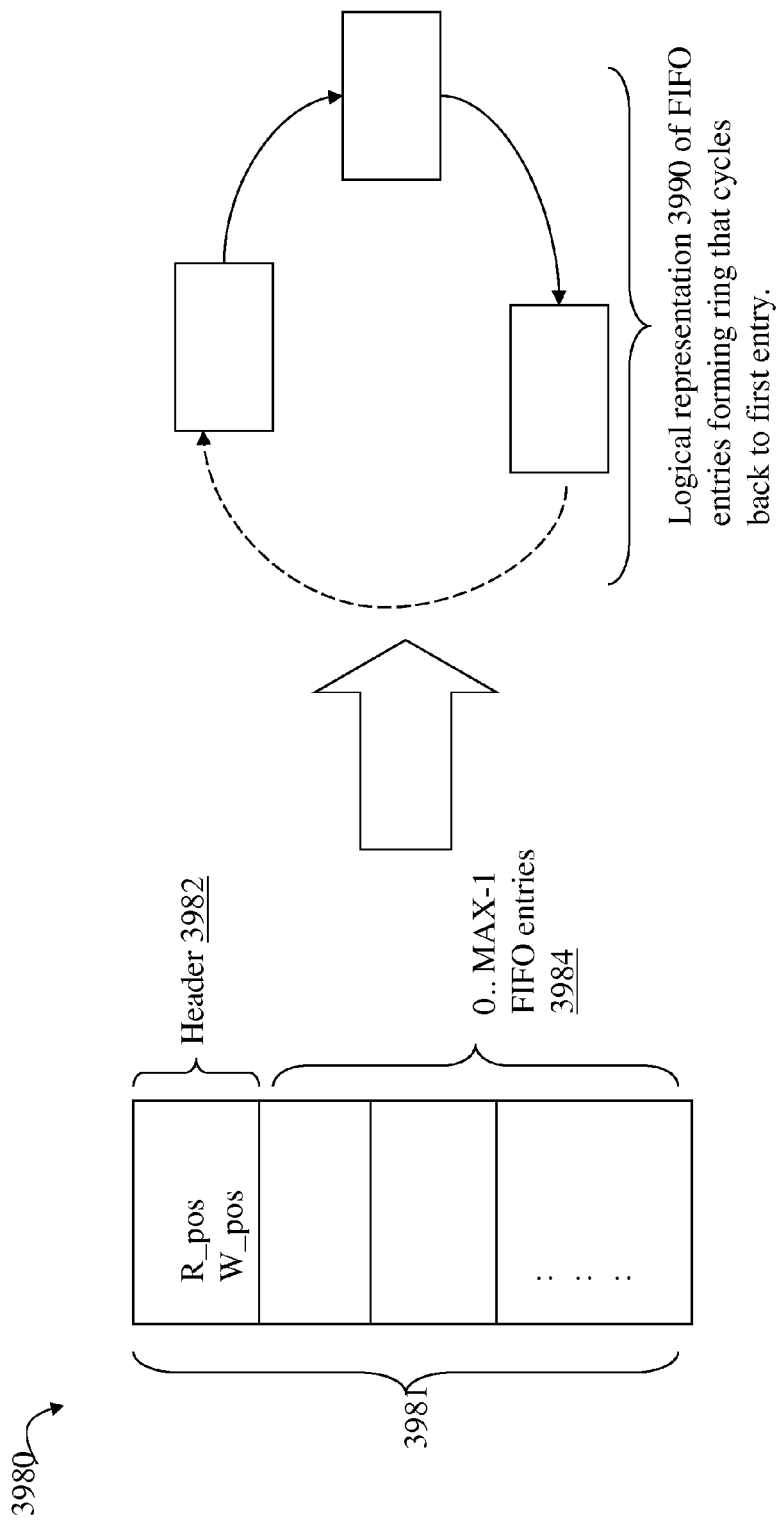

Referring to FIG. 50E, shown is an example illustrating in more detail how each of the SHM FIFOs, such as 3508*b* and 3508c, may be implemented in an embodiment. The example 3980 includes a first representation of a SHM FIFO 3981 that includes a header 3982 followed by FIFO entries 3984. Each entry of 3984 may correspond to 4 bytes of storage. In one embodiment, the structure 3981 may correspond to the physical layout in shared memory for the SHM FIFO. The header 3982 include R_pos indicating the FIFO entry (0 . . . MAX−1) at which the reader or message receiver is processing. W_pos indicates the FIFO entry (0 . . . MAX−1) at which the writer or message sender is processing. Element 3990 illustrates a logical representation of the FIFO entries 3984 forming a ring or circular buffer such that when the last FIFO entry (entry MAX−1) of 3984 is reached in processing by a reader or writer, processing cycles back to the first entry (FIFO entry 0).

Described in following paragraphs are logical steps of a Reader and a Writer that may be performed in one embodiment to utilize the shared memory FIFO structure of FIG. 50E. As an example with the CS SHM FIFO, the reader may be the server reading and processing entries from the FIFO and the writer may be the client placing entries in the queue of command offsets to be processed by the server. It should be noted that an embodiment may use a hardware primitive or instruction that may available to perform an atomic compare and swap operation or CAS. The CAS operation may described using three operands—a memory location (V), the expected old value (A), and a new value (B). The processor will atomically update the location V to the new value if the current value stored in V matches the expected old value, otherwise it will do nothing. In either case, the value that was stored in the location V prior to the CAS instruction may be returned. The CAS may be used to execute a read-modify-write sequence without fear of another thread modifying the location V in the meantime, because if another thread did modify V, the CAS would detect it (and fail) and the algorithm could retry the operation. The way in which the CAS operation is implemented may vary with embodiment.

Below is a representation of a data structure declaration that may be used with the FIFO structure. Also described below are logical steps that may be performed in an embodiment to write or put an entry into the FIFO structure. If the FIFO is full, then Writer is blocked until signaled by a reader that there is now an available entry in the FIFO structure for use by the writer. When the FIFO structure is not full, the new data is stored in the next available entry. It should be noted that an embodiment may use an atomic compare and swap operation when performing updates to R_pos and W_pos of the header of the FIFO structure.

```
struct Fifo_Body {
    int R_pos; /* current position to READ */
    int W_pos; /* current position to WRITE */
    int Entries_current; /* current count of entries in FIFO */
    int Entries_max; /* maximum count of entries in FIFO */
    int Entries[Entries_max-1]; /* array of entries */
};
Fifo_Create(struct Fifo_Body *fifo, int Entries_max) {
    fifo->R_pos=0;
    fifo->W_pos=0;
    fifo->Entries_current=0;
    fifo->Entries_max=Entries_max;
}
Fifo_Entry_Write(struct Fifo_Body *fifo, int Entry)
/* Normally the entire logic section below is interlocked against the reader.
The following LOCK and the subsequent UNLOCK ensure this.
In some implementations a LOCK and UNLOCK can be dispensed with if the following logic can be implemented with an ATOMIC COMPARE AND SWAP (CAS) instruction that can simultaneously update R_pos W_pos and Entries_current and determine if the update was successfully interlocked against the reader */
    LOCK( );
    while ((fifo->Entries_max-fifo->Entries_current)==0)
    {WAIT_ON_READER( )}/* wait for entry to be available */
        fifo->Entries[fifo->W_pos]=Entry; /* add entry */
        fifo->W_pos ++; /* adjust W_pos and Entries_current */
        fifo->W_pos %=fifo->Entries_max;
        fifo->Entries_current ++;
        WAKE_READER( )/* wake reader if he is blocked */
        UNLOCK( );
}
```

Below is a representation of logical steps that may be performed in an embodiment to retrieve an element from the shared memory FIFO. If the FIFO is empty, then the Reader is blocked until signaled by a writer storing the next entry in the FIFO structure.

```
Fifo_Entry_Read(struct Fifo_Body *fifo, int *Entry)
/* Normally the entire logic section below is interlocked against the writer.
This LOCK and the subsequent UNLOCK ensure this.
In some implementations a LOCK and UNLOCK can be dispensed with if the following logic can be implemented with an ATOMIC COMPARE AND SWAP (CAS) instruction that can simultaneously update R_pos W_pos and Entries_current and determine if the update was successfully interlocked against the writer */
    LOCK( );
    while (fifo->Entries_current==0) {WAIT_ON_WRITER( )}/* wait for entry to be present */
        *Entry=fifo->Entries[fifo->R_pos]; /* remove entry */
        fifo->R_pos ++; /* adjust R_pos and Entries_current */
        fifo->R_pos %=fifo->Entries_max;
        fifo->Entries_current—;
        WAKE_WRITER( )/* wake writer if he is blocked */
        UNLOCK( );
}
```

The foregoing may be implemented using two semaphores, a reading semaphore RSEM and a writing semaphore WSEM. A reader may be blocked on RSEM when waiting for a new entry to be written by a writer. The writer writing an entry may signal any reader blocked or waiting on RSEM. A writer may be blocked on WSEM when waiting for a new entry to be available for writing. A reader may signal any blocked writer waiting on WSEM after the reader reads a next FIFO entry.

A SHM FIFO may be implemented in a variety of different ways than as described herein to synchronize communication between the sender and receiver and also to implement the data structure.

In connection with the foregoing techniques, the client and server in U-U communications may utilize a pipe, shared memory for storing command data and two SHM FIFOs for communicating command offset locations in the shared memory. The pipe may be used for termination detection to detect when either of the client or server terminates. The pipe may also be used in connection with processing a command in backup mode rather than utilize the shared memory for the command data and the SHM FIFOs. In the backup mode, the pipe is used as a means for termination detection and also as a means to transmit the command data between the client and server in a bi-directional manner. Each of the client and server may have a thread reading from the pipe. The receiver of a message using each of the SHM FIFOs may use a thread which is signaled to read received command offsets. The pipe may be used in connection with initial processing as described herein to setup the other mechanism using shared memory for the U-U communications.

The pipe may be used in connection with termination detection so that a registered thread receives notification when a read error occurs. The foregoing read error is received by one of the client or server indicating that the other using the same pipe has terminated. The foregoing enables the registered thread which is notified on termination to perform any needed cleanup. Cleanup may include freeing any consumed resources. On the server side, it may include draining any commands currently being processed upon client failure and then invoke the close-handler callback on the server side. On the client side, it may include forcing completion with a failure or error for those outstanding commands upon server failure. As an example, a client may receive an error code (be notified) that the server terminated prior to completion of outstanding execution requests. On the client-side, there may be blocked threads waiting to be signaled upon completion of the execution results by the server which has now terminated. As a result, when the client receives an indication that the server has terminated with outstanding execute threads, the client can perform processing to signal waiting execute threads such as those threads or modules from which synchronous execute calls are made.

On the server side, when open-handler is performed, context information may be locally stored in the server regarding the context for the current session or connection started with the client as indicated by the context parameter. Based on the context information, the server may then keep track of each subsequent exec-handler invocation performed on behalf of that particular client associated with the context. If the close handler is invoked for a particular context, the close handler is able to perform any cleanup for commands in progress having the same context (indicating the same client-server connection). The foregoing context passed as a parameter with the open handler may also be characterized as a tag uniquely identifying the particular session or connection between the client and server. The context may be used as a tag identifying other command requests from the client associated with this same tag. The context and other tracking information may be stored locally in the server user container. Additionally, the open-handler callback may also include a user-context parameter including additional context information used to track command requests as well as other information that may be used by the callbacks.

The completion callback, if specified, indicates asynchronously performing a command request with respect to the user code invoking the execute API. In order to enable the user code to track the particular command request when completed, the completion callback includes a completion-callback-context. The user code may specify a value for the completion-callback-context to enable tracking the particular command or execute invocation. The completion-callback-context may be used by the completion callback to synchronize or match the completion callback invocation with a corresponding execute instance. If the completion call is not specified, the execute invocation is performed synchronously and the invoking code waits inline until control returns from the API execute code.

If an execute invocation is specified without an input-prepare callback, one embodiment may perform a memory copy to copy data from input-buffer-base having input-len (e.g., as indicated with the execute input parameters), to the input data area such as may be included in the shared memory location. If an execute invocation is specified without a output -prepare callback, one embodiment may perform a memory copy to copy data from the output data area, such as may be included in the shared memory location, to output-buffer-base having output-len (e.g., as indicated with the execute input parameters). In one embodiment, if one or more of the output-prepare and input-post callbacks are not specified, no alternative processing or action may be performed. If specified, the output-prepare callback as described herein may be invoked to perform preprocessing on the output buffer prior to invoking the server to perform a requested command. For example, the output-prepare callback may prepopulate the output buffer such as to initialize the output data area with metadata such as descriptors.

What will now be described are techniques that may be used in connection with U-K and K-U communications using the techniques herein. An embodiment using the techniques herein for he U-K and K-U cases may use different mechanisms for facilitating communication between a user container and the kernel container. When communicating with code executing in kernel mode, the kernel cannot terminate and still have a user process or container continue execution. Thus, there is no need to have code in user space be notified upon kernel termination.

Techniques for use with the U-K case for facilitating communication between code executing in user space as a client and code executing in kernel space as a server (e.g., from a user container to a kernel container) will now be described.

Figure 51A:
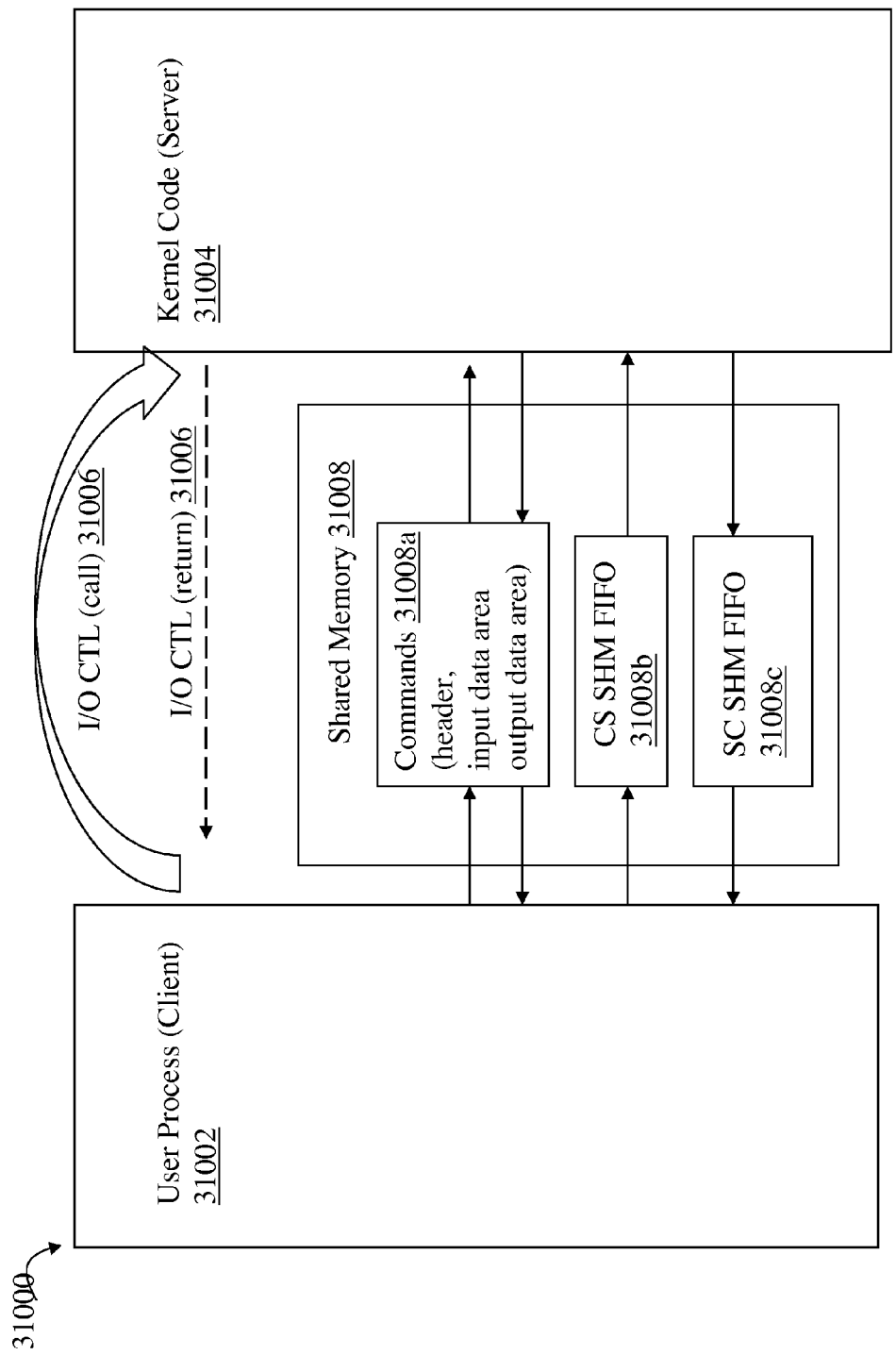
FIGS. 51A-51B are examples illustrating resources that may be used in connection with the U-K (user space to kernel space) communications in embodiments using the techniques herein.

Referring to FIG. 51A, shown is an example illustrating U-K communications in an embodiment using the techniques herein. The example 31000 includes a client user process 31002, a server that is a kernel container or code executing in kernel space 31004, shared memory 31008, and a system call from 31002 to 31004 indicated as an I/O CTL (I/O control) call or request. In following paragraphs in connection with the U-K case, the user process 31002 may also be referred to as the client and the kernel code 31004 may also be referred to as the server.

In connection with normal command processing, the command data may be stored in an area of shared memory 31008*a* similar to that as described for the U-U case. Additionally, the SHM FIFOs 31008*b* and 31008*c* may be used similar to that as described for the U-U case. The I/O CTL mechanism may be used for termination detection to indicate when the client has terminated. Additionally, the I/O CTL or system call may be used as a backup mode to communicate command data to the server from the client in the event there is a problem encountered with using shared memory 31008*a* for the command data. In one embodiment, a kernel routine or thread may be registered as a handler which is invoked when an I/O CTL or system call is made from user mode. A device may be created in kernel space and opened as a file descriptor by the user process 31002. The user process 31002 may issue an I/O CTL or system call to this kernel device. A kernel routine may be registered as the handler to handle such I/O CTL calls or requests to the kernel device. A close with respect to the kernel device may be performed when the user process 31002 terminates so that the registered handler of the kernel code 31004 is notified upon termination of client 31002. As described above in connection with the U-U case, if the kernel device is closed and there are outstanding execute requests (e.g., exec-handler invocations) in progress, the server may perform processing to drain or terminate in commands in progress, deallocate resources and the like.

In connection with a backup mode where there is a problem encountered using shared memory area 31008*a* for storing command data, the I/O CTL mechanism may be used for client termination detection and also to communicate command data to the server and also to return command data to the client.

In connection with normal processing mode as described above where the command data may be communicated using shared memory are 31008a, the offset or location of the command data in 31008a may be communicated from the client to the server using 31008b, and the offset or location of the command data in 31008a may be communicated from the server to the client using 1008c as described above for the U-U case.

Figure 51B:
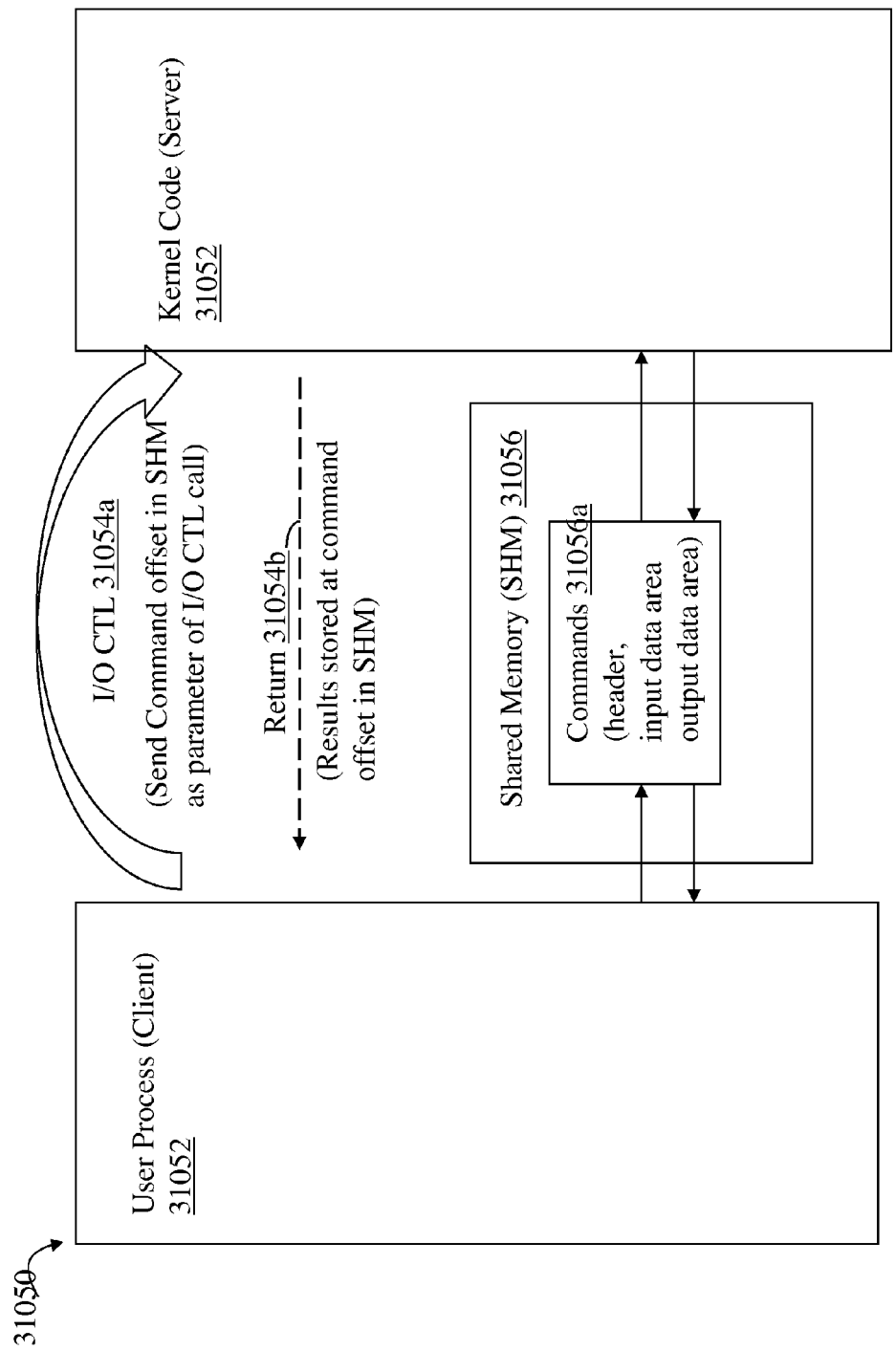

Referring to FIG. 51B, shown is an example of another way in which the techniques herein may be used to facilitate U-K communications. In the example 31052, command data may be stored in shared memory area 1056a. However, rather than use the two shared memory FIFOs (CS SHM FIFO 31008b and CS SHM FIFO 31008c), an embodiment may use an I/O CTL system call or request 31054a to send the command offset to the server from the client, and also to return 31054b to the client. The return 31054b to the client serves as a signal that server processing of the requested command is complete and the client may expect the results or output of the server processing to be included in the same location or command offset as previously sent to the server when the client initiated the I/O CTL call. In other words, an I/O CTL call is made 31054a to the kernel device described above with a parameter that is the command offset in 31056a after the client 31052 has placed the command data at the command offset location. The server 31052 is notified upon the occurrence of the I/O CTL call to the kernel device via a registered handler and retrieves the command data from the indicated offset location in shared memory. The kernel performs processing using the command data, stores the results in the output data area of the command data location at the command offset location, and then returns to the client 31054b. In connection with the embodiment of FIG. 51B, the I/O CTL mechanism is also used for client termination detection as described above using a registered handler which is notified when the kernel device is closed. An embodiment may use a different registered handler which is notified when other operations in the form of I/O CTL calls are performed with respect to the kernel device. Such other operations may include issuing an I/O CTL call to the kernel device for the command request as illustrated by 31054a.

Figure 51C:
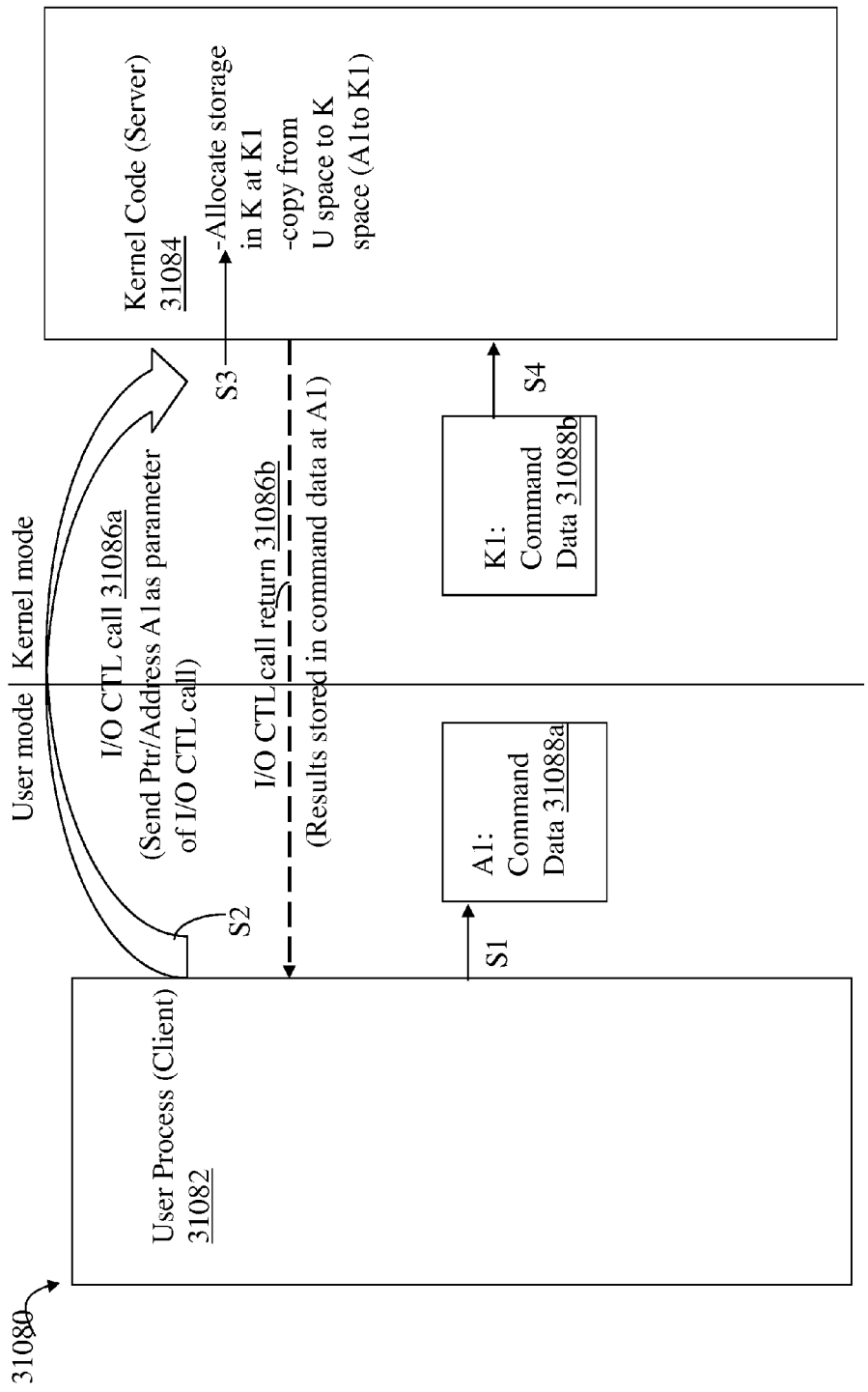
FIG. 51C is an example illustrating U-K communications using a backup mode and backup communication path to communicate command data in an embodiment using the techniques herein.

Referring now to FIG. 51C, shown is an example illustrating how the I/O CTL call may be used as a backup path for sending command data between client and server. The example 31080 may be used in connection with a backup mode for processing commands in connection with the first embodiment for U-K communications of FIG. 51A and with the second embodiment for U-K communications of FIG. 51B. In the example 31080, the client 31082 stores the command data 31088a at a location A1 in user space as indicated by step S1. In step S2, the client 31082 issues an I/O CTL call 31086a including A1 as a parameter identifying the address or pointer to the location of the command data 31088a in user space. In step S3, the registered kernel routine which handles the I/O CTL calls for the kernel device is invoked and performs processing to allocate storage in the kernel at a location K1 for the command data, copies the command data from user space location A1 to kernel space location K1, and then processes the command. Results are returned to the client from the kernel by having the kernel update the output data area in kernel space as part of processing of the command. Additionally output parameters (e.g., output-buffer-len-actual and output-status-code) stored in the command data may also be updated by the server. Command data is then copied from K1 (kernel space) to A1 (user space) by the server 31084 and then there is a return 31086b from the I/O CTL call in kernel space to the client 31082.

As compared or contrasted to the U-U case, the U-K case utilizes different techniques as described above. In particular, there is no pipe used in connection with the embodiments of the U-K case. In connection with embodiments described herein for the U-K case, the I/O CTL call may be used for termination detection when the user space process terminates effectively closing the established and opened kernel device as described above so that a registered kernel handler is invoked in response to the user space process termination. In one embodiment for U-K communications in which the command data is stored in shared memory, 2 SHM FIFOs may be used to communicate an offset location at which the command data is stored. In another embodiment for U-K communications, the I/O CTL call may be used to communicate the command offset location in shared memory rather than the foregoing 2 SHM FIFOs. In connection with embodiments described herein for U-K communications, the I/O CTL call may be used to send an address or pointer to a user-space address when operating in a backup mode for processing commands.

Processing associated with the U-K case is described in more detail in following paragraphs. Prior to describing the U-K case in more detail, an overview of techniques for use with the K-U case for facilitating communication between code executing in kernel space as a client and code executing in user space as a server (e.g., from a kernel container to a user container) will now be described.

Figure 52A:
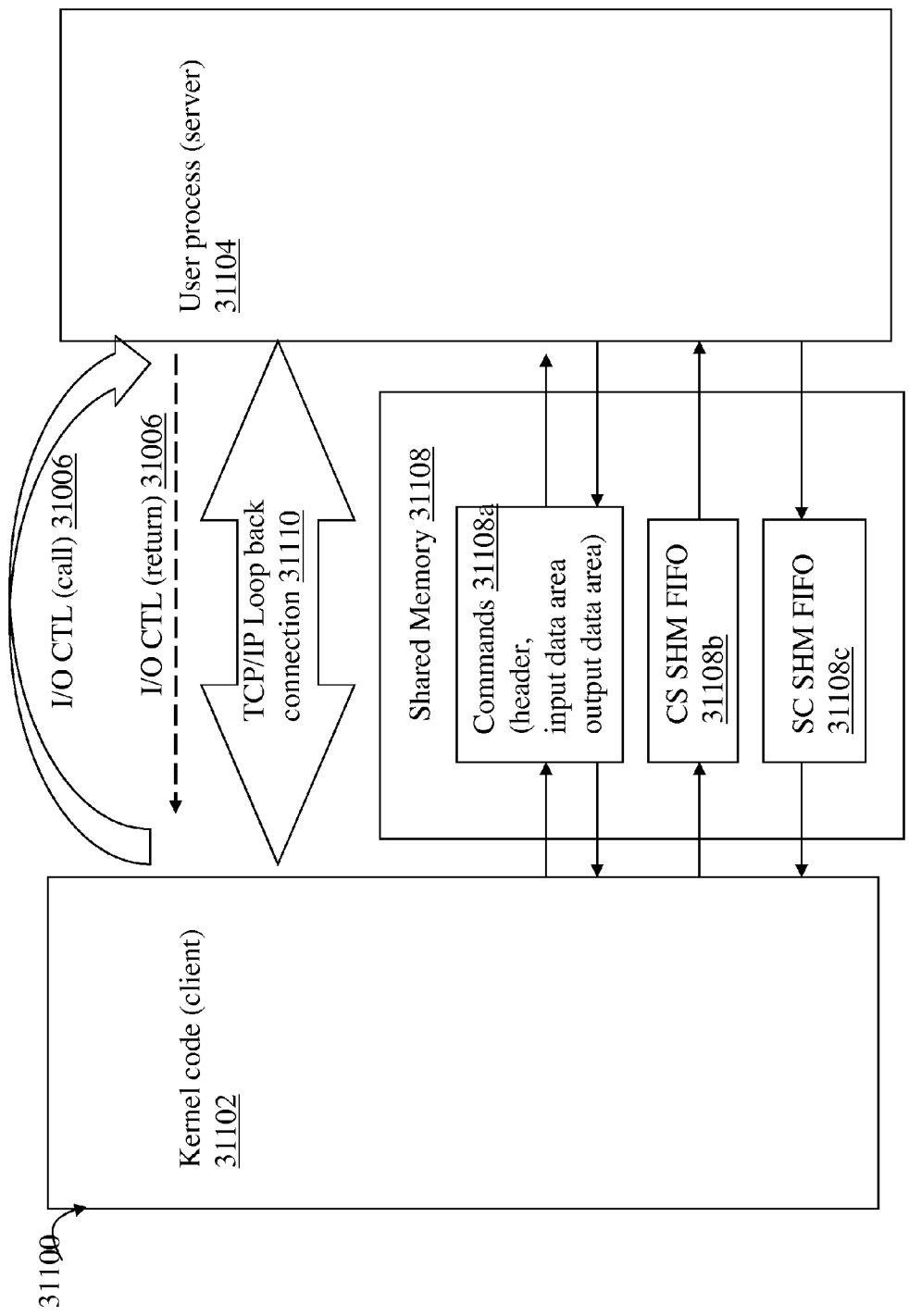
FIGS. 52A-52B are examples illustrating resources that may be used in connection with the K-U (kernel space to user space) communications in an embodiment using the techniques herein.

Referring to FIG. 52A, shown is an example illustrating K-U communications in an embodiment using the techniques herein. The example 31100 includes kernel code 31102 executing as a client, and user process 31104 executing as the server. In connection with the K-U case, the kernel code 31102 may be referred to as the client, and the user process 31104 may be referred to as the server. Shared memory location 31108a and the SHM FIFOs 31108b and 31108c may be used as described above in which the command data is stored in 31108a at an offset communicated using 31108b and 31108c. The I/O CTL mechanism 31106 may be used for server termination detection in a manner similar to that as described above using a registered kernel mode handler. The server may open a kernel device and the client/kernel 31102 may register a routine invoked when the kernel device is closed as may occur when the server/user process terminates. The registered routine may be invoked as described elsewhere herein to perform processing associated with user process termination. The registered routine may perform any needed cleanup such as detachment and/or deallocation or resources, invocation of completion callback forcing termination of commands in progress by invoking the completion callback for asynchronous execute commands or otherwise signaling any threads blocked or waiting inline for synchronous completion of execute command, updating an output-status-code indicating an error for incomplete/improper command processing, and the like. The elements 31108a, 31108b and 31108c may be used in connection with a normal command processing mode. In the event there are problems or errors in connection with storing command data in 31108a, a backup mode of command processing may be performed using a backup path to transmit command data between 31102 and 31104. In the example 31100, a loopback connection may be used as the backup path to transmit command data between 31102 and 31104 in a bidirectional manner. The loopback connection may be implemented as a TCP/IP loopback connection which used to carry or flow the actual command data between 31102 and 31104. The loopback creates a TCP/IP path to the same node/IP address. In connection with the techniques herein, the loopback connection is used by the client, K code, to communicate with server software, U-space code, on the same computer. Similarly, information may be returned from 31104 to 31102.

Figure 52B:
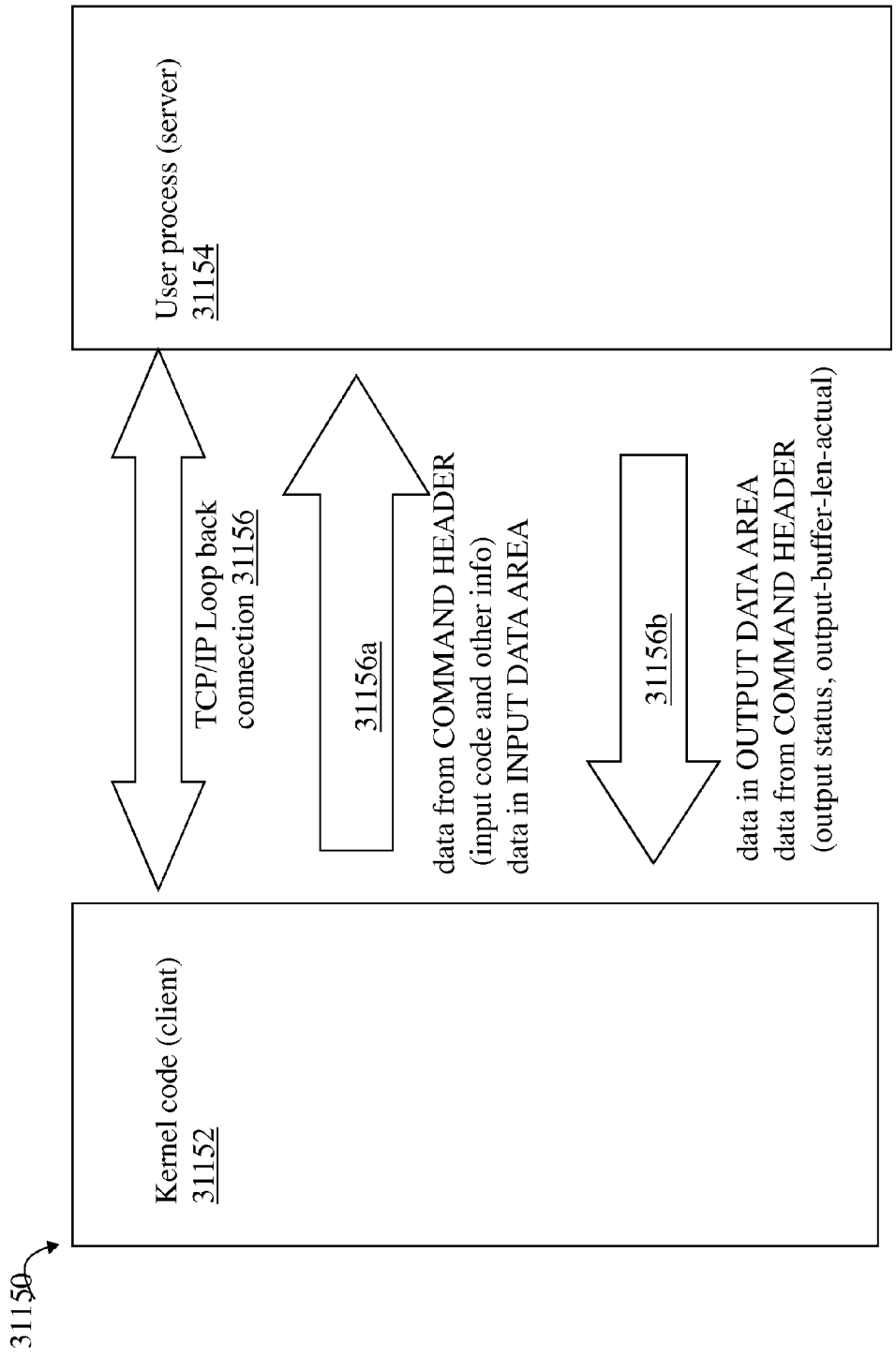

Referring to FIG. 52B, shown is an example illustrating use of the loopback connection as a backup path when operating in the backup command processing mode. Element 31156*a* illustrates transmitting command data, such as information included in the command header, input data area and (optionally) the output data area, from the client to the server. The server may then perform processing using the command data and return command data (e.g., information included in the command header, output data area, and (optionally) the input data area) from the server to the client as indicated by 31156*b*.

An embodiment may allocate and prepare the resources utilized for K-U and U-K communications as described herein in combination in connection with user space container and kernel space container initialization. Whenever a user-space process is created, code of the API may perform processing to communicate with the kernel to establish the necessary resources for U-K and K-U communications. The user-space process may initiate this processing using I/O CTL calls to communicate with the kernel rather than the pipe as described above in connection with establishing the resources for U-U communications. In one embodiment, the user process may create and prepare a portion of these resources and communicate information using I/O CTLs to the kernel code so that the kernel may attach to the resources for communicating with the user process. Also, by initiating this process, the user process may be requesting that the kernel take steps to create and prepare another portion of the resources and similarly communicate information to the user process so that the user process may attach to the kernel-prepared resources. The kernel may communicate this information to the user process as return parameter information of the I/O CTL call. The return parameter information may include data values and/or a pointer to a location containing the information. Based on the descriptions set forth above, the following resources may be created and prepared for use for K-U and U-K communications in one embodiment:

Kernel device creation for use in connection with issuing I/O CTLs and for user process space termination detection. The kernel may create a kernel device as part of kernel startup or initialization processing. As part of user process space initialization, the user process may open the kernel device to obtain a file descriptor for the kernel device. The user process may use the file descriptor in connection with issuing I/O CTL calls to the kernel device as described above.

A portion of shared memory of one or more command slots, each command slot containing data for one command. User space code may allocate and create the shared memory portion and communicate information to the kernel using I/O CTLs to the kernel device. It should be noted that two of the foregoing shared memory portions may be used in an embodiment—a first for U-K communications and a second for K-U communications.

2 SHM FIFOs for U-K communications. The sender of messages on each SHM FIFO may create the SHM FIFO and communicate information to the receiver so that the receiver can attach to receive messages. In one embodiment, the user process may initially create the CS SHM FIFO for U-K communications and then send the information to the kernel using I/O CTL parameters so that the kernel can attach. In response, the kernel may attach to the CS SHM FIFO, create the SC SHM FIFO, and send information to the user process regarding the SC SHM FIFO so the user process can attach to the SC SHM FIFO.

2 SHM FIFOs for K-U communications. The sender of messages on each SHM FIFO may create the SHM FIFO and communicate information to the receiver so that the receiver can attach to receive messages as described above.

2 semaphores for each SHM FIFO to synchronize access by message sender and receiver. These may be created by the kernel in kernel address space to facilitate any cleanup processing that is performed by the kernel upon client process termination.

Loopback connection. In one embodiment, the kernel code may open a communication channel to a user process when first needed during execution. The channel between the kernel and user process may be defined as a loopback connection to the same IP address using TCP/IP.

I/O CTL calls from U to K may be used as described herein to establish the resources used for U-K and K-U communications. In such a embodiment, the I/O CTL call may include one or more parameters identifying the requested operation issued by the user process.

Figure 53A:
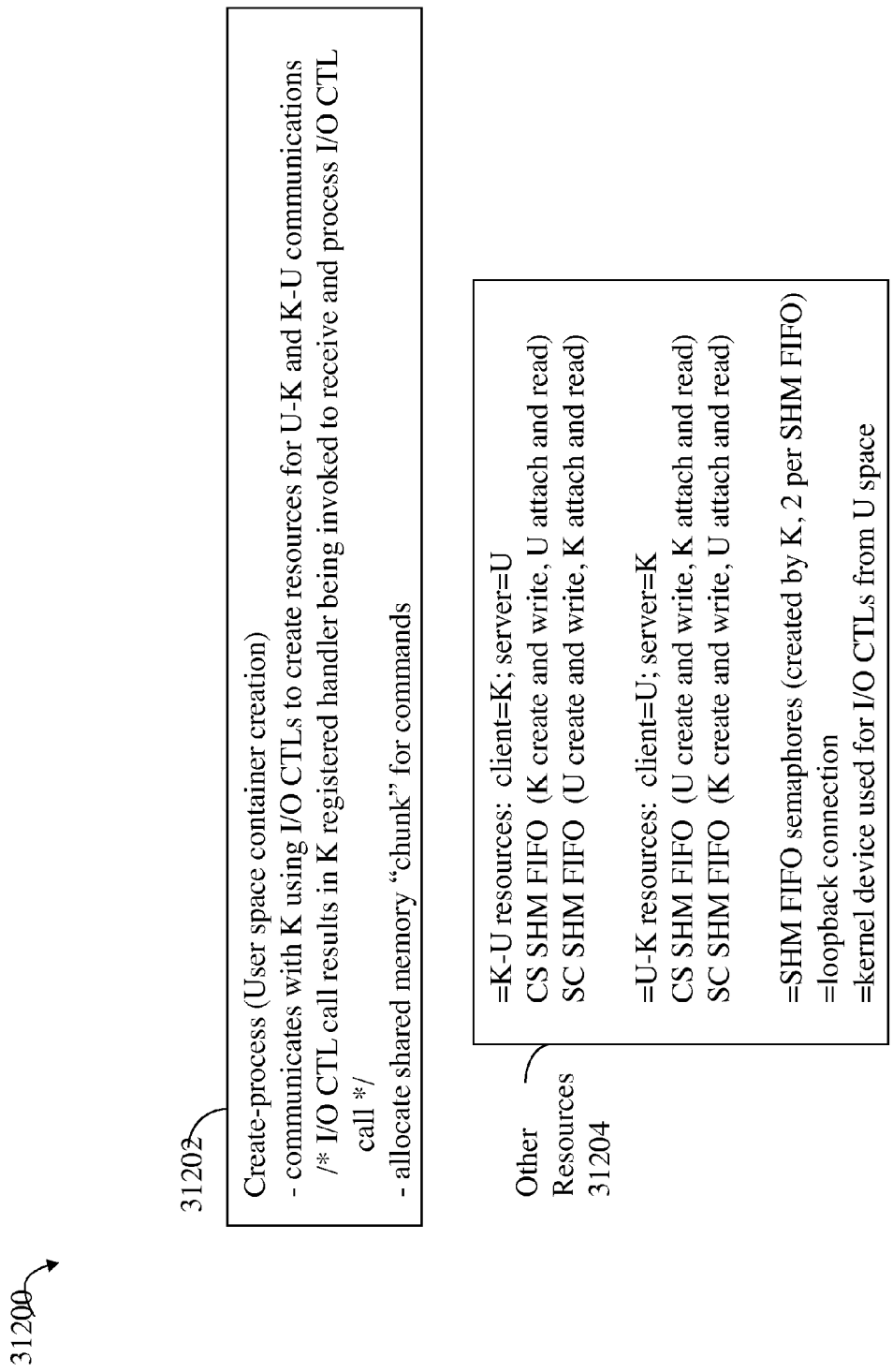
FIGS. 53A, 53B, 53C, 53D and 53E are examples illustrating in more detail processing steps that may be performed in connection with the U-K case in an embodiment.

Referring to FIG. 53A, shown is an example illustrating processing that may be performed to establish the resources used for U-K and K-U communications in an embodiment using the techniques herein. The example 31200 illustrates processing described above. Element 31202 represents steps that may be performed by API code, such as code for creating a user-space process. Code 31202 executing in user space may communicate with the kernel using I/O CTLs resulting in the kernel handler being invoked to receive and process the I/O CTL call. The exchange with the kernel as initiated by the user-space code of 31202 results in establishing the resources needed for K-U and U-K communications. Elements 31202 and 31204 summarize resources that may be established for use in connection with K-U and U-K communications.

It should be noted that, although not explicitly stated in connection with the U-K and K-U communications, an embodiment may also create and use threads to read received messages on the different SHM FIFOs as described herein in connection U-U communications.

Logical processing steps that may be performed by API code for the U-K and K-U cases has many similarities to that as described above in connection with the U-U case with variations to utilize the different resources for inter-module communications. The U-K case will now be described in more detail.

Figure 53B:
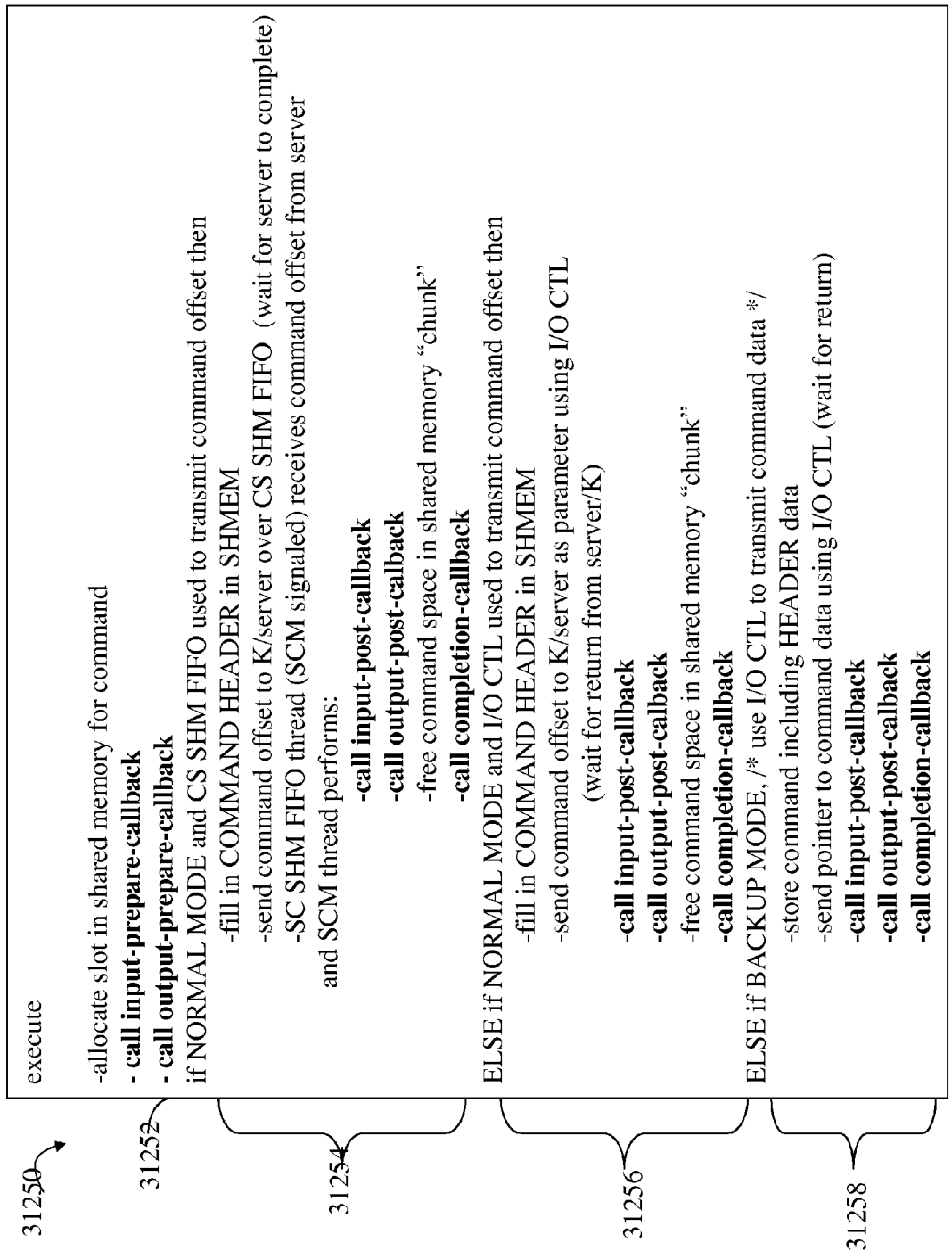

Referring to FIG. 53B, shown is an example illustrating logical processing that may be performed by code of the execute API for the U-K case. Element 31252 represents logical processing steps as may be performed by client-side API code executing in user space. Processing may initially allocate a command slot in the shared memory to hold the command data and invoke the input-prepare and output-prepare callbacks. Element 31254 includes steps that may be performed for processing commands in a normal mode in which the command data is stored in shared memory and the command offset or location in shared memory is communicated using the CS and SC SHM FIFOs. Element 31256 includes steps that may be performed for processing commands in a normal mode in which the command data is stored in shared memory and the command offset or location in shared memory is communicated using the I/O CTL calls. Element 31258 includes steps that may be performed for processing commands in a backup mode using the backup path of I/O CTL calls for communicating command data.

In connection with the normal processing mode and using the SHM FIFOs, element 31254 processing includes filling in the command data portion in shared memory (including the command header), sending the command offset to the server over the CS SHM FIFO, and waiting for the server to return control to the client by sending a message to the client over the SHM FIFO. The user space thread (referred to as SCM in the example 31250) may be signaled to read the command offset message received on the SC SHM FIFO. The SCM or reader thread may retrieve the command data from shared memory, invoke input-post and output-post callbacks, free the command slot or area from shared memory, and invoke the completion callback.

In connection with the normal processing mode and using I/O CTL calls to transmit the command offset location in shared memory, element 31256 processing includes filling in the command data portion in shared memory (including the command header), sending the command offset to the server using an I/O CTL call, and waiting for the server to return control to the client. Subsequently, the execute API may perform the following inline: retrieve the command data from shared memory, invoke input-post and output-post callbacks, free the command slot or area from shared memory, and invoke the completion callback.

In connection with the backup command processing mode and using an I/O CTL call to communicate an address of the command data, element 31258 processing includes filling in the command data (including the command header) for transmission to the server at an address in user space, sending the user space location at which the command data is stored to the server as an I/O CTL parameter and waiting for the server to return control to the client. Subsequently, the input-post, output-post, and completion callbacks are invoked.

Figure 53C:
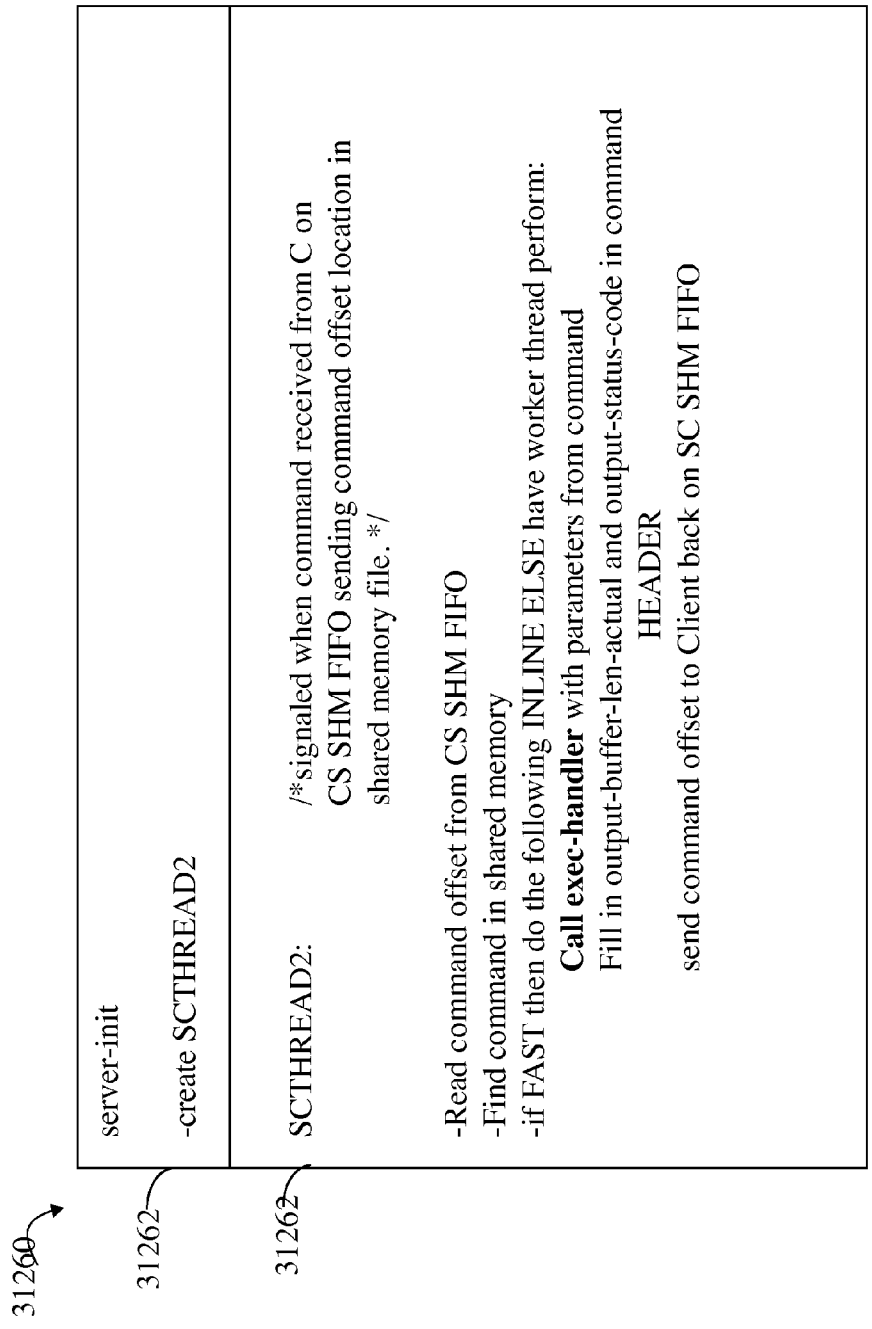

Referring to FIG. 53C, shown is an example illustrating logical processing that may be performed by code of the server API for the U-K case. The example 31260 illustrates steps that may be performed in connection with normal command mode processing in which the SHM FIFOs are used to communicate command offsets or locations in shared memory between the client and server. Element 31262 represents logical processing steps as may be performed by server-side API code executing in kernel space for the server-init API to create the thread SCTHREAD2 having a code body that performs processing as indicated in 31262. SCTHREAD2 may be a thread created to monitor and read from the CS SHM FIFO as described elsewhere herein, for example, in connection with FIG. 49C for the U-U case.

Figure 53D:
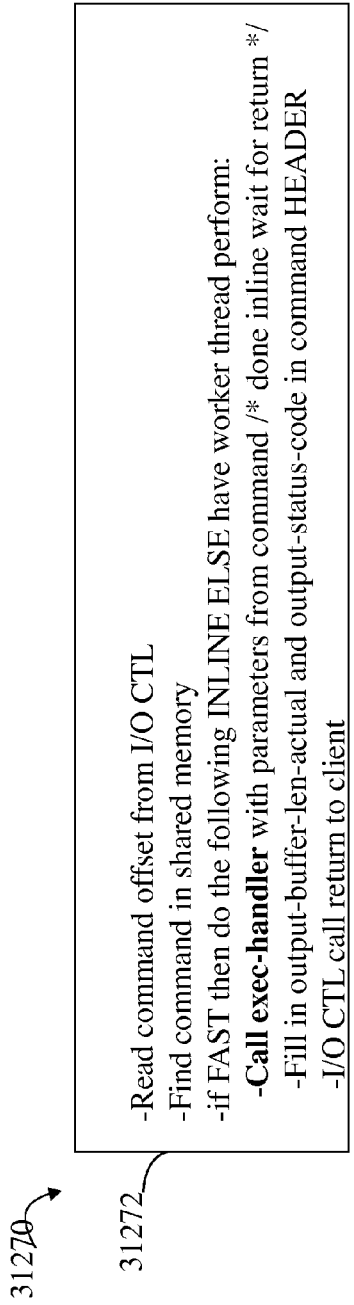

Referring to FIG. 53D, shown is an example illustrating logical processing that may be performed by code of the server API for the U-K case. The example 31270 illustrates steps that may be performed by the registered handler routine called to receive and process I/O CTLs issued from the user process to the kernel device as described above. Processing may include: reading the command offset from the I/O CTL parameter list, and finding and retrieving the command data in shared memory. The following is then performed either by the registered handler inline or by a worker thread: invoke exec-handler with appropriate parameters populated from the command data, filling in values for the output parameters, output-buffer-len-actual and output-status-code in the command header, and then returns from the I/O CTL call to the client. It should be noted that processing of the registered handler when the I/O CTL call is used as the backup communication path to transmit the address of the command data in user-space is similar to that as described in the example 31270. In this latter case, the kernel registered handler takes care of allocating any kernel space storage for the command data, copying the command data to and from user-space and kernel space, and then returning from the I/O CTL call to the client to signal that server processing of the command request has completed as described elsewhere herein.

Figure 53E:
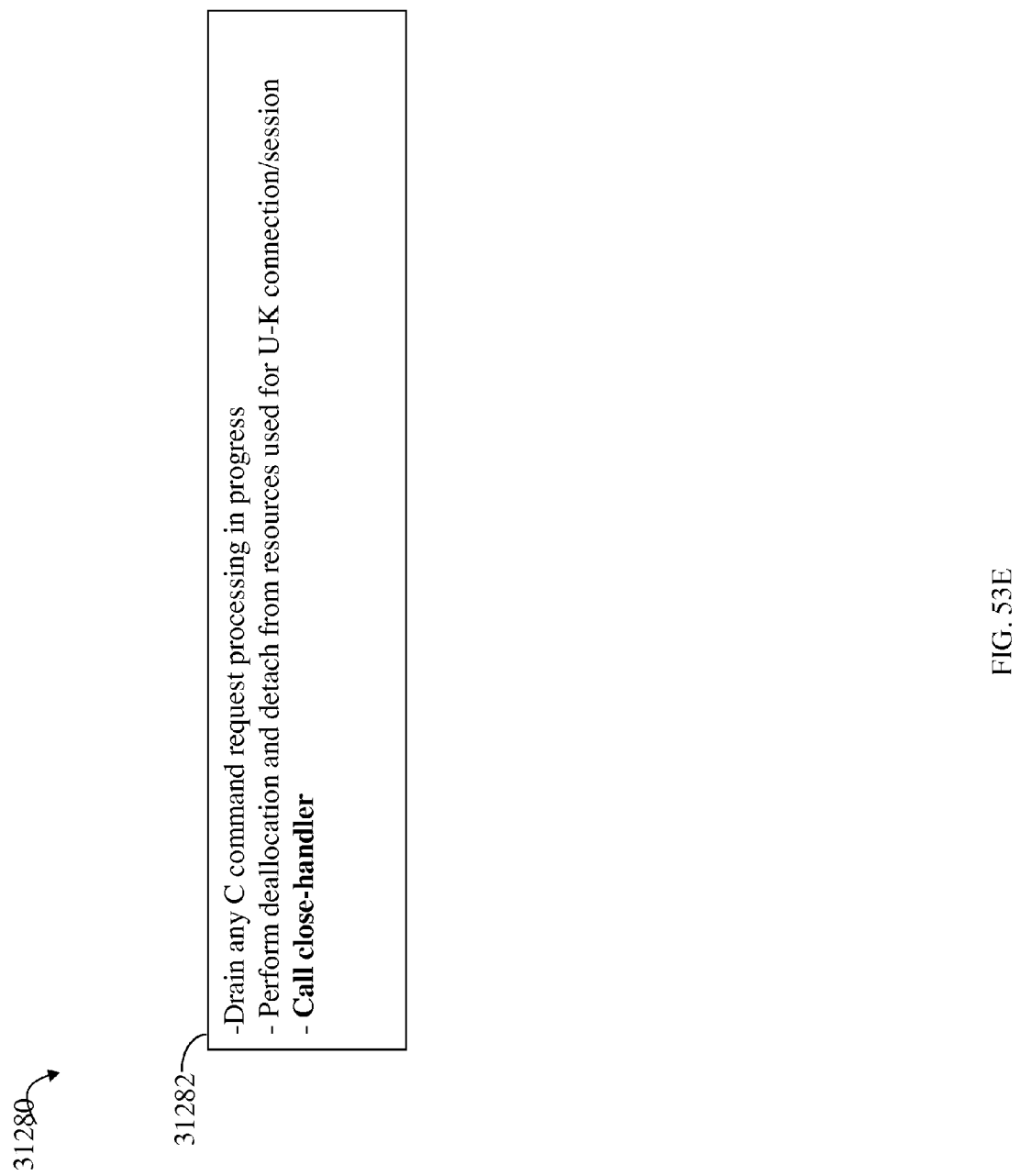

Referring to FIG. 53E, shown is an example illustrating logical processing that may be performed by code of the kernel server API for the U-K case as part of termination detection processing. Element 31282 represents logical processing that may be performed by a kernel registered handler invoked when the file descriptor of the kernel device used in connection with I/O CTL calls as described herein for U-K and K-U communications is closed. As described above, this may occur when the user process terminates or otherwise closes the kernel device. In response as indicated by 31282, the kernel API code may drain any outstanding or in-progress command requests, detach and deallocate any resources used for communications with the user process, and invoke the close-handler callback.

What will now be described is additional detail regarding the K-U case.

Figure 54A:
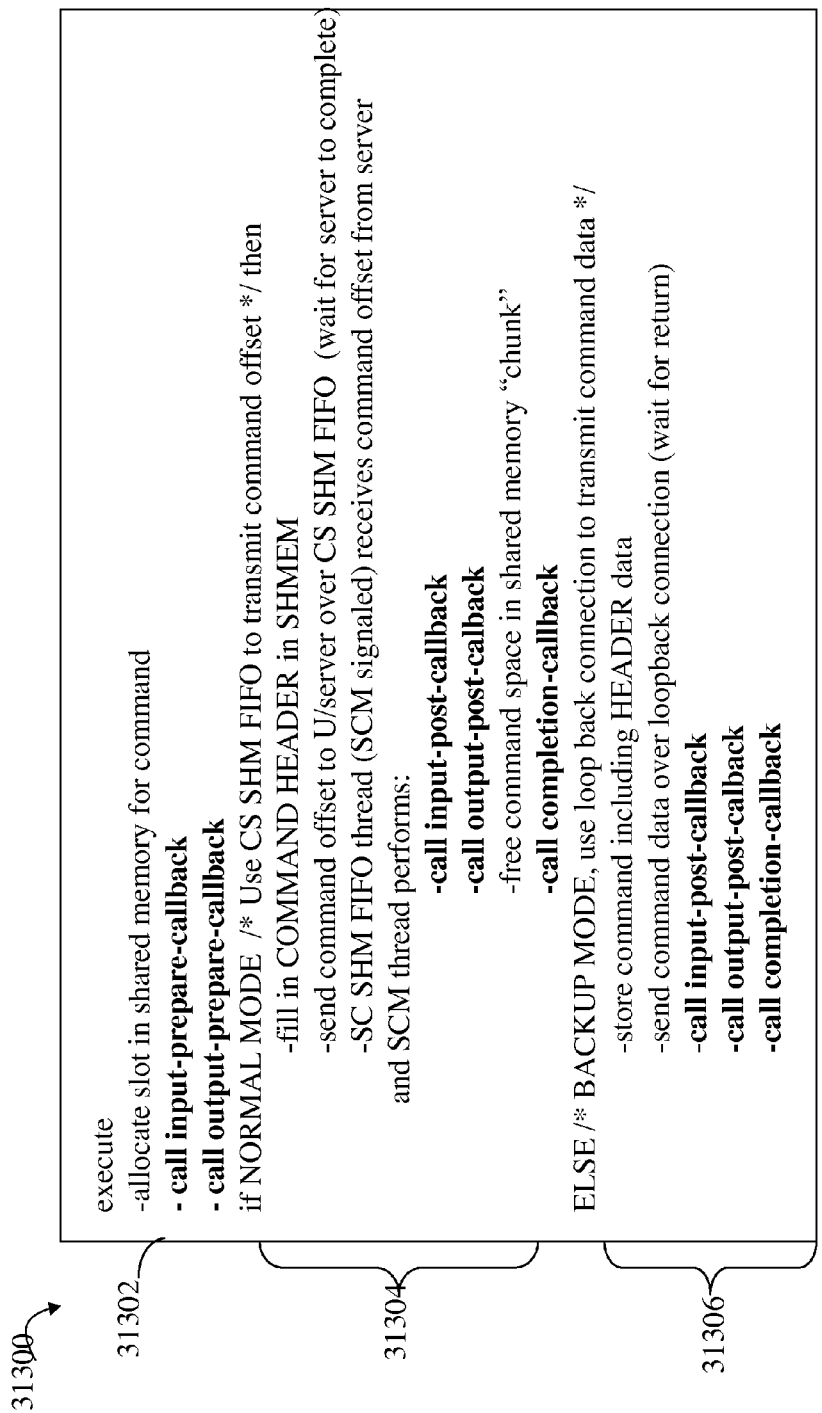
FIGS. 54A and 54B are examples illustrating in more detail processing steps that may be performed in connection with the K-U case in an embodiment.
Figure 54B:
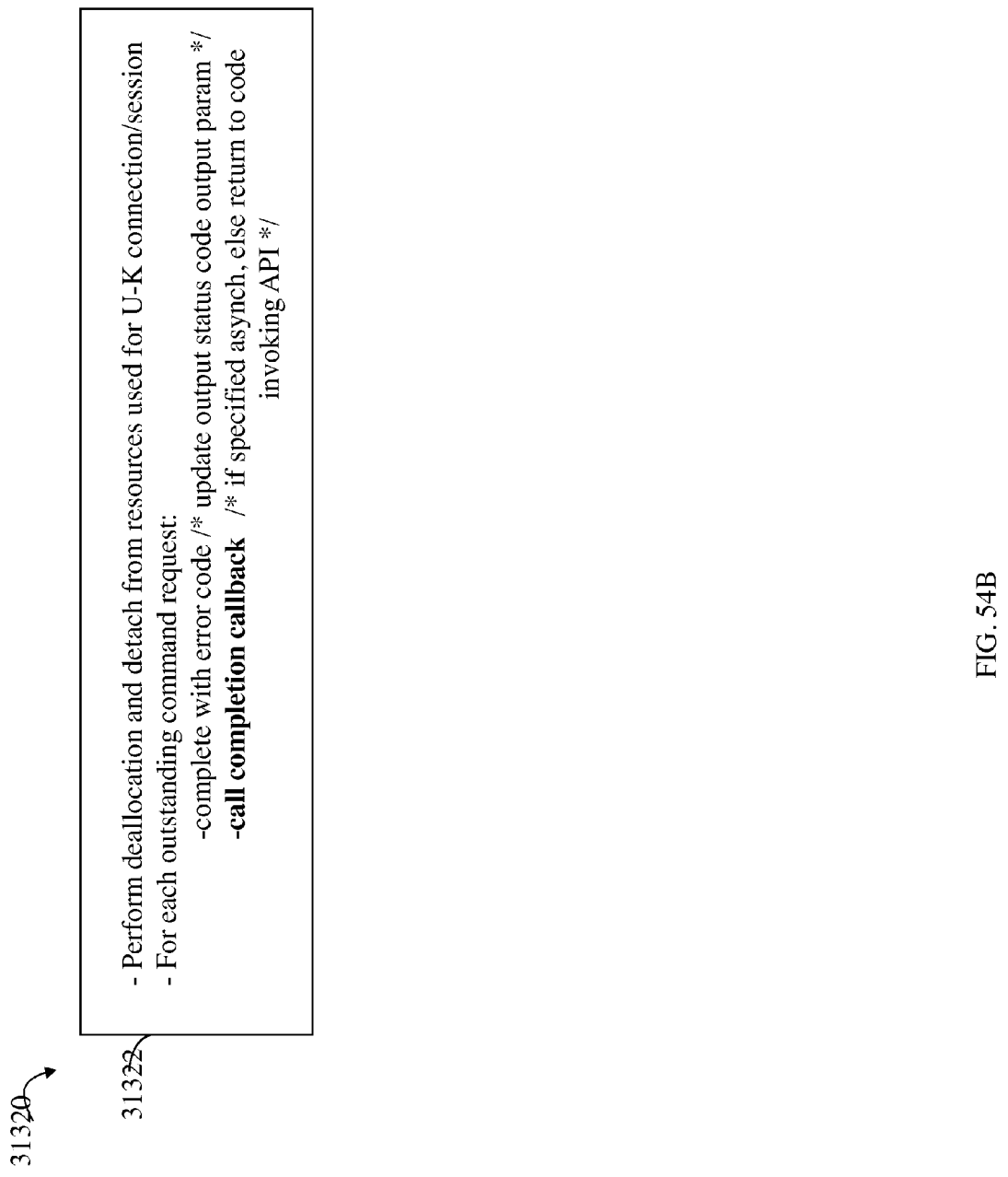

Referring to FIG. 54A, shown is an example illustrating logical processing that may be performed by code of the execute API for the K-U case. Element 31302 represents logical processing steps as may be performed by client-side API code executing in kernel space. Processing may initially allocate a command slot in the shared memory to hold the command data and invoke the input-prepare and output-prepare callbacks. Element 31304 includes steps that may be performed for processing commands in a normal mode in which the command data is stored in shared memory and the command offset or location in shared memory is communicated using the CS and SC SHM FIFOs. Element 31306 includes steps that may be performed for processing commands in a backup mode in which the backup path of the loopback connection is used for communicating command data.

In connection with normal command processing mode, element 31304 processing includes filling in the command header in shared memory, sending the command offset to the server using the CS SHM FIFO and waiting for the server to send a message using the SC SHM FIFO. Subsequently, the SCM thread monitoring the SC SHM FIFO invokes input-post and output-post callbacks, frees the command slot or location for the command data in shared memory for use with other commands, and invokes the completion-callback.

In connection with backup command processing mode, element 31306 processing includes preparing the command data, including the command header, transmitting the command data to the server over the loopback connection and waiting inline for the server to return command processing results (e.g., as may be included in the output data area of the command). Subsequently, the after control has returned from the server, the input-post, output-post and completion callbacks are invoked.

Referring to Figure MB, shown is an example illustrating logical processing that may be performed by code of the server API for the K-U case as part of termination detection processing. Element 31322 represents logical processing that may be performed by a kernel registered handler invoked when the file descriptor of the kernel device used in connection with I/O CTL calls as described herein for U-K and K-U communications is closed. As described above, this may occur when the user process terminates or otherwise closes the kernel device. In response as indicated by 31322, the kernel API code may detach and deallocate any resources used for communications with the user process. Additionally, for each outstanding command request, any return or output parameters may be appropriately set to indicate an error condition or improper termination status (e.g., updating the output-status-code accordingly). For each asynchronous outstanding execute call, the completion-callback is invoked. For each synchronous outstanding execute call, control may be returned to the invoking code.

In connection with K-U communications, the server executing in user space may include code similar to that as described in connection with FIG. 53C to read incoming command offsets from the client. When executing in backup mode, both the client and server may include code to prepare, and send and receive command data over the loopback connection as described above. For example, the client may include code for forming and sending command data over the TCP/IP loopback connection to the server. The client may block or wait until a response is received over the loopback connection from the server. The server may include a thread which is signaled to read incoming command data sent over the loopback connection from the client. The thread may also prepare and transmit command data from the server to the client after the server has processed a command. The logic is similar to that as described above in connection with other cases except that the loopback connection is used to transmit the command data rather than, for example, the pipe as with the U-U case.

It should be noted that as described above, the K-U and U-K cases may use the I/O CTL mechanism for termination detection using a first registered handler or routine which is notified and invoked when the kernel device is closed as occurs upon user process termination. In connection with the U-K case when the user-space client issues a command request to the kernel-space server, the client issues an I/O CTL call or system call to the kernel device. A second registered kernel handler or routine is notified and invoked in response to the call. The second registered routine processes the command request and then returns to the client. The client is notified regarding completion of server processing as a result of the second registered routine returning to the client from the I/O CTL or system call.

As will be described in following paragraphs in accordance with techniques herein, an RPC interface is defined and includes a server interface whereby a first container, acting as a server, exports, exposes, registers, or otherwise publishes a named function or routine that may be called from a second container. The RPC interface also includes a client interface that may be used by the second container, acting as a client, in connection with issuing requests or commands to the first container to execute a registered RPC of the server container.

Referring to FIG. 55, shown is an example of a server-side API that may be used in connection with techniques herein for RPCs. Element 4310 includes a first API that may be invoked by a server to register a named function or routine. Element 4320 includes a second API that may be invoked by a server to unregister a named function or routine. By unregistering an RPC, the RPC is removed from the list of registered RPC routines which can be invoked by a client. In other words, a server unregistering an RPC is no longer providing remotely accessible services via the RPC call. Element 4310 includes the first API call, rpc_register, that includes a first parameter, &rpc_object, which identifies the RPC object used to track information for the RPC. Rpc_includes a second parameter, rpc_function, which identifies the name of the function being registered. Rpc_function may be a string. The RPC object identified by the first parameter, &rpc_object, may include information about the named registered RPC such as the address of the routine or function invoked. An example of an RPC object that may be used in an embodiment is described in more detail in following paragraphs.

The rpc_register API of 4310 provides for registering an RPC having the name of the rpc_function parameter. Thus, a calling module specifies invocation of an RPC using the name of the rpc_function parameter. Additionally, an embodiment may also use the rpc_function parameter to identify the routine or body of code which is invoked as a result of the RPC. As an alternative, an embodiment may use two parameters rather than a single rpc_function parameter—a first to specify the name by which an RPC is registered and used by a calling routine, and a second to specify the name of the called routine within a code module to which control is transferred as a result of an RPC invocation. For example, a first container may register an RPC having the name "FUNC1" so that a calling container may use this name when issuing a remote procedure call. The first container may provide a routine "FUNC1_CODE( )" to which control is transferred as a result of invoking the RPC FUNC1.

Each container may have a list of one or more registered RPCs. A container may remove a registered RPC from its list of registered RPCs using the unregister API as illustrated in 4320. The unregister API takes a single input parameter, &rpc_object, which is an RPC object of a previously registered RPC. The list of registered RPCs may be maintained in the context of the server container and its address space.

Referring to FIG. 56, shown is an example of a client-side API that may be used in connection with techniques herein for RPCs. The example 4350 includes three APIs described in more detail below. Element 4360 describes rpc_call SLOW. Element 4370 describes rpc_, Element 4380 describes rpc_call FAST. Elements 4360 and 4380 illustrate two different APIs for two different versions of remote procedure calls that may be in used in an embodiment in accordance with techniques herein. Each invocation of 4360 and 4380 may be a request to a server container to perform the requested RPC. Element 4370 may be characterized as an ancillary function that may be used in an embodiment in connection with the API of 4380 as described below. Element 4360 describing the rpc_call SLOW API includes the following parameters:

ic_id—identifying the remote container or server container including the RPC being invoked;

NAME—string identifying the RPC name in the server being called;

input_args—optional one or more RPC input arguments or parameters;

output_args—optional one or more RPC output arguments or parameters;

&rpc_status_rv—return value indicating the status of the RPC call.

A client may issue an rpc_call SLOW to request that the server perform processing associated with the registered RPC. The NAME parameter identifies a previously registered RPC by the server container identified by the parameter ic_id. Input_args and output_args, respectively, are the input and output parameters for the RPC. As will be described in more detail below, the rpc_call SLOW may be characterized as less efficient in terms of performance than the techniques used in implementing the rpc_call FAST, for example, when performing multiple RPC calls to the same RPC.

The rpc_lookup API and rpc_call FAST may be used together as an alternative to using the rpc_call SLOW to issue an RPC for a previously registered RPC. A client may first invoke the rpc_lookup API for an RPC that has been registered by a server container. Rpc_lookup may include the following parameters as illustrated by element 4370:

ic_id—identifying the remote container or server container including the RPC being invoked;

rpc_name—string identifying the RPC name in the server being called;

&rpc_remote_addr_rv—return value identifying the address of RPC object in the remote server container exporting the RPC; and &state_id_rv—current global RPC state id for the remote server container.

The first and second parameters, ic_id and rpc_name, are respectively similar to the first and second parameters of rpc_slow as described above. The third and fourth parameters are return values. Rpc_lookup issues a request from the client to the server container (denoted by ic_id) to perform a lookup in the remote server container's list of registered RPCs. In particular, a determination is made as to whether the remote server container's list of registered RPCs includes an RPC object associated with a named function denoted by the second parameter, rpc_name. If so, a pointer to the RPC object in the remote container's registered RPC list is returned as the third parameter. Additionally, state_id_rv is returned representing an identifier characterizing the global state or configuration of the remote server container with respect to its RPC configuration. If any RPC is unregistered from the remote container, the state_id value is accordingly modified to reflect this change. It should be noted that the embodiment described herein does not modify the state_id of the container if a new RPC is registered since such events may not be characterized as events of interest with respect to the RPC configuration and use of the state_id. The combination of the rpc_lookup and rpc_call FAST may be characterized as providing an optimized technique for performing remote procedure calls or requests issued from the client to the server. As such with this optimized technique as will be described in more detail below, the state_id value may be used to detect RPC configuration changes affecting the use of the optimized technique and may be used in connection with alerting a client to take an action in response.

As illustrated by element 4380, rpc_call FAST may include the following parameters:

ic_id—identifying the remote container or server container including the RPC being invoked;

state_id—current global RPC state id for the remote server container;

rpc_remote_addr—value identifying the address of RPC object in the remote server container exporting the RPC;

input_args—optional one or more RPC input arguments or parameters;

output_args—optional one or more RPC output arguments or parameters;

&rpc_status_rv—return value indicating the status of the RPC call.

The parameters ic_id, input_args, output_args, and &rpc_status_rv are as described above in connection with rpc_call SLOW. The parameters state_id and rpc_remote_addr are as returned from a previous call to rpc_lookup. It should be noted that the rpc_call SLOW includes a second parameter NAME identifying the RPC by a named-string rather than the second and third parameters of the rpc_call FAST used to identify the RPC being invoked.

As described in more detail below, the rpc_call SLOW may perform a lookup in the server RPC's registered RPC list with each invocation prior to invoking the RPC. In contrast, these two operations of lookup and invoking the RPC are partitioned in accordance with a second technique for performing remote procedure calls using rpc_lookup and rpc_call FAST. With this latter technique, a client may perform a lookup in the remote server's registered RPC list to obtain the RPC object corresponding to the desired RPC to be invoked at a subsequent point in time. The client may cache this pointer to the RPC object identifying the registered RPC and utilize this cached pointer multiple times for subsequent multiple invocations of the RPC code in the server. The parameter state_id_rv returned from the rpc_lookup call may be passed to the server when the client issues an RPC request (via a subsequent rpc_call FAST invocation) as a way for the server to validate the remote_rpc_addr parameter. If an RPC configuration state change has occurred which could possibly affect the validity of the remote_rpc_addr parameter value, then the server does not use the remote_rpc_addr parameter value passed to it by the client (in the current rpc_call FAST invocation). Rather, the server accordingly alerts the client to perform another lookup using rpc_lookup and refresh its cached value of remote_rpc_addr. The more recent value of remote_rpc_addr may then be used by the client in subsequent calls. Thus, using the combination of rpc_lookup and rpc_call FAST provides for an optimized way of performing RPCs in contrast to using rpc_call SLOW which performs lookup processing with each invocation. In other words, using the optimized technique with rpc_lookup and rpc_call FAST, the client can perform lookup processing on the server once, cache the returned remote_rpc_addr, and reuse the remote_rpc_addr parameter identifying the RPC and code thereof. The remote_rpc_addr parameter may be used in connection with multiple subsequent RPC calls rather than perform lookup processing each time to identify the desired RPC object. The state_id parameter returned from the rpc_lookup API call may also be cached and passed to the server with each rpc_call FAST invocation for use by the server in validation and detection of server RPC configuration changes. The foregoing is described in more detail below.

It should be noted that each of the three APIs of FIG. 56 result in a request being issued to the identifier server to perform processing. The rpc_lookup API issues a remote request to the server to obtain information regarding a particular registered RPC. The information from the rpc_lookup may be used to facilitate one or more subsequent processing requests for additional remotely performed services by the registered RPC code of the server.

Figure 57:
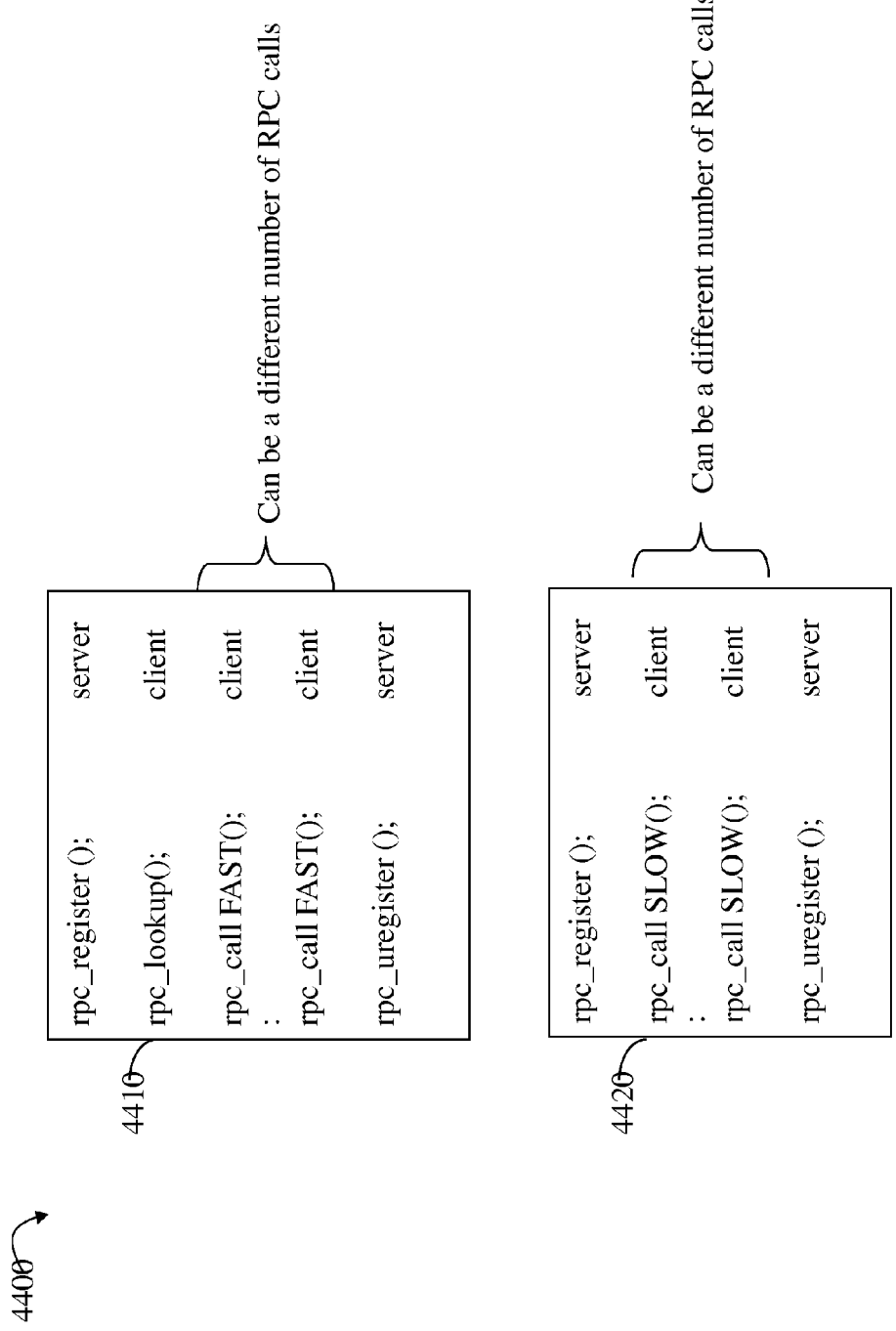
FIG. 57 is an example illustrating a call ordering of API calls in an embodiment in connection with techniques herein.

Referring to FIG. 57, shown is an example illustrating a possible ordering of API calls within an embodiment in connection with a same registered RPC. Element 4410 illustrates a first possible ordering of API calls in connection with a registered RPC where the client utilizes the optimized technique involving the rpc_lookup and rpc_call FAST server APIs. It should be noted that a single rpc_lookup is performed and that one or more rpc_call FAST API invocations for the same registered RPC may be performed using the information regarding the registered RPC returned via the rpc_lookup. Element 4420 illustrates a second possible ordering of API calls in connection with a registered RPC where the client utilizes the unoptimized technique involving the rpc_call SLOW server API.

In an embodiment in which the RPC facility is built on top of, and utilizes, the lower level intermodule communication mechanism and technique to facilitate inter-module communication between two code modules in different containers as described in the '759 and '822 patent applications, communications from the client container to the server container may form a command path including a request path from the client to the server to issue a request and a return path from the server back to the client. The command path may be characterized as a runtime path or call chain between the client and server. The call chain may include multiple invocation layers of routines including user code and one or more API routines of the intermodule communication techniques and RPC facility as described herein. It should be noted that one or more layers may be included in the command path and associated call chain above the RPC facility layer (e.g., where another user code module makes calls to API code using the RPC client-side API of FIG. 56).

Figure 57A:
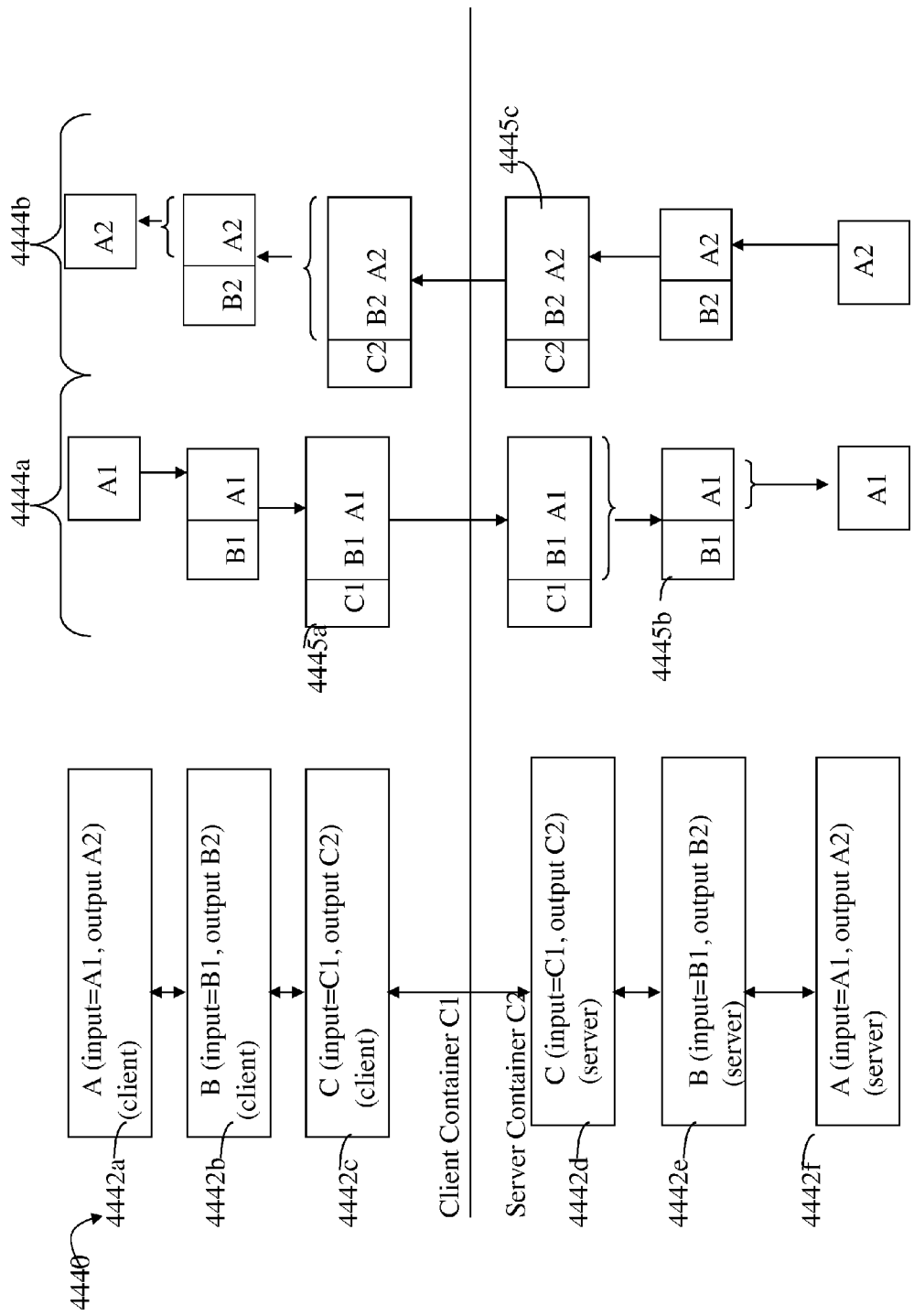
FIG. 57A is an example illustrating different layers in a call chain and command path in an embodiment in connection with techniques herein.

Referring to FIG. 57A, shown is an example illustrating multiple invocation layers as may be included in a command path in accordance with techniques herein. The example 4440 illustrates container C1 which may be characterized as the client and container C2 which may be the server. At runtime, client C1 may have a runtime call chain of routines A, B and C where a call is made from routine A to routine B. Subsequently routine B makes a call to routine C. The call from routine A as illustrated by 4442*a* may be a request to the server container C2 to invoke a registered RPC of the container C2. As a result of the invocation instance 4422*a*, additional calls represented by 4442*b* and 4442*c* are also performed on the client side in connection with implementing this request directed to container C2 to perform the RPC. The additional calls may be included in the runtime call chain as part of processing to communicate with the server and request execution of a registered RPC. Furthermore, in connection with this initial invocation of 4442*a*, routines may be invoked on the server side as indicated by 4442*d*, 4442*e* and 4442*f*. It should be noted that the client and server may have parallel or symmetric calls included in the chain with the initial client call made at the highest client level corresponding to 4442*a*. With reference to the example 4440, levels on the client and server side, from highest to lowest, may be denoted by 4442*a*-4442*f*. Thus, A 4442*a* may denote the lowest level on the client side and A 4442*f* may denote the lowest level on the server side.

As a further example, routine A may be a user routine which performs a call using the rp_call FAST of the client side RPC API described in connection with FIG. 56. The rpc_call FAST API call results in executing code of the API which further includes additional API calls as specified in the intercontainer communications APIs as described in the '759 and '822 patent applications. For example, as will be described in more detail in following paragraphs, requests from the client to the server may be issued in connection with the rpc_call SLOW, rpc_lookup and rpc_call FAST client APIs using the appropriate intermodule communication techniques (that may vary with whether the client and server containers execute in user or kernel mode). Independent of whether the client and server are in user mode or kernel mode, the same API may be used for inter-container communication. As described in the '759 and '822 applications, an execute API call may be performed to issue requests from the client container to the server container for implementation of each of the client-side APIs of FIG. 56. Thus, the execute API may be an API call at a runtime level in the call chain lower than the RPC API call, for example, if the API code for rpc_call FAST further includes an execute API call. The user code invoking the rpc_call FAST API code may be at a level above the RPC API code. Thus, an exemplary call chain from highest to lowest may be user code-RPC API code-execute API code. A reciprocal or parallel set of calls in the chain (such as denoted by 4442*d*, 4442*e* and 4442*f*) may exist on the server side in connection with performing the requested registered RPC identified in the rpc_call FAST invocation. For example, a client side execute API call may result in issuing a command request to the server container C2 causing execution of an exec-handler callback routine. Subsequently, this exec-handler on the server side may invoke the requested registered RPC of the server.

Element 4444*a* may represent the input parameters passed down the call chain from client to server in connection with performing an RPC. The information communicated from the client container to the server container at the lowest client side level represents an aggregation of collected input data to that point in the call chain. It is this collected aggregation of data 4445*a* from all the above levels in the client-side call chain which is passed to the server container for processing. A layer in the call chain may only have knowledge of its input and output parameters. A routine which is invoked in the call chain on the client side may add its input parameters to the set of other input parameters from layers higher up in the call chain. In one embodiment, an invoked routine may allocate storage for its input parameters and also for input parameter information passed to it from any layers above. The invoked routine may copy its input parameter information and other input parameter information from the above layers into the allocated storage, and then pass this to any lower level in the call chain. The foregoing may be performed at each layer in the call chain by an invoked routine until the bottom layer on the client side (e.g. 4442*c*) is reached which communicates the input parameters to the server. In this example, each layer in the server side may remove and use a portion of the input parameters as produced by its corresponding client-side layer. For example, client side routine B passes input parameter B1 to the server for use by the corresponding server side routine B. On the server side, the server-side routine B receives input parameter data as represented by 4445*b*, removes and uses B1, and passes the remaining set of input parameter data (including only A1 in this case) further down the call chain for use by other corresponding layers.

Element 4444*b* may represent the output parameters which are populated by the server without output data and passed up the call chain from server to the client after performing an RPC. The output parameters may be passed along the return path up the call chain as denoted from 4442*f*, 4442*e*, 4442*d*, 4442*c*, 4442*b* to 4442*a*. In a manner similar to that as described above for constructing and passing input parameter data, output parameter data may be aggregated for the various levels in the call chain along the return path so that 4445*c* may represent the collected aggregated output data from the server return path of the call chain which is communicated to the client. On the client side, each layer of the call chain in the return path may remove its output data as produced by the corresponding server side, and pass the remaining output data up the call chain until the point of origination (highest level in the call chain) is reached.

A technique that may be used in an embodiment in connection with passing input and output parameters among the various layers, for example, for use with performing remote procedure calls is described elsewhere herein. In such a technique, each layer in the hierarchy may perform processing for its input data and descriptors and also for its output data and output descriptors describing output or return data values.

Figure 58:
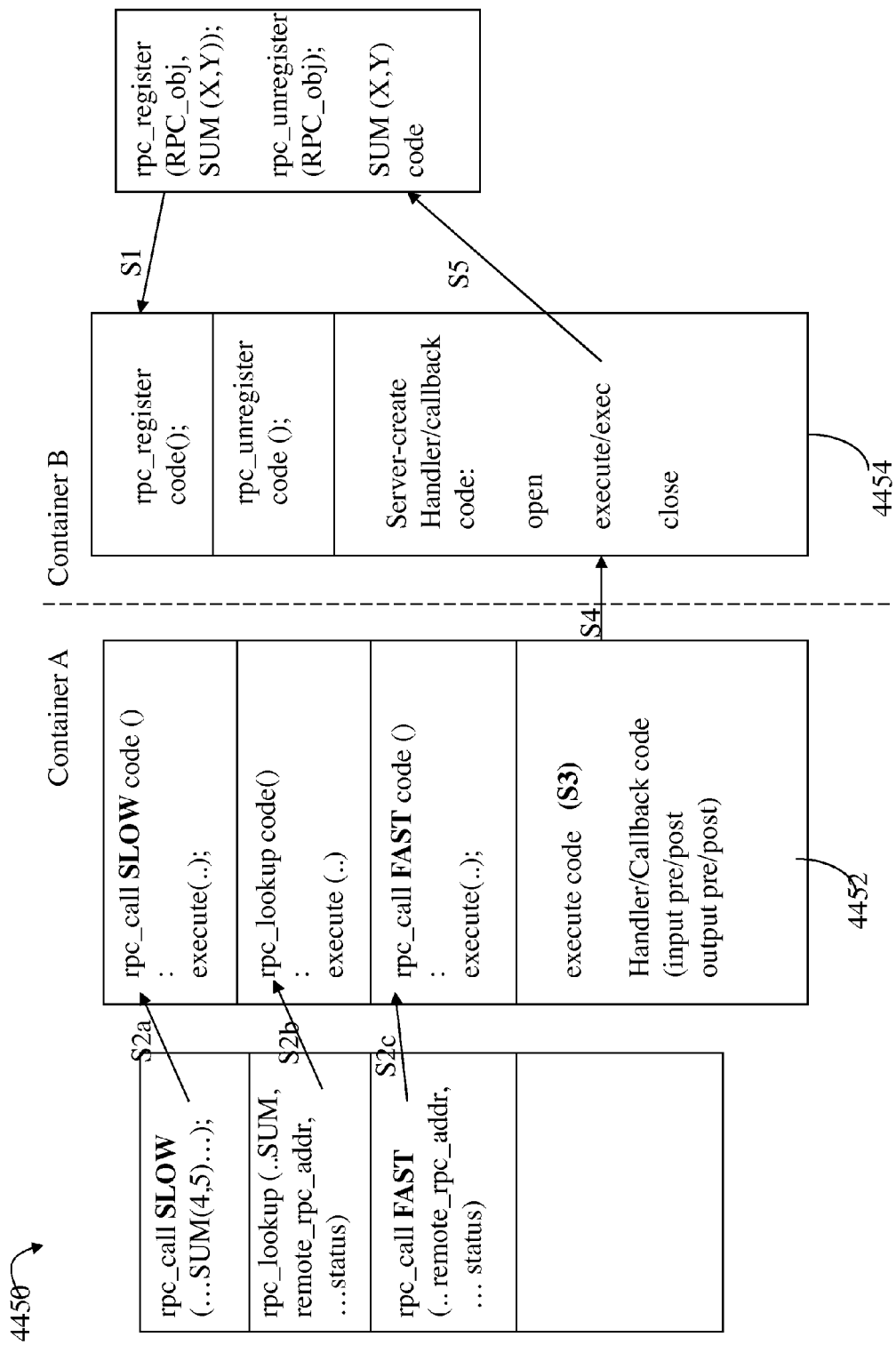
FIG. 58 is an example illustrating transfer of control in connection with illustrating use of the techniques herein in an embodiment.

Referring to FIG. 58, shown is an example illustrating interactions between different code modules and containers in connection with the techniques described herein for performing RPCs. The example 4450 includes container A which may be a client container and container B which may be a server container. Although not illustrated in FIG. 58, it should be noted that a single container may function as both a client and a server in connection with techniques herein. Elements 4452 and 4454 may represent code modules invoked as a result of performing an API call using the APIs of FIGS. 55 and 56. Elements 4452 and 4454 may also include additional API code that may be invoked in connection with performing intermodule communications between containers.

The example 4450 illustrates different execution flows and corresponding portions of code that may be invoked in connection with performing techniques herein. As a first step S1, container B may issue an rpc_register API call resulting in transfer of control to the rpc_register API code. The API code for rpc_register performs processing to register the RPC SUM. Additional details regarding processing performed by the APIs of FIGS. 55 and 56 are described below. Once the RPC SUM is registered, a client may subsequently issue requests in the form of RPCs to have the server container B execute the routine or code associated with the registered RPC SUM. In one embodiment in which the rpc_call SLOW technique is used, container A may issue a corresponding API call as illustrated by step S2a resulting in transfer of control to the rpc_call SLOW API code which then invokes the execute API code as illustrated by S3. In connection with intermodule communication techniques that may be used to implement the client-side API of FIG. 56, the execute client-side API and associated callbacks or handlers (e.g., input prepare, input post, output prepare, output post, and the like), and the server-create server side API and associated callbacks or handlers (e.g., open handler, exec or execute handler, and the like), are described in the 759 and '822 patent applications. The rpc_call SLOW API call to perform the SUM registered RPC may result in a request being sent from container A to container B as illustrated by S4. The transfer illustrated by S4 may be implemented using the appropriate intermodule communication technique as may be used by an embodiment of the execute API code (S3). As illustrated by S4, the request being issued by the client container A results in a transfer of control to the exec-handler API code of the server container B. The exec-handler API code of container B then transfers control to the code associated with the requested registered RPC SUM as illustrated by S5. When the RPC SUM has completed processing, control returns along the same path as just described until the point of origination or invocation of S2a.

What will now be described are other command paths that may be followed in an embodiment in which the rpc_call FAST technique is used rather than the technique associated with the rpc_call SLOW API call. Subsequent to registering SUM on the server side as illustrated by S1, container A may issue a corresponding API call as illustrated by step S2b to perform an rpc_lookup and obtain information identifying the RPC object in the server. Executing the rpc_lookup API call as illustrated by S2b results in a transfer of control to the rpc_lookup API code which then invokes the execute API code as illustrated by S3. The rpc_lookup API call to retrieve the information (e.g., pointer to RPC object used by the server) identifying the registered RPC may result in a request being sent from container A to container B as illustrated by S4. The transfer illustrated by S4 may be implemented using the appropriate intermodule communication technique as may be used by an embodiment of the execute API code (S3). As illustrated by S4, the request issued by the client container A results in a transfer of control to the exec-handler API code of the server container B. The exec-handler API code may perform processing to obtain the requested information regarding the registered RPC SUM, and then control returns along the same path as just described until the point of origination or invocation. Container A may then perform an rpc_call FAST API call as illustrated by step S2c resulting in transfer of control to the rpc_call FAST API code which then invokes the execute API code as illustrated by S3. The rpc_call FAST API call to perform the SUM registered RPC may result in a request being sent from container A to container B as illustrated by S4. The transfer illustrated by S4 may be implemented using the appropriate intermodule communication technique as may be used by an embodiment of the execute API code (S3). As illustrated by S4, the request being issued by the client container A results in a transfer of control to the exec-handler API code of the server container B. The exec-handler API code of container B then transfers control to the code associated with the requested registered RPC SUM as illustrated by S5. When the RPC SUM has completed processing, control returns along the same path as just described until the point of origination or invocation (point of invocation associated with S2c).

It should be noted that as illustrated in FIG. 57A, there may be one or more layers above on the client side than as illustrated which utilize the RPC API and techniques as described herein.

It should be noted that processing performed by code of the server side APIs of FIG. 55 may not require communicating with another container. In an embodiment in accordance with techniques herein, processing performed in connection with implementing the client side APIs of FIG. 56 may result in issuing an inter-container request, such as to the server container.

What will now be described are logical processing steps that may be performed by an embodiment in connection with the techniques herein for the different APIs illustrated in FIGS. 55 and 56.

Figure 59:
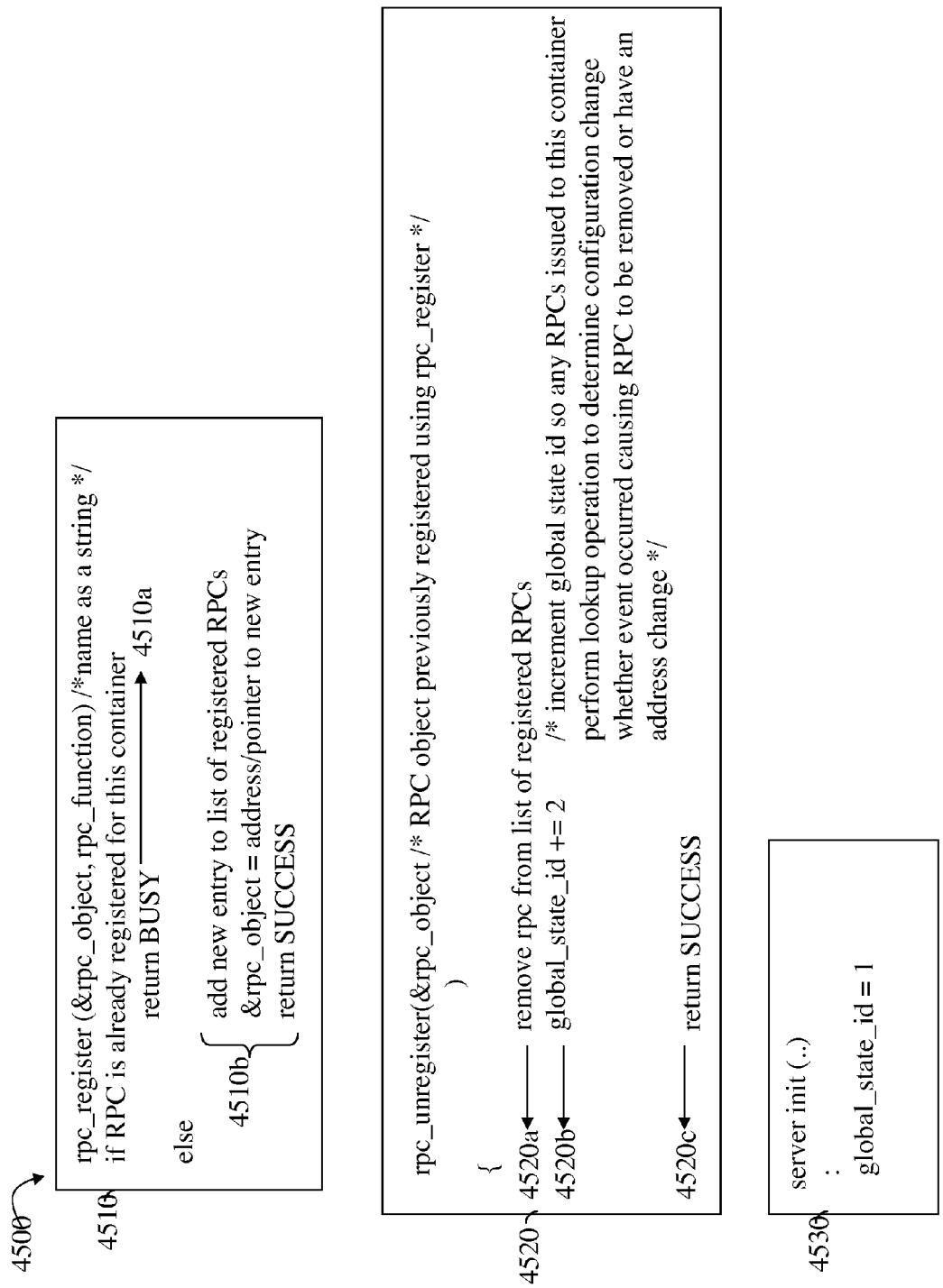

Referring to FIG. 59, shown is an example illustrating logical processing that may be performed by code on the server in connection with the RPC facility and techniques herein. Element 4510 represents processing that may be performed by API code for the rpc_register routine to register an RPC. In one embodiment, the server may maintain a list of RPC objects corresponding to registered RPCs. As indicated in 4510, when a request is made to register an RPC, the server checks to see whether the RPC is already registered. If so, at step 4510a an appropriate status is returned. Otherwise as indicated by 4510b, processing is performed to add a new RPC object as a new entry to the list of registered RPCs. The RPC object may be initialized to include information for the particular RPC. For example, the RPC object may include a record or field in which a string corresponding to the function name (as passed in by parameter rpc_function) is stored. The RPC object may include a record or field for storing the address of the routine or body of code for the RPC. Control is transferred to this address in order to perform the registered RPC as may be requested by a client. Once the RPC object has been created, initialized and placed on the list of registered RPC objects for the server, a status of success may be returned.

Element 4520 represents processing that may be performed in connection with the rpc_unregister API. At step 4520a, the RPC is removed from the list of registered RPCs by removing the RPC object representing the RPC being unregistered. At step 4520b, the variable global state_id is incremented by 2 to indicate or record an RPC configuration change. As described in connection with other processing, the global_state$_{13}$ id may be used to detect changes in RPC configuration which may affect the validity of the information cached by the client returned as a result of the rpc_lookup API call for use in performing subsequent RPC calls using the API described herein. At step 4520c, success is returned.

It should be noted that although the global_state_id variable is incremented by 2 to indicate an RPC configuration change being tracked, an embodiment may also use other techniques to indicate and track desired changes. For example, an embodiment may increment the variable by an amount other than 2. Generally, an embodiment may use a technique where each unregister event results in a different or unique value reflecting this RPC configuration state change.

In connection with techniques described herein, a server container may be characterized as having a remote procedure call configuration that may vary at different points in time, for example, depending on what RPCs are registered. The server container may maintain remote procedure call configuration information describing its current remote procedure call configuration state. The global state identifier may be included in remote procedure call configuration information for a container which characterizes its current remote procedure call configuration state. More generally, remote procedure call configuration information may also include other information related to the remote procedure call configuration of a server container such as what RPCs are registered and information about a registered RPC such as, for example, a pointer to an RPC object, an address of a routine corresponding to code or a routine for a registered RPC, and the like. The RPC object described herein may be more generally referred to as a remote procedure call descriptor describing an instance of an RPC object for a registered RPC.

Element 4530 indicates processing performed as part of the server init API code. The server init API is described in 'the 759 and '822 applications. Part of the processing performed by the API code as indicated by element 4530 is initializing the variable global_state_id to 1.

Figure 60:
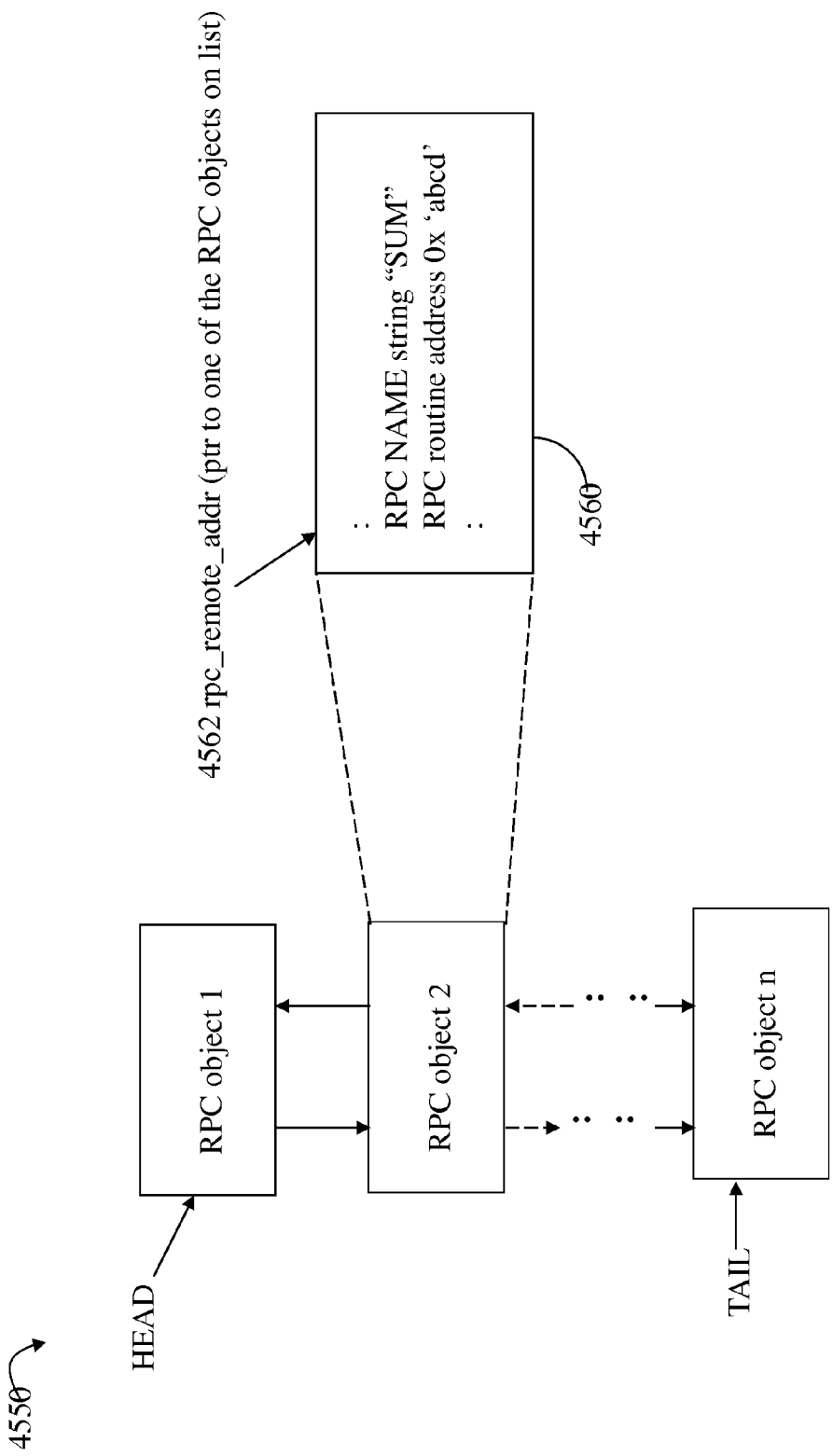
FIG. 60 is an example illustrating a list of registered RPC objects that may be maintained for each server in an embodiment in accordance with techniques herein.

Referring to FIG. 60, shown is an example illustrating a list of registered RPC objects that may be maintained for each server container. The example 4550 includes a list of RPC objects where there is an entry on the list for each RPC registered at a point in time for the server container. The list may be manipulated using pointers or other appropriate management techniques that may vary with how the list is implemented. In this example, the list may be implemented as doubly linked list although other data structures may also be used. Element 4560 illustrates in more detail records or fields that may be included in each RPC object. In this example, element 4560 may include a string identifying the name of the RPC, such as "SUM". The element 4560 may also identify the address of the routine which is invoked when a request is made to perform the RPC. An embodiment may include other information than as illustrated in FIG. 60.

At a point in time, the list illustrated in the example 4550 for a server container may be traversed to determine the currently registered RPCs for the server and also obtain information regarding the currently registered RPCs.

Figure 61:
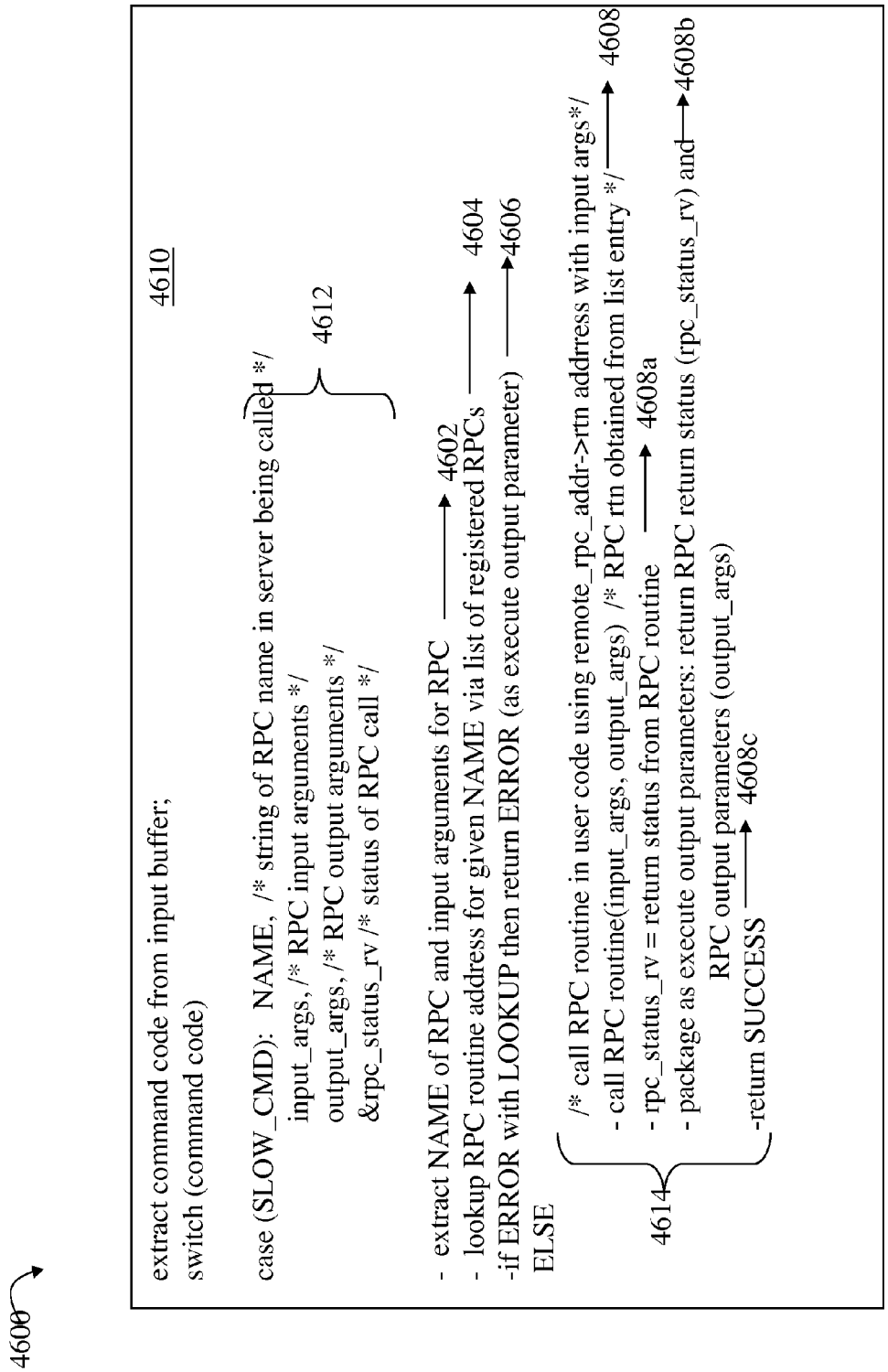
Figure 62:
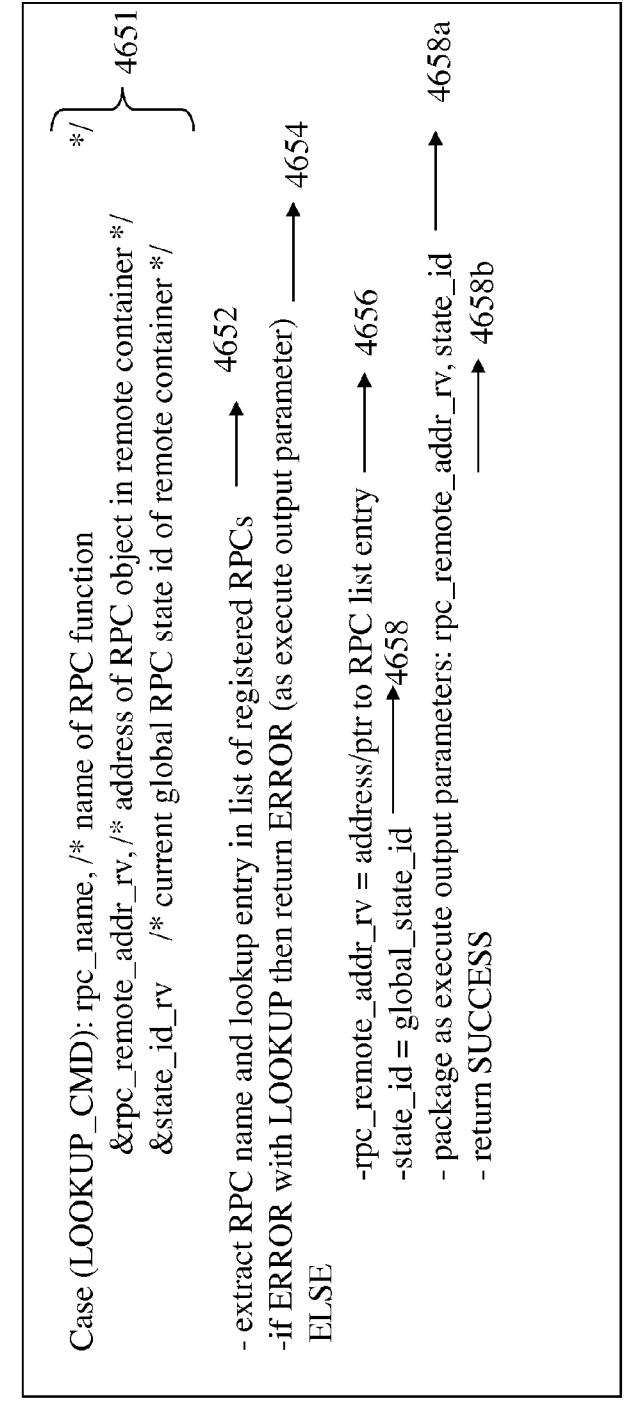
Figure 63:
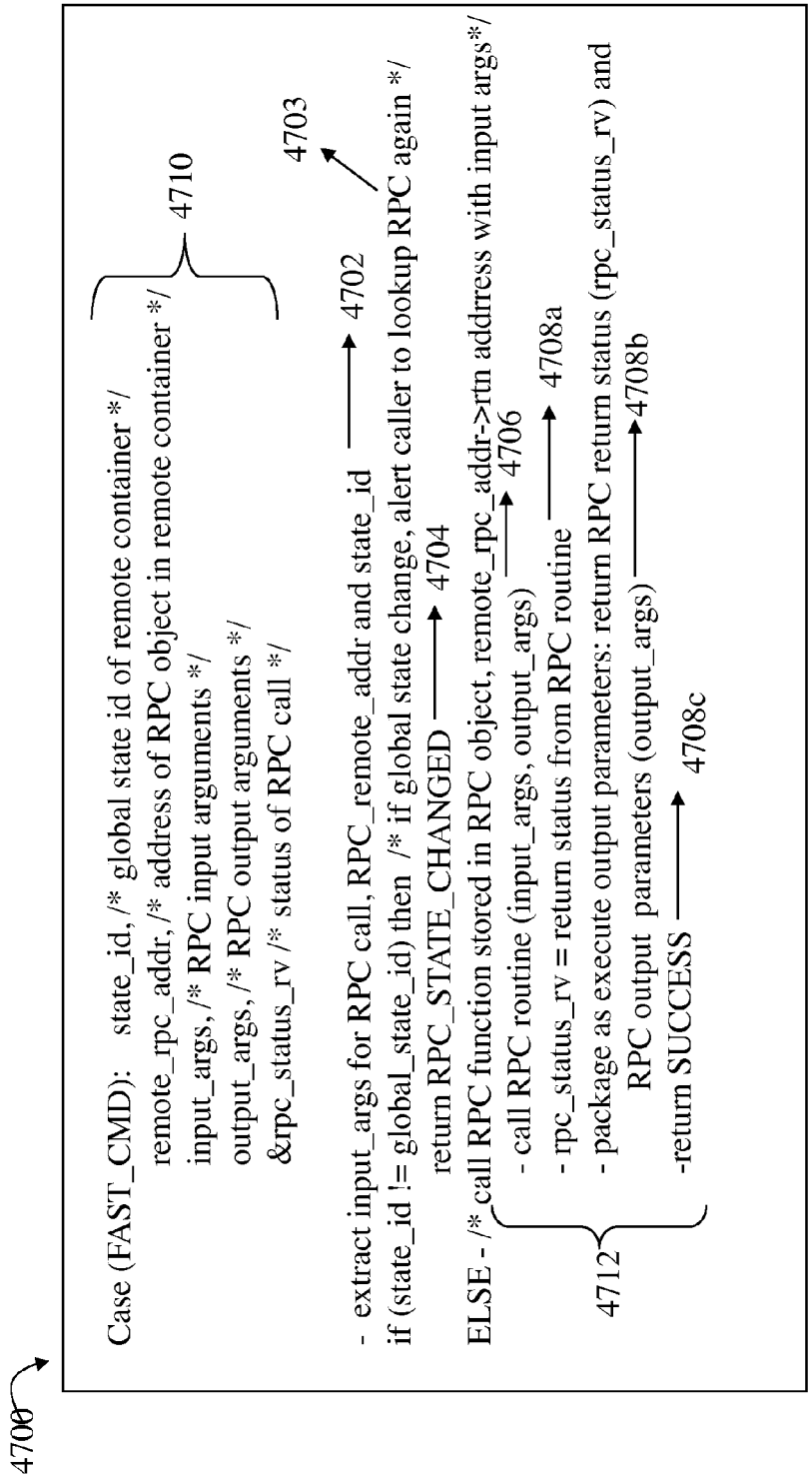

Referring to FIGS. 61, 62 and 63, shown are examples describing processing that may be performed by code on the server side in connection with processing a received client request for one of the client-side API calls of FIG. 56. As previously described, for example, in connection with FIG. 58, the exec-handler on the server-side is invoked in connection with the command path in an embodiment using the intermodule communication techniques of the '759 and '822 applications. FIGS. 61-63 describe the processing performed by the exec-handler on the server side in response to receiving command requests for the different client side API calls of FIG. 56. As described elsewhere herein, each of the client-side API calls of FIG. 56 may result in a request being issued to the server via the execute client-side API.

The example 4600 of FIG. 61 includes a case statement which switches on a command code where a different command code may be transmitted from the execute code of the client to the exec-handler of the server for each of the different client-side API calls of FIG. 56. When the command code indicates an rpc_call SLOW is issued, processing of 4610 is performed. The execute call from the client transmits the necessary input data and parameters including the input parameters passed to the rpc_call SLOW API code such as indicated by 4612. At step 4602, the NAME of the RPC to be invoked and the RPC input arguments are extracted from the input parameter block. At step 4604, the RPC routine address may be looked up in the list of registered RPC objects for the server. Step 4604 may include linearly traversing the list and comparing the RPC NAME field of each RPC object entry to the NAME input parameter until a match is found. An embodiment may implement the list using any one of a variety of different structures and techniques known in the art. For example, an embodiment may use a hash table where the RPC names are hashed to determine the associated list entry. At step 4606, a determination is made as to whether the lookup successfully found a match based on the RPC name as a string. If not, an error is returned in step 4606. If a corresponding entry for the requested RPC NAME is found on the registered RPC list for the server, processing of 4614 is performed. At step 4608, the RPC routine is invoked using the address obtained from the matching entry found on the registered RPC list. At step 4608*a*, the rpc_status_rv is assigned the return status from the RPC routine. At step 4608*b*, the rpc_status_rv and RPC output parameters (output arguments) are packaged as execute output parameters to be returned to the client. At step 4608*c*, a success status is returned.

Referring to FIG. 62, shown is an example of processing that may be performed by the exec-handler or callback on the server when the command code indicates an rpc_lookup is issued from the client. The data received by the server from the client may include the information of 4651. At step 4652, the rpc_name is extracted from the received data from the client and the list of registered RPCs for the server may be traversed to determine a corresponding entry and RPC object, if any, as described above. If no such entry is found on the list as illustrated by 4654, an error status may be returned. Otherwise, if a corresponding entry and RPC object is located on the list of registered RPCs, the output parameter rpc_remote_addr_rv is assigned the address of the located RPC object in the list. At step 4658, the output parameter state_id is assigned the current value of the global_state_id for this server. At step 4658*a*, rpc_remote_addr_rv and state_id are packaged as output parameters returned to execute on the client side. At step 4658*b*, a success status is returned.

Referring to FIG. 63, shown is an example of processing that may be performed by the exec-handler or callback on the server when the command code indicates an rpc_call FAST is issued from the client. The data received by the server from the client may include the information of 4710. At step 4702, the remote_rpc_addr, input args for the RPC, and state_id are extracted from the received data from the client. At step 4703, a determination is made as to whether the state_id is the same as the current value for the global_state_id. If not, there has been a change to the RPC configuration for this server and a corresponding status is returned to the caller in step 4704. This status returned in step 4704 may alert the caller who may then respond by obtaining a fresh value for remote_rpc_addr (such as by performing an rpc_lookup API call). As described herein, remote_rpc_addr may identify the RPC object in the server's address space. As illustrated in FIG. 60, one of the fields in this RPC object may be the address of where to transfer control in response to receiving a corresponding client request to perform the RPC.

Different events may cause the unregister API call to be executed for an RPC such as, for example, when a code module within a server is unloaded or removed from the server's address space. For example, a server container may be executing at a first point in time and an RPC may be registered. Prior to unloading a code module from the server container's address space, the RPC may be unregistered causing an RPC configuration state change. At a second point in time, the code module of the server container may be reloaded and the RPC included therein may be re-registered. In such a case, if the client has a value for remote_rpc_addr obtained when the server is running at the first point in time and then tries to use this value after the second point in time, the address (as denoted by the value) may be stale and no longer identify a valid RPC object for the RPC. There is no guarantee that the server's address space contents from the first point in time is preserved across the unloading and reloading of the code module. As a result, such events causing an unregister may result in RPC configuration changes for the server so that a client's cached value for remote_rpc_addr is stale, dirty or otherwise rendered invalid for subsequent use. Returning RPC_STATE_CHANGED indicates detection of this condition. If no global state change is determined, processing of 7412 is performed. At step 4706, the RPC routine is invoked with the appropriate input and output arguments. At step 4708a, the rpc_status_rv is assigned a return status from the RPC routine invocation. At step 4708b, rpc_status_rv and the RPC output arguments (output_args) are packaged and returned to the execute code on the client side. At step 4708c, a success status is returned.

What will now be described in more detail is processing that may be performed by code on the client side in connection with techniques described herein.

Referring to FIG. 64, show is an example illustrating processing that may be performed by code included in the client side for the rpc_lookup API. The parameters of the API call are as indicated by 4760. At step 4752, an execute API call is performed to issue a request from the client to the server to perform the lookup for the indicated RPC (rpc_name). After control is returned, a determination is made as to whether the status indicates that the requested server is not present. If so, step 4754 returns a corresponding status. If the status indicates that the requested RPC is not found but the server is present, then a corresponding status is returned in step 4756. Otherwise, step 4758 returns success. It should be noted that an embodiment may perform processing for handling different types of possible errors than a described herein. Although not included as part of the example 4750, an embodiment may have some portion of client code cache the returned values for rpc_remote_addr_rv and state_id_rv for use in connection with subsequent client side API calls for rpc_call FAST. Processing for caching the foregoing return values from this API call (returned from the server) may be performed by code of the rpc_lookup API or other code on the client side.

Figure 65:
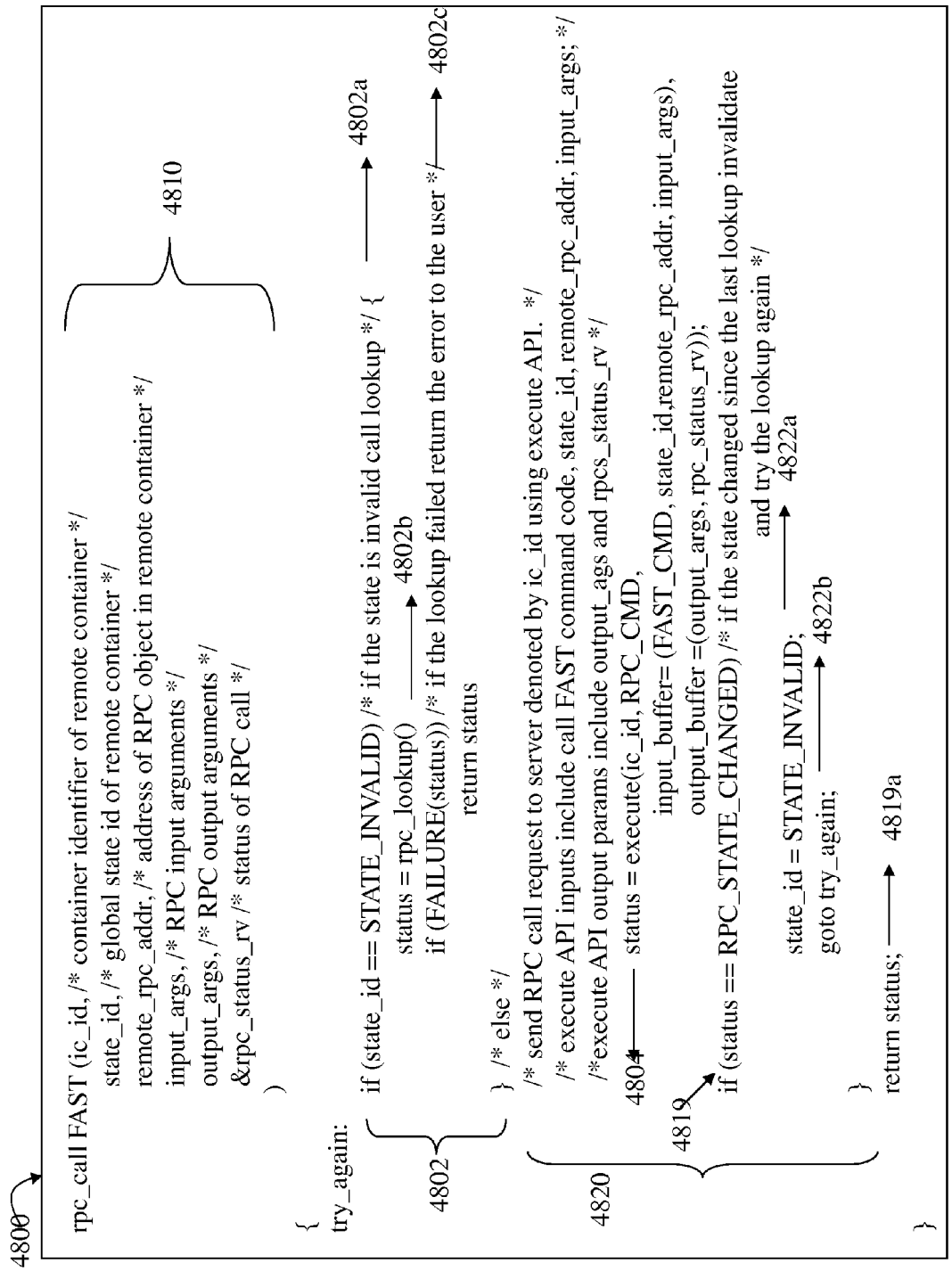

Referring to FIG. 65, show is an example illustrating processing that may be performed by code included in the client side for the rpc_call FAST API. The parameters of the API call are as indicated by 4810. At step 4802a, a determination is made as to whether state_id indicates an invalid state for the call lookup. If so, the rpc_lookup API is invoked in step 4802b to try and obtain a valid value for remote_rpc_addr. If the call at step 4802b results in failure, a corresponding status is returned in step 4802c. If the call at step 4802b does not result in failure status being returned, processing of 4820 is performed. In step 4804, the RPC call request is sent to the server using the execute API call. At step 4804, a return status for the execute API call is examined. If the status indicates that the server's RPC configuration has changed as indicated by a return value of RPC_STATE_CHANGED in step 4819, state_id is updated as in step 4822a and control proceeds to try_again at step 4822b to attempt to obtain a value for remote_rpc_addr. Status is returned in step 4819a.

Referring to FIG. 66 show is an example illustrating processing that may be performed by code included in the client side for the rpc_call SLOW API. The parameters of the API call are as indicated by 4860. At step 4852, the RPC call request is sent to the server using the execute API call. Step 4852 assigns status as returned for the execute API call. At step 4854, the status is returned.

What will now be described is a way in which the input and output parameters may be communicated between the various layers in a call chain on the client side and server side and how the data may be processed prior to transmitting from the client to the server. Also described is how an embodiment may process data returned from the server to the client. The data received by the client may be returned in response to a previous request issued from the client, for example, such as in connection with a request issued via the execute API call for one of the client-side APIs of FIG. 56.

With reference back to FIG. 57A, processing was described for the input parameters, for example, where each layer in the call chain on the client side may allocate storage for that layer's input parameters and storage for any input parameters and other data communicated from layers above. The current layer in the call chain may then copy its own information and information from layers above into the allocated storage, and then pass this information onward to subsequent layers down in the call chain. More generally, a called routine may receive data from the caller that needs to be sent to another container such as for the RPC API described herein. The called routine may build a structure for the command containing the called routine's information and also including the caller's input data and metadata (such as input descriptors) as well as other metadata, for example, that may be needed in connection with output parameters. The called routine sends the structure for the command to the lower levels of the call chain or command path and the lower levels in the call chain may also perform similar processing. As described above, one way to implement such a command path is to have each level in the call chain allocate the space necessary for its own data and metadata as well as the information provided by the layer above, and copy all of the foregoing into the allocated buffer. The foregoing may be characterized as inefficient in that additional overhead in terms of processing and resources are used in connection with storage allocation and copying performed at each layer. As additional layers in a multi-layered implementation increase, so does the inefficiency.

What will now be described is an alternate technique that may be used in connection with processing input and output parameters at the various layers in the call chain such as in connection with the RPC facility described herein where data from multiple layers in the call chain is transmitted to the server. Described in following paragraphs are techniques that may be used to provide a common format for describing data used in connection with multiple layers in the call chain where each level can construct a chain describing its own metadata and data and embed the information for the levels above. The resulting information can then be encoded for transport and sent to another container. An implementation may also contain performance optimizations and ensure that only the relevant information is copied when sending the command and receiving the response.

Figure 67:
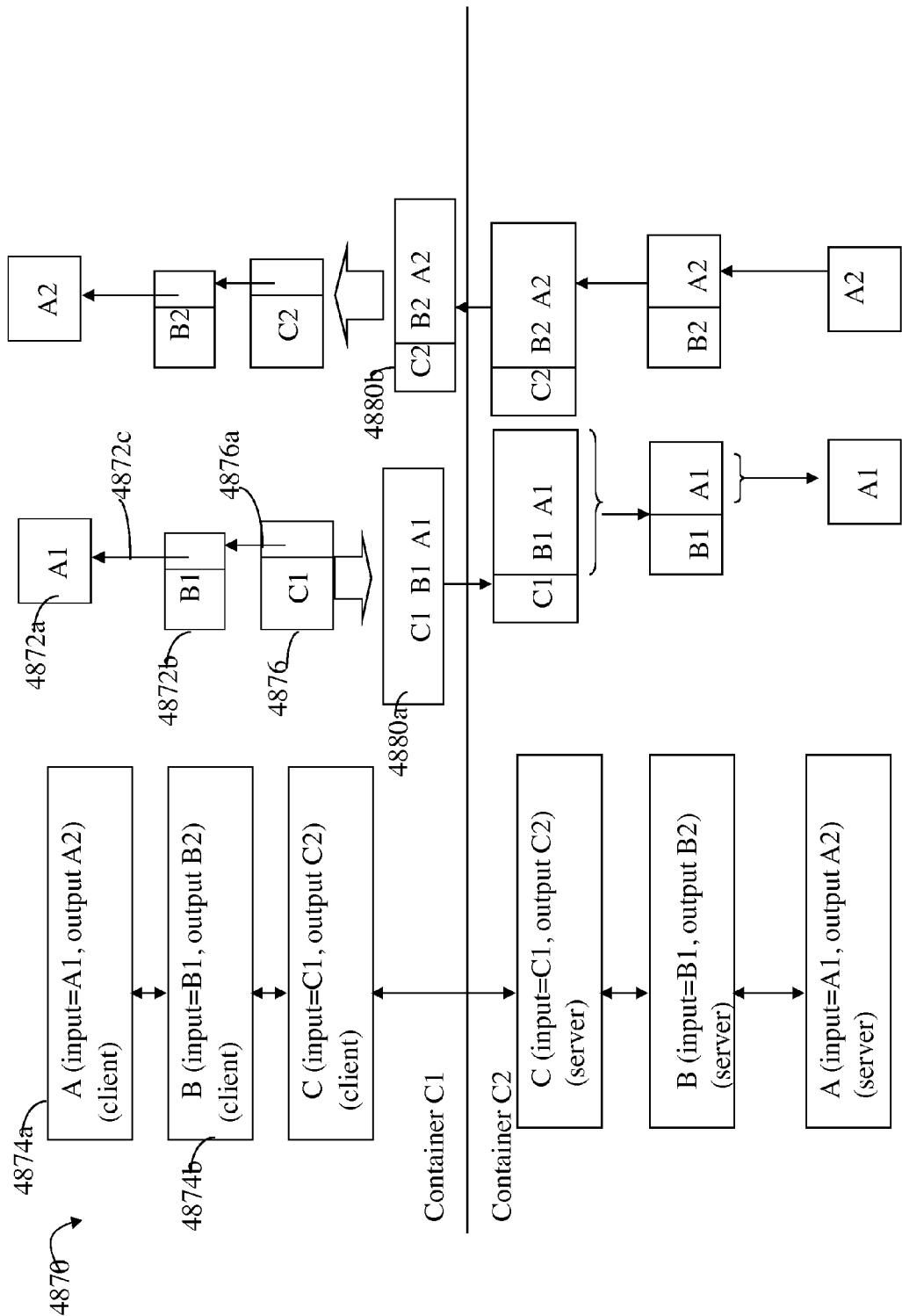
FIGS. 67, 67A, and 68 are examples illustrating use of data and descriptors with embedded lists in an embodiment in accordance with techniques herein.

Referring to FIG. 67, shown is an example illustrating a technique that may be used in connection with processing input and output parameters at the various levels in the call chain. At each layer in the call chain, processing is performed to allocate storage and copy into this allocated storage the input parameters for the current layer. Additionally, parameters from the upper layers are embedded or linked into a list of parameters using pointers. Thus, each layer in the call chain may have an associated embedded list for its input parameters, and an associated embedded list for its output parameters. For example, routine A 4874a may call routine B 4874b. As indicated by 4872b, routine B allocates storage for its parameter B1 and embeds the parameters from layers higher in the call chain using a pointer 4872c to the collective or aggregate set of input parameters associated with higher layers in the call chain. Thus, input parameters used by routines occurring previously in the call chain may be represented as an embedded list using pointers. Similarly, routine C references all input parameters of layers higher in the call chain via pointer 4876a so that element 4876 provides access to all input parameters for the current layer in the call chain and layers higher in the call chain. As a result, the input parameters may be represented using a hierarchical structure of embedded lists connected via pointers. The hierarchical structure of input parameters may be constructed as the calls progress down the call chain until the client is ready to communicate with the server container. As will be described in following paragraphs, at this point, code on the client side may marshal parameters into a flat or linear arrangement forming a data stream which is transmitted to the server. As also described herein, the marshalling process may be characterized as encoding the parameters in a different format for transmission to, and use by, the server. The server may operate on the parameters in this encoded format and also store output parameters and other information in this encoded format. The client may receive any return or output parameters in this encoded format and then unmarshal or decode the data into its original hierarchical structure and format for use in processing by the client side. For example, 4880a may represent the encoded format generated prior to transmission from the client to the server. Data of 4880a may then be sent to the server for processing. Each layer on the server side may remove input parameters it uses and pass remaining data to subsequent layers down the call chain by adjusting an offset into the flat or continuous segment of input parameters in the encoded form. Similarly, the output parameters may be constructed on the server side to build a flat or continuous segment of the output data which is then transmitted back to the client as represented by 4880b. Upon return to the client, the client may then unmarshal or decode the data of 4880b into a hierarchical structure of embedded lists linked together using pointers where each layer has its output parameters on a separate embedded list. It should be noted that an embodiment may also have each layer on the client side of the call chain build an output data area populated with output descriptors and metadata. The metadata included in the output data area may then be used by the server in connection with storing output data to particular locations.

As mentioned above, marshalling may refer to the process of transforming a representation of an object into a data format suitable for transmission such as from one container to another in connection with remote procedure calls and associated requests as described herein. Marshalling may be used in different embodiments in accordance with techniques described herein to serialize an object by converting its data into a byte stream in such a way that the byte stream may also be converted back into a copy of the original data object. The process of converting encoded data (the byte stream resulting from marshalling) back into the original data object or decoded format may also be referred to as unmarshalling.

Figure 67A:
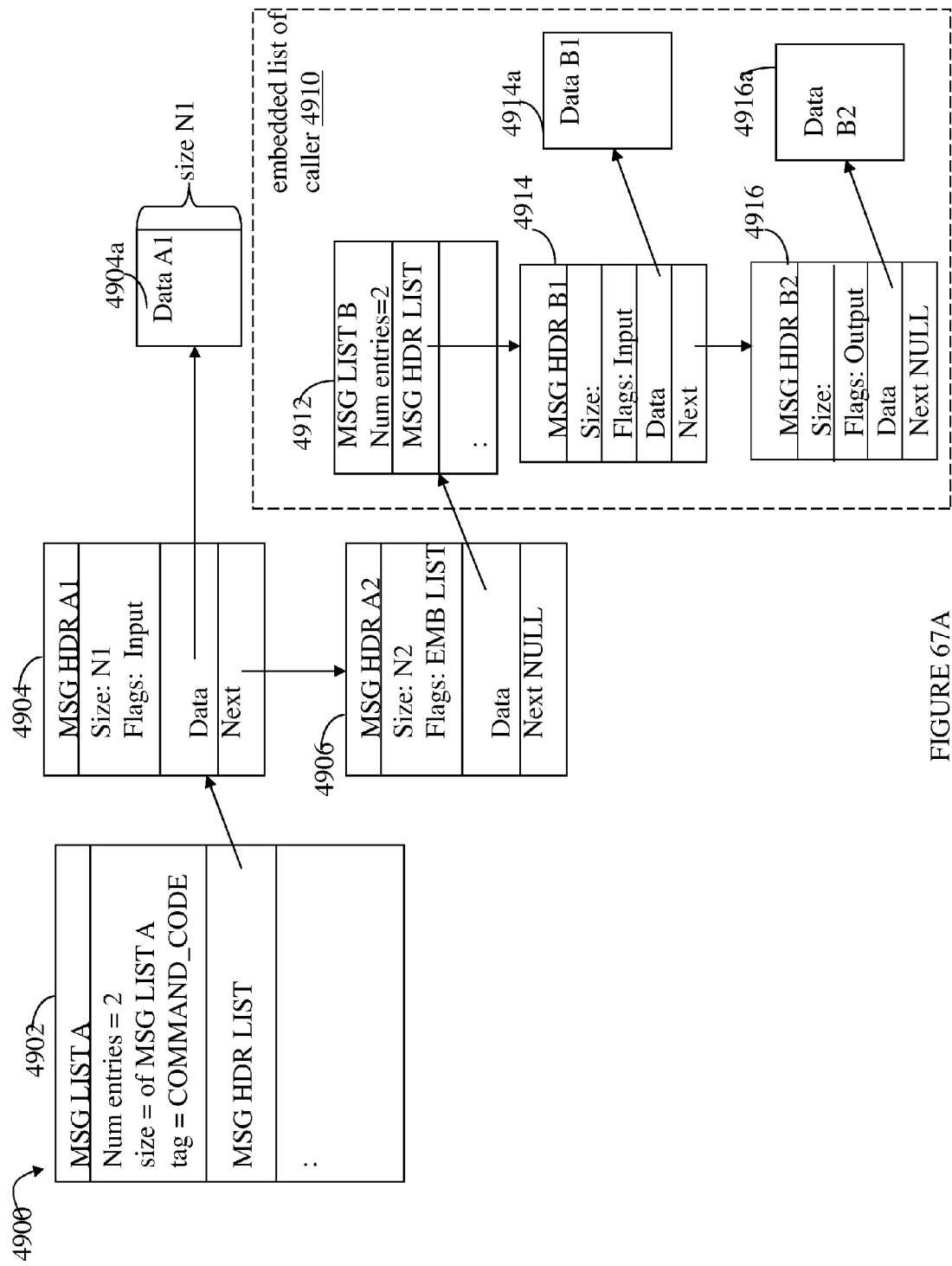

Referring to FIG. 67A, shown is an example 4900 of how a hierarchical structure may be created and used in connection with the techniques herein. In the example 4900, it should be noted that input and output parameters are illustrated as being intermixed in the same structure. However, an embodiment may also construct and use on the client side a first hierarchical structure for input parameters and a second different hierarchical structure for output parameters as illustrated in FIG. 67. As will also be described in more detail below, an embodiment may use an encoded format where the input and output information are intermixed. Alternatively, an embodiment may use an encoded format where each of the input and output information is maintained in a separate buffer or data area.

The example 4900 may represent input and output parameters where a first call is made to routine B, and then a second call is made from the routine B to a routine A. In connection with the first call, routine B may be invoked using the following parameters:

Call B(input parameters=B1, output parameters=B2).

In connection with the second call, the code of routine B may then perform a call to routine A using the following parameters:

Call A(input parameters=A1, embedded message list from routine B)

and without any output parameters consumed by routine B. The above "embedded message list from routine B" refers to the list of 4910 of FIG. 67A illustrating where the called routine A is passed parameter information of 4910 from the calling routine B.

Parameters for a current level or layer in the call chain may be represented using a message list where each entry in the message list corresponds to either a parameter of the current layer or another message list that is an embedded list of parameters from a next highest level in the call chain. For example, the list of input and output parameters for routine B may be represented by element 4910 which includes a message list denoted by 4912. The message list 4912 includes a first entry 4914 corresponding to the input parameter B1 and an entry 4916 corresponding to the output parameter B2. The data for parameter B1 may be stored in a data area 4914a referenced using a data pointer of 4914 as illustrated. Similarly, the data for parameter B2 may be stored in a data area 4916a referenced using a data pointer of 4916. When routine B calls routine A, routine A may allocate storage for its own message list represented by element 4902 which includes a first entry for a first parameter A1 (having an entry on the message list 4902 denoted by 4904) and a second entry that is an embedded list. In this example, routine A allocates storage for 4902, 4904 and 4906 and then links or chains to the embedded list 4910 using the data pointer of element 4906.

The example 4900 illustrates message lists as may be used in an embodiment. The message list is denoted by a structure such as 4902 and may include message list metadata (e.g., number of entries, size of the message list in bytes, a tag) and a pointer to a list of one or more entries (MSG HDR LIST). As described above, a message list contains headers (e.g., 4904, 4906, 4914, 4916) that describe data (such as input and output parameters) or other embedded message lists (e.g., 4912). As also described above, message lists may form a hierarchical structure, such as a tree, of metadata that describes data buffers at each level of a command path or call chain. The message lists described herein may be used to prevent excessive data copying and command reconstruction that would otherwise occur at each level through the call chain or command path. Once a command is ready to be sent to another container, the message list can be marshalled into a single self-describing contiguous data buffer that contains necessary input data as well as the descriptors used by the receiver/server to determine where to copy the output data. During encoding, each header in the list may be transformed into a fixed-size format.

In one embodiment, the process of encoding a message list may involve traversing each element in the structure from a root element such as associated with a current level in the call chain. In one embodiment, recursion may not be utilized since the code may execute in kernel mode. As a result, an embodiment may perform processing which traverses the hierarchical structure representing the message lists in an iterative manner. An embodiment may build or construct a parallel linear list as new message lists are added. For example, an embodiment may record and construct a parallel list as the hierarchical structure is built where the parallel list may be a linear list including entries thereon having an ordering corresponding to a depth first traversal through the hierarchical structure. In one hierarchical structure, an additional list may be maintained extending from each entry in the top level or root message list. Each time an embedded list is added at a level in the hierarchy and the embedded list originates from an entry in the root message list, all of the message headers (entries) in the embedded list may be included in another list associated with the originating entry in the root message list. When it is time to encode the hierarchical structure, the linear list(s) may be traversed and the information of the linear list(s) encoded into a second format such as described in more detail in following paragraphs.

Using the encoded list, the receiver can access any output data required for the command, and set the actual amount of buffer space used for each message header. When the command is returned to the user, the encoded list in the command buffer may be decoded so that all the output data can be copied into the user's client side data buffers. Any relevent metadata, such as the actual buffer size used, may also be copied into the original message list metadata as part of the decoding stage. Once decoded, parts of a message list can be reused by the different levels of the command path.

In FIG. 67A, it should be noted that several fields of the different structures are illustrated. Additional detail regarding fields that may be included in structures of FIG. 67A is described in following paragraphs.

Figure 68:
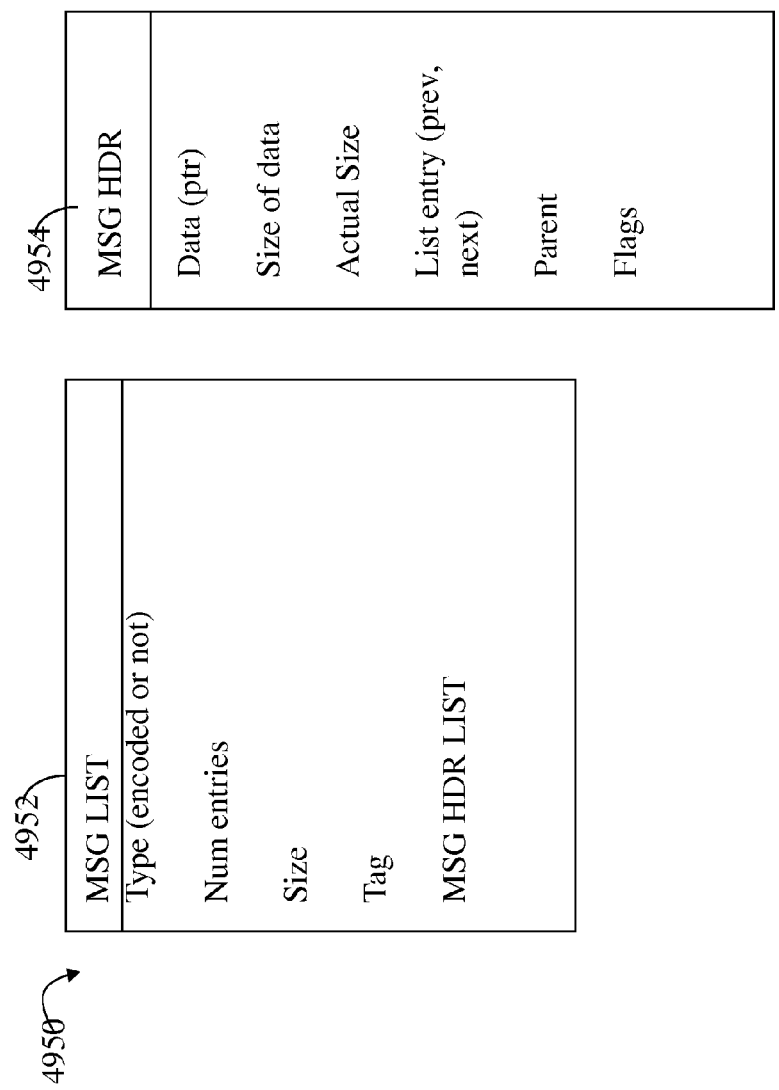

Referring to FIG. 68, shown is an example illustrating in more detail fields that may be included in message list (msg list 4952) and message header (msg hdr 4954) structures in an embodiment in accordance with techniques herein. The msglist 4952 may include the following fields:

type—indicating whether the list has been encoded or not.

num entries—indicating the number of entries in a message list. An embedded list may count as a single entry in another message list.

size—specifies the size or amount of storage needed to encode a message list. The size may denote a cumulative amount of storage needed to store each message header, the data described by each message header, and also any storage needed for all embedded lists.

tag—user-specified tag that may be used to associate a command code with a message list containing the command data. For example, the tag may denote a command code corresponding to each of the different client-side API calls.

msg_hdr_list—this is a list of all children message headers.

A msg hdr (message header) 4954 may be used to describe a fixed size data region that can contain user data or another embedded message list. In one embodiment, the following fields may be included in the msg hdr structure:

data (ptr)—pointer to a data region containing user data. When a message header describes an embedded message list "data" points to that list.

size—Size of the user data region as identified by the data pointer (data ptr field).

size_actual—This field is used to track the actual size of output data after a command request. If an entire output buffer is not used, an embodiment may only copy the bytes that contain output data back into the original buffer when decoding.

list_entry—includes a previous pointer and a next pointer identifying, respectively, the previous and next msg hdrs or entries on the parent message list.

parent—this is a pointer to the message list (msg list structure) that a message header is located on as an entry.

flags—may be used to indicate a usage of the data described. For example, a flag may indicate whether the data is input data or output data. If the data is indicated as input data, an embodiment may only copy the associated data when sending a command. If the data is indicated as output data, an embodiment may only copy the data at command completion such as upon return from the server. The flag may also indicate that the message header describes an embedded message list An embodiment may includes other information in a msg list structure 4952 and/or msg hdr structure 4954 than as described. For example, an embodiment may store additional pointers in connection with generating a linear list in addition to the hierarchical structure. For example, one embodiment may maintain an additional list of msg hdrs representing a depth first traversal. Each time an embedded list is processed, entries from the embedded list may be added to a additional list.

Figure 68A:
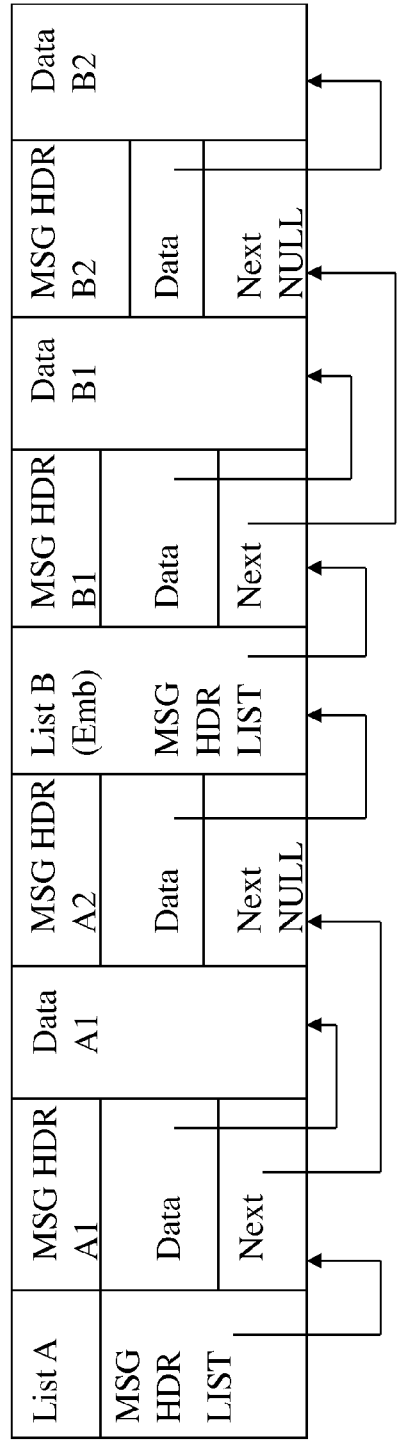
FIGS. 68A, 68B, 69 and 70 are examples illustrating different encoding formats of data and descriptors embedded lists in an embodiment in accordance with techniques herein.

Referring to FIG. 68A, shown is an example illustrating one way in which data may be encoded. The example 41000 represents one encoded data format after marshalling is complete such as prior to transmitting the data in the example 41000 from the client to the server. The example 41000 illustrates one particular format in which the data from the hierarchical structure of input and/or output parameters and associated metadata may be represented as a contiguous stream of data. The data of FIG. 68A may be the result of traversing the hierarchical structure such as using the parallel linear list described above. The example 41000 represents one way in which the data of the hierarchical structure of FIG. 67A may be encoded using a single buffer for both input and output parameters and associated metadata such as data descriptors describing the parameters. The encoding process gathers each of the different descriptors and data portions from the hierarchical structure into a contiguous segment of data. Pointers of the different descriptors may be adjusted to indicate the new locations as offsets in the encoded format. An embodiment may use the single buffer for both input and output parameters and descriptors in connection with the techniques herein, for example, when the underlying intermodule communication mechanism uses shared memory accessible to both the client and server containers. The offsets may be determined using the size fields of the message headers.

In one embodiment, a callback on the client side, such as input-prepare-callback or output-prepare-callback described in the '759 and '822 patent applications, may perform the encoding. When data is returned to the client from the server, another callback on the client side, such as output-post callback, may perform the necessary decoding to unmarshal the encoded data and copy the output data therefrom to the proper locations in the hierarchical structure.

It should be noted that an embodiment using a single buffer for the encoded format and having input and output data and descriptors in a same hierarchical structure may use a single prepare callback which performs encoding for all input data and descriptors and output data and descriptors, and a single post callback which performs decoding upon return to the client container from the server container. In one embodiment, the encoding process may include processing all descriptors (input and output) and copying only the input data. An embodiment may assume that there is no actual data stored in the output data areas described by the output descriptors. Thus, an embodiment may optionally assume the foregoing for efficiency to avoid additional overhead incurred in connection with copying output data.

Figure 68B:
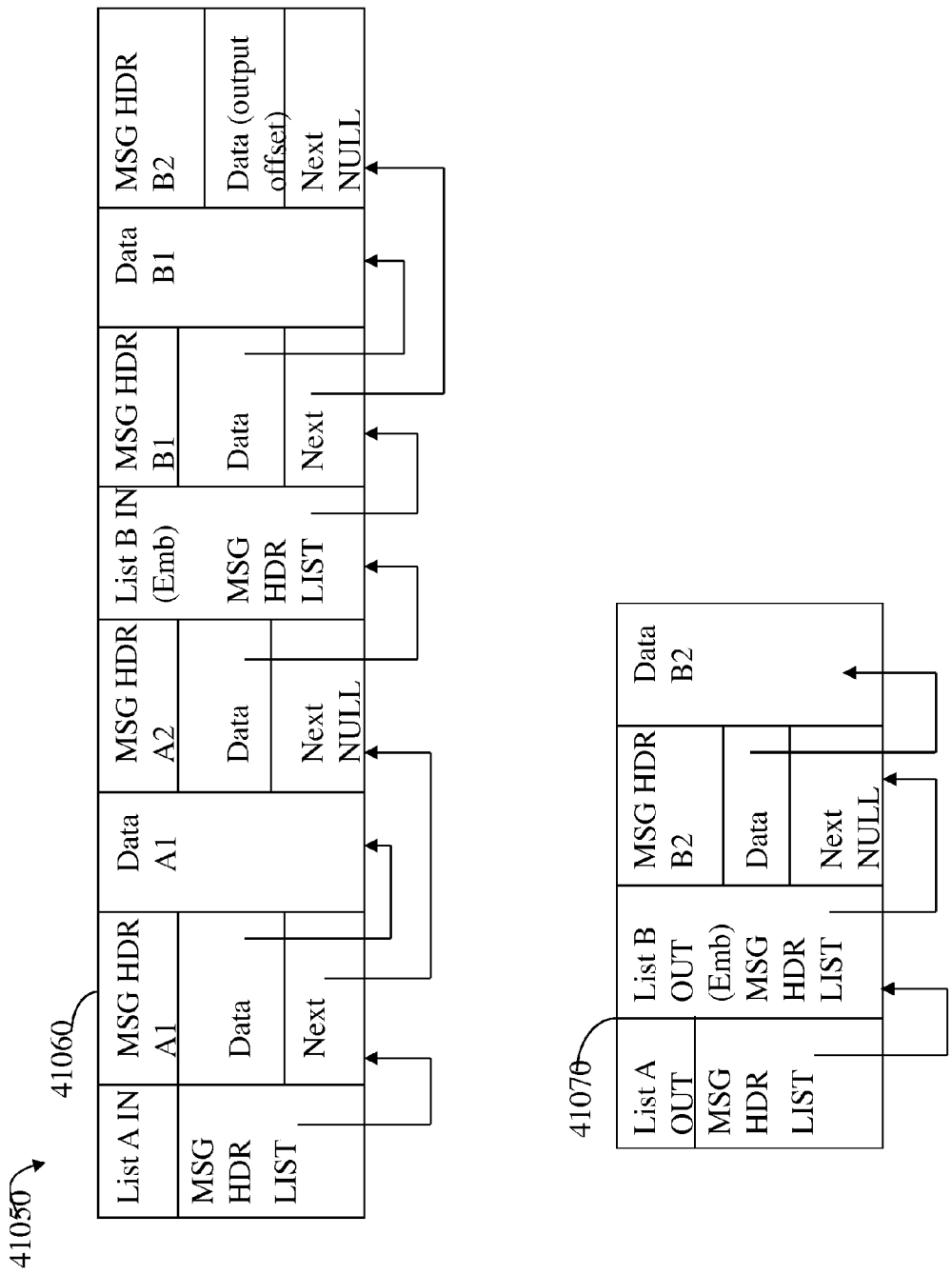

Referring to FIG. 68B, shown is another example illustrating how data may be encoded. The example 41050 represents a second encoded data format that may be used in an embodiment representing the encoded data after marshalling is complete such as prior to transmitting the data in the example 41050 from the client to the server. In this example 41050, an embodiment may have a separate input data area 41060 and output data area 41070 for the encoded data. In this example, the client side may communicate in the input data area 41060 all descriptors (including output data descriptors) and input data. On the server side, the server may perform the processing to copy the output descriptors from the input data area to the output data area 41070 along with any output data transmitted back to the client. An embodiment may use the input prepare callback on the client to perform processing to encode the data as represented in 41060. Output post callback on the client may perform processing to decode the data returned into the proper locations in the hierarchical structure. An embodiment may choose to utilize the encoded format of FIG. 68B, for example, where an alternative mechanism other than shared memory is used for inter-container communication as described in the '759 and '822 patent applications. The output post callback and input prepare callback are described in the '759 and '822 patent applications described elsewhere herein.

Figure 69:
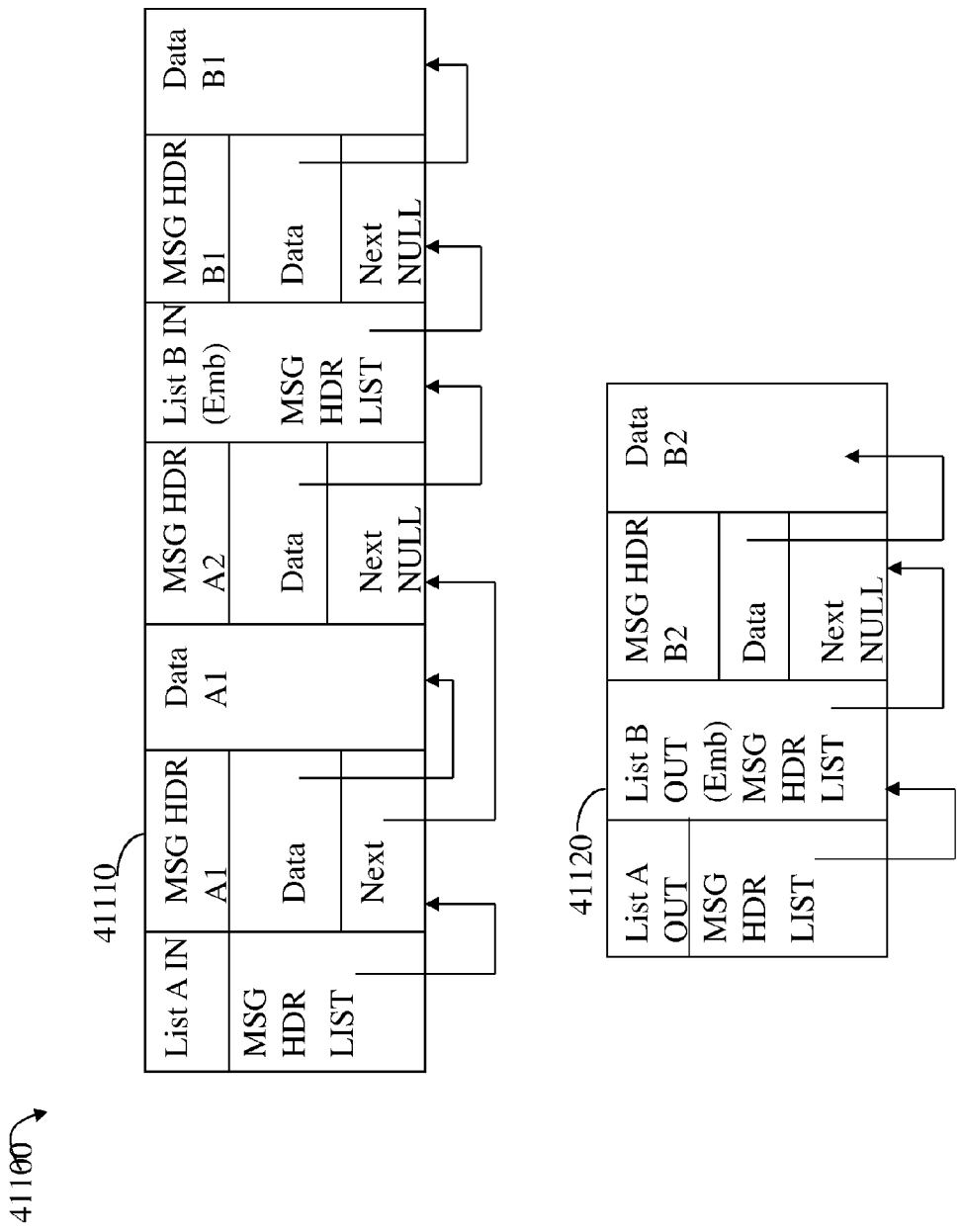

Referring to FIG. 69, shown is an example 41100 illustrating yet another way of how data may be encoded. The example 41150 is similar to that as described in FIG. 68B in that there are separate input and output data areas 41110 and 41120. However, in this example, the output descriptors are communicated using the output data area 41120 and are not included in the input data area 41110 for sending from the client to the server. In this example, input prepare callback on the client may encode the input descriptors and data as represented in 41110, and output prepare callback on the client may encode the output descriptors and data as represented in 41120. An embodiment may not actually copy the output data into the area of 41120 but rather may only encode the output descriptors. It may be assumed, as described above, that the output data locations do not include valid data prior to transmission to the server.

An embodiment may choose to utilize the encoded format of FIG. 69, for example, when shared memory is used for inter-container communication as described in the '759 and '822 patent applications. In such an embodiment, parameter information of 41060 and 41070 may be communicated from the client to the server where area 1070 may include valid output descriptor information and where the output parameter data areas (e.g., denoted as Data B2) do not communicate any valid information. Different layers on the server side may retrieve the appropriate input parameter information from 41060 and output descriptor information from 41070, determine any outputs, and populate the appropriate output data areas (e.g., such as Data B2).

Figure 70:

Referring to FIG. 70, shown is an example illustrating more generally different layouts for the data areas as described above. Element 41160 may represent encoded data using a single buffer where input and output data and descriptors may be intermixed. One possible encoded format is as described in connection with FIG. 68A. Element 41170 may represent encoding where the input and output data areas are segregated. However, the output descriptors may be communicated to the server in the input data area. On the server side, the output descriptors may be copied to the output data area. FIG. 68B specifies one possible encoded format for the input and output data areas in accordance with the general representation of 41170. Element 41180 may represent encoding where the input and output data areas are segregated and the output descriptors are communicated to the server from the client via the output data area. FIG. 69 specifies one possible encoded format for the input and output data areas in accordance with the general representation of 41180.

Figure 71A:
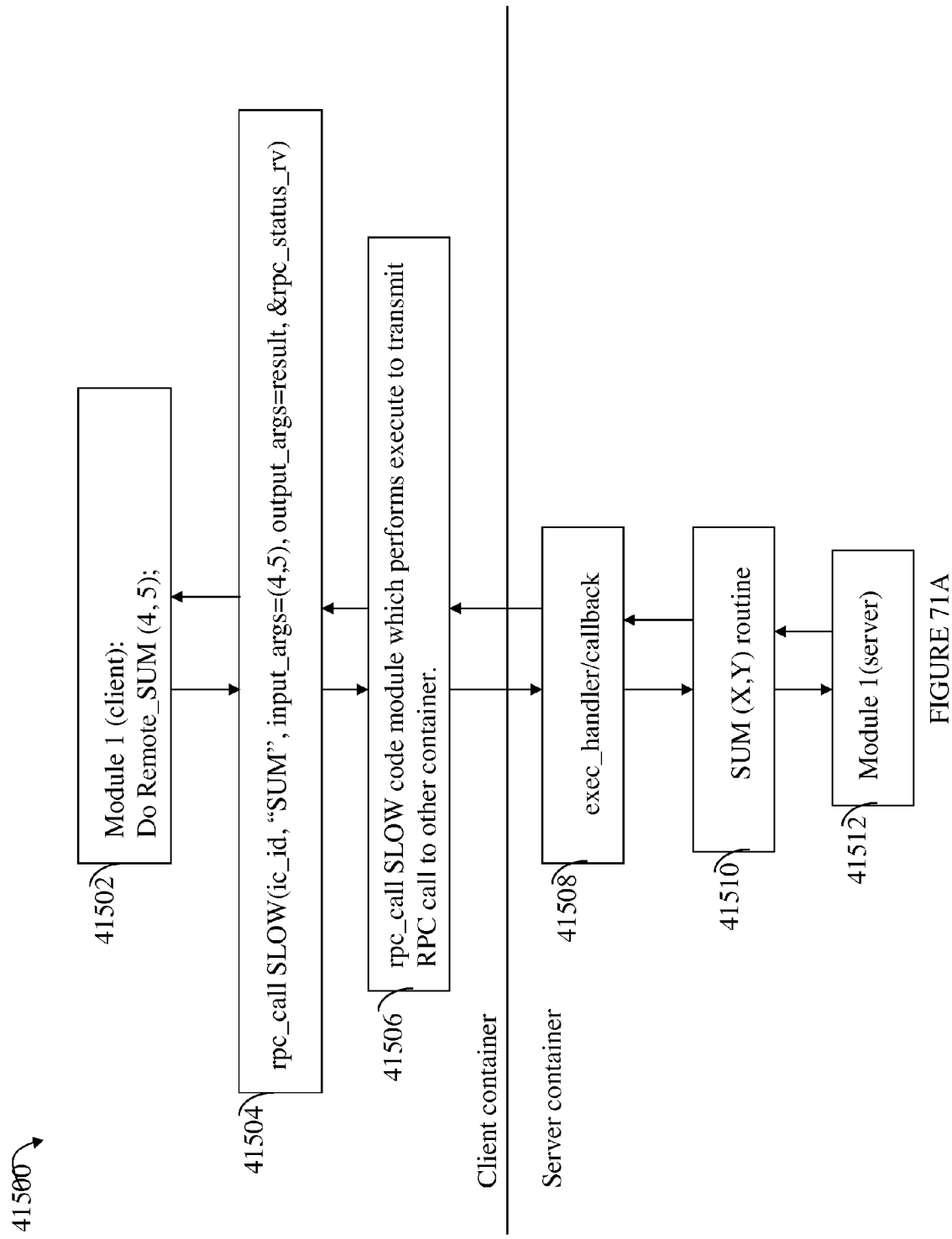
FIGS. 71A, 71B, and 72 illustrate an example of a call chain and associated structures that may be used to represent data and descriptors in an embodiment in accordance with techniques herein.

Referring to FIG. 71A, shown is an example of layers that may be included in a call chain of a command path for issuing a request to a server to perform the registered RPC SUM. In the example 41500, the client container includes a first call represented in 41502 from a module to issue a request to perform an RPC SUM (4,5). The first call, as may be included in user code and represented by 41502, results in a second call represented in 41504. The second call 41504 is an API call as described in connection with FIG. 56. The API call of 41504 may result in one or more other lower levels calls as represented by 41506 in connection with preparing the data for transmission to the server, such as by encoding as described above. Step 41506 may include, for example, performing processing for the execute API call resulting in invocation of the input-prepare callback and the output prepare callback. The input prepare callback may prepare the input data area by copying and encoding the input data and descriptors. The output prepare callback may prepare the output data area by copying and encoding the output data descriptors without copying any output data. Rather, the output data area may be populated with the output descriptors only. The data in the encoded format may be transmitted to the server container for processing by one or more layers on the server side corresponding to those on the client side. The server side call chain includes calls 41508, 41510 and 41512. The return path of the call chain or command is also illustrated from 41512 returning to 41502. Each layer in the call chain for transmitting the request and performing the processing on the server may be denoted by the arrows from 41502 to 41512 and each layer may perform processing with respect to the input and output data areas as described herein. In particular, each layer on the server side may remove its parameter data and descriptor information and pass on the remaining input data and descriptor information to subsequent lower levels in the call chain. Similarly, each layer may perform processing as described herein on the server and client side for the output descriptors and output data.

Figure 71B:
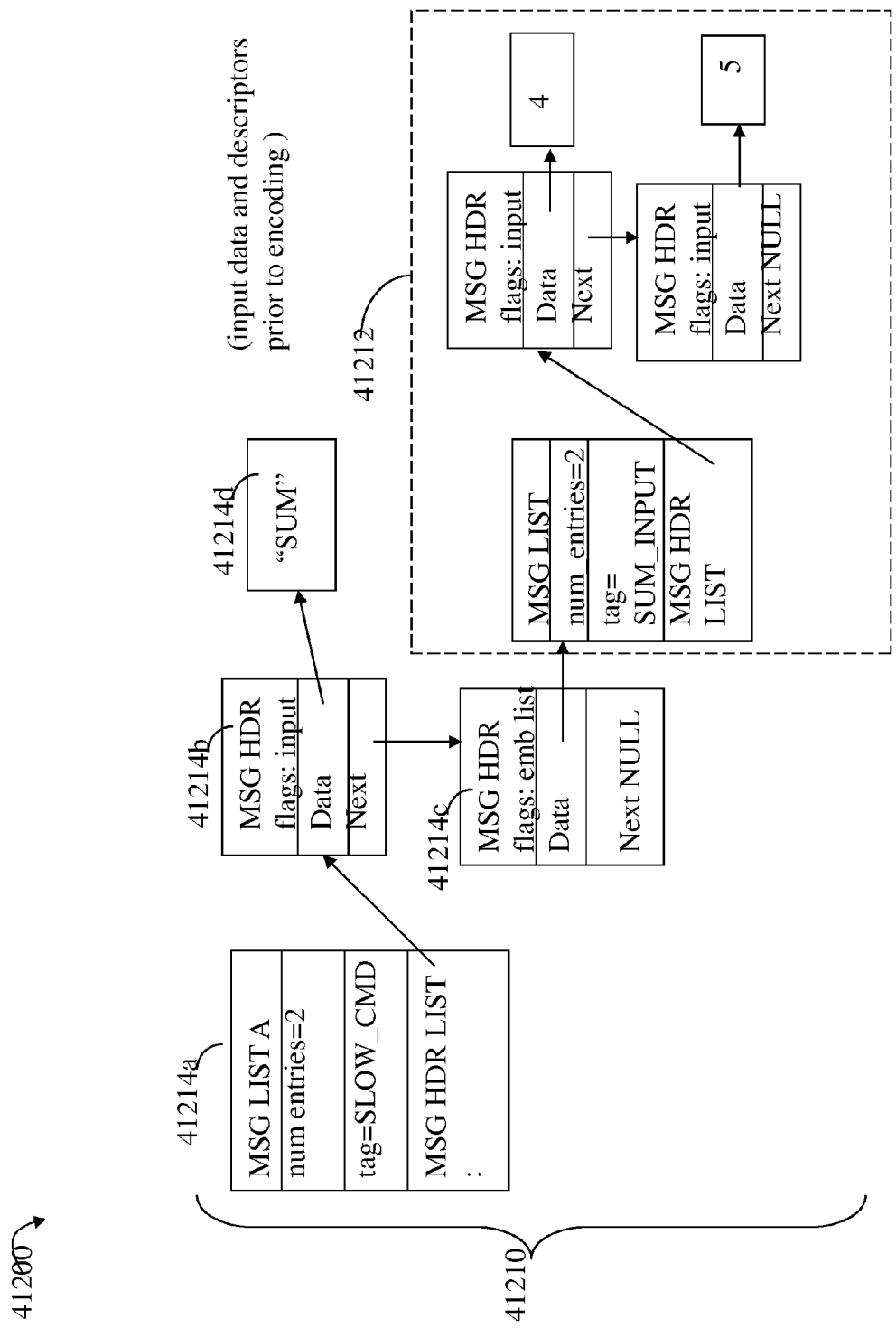

FIG. 71B may represent the input data and descriptors constructed as a hierarchical structure described herein using message lists and message headers with embedded message lists. In the example 41200, element 41212 represents the embedded message list of input data and descriptors for the call 41502 of FIG. 71A. The remaining structures 41214a, 41215b, 41214c and 41214d represent input data and descriptors for the API call in 41504. The data pointer of 41214c may be used to link or chain the embedded message list 41212 of input data information from a higher level in the call chain corresponding to 41502 of FIG. 71A. The example 41200 represents the input data and descriptors prior to encoding. FIG. 71B may represent the format of the input data prior to encoding, for example, by input-prepare callback on the client.

Figure 72:
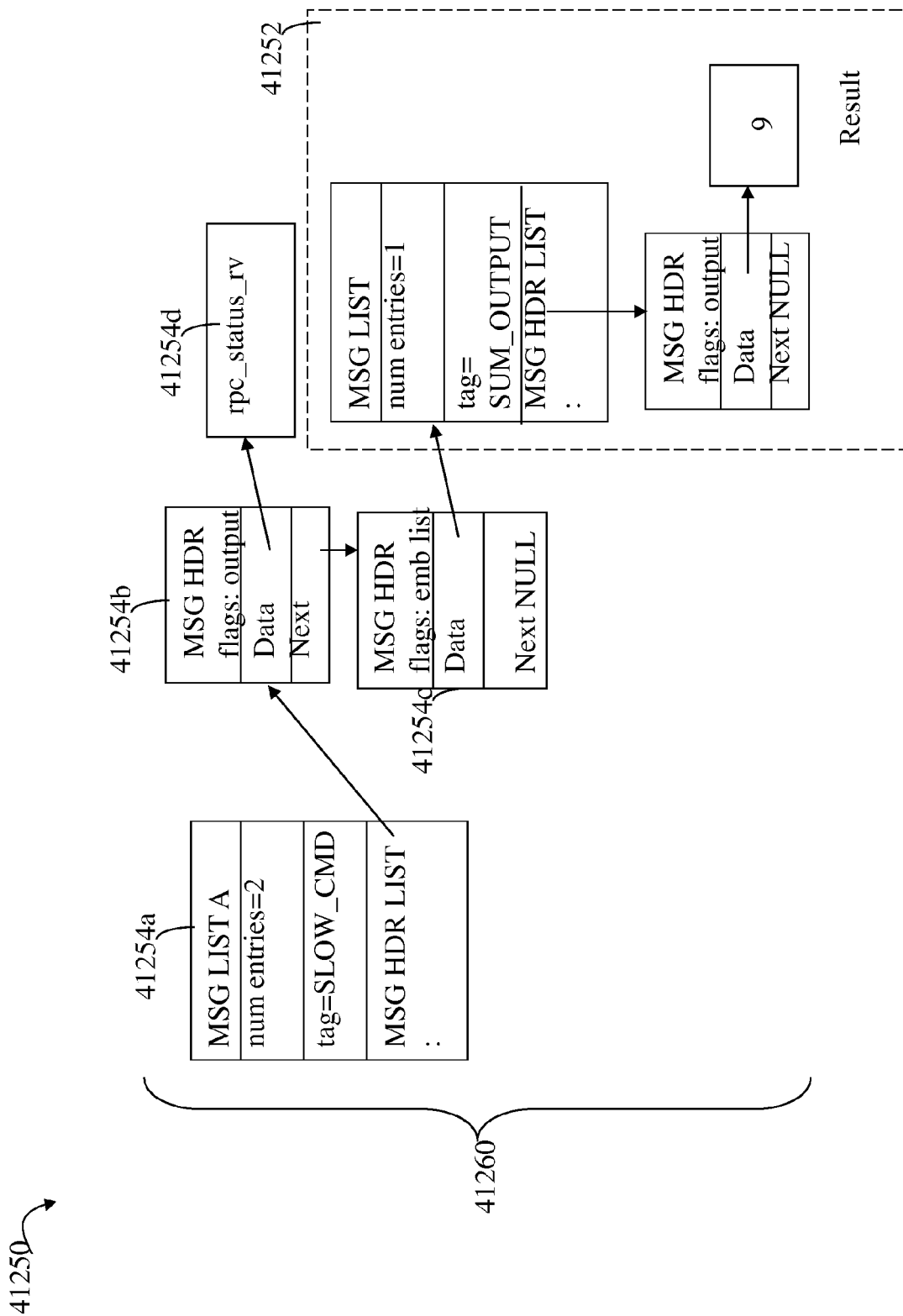

FIG. 72 may represent the output data and descriptors constructed as a hierarchical structure described herein using message lists and message headers with embedded message lists. In the example 41250, element 41252 represents the embedded message list of output data and descriptors for the call 41502 of FIG. 71A. The remaining structures 41254a, 41254b, 41254c, 41254d represent output data and descriptors for the API call of 41504 with the data pointer of 41254c used to link or chain the embedded message list of output data information 41252 from a higher level in the call chain. The example 41250 represents the input data and descriptors in the decoded or unencoded format such as after the client performs decoding upon receiving results from the server. FIG. 72 may represent the format of the output data after decoding processes results from the client, for example, such as may be performed by output-post callback on the client. The output prepare callback may be used to prepare the output data area prior to transmission to the server by copying and encoding the output data descriptors without copying any output data as described above.

An embodiment may provide an API which includes defined interfaces for forming and using the message lists described herein. In one embodiment, such an API may be referred to as a message transport API which may be used in connection with other APIs described herein. As will be appreciated by those skilled in the art, use of the message lists as described herein with embedded message lists may be used to reduce memory copies when passing parameter information from multiple hierarchical levels in a call chain. In an embodiment which does not use the message lists and techniques described above, each level in the call chain on the client side may alternatively allocate a buffer large enough to hold parameter information utilized by the current client side routine and a corresponding server-side routine and also for any parameter information passed to the current level by a calling routine. The current client side routine may copy any parameter information passed to it by a calling routine into the allocated buffer and then pass the buffer on to any next client side routine which is invoked in the call chain. Use of the message lists herein which utilize embedded message lists may reduce processing performed by a called routine since the called routine does not have to perform memory copying of parameter information passed to it by the calling routine. Rather, the called routine may use a pointer to an embedded message list of the parameter information received from the calling routine. In connection with techniques described herein on the client side prior to transmission to another container such as a server container, the chain of embedded message lists (also referred to as the decoded form or format) may be encoded into a contiguous stream which is then communicated to the server. The server may operate on the parameter information in its encoded form or may alternatively decode the parameter information and may operate on the parameter information in its decoded form. In either case, the server may transmit any output parameters to the client in the encoded format where the client may decode the output data in accordance with the decoded format forming a hierarchical structure of parameter information. An embodiment may use a message transport API for operating on the message lists so that the code invoking the message transport API routines is insulated from the different internal encoded and decoded formats that may be used. For example, the server side code may use a message transport API for extracting information from a message list and also populating a message list with output parameter data. As such, the server side code may be insulated from the particular format of the message lists on the server side as well as any changes to the message list formats. The code implementing the message transport API may perform processing in accordance with the particular format utilized. Similarly, the client side code may also use the message transport API. For example, code of the RPC API as described herein on both the client side and server side may utilize the message transport API which may include different APIs for forming the message list and its elements, extracting information from a message list, and the like.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for communicating between one or more producers and one or more consumers comprising:
   registering, by a first consumer of an event queue, for notification regarding occurrences of one or more events;
   posting, by a producer of the event queue, notification to a plurality of consumers of the event queue regarding one or more occurrences of one or more events, each of said plurality of consumers receiving notification regarding occurrences of events for which said each consumer is registered on a corresponding one of a plurality of event notification lists, said plurality of consumers including said first consumer, said posting including posting a first event notification to said plurality of event notification lists in accordance with a pending policy whereby processing of said producer is blocked if any of the plurality of event notification lists do not have a free entry to post the first event notification, said posting further including:
      posting, by said producer, said first event notification to a portion of said plurality of event notification lists; and
      blocking execution of said producer because an event notification list of the first consumer does not have a free entry to post the event notification, wherein said blocking blocks said producer from posting the first event notification to the event notification list and any other remaining ones of the plurality of event notification lists not included in the portion, wherein the event notification list of the first consumer is not included in said portion of said plurality of said event notification lists;

retrieving, by said first consumer, posted event notifications regarding events for which said first consumer is registered, wherein, if said first consumer is executing in user space and said event notification list of said plurality of event notification lists to which said event notifications for said first consumer are posted is located in shared memory, said first consumer retrieves said posted event notifications without proxying into kernel space, and wherein if said event notification list of said first consumer is not located in shared memory, said first consumer proxies into kernel space to retrieve said posted event notifications from said event notification list; and wherein said event notification list is implemented using a ring buffer, and wherein said event queue is used by different containers for communicating therebetween, each of said different containers executing in a context of its own address space that is different from address spaces of other containers.

2. The method of claim 1, wherein posting a notification regarding an occurrence of an event includes posting an event notification to an entry in said ring buffer and posting additional data to a private data area, said private data area being located in shared memory if said event notification list is included in shared memory.

3. The method of claim 1, wherein said producer uses a first application programming interface to create a first reference structure to said event queue, and said first consumer uses said first application programming interface to create a second reference structure to said event queue.

4. The method of claim 3, wherein said first consumer uses a second application programming interface to perform said registering, each invocation of said second application programming interface by said first consumer identifying said second reference structure, and wherein said first consumer uses a third programming interface to perform said retrieving, each invocation of said third programming interface by said first consumer identifying said second reference structure.

5. The method of claim 3, wherein said producer uses a second application programming interface to perform said posting, each invocation of said second application programming interface by said producer identifying said first reference structure.

6. The method of claim 4, wherein said producer is also a consumer of one or more events for which said producer has registered using said second application programming interface, wherein each invocation of said second application programming interface by said producer identifies said first reference structure.

7. The method of claim 1, wherein an application programming interface is invoked by code of a container other than said producer and said one or more consumers to create said event queue.

8. The method of claim 1, wherein said registering, said posting and said retrieving are performed using defined interfaces, said defined interfaces used when said producer executes in user space and said first consumer executes in user space, when said producer executes in user space and said first consumer executes in kernel space, and when said producer executes in kernel space and said first consumer executes in user space.

9. The method of claim 1, wherein said event queue is associated with a registration database of registered events for which consumers are registered, wherein processing performed to modify said registration database includes performing processing to close a logical gate, awakening all waiting producers of said event queue waiting for a free entry in any notification list of any consumer of said event queue, modifying said registration database, and opening said logical gate.

10. The method of claim 9, wherein processing performed by said producer in connection with said posting of an event notification for a first event to said event notification list of said first consumer includes: reading information from said registration database when said producer determines that said logical gate is opened, said information indicating that said first consumer is registered to receive notifications regarding said first event; acquiring a mutex to synchronize access to said first consumer's event notification list with other producers; and if there are no free entries in said first consumer's event notification list and said producer is trying to post an event notification to a bee entry in said first consumer's event notification list, said producer determines whether the gate is closed, and if the gate is closed, the producer releases said mutex and resumes processing when said gate is opened, and if the gate is open, said producer blocks waiting for a free entry in said first consumer's event notification list.

11. The method of claim 10, wherein an application programming interface includes a first defined interface for use by a consumer to perform said registering, a second defined interface for use by a consumer to unregister for a specified event, and a third defined interface used by producers and consumers of said event queue to indicate that an invoking container is ending use of said event queue for communications with other containers which have opened said event queue for communications using a fourth defined interface, and wherein code of routines for said first defined interface, said second defined interface and said third defined interface modify said registration database.

12. The method of claim 11, wherein said application programming interface includes a fifth defined interface used by a producer to perform said posting.

13. The method of claim 12, wherein said fifth defined interface includes a parameter indicating a policy utilized in connection with posting an event notification to a consumer's event notification list when the consumer's event notification list is full, said parameter indicating one of a plurality of policies, said plurality of policies including said pending policy, overwrite oldest, and overwrite newest, wherein said pending policy causes processing of a posting producer to wait until an entry in the consumer's event notification list is free, said overwrite oldest causes a posting producer to overwrite an oldest entry in the consumer's event notification list when full, and said overwrite newest causes a posting producer to overwrite a newest entry in the consumer's event notification list when full.

14. The method of claim 1, wherein a defined interface is used by said first consumer to perform said retrieving, said defined interface including a parameter indicating a timeout value, wherein, if said event notification list of said first consumer is empty, said timeout value specifies an amount of time said first consumer waits for an event notification to be posted to said event notification list prior to said first consumer continuing processing.

15. A non-transitory computer readable medium comprising executable code thereon for facilitating communications between one or more producers and one or more consumers, the computer readable medium comprising executable code for:

a first interface for opening communications between an invoking container and other containers using said event queue, said first defined interface being invoked by producers and consumers of said event queue prior to using said event queue for communicating with other containers, said first interface returning a reference to said event queue;

a second interface used by a consumer of said event queue to register for notification regarding occurrences of one or more events, said second interface including a parameter indicating said reference used by said consumer;

a third interface used by a producer of said event queue to post one or more notifications regarding one or more occurrences of one or more events to a plurality of consumers, each consumer receiving a notification on a corresponding one of a plurality of event notification lists used by said consumer regarding events for which said each consumer has registered using said second interface; and a fourth interface used by a consumer to retrieve event notifications from an event notification list regarding events for which the consumer is registered, wherein if the consumer is executing in user space and the event notification list of the consumer is located in shared memory, said consumer retrieves the event notifications therefrom without proxying into kernel space, and wherein if said event notification list of the consumer is not located in shared memory, said consumer proxies into kernel space to retrieve the event notifications therefrom;

wherein the producer uses the third interface to post a first event notification to said plurality of event notification lists in accordance with a pending policy whereby processing of the producer is blocked if any of the plurality of event notification lists do not have a free entry to post the first event notification, and the computer readable medium further comprises code for:

posting, by said producer, said first event notification to a portion of said plurality of event notification lists; and blocking execution of said producer because an event notification list of the first consumer does not have a free entry to post the event notification, wherein said blocking blocks said producer from posting the first event notification to the event notification list and any other remaining ones of the plurality of event notification lists not included in the portion, wherein the event notification list of the first consumer is not included in said portion of said plurality of said event notification lists;

wherein said event notification list is implemented using a ring buffer, and wherein said event queue is used by different containers for communicating therebetween, each of said different containers executing in a context of its own address space that is different from address spaces of other containers.

16. The non-transitory computer readable medium of claim 15, wherein said third interface includes a parameter indicating a policy utilized in connection with posting an event notification to a consumer's event notification list when the consumer's event notification list is full, said parameter of said third interface indicating one of a plurality of policies, said plurality of policies including pending policy, overwrite oldest, and overwrite newest, wherein said pending policy causes processing of a posting producer to wait until an entry in the consumer's event notification list is free, said overwrite oldest causes a posting producer to overwrite an oldest entry in the consumer's event notification list when full, and said overwrite newest causes a posting producer to overwrite a newest entry in the consumer's event notification list when full.

17. The non-transitory computer readable medium of claim 15, wherein said fourth interface includes a parameter indicating a timeout value, wherein, if said event notification list of said consumer is empty, said timeout value specifies an amount of time said consumer waits for an event notification to be posted to said event notification list prior to said consumer continuing processing.

18. The non-transitory computer readable medium of claim 15, wherein said first interface includes a parameter indicating whether an event notification list of said invoking container is located in shared memory, and wherein a producer invoking said first interface indicates that said event notification list is created to hold no entries.

19. The non-transitory computer readable medium of claim 15, wherein said event queue is used for communicating between different containers, each of said different containers executing in a context of an address space that is different from address spaces of other containers, and said computer readable medium includes code for implementing said interfaces between a producer executing in user space and a consumer executing in user space, between a producer executing in user space and a consumer executing in kernel space, and between a producer executing in kernel space and a consumer executing in user space.

* * * * *